(12) United States Patent
Lim et al.

(10) Patent No.: US 11,889,078 B2
(45) Date of Patent: *Jan. 30, 2024

(54) ENCODER, DECODER, ENCODING METHOD, AND DECODING METHOD

(71) Applicant: Panasonic Intellectual Property Corporation of America, Torrance, CA (US)

(72) Inventors: Chong Soon Lim, Singapore (SG); Hai Wei Sun, Singapore (SG); Sughosh Pavan Shashidhar, Singapore (SG); Han Boon Teo, Singapore (SG); Ru Ling Liao, Singapore (SG); Takahiro Nishi, Nara (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/833,540

(22) Filed: Jun. 6, 2022

(65) Prior Publication Data

US 2022/0303534 A1   Sep. 22, 2022

Related U.S. Application Data

(63) Continuation of application No. 16/417,517, filed on May 20, 2019, now Pat. No. 11,399,176, which is a (Continued)

(51) Int. Cl.
H04N 19/119 (2014.01)
H04N 19/159 (2014.01)
(Continued)

(52) U.S. Cl.
CPC ......... *H04N 19/119* (2014.11); *H04N 19/157* (2014.11); *H04N 19/159* (2014.11);
(Continued)

(58) Field of Classification Search
CPC .. H04N 19/119; H04N 19/157; H04N 19/159; H04N 19/176; H04N 19/196; H04N 19/463; H04N 19/96
See application file for complete search history.

(56) References Cited

U.S. PATENT DOCUMENTS 6,614,939 B1    9/2003   Yamauchi
7,925,103 B2    4/2011   Lee et al.
(Continued)

FOREIGN PATENT DOCUMENTS

EP    2 490 449 A1    8/2012
EP    2 680 584 A1    1/2014
(Continued)

OTHER PUBLICATIONS

Bordes et al., Huawei & HiSilicon, Qualcomm, Samsung, Technicolor, "CE2: Unified solution of flexible motion partitioning," JCTVC-E374, Joint Collaborative Team on Video Coding (JCT-VC) of ITU-T SG16 WP3 and ISO/IEC JTC1/SC29/WG11, 5$^{th}$ Meeting, Geneva, CH, Mar. 16-23, 2011. (3 pages).
(Continued)

*Primary Examiner* — Dakshesh D Parikh
(74) *Attorney, Agent, or Firm* — Seed IP Law Group LLP

(57) ABSTRACT

An image encoder/decoder includes circuitry and a memory coupled to the circuitry. When a geometry of a block of a picture satisfies a first condition, the circuitry splits the block of the picture into sub blocks having a first set of geometries. When the geometry of the block does not satisfy the first condition, the circuitry splits the block of the picture into sub blocks having a second set of geometries, the second set of
(Continued)

geometries being different from the first set of geometries. The circuitry encodes/decodes the sub blocks of the block.

1 Claim, 65 Drawing Sheets

Related U.S. Application Data continuation of application No. PCT/JP2017/041422, filed on Nov. 17, 2017.

(60) Provisional application No. 62/424,782, filed on Nov. 21, 2016.

(51) Int. Cl.
*H04N 19/176* (2014.01)
*H04N 19/196* (2014.01)
*H04N 19/96* (2014.01)
*H04N 19/157* (2014.01)
*H04N 19/463* (2014.01)

(52) U.S. Cl.
CPC ......... *H04N 19/176* (2014.11); *H04N 19/196* (2014.11); *H04N 19/463* (2014.11); *H04N 19/96* (2014.11)

(56) References Cited

U.S. PATENT DOCUMENTS

| | | | |
|---|---|---|---|
| 10,397,575 B2 | 8/2019 | Kobayashi | |
| 10,652,536 B2 | 5/2020 | Lim et al. | |
| 11,019,335 B2 | 5/2021 | Park et al. | |
| 2003/0035477 A1 | 2/2003 | Sekiguchi et al. | |
| 2011/0103475 A1 | 5/2011 | Alshina et al. | |
| 2012/0128070 A1 | 5/2012 | Kim et al. | |
| 2012/0147957 A1 | 6/2012 | Alshina et al. | |
| 2012/0177107 A1 | 7/2012 | Fu et al. | |
| 2012/0182388 A1 | 7/2012 | Lim et al. | |
| 2012/0288007 A1* | 11/2012 | Lee ...................... | H04N 19/119 375/E7.243 |
| 2013/0034159 A1 | 2/2013 | Siekmann et al. | |
| 2013/0034171 A1 | 2/2013 | Winken et al. | |
| 2013/0077686 A1 | 3/2013 | Alshina et al. | |
| 2013/0083849 A1 | 4/2013 | Alshina et al. | |
| 2013/0083850 A1 | 4/2013 | Alshina et al. | |
| 2013/0136175 A1* | 5/2013 | Wang ................... | H04N 19/593 375/240.12 |
| 2013/0136180 A1 | 5/2013 | Yang et al. | |
| 2013/0163664 A1* | 6/2013 | Guo ...................... | H04N 19/176 375/240.12 |
| 2013/0266067 A1 | 10/2013 | Song et al. | |
| 2013/0343664 A1 | 12/2013 | Kobayashi | |
| 2014/0098189 A1 | 4/2014 | Deng et al. | |
| 2014/0105287 A1 | 4/2014 | Alshina et al. | |
| 2014/0105296 A1 | 4/2014 | Alshina et al. | |
| 2014/0119455 A1 | 5/2014 | Kobayashi | |
| 2014/0119671 A1 | 5/2014 | Lim et al. | |
| 2014/0328389 A1 | 11/2014 | Fu et al. | |
| 2015/0016525 A1 | 1/2015 | Alshina et al. | |
| 2015/0326879 A1 | 11/2015 | Alshina et al. | |
| 2016/0057438 A1 | 2/2016 | Yamamoto et al. | |
| 2016/0173904 A1* | 6/2016 | Park ...................... | H04N 19/597 375/240.13 |
| 2016/0219308 A1* | 7/2016 | Zheng .................. | H04N 19/85 |
| 2016/0309156 A1 | 10/2016 | Park et al. | |
| 2016/0353113 A1 | 12/2016 | Zhang et al. | |
| 2017/0041607 A1 | 2/2017 | Song et al. | |
| 2017/0124430 A1 | 5/2017 | Ohira et al. | |
| 2017/0208336 A1* | 7/2017 | Li ......................... | H04N 19/136 |
| 2017/0251219 A1 | 8/2017 | Song et al. | |
| 2017/0272782 A1 | 9/2017 | Li et al. | |
| 2017/0353721 A1* | 12/2017 | Piao ..................... | H04N 19/176 |
| 2018/0070110 A1* | 3/2018 | Chuang ................ | H04N 19/96 |
| 2018/0109812 A1 | 4/2018 | Tsai et al. | |
| 2018/0139453 A1 | 5/2018 | Park et al. | |
| 2019/0281285 A1* | 9/2019 | Piao ..................... | H04N 19/137 |

FOREIGN PATENT DOCUMENTS

| | | |
|---|---|---|
| EP | 2 866 443 A1 | 4/2015 |
| EP | 3 016 392 A1 | 5/2016 |
| JP | 2011-10371 A | 1/2011 |
| JP | 2012-80213 A | 4/2012 |
| JP | 2012-518940 A | 8/2012 |
| JP | 2013-528023 A | 7/2013 |
| JP | 2013-229674 A | 11/2013 |
| JP | 2015-536112 A | 12/2015 |
| WO | 2010/002214 A2 | 1/2010 |
| WO | 2012/077960 A3 | 6/2012 |
| WO | 2014/120367 A1 | 8/2014 |
| WO | 2015/012622 A1 | 1/2015 |
| WO | 2016/148438 A2 | 9/2016 |
| WO | 2017/123980 A1 | 7/2017 |

OTHER PUBLICATIONS

Chen et al., "Algorithm Description of Joint Exploration Test Model 4", Joint Video Exploration Team (JVET) of ITU-T SG 16 WP 3 and ISO/IEC JTC 1/SC 29/WG 11, 4$^{th}$ Meeting, Chengdu, CN, Oct. 15-21, 2016, Document: JVET-D1001 v3, 5 pages.
European Summons to attend oral proceedings pursuant to Rule 115(1) EPC dated Sep. 11, 2020, for the corresponding European Patent Application No. 17872674.1, 6 pages.
Extended European Search Report, dated Jun. 25, 2019, for European Application No. 17871825.0-1208, 8 pages.
Extended European Search Report, dated Aug. 1, 2019, for European Application No. 17870669.3-1208, 9 pages.
Extended European Search Report, dated Aug. 1, 2019, for European Application No. 17872674.1-1208, 9 pages.
Extended European Search Report, dated Nov. 10, 2021, for European Application No. 21184694.4-1208, 11 pages.
Extended European Search Report, dated Feb. 15, 2022, for European Application No. 21192846.0-1208. (9 pages).
Huang et al., MediaTek Inc., "EE2.1: Quadtree plus binary tree structure integration with JEM tools," JVET-C0024, Joint Video Exploration Team (JVET) of ITU-T SG 16 WP 3 and ISO/IEC JTC 1/SC 29/WG 11, 3$^{rd}$ Meeting: Geneva, CH, 26 May-Jun. 1, 2016, 5 pages.
Information technology—High efficiency coding and media delivery in heterogeneous environments—Part 2:High efficiency video coding, ISO/IEC 23008-2:2013(E), Geneva, Switzerland, Dec. 1, 2013.
International Search Report dated Feb. 20, 2018 for International Application No. PCT/JP2017/041421, 5 pages. (With English Translation).
International Search Report dated Feb. 20, 2018 for International Application No. PCT/JP2017/041422, 8 pages. (With English Translation).
International Search Report dated Feb. 20, 2018 for International Application No. PCT/JP2017/041423, 11 pages. (With English Translation).
Japanese Notice of Reasons for Refusal dated Jul. 14, 2020, for the corresponding Japanese Patent Application No. 2018-551694, 5 pages. (With English Translation).
Japanese Notice of Reasons for Refusal dated Jul. 14, 2020, for Japanese Patent Application No. 2018-551695, 6 pages. (With English Translation).
Japanese Notice of Reasons for Refusal dated Sep. 15, 2020, for Japanese Patent Application No. 2018-551695, 5 pages. (With English Translation).
Li et al., Qualcomm Inc., "Multi-Type-Tree," JVET-D0117, Joint Video Exploration Team (JVET) of ITU-T SG 16 WP 3 and ISO/IEC JTC 1/SC 29/WG 11, 4$^{th}$ Meeting: Chengdu, CN, Oct. 15-21, 2016, 3 pages.

(56) References Cited

OTHER PUBLICATIONS

Li et al., "Multi-Type Tree," Joint Video Exploration Team (JVET) of ITU-T SG 16 WP 3 and ISO/IEC JTC 1/SC 29/WG 11 4th Meeting: Chengdu, CN, Oct. 15-21, 2016, Document JVET_D0117rl, 3 pages.
Office Action, dated Mar. 9, 2022, for U.S. Appl. No. 16/417,514, Chong Soon Lim et al., "Encoder, Decoder, Encoding Method, and Decoding Method," 30 pages.
Search Report of TW Patent Application No. 106140146, dated Aug. 26, 2021, 2 Pages. (with English Translation).
Taiwanese Office Action, dated Aug. 30, 2021 for Taiwanese Patent Application No. 106140146, 11 Pages.
Taiwanese Search Report, dated Sep. 9, 2021, for Taiwanese Application No. 106140147. (18 pages). (with English translation).
Korean Office Action, dated Sep. 27, 2022, for Korean Patent Application No. 10-2019-7013979. (6 pages) (with English Translation).
Panusopone et al., "Efficient Transform Unit Representation," JCTVC-D250_r2, Joint Collaborative Team on Video Coding (JCT-VC) of ITU-T SG16 WP3 and ISO/IEC JTC1/SC29/WG11, 4nd Meeting: Daegu, KR, Jan. 20-28, 2011. (3 pages).
Written Decision on Dismissal of Amendment, dated Sep. 27, 2022, for Korean Patent Application No. 10-2019-7013979. (8 pages) (with English Translation).
Non-Final Office Action, dated Dec. 6, 2022, for U.S. Appl. No. 17/580,344, 22 pages.

\* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$<br>WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$<br>WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

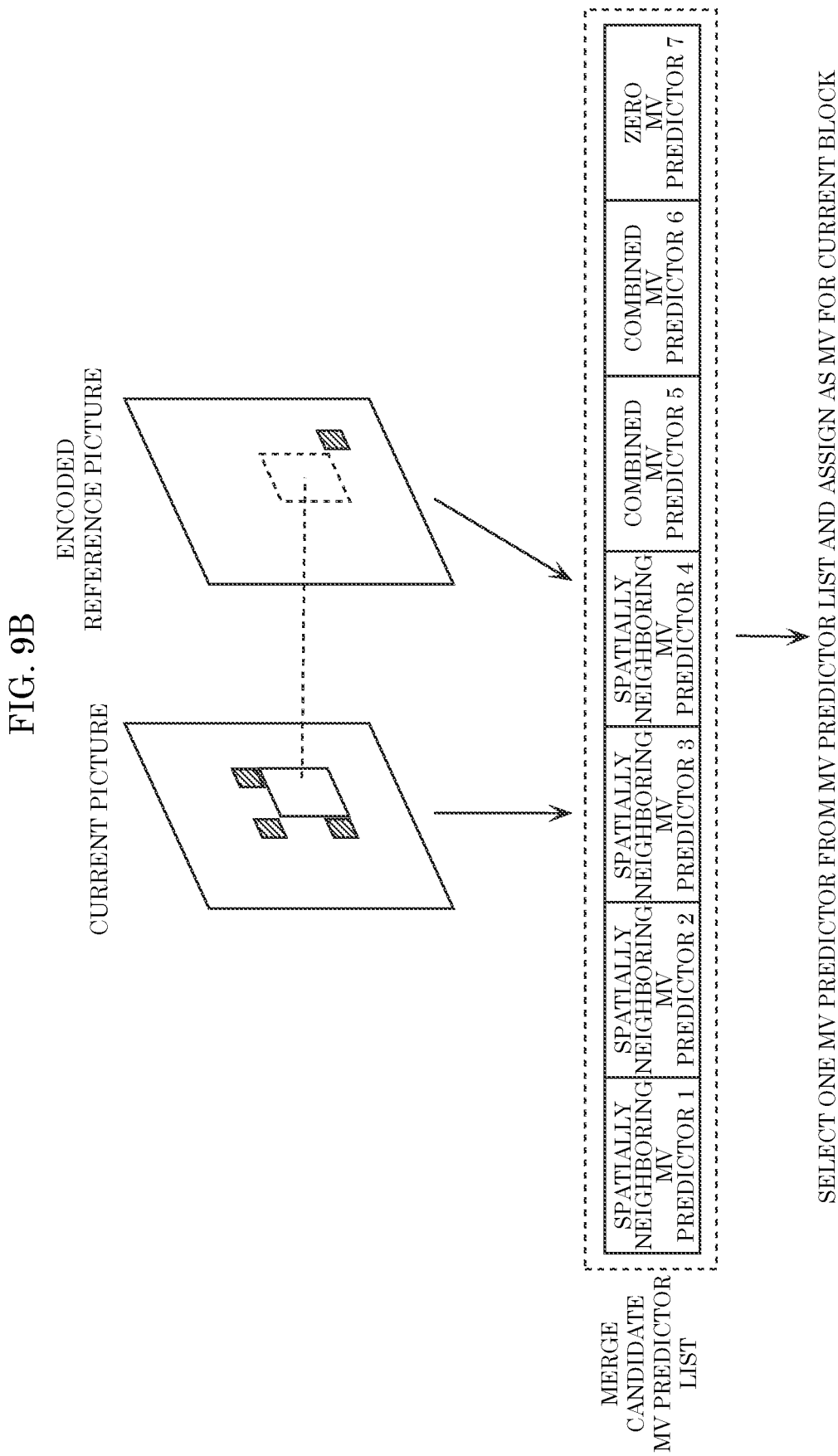

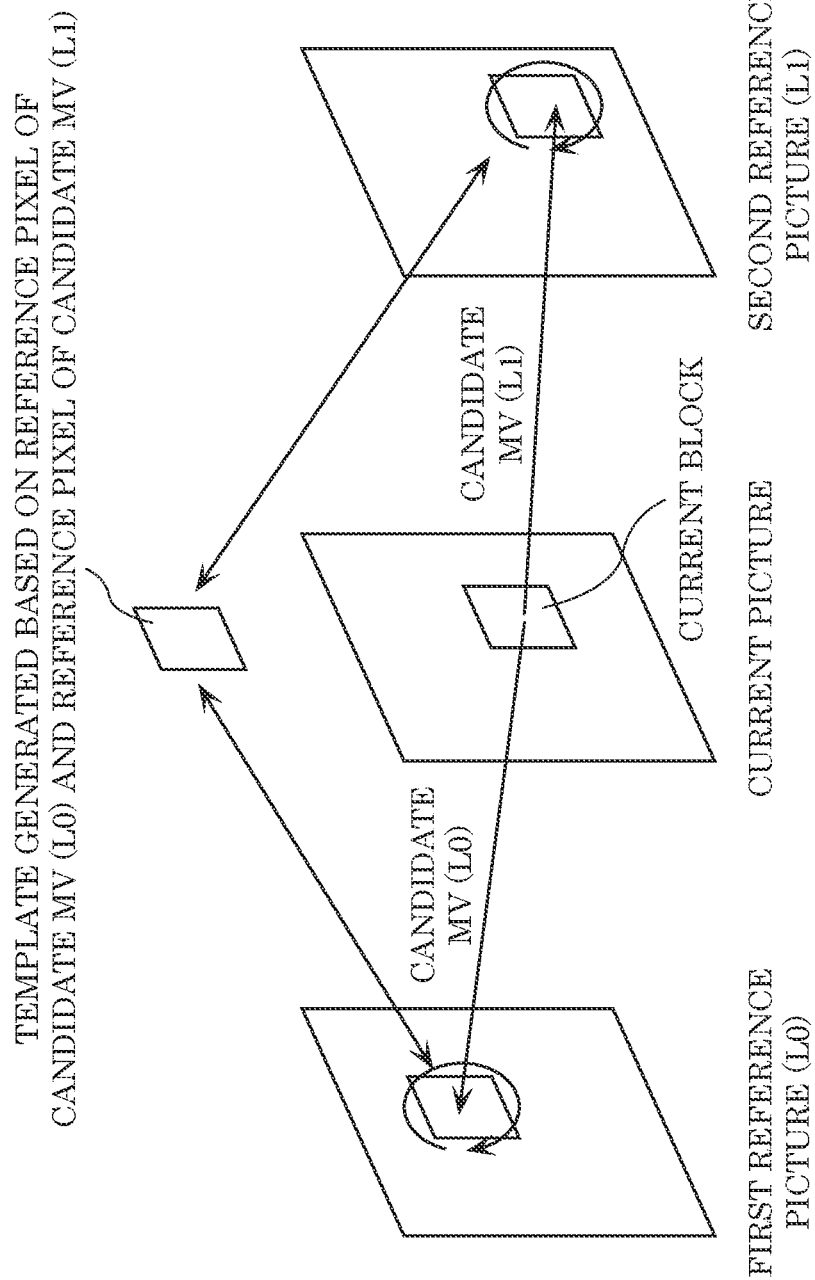

SELECT BLOCK PARTITION STRUCTURE
AT DEPTH 1

ENCODER, DECODER, ENCODING METHOD, AND DECODING METHOD

BACKGROUND

Technical Field

This disclosure relates to video coding, and particularly to video encoding and decoding systems, components, and methods for performing block partitioning related to a prediction process, a transform process or an inverse transform function.

Description of the Related Art

With advancement in video coding technology, from H.261 and MPEG-1 to H.264/AVC (Advanced Video Coding), MPEG-LA, H.265/HEVC (High Efficiency Video Coding) and H.266/VVC (Versatile Video Codec), there remains a constant need to provide improvements and optimizations to the video coding technology to process an ever-increasing amount of digital video data in various applications. This disclosure relates to further advancements, improvements and optimizations in video coding, particularly in block partitioning related to a prediction process, a transform process or an inverse transform process.

BRIEF SUMMARY

In an embodiment, an image encoder includes circuitry and a memory coupled to the circuitry. When a geometry of a block of a picture satisfies a first condition, the circuitry splits the block of the picture into sub blocks having a first set of geometries. When the geometry of the block does not satisfy the first condition, the circuitry splits the block of the picture into sub blocks having a second set of geometries, the second set of geometries being different from the first set of geometries. The circuitry encodes the sub blocks of the block.

In an embodiment, an image encoding method includes, when a geometry of a block of a picture satisfies a first condition, splitting the block of the picture into sub blocks having a first set of geometries. When the geometry of the block does not satisfy the first condition, the block of the picture is split into sub blocks having a second set of geometries, the second set of geometries being different from the first set of geometries. The sub blocks of the block of the picture are encoded.

In an embodiment, an image decoder includes circuitry and a memory coupled to the circuitry. When a geometry of a block of a picture satisfies a first condition, the circuitry splits the block of the picture into sub blocks having a first set of geometries. When the geometry of the block does not satisfy the first condition, the circuitry splits the block of the picture into sub blocks having a second set of geometries, the second set of geometries being different from the first set of geometries. The circuitry decodes the sub blocks of the block. In an embodiment, an image decoding method includes, when a geometry of a block of a picture satisfies a first condition, splitting the block of the picture into sub blocks having a first set of geometries. When the geometry of the block does not satisfy the first condition, the block of the picture is split into sub blocks having a second set of geometries, the second set of geometries being different from the first set of geometries. The sub blocks of the block of the picture are decoded.

General or specific aspects of the present disclosure may be realized as a system, method, integrated circuit, computer program, computer readable medium such as a CD-ROM, or any given combination thereof.

The present disclosure can provide an encoder, a decoder, an encoding method, and a decoding method capable of realizing a further improved compression efficiency and a further reduced processing load.

Some implementations of embodiments of the present disclosure may improve an encoding efficiency, may simply be an encoding/decoding process, may accelerate an encoding/decoding process speed, may efficiently select appropriate components/operations used in encoding and decoding such as appropriate filter, block size, motion vector, reference picture, reference block, etc.

Additional benefits and advantages of the disclosed embodiments will become apparent from the specification and drawings. The benefits and/or advantages may be individually obtained by the various embodiments and features of the specification and drawings, not all of which need to be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

FIG. 3 is a table indicating transform basis functions of various transform types.

FIG. 9B illustrates one example of a process for deriving a motion vector in merge mode.

FIG. 9C is a conceptual diagram illustrating an example of DMVR (dynamic motion vector refreshing) processing.

DETAILED DESCRIPTION

Figure 1:
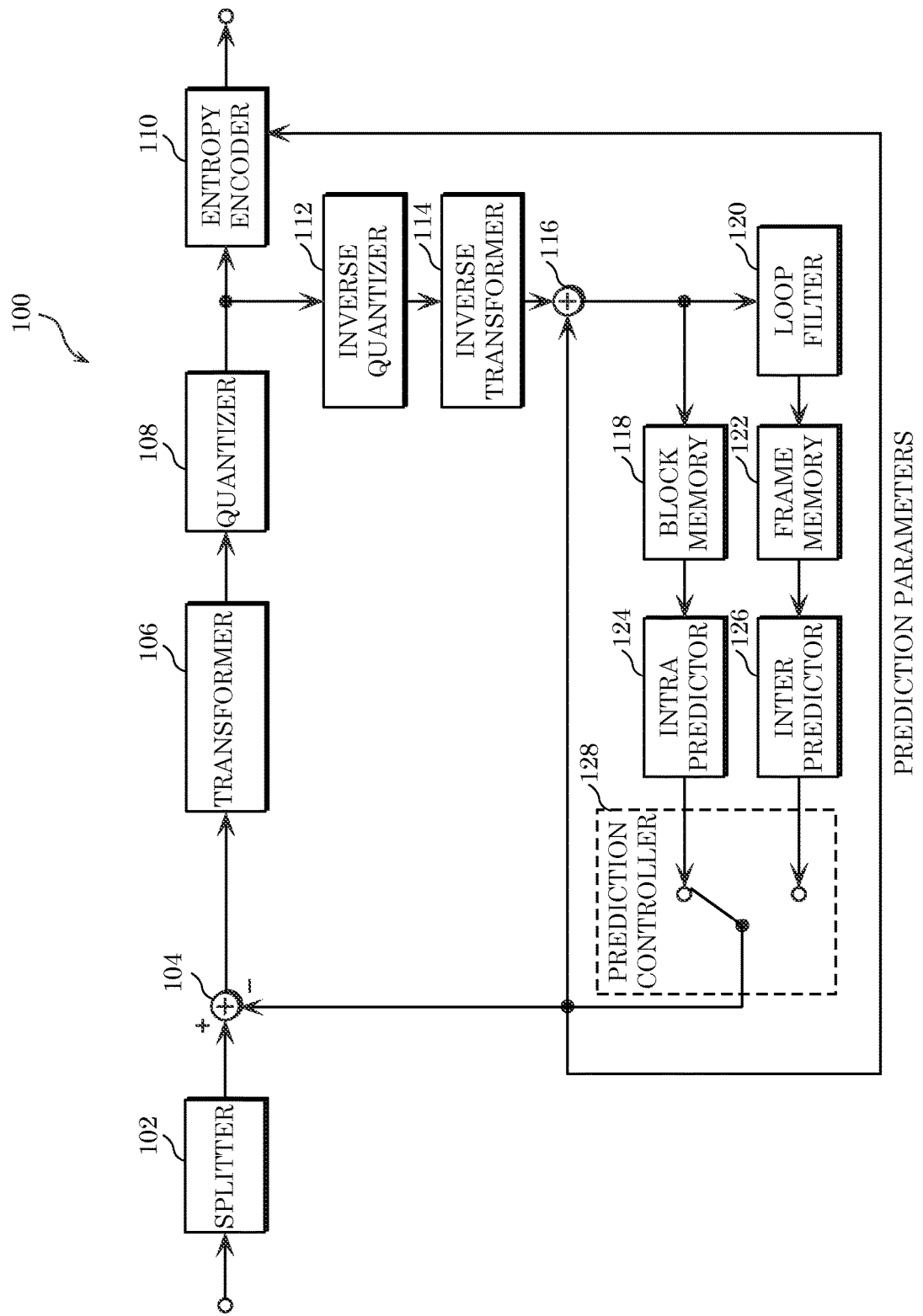
FIG. 1 is a block diagram illustrating a functional configuration of an encoder according to an embodiment.

Hereinafter, embodiment(s) will be described with reference to the drawings. Note that the embodiment(s) described below each show a general or specific example. The numerical values, shapes, materials, components, the arrangement and connection of the components, steps, the relation and order of the steps, etc., indicated in the following embodiment(s) are mere examples, and are not intended to limit the scope of the claims. Therefore, those components disclosed in the following embodiment(s) but not recited in any of the independent claims defining the broadest inventive concepts may be understood as optional components.

Embodiments of an encoder and a decoder will be described below. The embodiments are examples of an encoder and a decoder to which the processes and/or configurations presented in the description of aspects of the present disclosure are applicable. The processes and/or configurations can also be implemented in an encoder and a decoder different from those according to the embodiments. For example, regarding the processes and/or configurations as applied to the embodiments, any of the following may be implemented:

(1) Any of the components of the encoder or the decoder according to the embodiments presented in the description of aspects of the present disclosure may be substituted or combined with another component presented anywhere in the description of aspects of the present disclosure.

(2) In the encoder or the decoder according to the embodiments, discretionary changes may be made to functions or processes performed by one or more components of the encoder or the decoder, such as addition, substitution, removal, etc., of the functions or processes. For example, any function or process may be substituted or combined with another function or process presented anywhere in the description of aspects of the present disclosure.

(3) In the method implemented by the encoder or the decoder according to the embodiments, discretionary changes may be made such as addition, substitution, and removal of one or more of the processes included in the method. For example, any process in the method may be substituted or combined with another process presented anywhere in the description of aspects of the present disclosure.

(4) One or more components included in the encoder or the decoder according to embodiments may be combined with a component presented anywhere in the description of aspects of the present disclosure, may be combined with a component including one or more functions presented anywhere in the description of aspects of the present disclosure, and may be combined with a component that implements one or more processes implemented by a component presented in the description of aspects of the present disclosure.

(5) A component including one or more functions of the encoder or the decoder according to the embodiments, or a component that implements one or more processes of the encoder or the decoder according to the embodiments, may be combined or substituted with a component presented anywhere in the description of aspects of the present disclosure, with a component including one or more functions presented anywhere in the description of aspects of the present disclosure, or with a component that implements one or more processes presented anywhere in the description of aspects of the present disclosure.

(6) In the method implemented by the encoder or the decoder according to the embodiments, any of the processes included in the method may be substituted or combined with a process presented anywhere in the description of aspects of the present disclosure or with any corresponding or equivalent process.

(7) One or more processes included in the method implemented by the encoder or the decoder according to the embodiments may be combined with a process presented anywhere in the description of aspects of the present disclosure.

(8) The implementation of the processes and/or configurations presented in the description of aspects of the present disclosure is not limited to the encoder or the decoder according to the embodiments. For example, the processes and/or configurations may be implemented in a device used for a purpose different from the moving picture encoder or the moving picture decoder disclosed in the embodiments.

Encoder

First, the encoder according to an embodiment will be described. FIG. 1 is a block diagram illustrating a functional configuration of encoder 100 according to the embodiment. Encoder 100 is a moving picture encoder that encodes a moving picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

(Splitter)

Splitter 102 splits each picture included in an inputted moving picture into blocks, and outputs each block to subtractor 104. For example, splitter 102 first splits a picture into blocks of a fixed size (for example, 128×128). The fixed size block may also be referred to as a coding tree unit (CTU). Splitter 102 then splits each fixed size block into blocks of variable sizes (for example, 64×64 or smaller)

based, for example, on recursive quadtree and/or binary tree block splitting. The variable size block may also be referred to as a coding unit (CU), a prediction unit (PU), or a transform unit (TU). In various implementations there may be no need to differentiate between CU, PU, and TU; all or some of the blocks in a picture may be processed per CU, PU, or TU.

Figure 2:
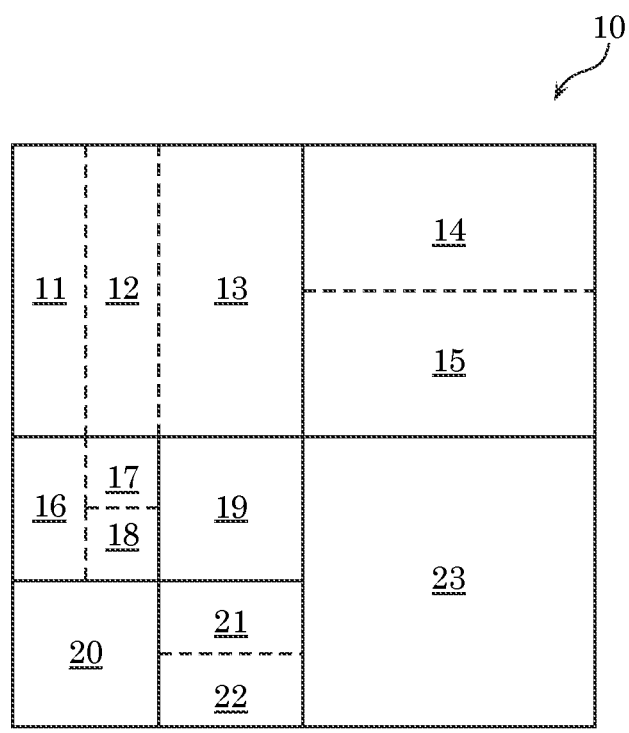
FIG. 2 illustrates one example of block splitting.

FIG. 2 illustrates one example of block splitting according to an embodiment. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

While in FIG. 2 one block is split into four or two blocks (quadtree or binary tree block splitting), splitting is not limited to these examples. For example, one block may be split into three blocks (ternary block splitting). Splitting including such ternary block splitting is also referred to as multi-type tree (MBT) splitting.

(Subtractor)

Subtractor 104 subtracts a prediction signal (prediction sample, inputted from prediction controller 128, to be described below) from an original signal (original sample) per block split by and inputted from splitter 102. In other words, subtractor 104 calculates prediction errors (also referred to as "residuals") of a block to be encoded (hereinafter referred to as a "current block"). Subtractor 104 then outputs the calculated prediction errors (residuals) to transformer 106.

The original signal is a signal input into encoder 100, and is a signal representing an image for each picture included in a moving picture (for example, a luma signal and two chroma signals). Hereinafter, a signal representing an image is also referred to as a sample.

(Transformer)

Transformer 106 transforms spatial domain prediction errors into frequency domain transform coefficients, and outputs the transform coefficients to quantizer 108. More specifically, transformer 106 applies, for example, a defined discrete cosine transform (DCT) or discrete sine transform (DST) to spatial domain prediction errors. The defined transform may be predefined.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction) as well as intra prediction mode.

Information indicating whether to apply EMT or AMT (referred to as, for example, an EMT flag or an AMT flag) and information indicating the selected transform type is typically signaled at the CU level. Note that the signaling of such information need not be performed at the CU level, and may be performed at another level (for example, at the bit sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are typically signaled at the CU level. Note that the signaling of such information need not be performed at the CU level, and may be performed at another level (for example, at the sequence level, picture level, slice level, tile level, or CTU level).

Either a separate transform or a non-separable transform may be applied in transformer 106. A separate transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

In another example of a non-separable transform, after the input 4×4 block is regarded as a single array including 16 components, a transform that performs a plurality of Givens rotations (e.g., a Hypercube-Givens Transform) may be applied on the array.

(Quantizer)

Quantizer 108 quantizes the transform coefficients output from transformer 106. More specifically, quantizer 108 scans, in a determined scanning order, the transform coefficients of the current block, and quantizes the scanned transform coefficients based on quantization parameters (QP) corresponding to the transform coefficients. The determined scanning order may be predetermined. Quantizer 108 then outputs the quantized transform coefficients (hereinafter referred to as quantized coefficients) of the current block to entropy encoder 110 and inverse quantizer 112.

A determined scanning order is an order for quantizing/inverse quantizing transform coefficients. For example, a determined scanning order is defined as ascending order of frequency (from low to high frequency) or descending order of frequency (from high to low frequency).

A quantization parameter (QP) is a parameter defining a quantization step size (quantization width). For example, if the value of the quantization parameter increases, the quantization step size also increases. In other words, if the value of the quantization parameter increases, the quantization error increases.

(Entropy Encoder)

Entropy encoder 110 generates an encoded signal (encoded bitstream) based on the quantized coefficients, which are inputted from quantizer 108. More specifically, for example, entropy encoder 110 binarizes quantized coefficients and arithmetic encodes the binary signal, to output a compressed bitstream or sequence.

(Inverse Quantizer)

Inverse quantizer 112 inverse quantizes the quantized coefficients, which are inputted from quantizer 108. More specifically, inverse quantizer 112 inverse quantizes, in a determined scanning order, quantized coefficients of the current block. Inverse quantizer 112 then outputs the inverse quantized transform coefficients of the current block to inverse transformer 114. The determined scanning order may be predetermined.

(Inverse Transformer)

Inverse transformer 114 restores prediction errors (residuals) by inverse transforming the transform coefficients, which are inputted from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since, typically, information is lost in quantization, the restored prediction errors do not match the prediction errors calculated by subtractor 104. In other words, the restored prediction errors typically include quantization errors.

(Adder)

Adder 116 reconstructs the current block by summing prediction errors, which are inputted from inverse transformer 114, and prediction samples, which are inputted from prediction controller 128. Adder 116 then outputs the reconstructed block to block memory 118 and loop filter 120. A reconstructed block is also referred to as a local decoded block.

(Block Memory)

Block memory 118 is storage for storing blocks in a picture to be encoded (referred to as a "current picture") for reference in intra prediction, for example. More specifically, block memory 118 stores reconstructed blocks output from adder 116.

(Loop Filter)

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes. For example, gradient directionality D is calculated by comparing gradients of a plurality of directions (for example, the horizontal, vertical, and two diagonal directions). Furthermore, for example, gradient activity A is calculated by summing gradients of a plurality of directions and quantizing the sum.

The filter to be used for each sub-block is determined from among the plurality of filters based on the result of such categorization.

Figure 4A:
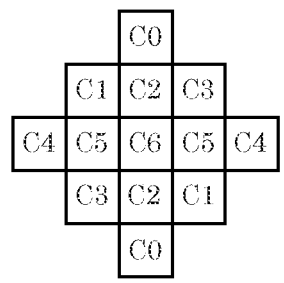
FIG. 4A illustrates one example of a filter shape used in ALF (adaptive loop filter).
Figure 4B:
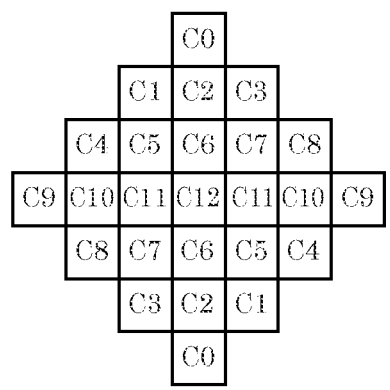
FIG. 4B illustrates another example of a filter shape used in ALF.
Figure 4C:
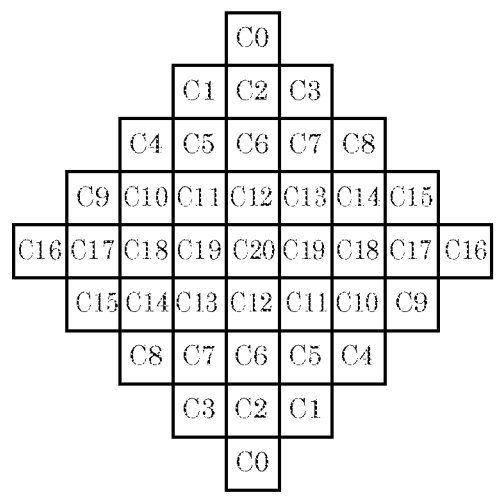
FIG. 4C illustrates another example of a filter shape used in ALF.

The filter shape to be used in ALF is, for example, a circular symmetric filter shape. FIGS. 4A, 4B, and 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is typically signaled at the picture level. Note that the signaling of information indicating the filter shape need not be performed at the picture level, and may be performed at another level (for example, at the sequence level, slice level, tile level, CTU level, or CU level).

The enabling or disabling of ALF may be determined at the picture level or CU level. For example, for luma, the decision to apply ALF or not may be done at the CU level, and for chroma, the decision to apply ALF or not may be done at the picture level. Information indicating whether ALF is enabled or disabled is typically signaled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is typically signaled at the picture level. Note that the signaling of the coefficients set need not be performed at the picture level, and may be performed at another level (for example, at the sequence level, slice level, tile level, CTU level, CU level, or sub-block level).

(Frame Memory)

Frame memory 122 is storage for storing reference pictures used in inter prediction, for example, and is also referred to as a frame buffer. More specifically, frame memory 122 stores reconstructed blocks filtered by loop filter 120.

(Intra Predictor)

Intra predictor 124 generates a prediction signal (intra prediction signal) by intra predicting the current block with reference to a block or blocks that are in the current picture as stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of defined intra prediction modes. The defined intra prediction modes may be predefined. The intra prediction modes typically include one or more non-directional prediction modes and a plurality of directional prediction modes.

The one or more non-directional prediction modes include, for example, planar prediction mode and DC prediction mode defined in the H.265/HEVC standard.

The plurality of directional prediction modes include, for example, the 33 directional prediction modes defined in the H.265/HEVC standard. Note that the plurality of directional prediction modes may include 32 directional prediction modes in addition to the 33 directional prediction modes (for a total of 65 directional prediction modes).

Figure 5A:
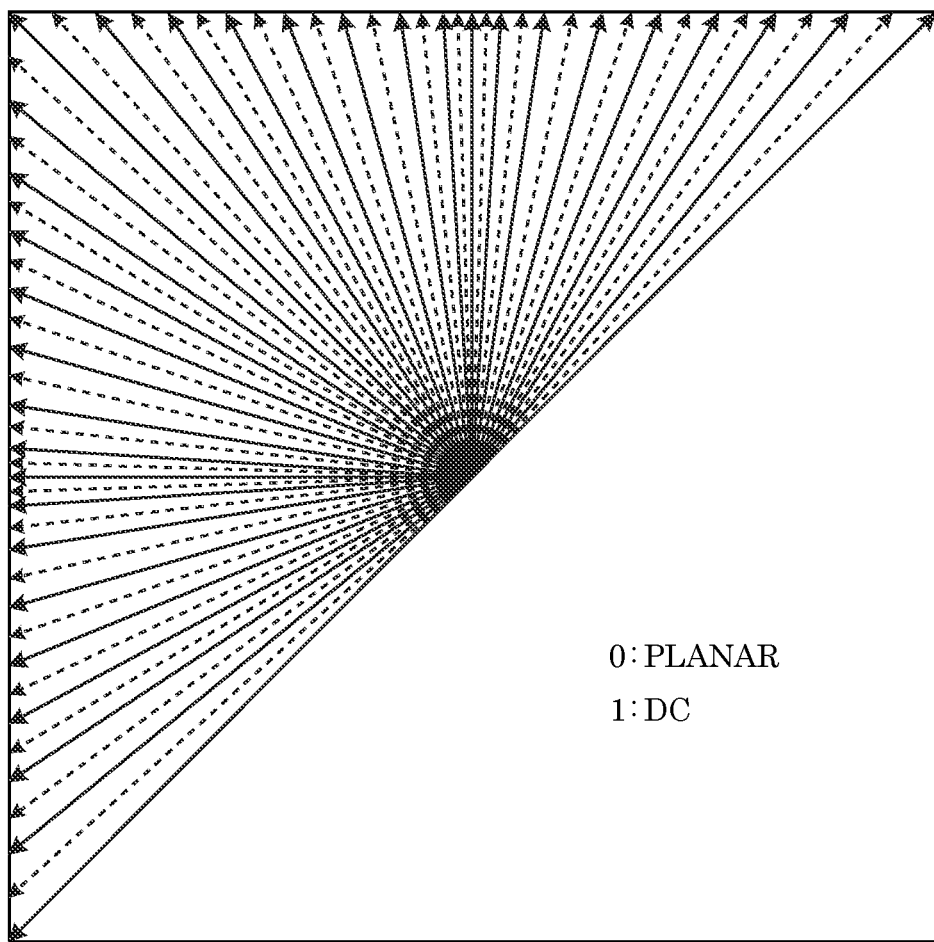
FIG. 5A illustrates 67 intra prediction modes used in an example of intra prediction.

FIG. 5A illustrates a total of 67 intra prediction modes used in intra prediction (two non-directional prediction modes and 65 directional prediction modes). The solid arrows represent the 33 directions defined in the H.265/HEVC standard, and the dashed arrows represent the additional 32 directions. (The two "non-directional" prediction modes are not illustrated in FIG. 5A.)

In various implementations, a luma block may be referenced in chroma block intra prediction. That is, a chroma component of the current block may be predicted based on a luma component of the current block. Such intra prediction is also referred to as cross-component linear model (CCLM) prediction. The chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is typically signaled at the CU level. Note that the signaling of this information need not be performed at the CU level, and may be performed at another level (for example, on the sequence level, picture level, slice level, tile level, or CTU level).

(Inter Predictor)

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per current sub-block (for example, per 4×4 block) in the current block. For example, inter predictor 126 performs motion estimation in a reference picture for the current block or the current sub-block, to find a reference block or sub-block in the reference picture that best matches the current block or sub-block. Inter predictor 126 then performs motion compensation (or motion prediction) based on the motion estimation, to obtain motion information (for example, a motion vector) that compensates for (or predicts) the movement or change from the reference block or sub-block to the current block or sub-block, and generates an inter prediction signal of the current block or sub-block based on the motion information. Inter predictor 126 then outputs the generated inter prediction signal to prediction controller 128.

The motion information used in motion compensation may be signaled in a variety of forms as the inter prediction signal. For example, a motion vector may be signaled. As another example, a difference between a motion vector and a motion vector predictor may be signaled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from the motion estimation (in the reference picture) and a prediction signal based on motion information of a neighboring block (in the current picture). Such inter prediction (motion compensation) is also referred to as overlapped block motion compensation (OBMC).

In OBMC mode, information indicating sub-block size for OBMC (referred to as, for example, OBMC block size) may be signaled at the sequence level. Further, information indicating whether to apply the OBMC mode or not (referred to as, for example, an OBMC flag) may be signaled at the CU level. Note that the signaling of such information need not be performed at the sequence level and CU level, and may be performed at another level (for example, at the picture level, slice level, tile level, CTU level, or sub-block level).

Figure 5B:
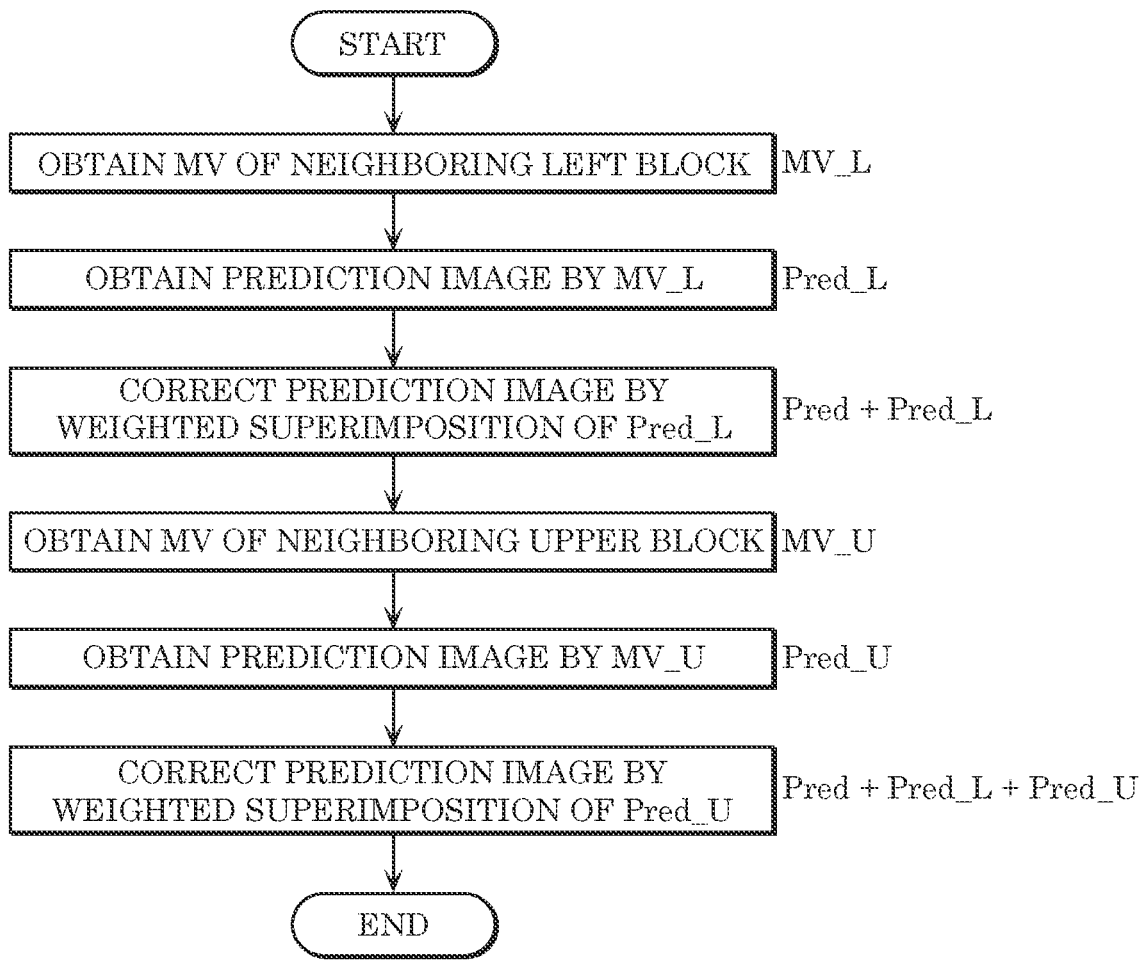
FIG. 5B is a flow chart illustrating one example of a prediction image correction process performed in OBMC (overlapped block motion compensation) processing.

Hereinafter, the OBMC mode will be described in further detail. FIG. 5B is a flowchart and FIG. 5C is a conceptual diagram illustrating a prediction image correction process performed by OBMC processing.

Figure 5C:
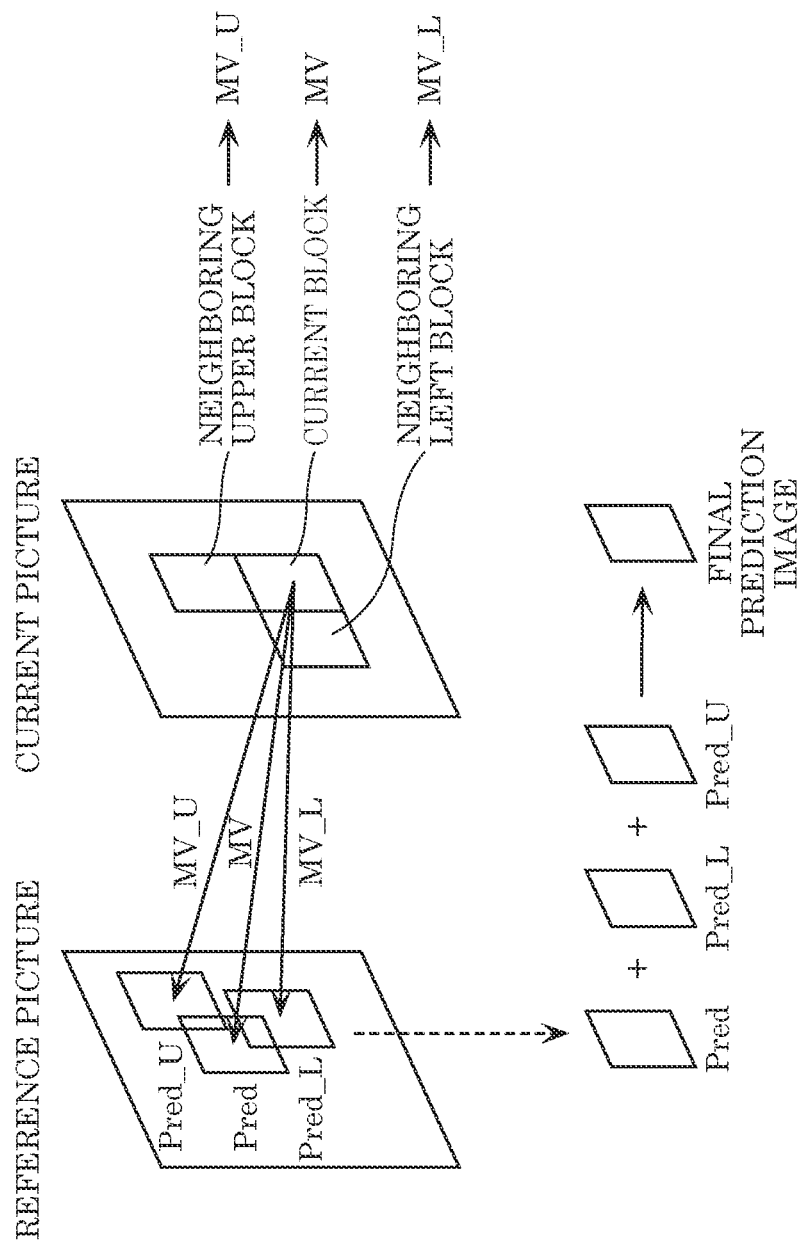
FIG. 5C is a conceptual diagram illustrating one example of a prediction image correction process performed in OBMC processing.

Referring to FIG. 5C, first, a prediction image (Pred) is obtained through typical motion compensation using a motion vector (MV) assigned to the target (current) block. In FIG. 5C, an arrow "MV" points to the reference picture, to indicate what the current block in the current picture is referencing in order to obtain a prediction image.

Next, a prediction image (Pred_L) is obtained by applying (reusing) a motion vector (MV_L), which was already derived for the encoded neighboring left block, to the target (current) block, as indicated by an arrow "MV_L" originating from the current block and pointing to the reference picture to obtain the prediction image Pred_L. Then, the two prediction images Pred and Pred_L are superimposed to perform a first pass of the correction of the prediction image, which in one aspect has an effect of blending the border between the neighboring blocks.

Similarly, a prediction image (Pred_U) is obtained by applying (reusing) a motion vector (MV_U), which was already derived for the encoded neighboring upper block, to the target (current) block, as indicated by an arrow "MV_U" originating from the current block and pointing to the reference picture to obtain the prediction image Pred_U. Then, the prediction image Pred_U is superimposed with the prediction image resulting from the first pass (i.e., Pred and Pred_L) to perform a second pass of the correction of the prediction image, which in one aspect has an effect of blending the border between the neighboring blocks. The result of the second pass is the final prediction image for the current block, with blended (smoothed) borders with its neighboring blocks.

Note that the above example is of a two-pass correction method using the neighboring left and upper blocks, but the method may be a three-pass or higher-pass correction method that also uses the neighboring right and/or lower block.

Note that the region subject to superimposition may be the entire pixel region of the block, and, alternatively, may be a partial block boundary region.

Note that here, the prediction image correction process of OBMC is described as being based on a single reference picture to derive a single prediction image Pred, to which additional prediction images Pred_L and Pred_U are superimposed, but the same process may apply to each of a plurality of reference pictures when the prediction image is corrected based on the plurality of reference pictures. In such a case, after a plurality of corrected prediction images are obtained by performing the image correction of OBMC based on the plurality of reference pictures, respectively, the obtained plurality of corrected prediction images are superimposed to obtain the final prediction image.

Note that, in OBMC, the unit of the target block may be a prediction block and, alternatively, may be a sub-block obtained by dividing the prediction block.

One example of a method to determine whether to implement OBMC processing is to use an obmc_flag, which is a signal that indicates whether to implement OBMC processing. As one specific example, the encoder may determine whether the target block belongs to a region including complicated motion. The encoder sets the obmc_flag to a value of "1" when the block belongs to a region including complicated motion and implements OBMC processing during encoding, and sets the obmc_flag to a value of "0" when the block does not belong to a region including complication motion and encodes the block without implementing OBMC processing. The decoder switches between implementing OBMC processing or not by decoding the obmc_flag written in the stream (i.e., the compressed sequence) and performing the decoding in accordance with the flag value.

Note that the motion information may be derived on the decoder side without being signaled from the encoder side. For example, a merge mode defined in the H.265/HEVC standard may be used. Furthermore, for example, the motion information may be derived by performing motion estimation on the decoder side. In this case, the decoder side may perform motion estimation without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
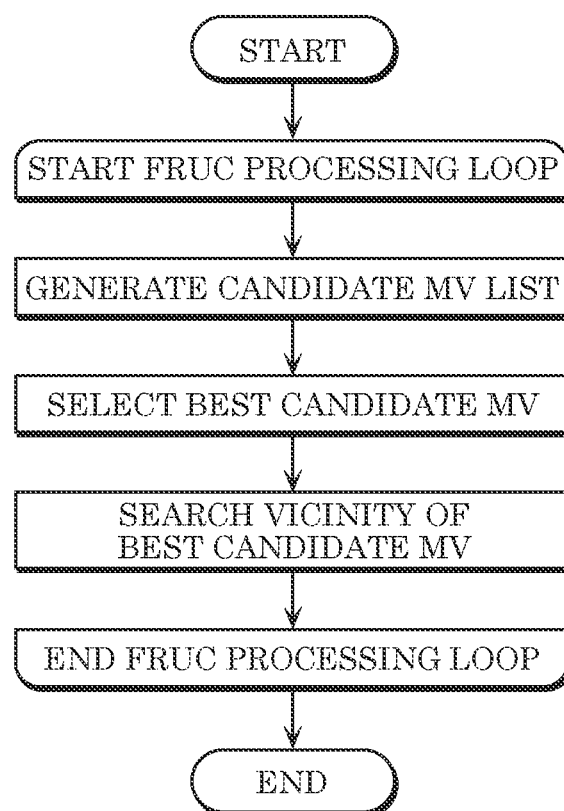
FIG. 5D is a flow chart illustrating one example of FRUC (frame rate up conversion) processing.

One example of FRUC processing is illustrated in FIG. 5D. First, a candidate list (a candidate list may be a merge list) of candidates, each including a prediction motion vector (MV), is generated with reference to motion vectors of encoded blocks that spatially or temporally neighbor the current block. Next, the best candidate MV is selected from among the plurality of candidate MVs registered in the candidate list. For example, evaluation values for the candidate MVs included in the candidate list are calculated and one candidate MV is selected based on the calculated evaluation values.

Next, a motion vector for the current block is derived from the motion vector of the selected candidate. More specifically, for example, the motion vector for the current block is calculated as the motion vector of the selected candidate (the best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched using pattern matching in a reference picture and evaluation values, and an MV having a better evaluation value is found, the best candidate MV may be updated to the MV having the better evaluation value, and the MV having the better evaluation value may be used as the final MV for the current block. A configuration in which the processing to update the MV having a better evaluation value is not implemented is also acceptable.

The same processes may be performed in cases in which the processing is performed in units of sub-blocks.

An evaluation value may be calculated in various ways. For example, a reconstructed image of a region in a reference picture corresponding to a motion vector is compared with a reconstructed image of a determined region (which may be in another reference picture or in a neighboring block in the current picture, for example, as described below), and a difference in pixel values between the two reconstructed images may be calculated and used as an evaluation value of the motion vector. The determined region may be predetermined. Note that the evaluation value may be calculated by using some other information in addition to the difference.

Next, pattern matching is described in detail. First, one candidate MV included in a candidate list (e.g., a merge list) is selected as the starting point for the search by pattern matching. The pattern matching used is either first pattern matching or second pattern matching. First pattern matching and second pattern matching are also referred to as bilateral matching and template matching, respectively.

In first pattern matching, pattern matching is performed between two blocks in two different reference pictures that are both along the motion trajectory of the current block. Therefore, in first pattern matching, for a region in a reference picture, a region in another reference picture that conforms to the motion trajectory of the current block is used as the determined region for the above-described calculation of the candidate's evaluation value.

Figure 6:
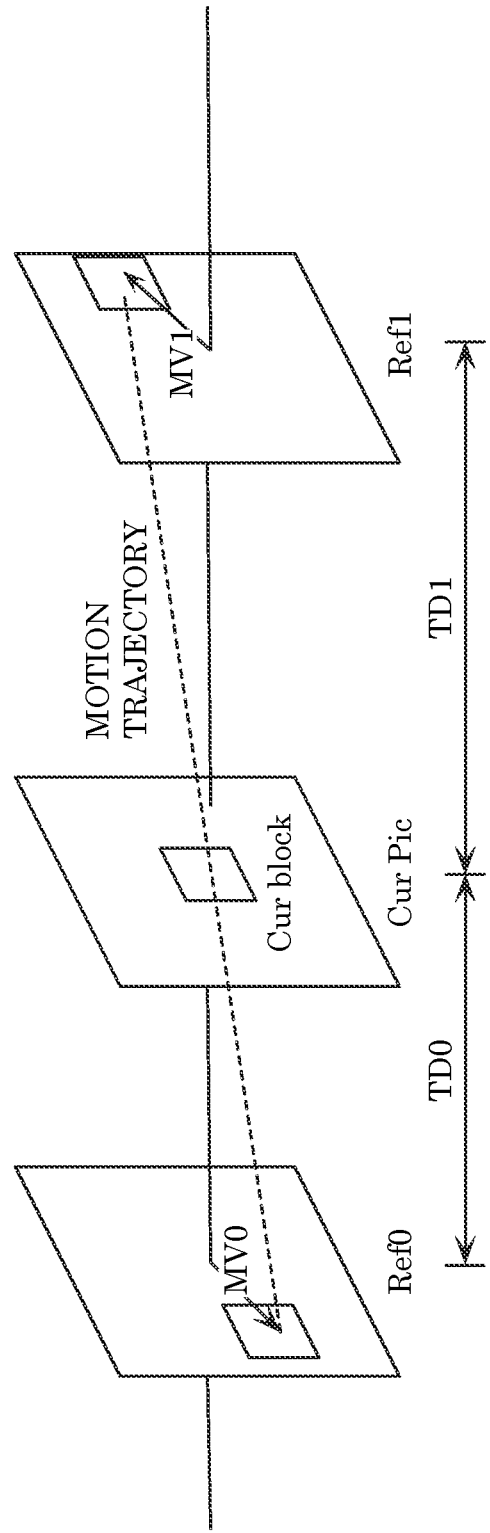
FIG. 6 illustrates one example of pattern matching (bilateral matching) between two blocks along a motion trajectory.

FIG. 6 illustrates one example of first pattern matching (bilateral matching) between two blocks in two reference pictures along a motion trajectory. As illustrated in FIG. 6, in first pattern matching, two motion vectors (MV0, MV1) are derived by finding the best match between the two blocks in two different reference pictures (Ref0, Ref1) along the motion trajectory of the current block (Cur block). More specifically, a difference may be obtained between (i) a reconstructed image at a position specified by a candidate MV in a first encoded reference picture (Ref0), and (ii) a reconstructed image at a position specified by the candidate MV, which is symmetrically scaled per display time intervals, in a second encoded reference picture (Ref1). Then, the difference may be used to derive an evaluation value for the current block. A candidate MV having the best evaluation value among a plurality of candidate MVs may be selected as the final MV.

Under the assumption of continuous motion trajectory, the motion vectors (MV0, MV1) pointing to the two reference blocks are proportional to the temporal distances (TD0, TD1) between the current picture (Cur Pic) and the two reference pictures (Ref0, Ref1). For example, when the current picture is temporally between the two reference pictures, and the temporal distance from the current picture to the two reference pictures is the same, first pattern matching derives two mirroring bi-directional motion vectors.

In second pattern matching (template matching), pattern matching is performed between a template in the current picture (blocks neighboring the current block in the current picture; for example, the top and/or left neighboring blocks) and a block in a reference picture. Therefore, in second pattern matching, a block neighboring the current block in the current picture is used as the determined region for the above-described calculation of the candidate evaluation value.

Figure 7:
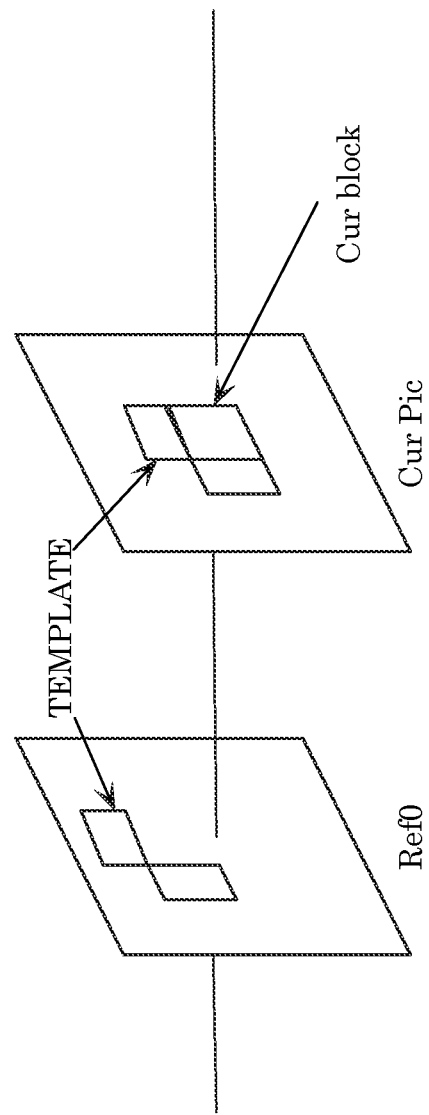
FIG. 7 illustrates one example of pattern matching (template matching) between a template in the current picture and a block in a reference picture.

FIG. 7 illustrates one example of pattern matching (template matching) between a template in the current picture and a block in a reference picture. As illustrated in FIG. 7, in second pattern matching, a motion vector of the current block is derived by searching in a reference picture (Ref0) to find a block that best matches neighboring block(s) of the current block (Cur block) in the current picture (Cur Pic). More specifically, a difference may be obtained between (i) a reconstructed image of one or both of encoded neighboring upper and left regions relative to the current block, and (ii) a reconstructed image of the same regions relative to a block position specified by a candidate MV in an encoded reference picture (Ref0). Then, the difference may be used to derive an evaluation value for the current block. A candidate MV having the best evaluation value among a plurality of candidate MVs may be selected as the best candidate MV.

Information indicating whether to apply the FRUC mode or not (referred to as, for example, a FRUC flag) may be signaled at the CU level. Further, when the FRUC mode is applied (for example, when the FRUC flag is set to true), information indicating the pattern applicable matching method (e.g., first pattern matching or second pattern matching) may be signaled at the CU level. Note that the signaling of such information need not be performed at the CU level, and may be performed at another level (for example, at the sequence level, picture level, slice level, tile level, CTU level, or sub-block level).

Next, methods of deriving a motion vector are described. First, a description is given of a mode for deriving a motion vector based on a model assuming uniform linear motion. This mode is also referred to as a bi-directional optical flow (BIO) mode.

Figure 8:
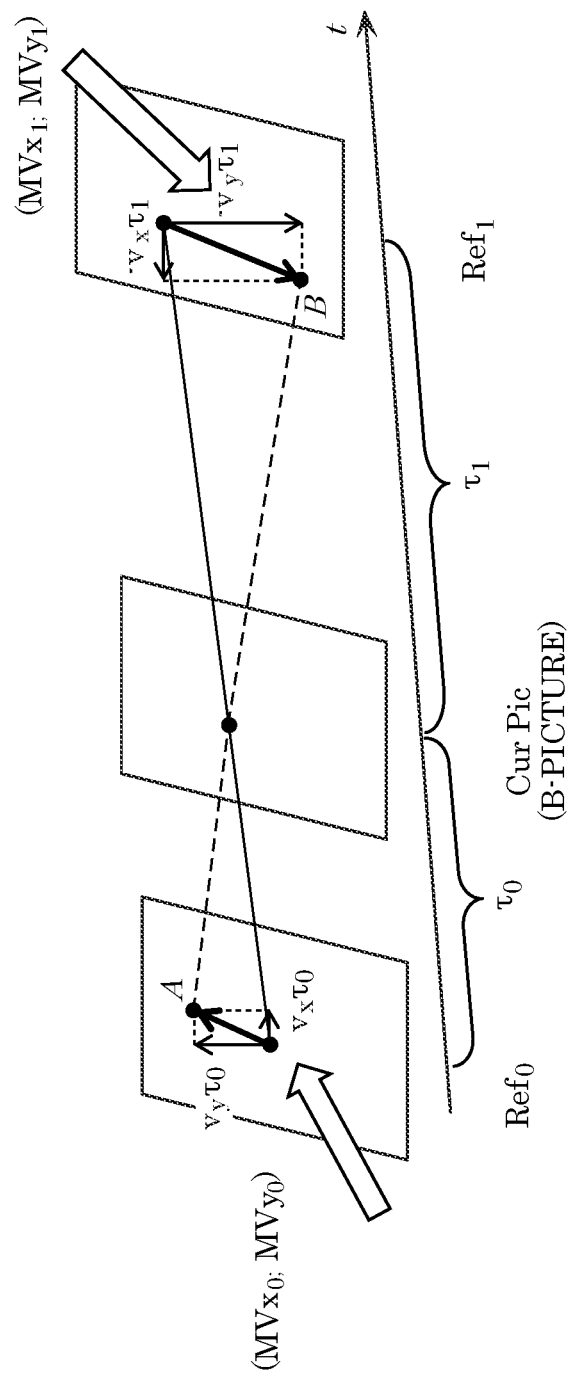
FIG. 8 illustrates a model that assumes uniform linear motion.

FIG. 8 illustrates a model that assumes uniform linear motion. In FIG. 8, $(v_x, v_y)$ denotes a velocity vector, and $\tau_0$ to and $\tau_1$ denote temporal distances between the current picture (Cur Pic) and two reference pictures (Ref$_0$, Ref$_1$), respectively. (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation (Equation 1) is given.

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. The optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture, is equal to zero. A motion vector of each block obtained from, for example, a merge list may be corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Next, a description is given of a mode in which a motion vector is derived for each sub-block based on motion vectors of neighboring blocks. This mode is also referred to as affine motion compensation prediction mode.

Figure 9A:
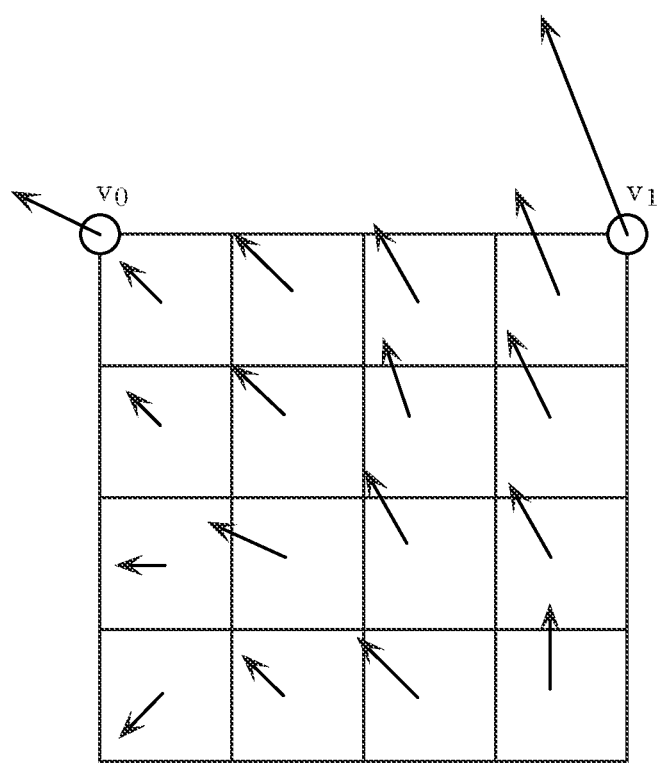
FIG. 9A illustrates one example of deriving a motion vector of each sub-block based on motion vectors of neighboring blocks.

FIG. 9A illustrates one example of deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks. Similarly, motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (2)$$

Here, x and y are the horizontal and vertical positions of the sub-block, respectively, and w is a determined weighted coefficient. The determined weighted coefficient may be predetermined.

An affine motion compensation prediction mode may include a number of modes of different methods of deriving the motion vectors of the top left and top right corner control points. Information indicating an affine motion compensation prediction mode (referred to as, for example, an affine flag) may be signaled at the CU level. Note that the signaling of information indicating the affine motion compensation prediction mode need not be performed at the CU level, and may be performed at another level (for example, at the sequence level, picture level, slice level, tile level, CTU level, or sub-block level).

(Prediction Controller)

Prediction controller 128 selects either the intra prediction signal (outputted from intra predictor 124) or the inter prediction signal (outputted from inter predictor 126), and outputs the selected prediction signal to subtractor 104 and adder 116.

As illustrated in FIG. 1, in various implementations, the prediction controller 128 may output prediction parameters, which are inputted to entropy encoder 110. Entropy encoder 110 may generate an encoded bitstream (or sequence) based on the prediction parameters, inputted from prediction controller 128, and the quantized coefficients, inputted from quantizer 108. The prediction parameters may be used by the decoder, which receives and decodes the encoded bitstream, to carry out the same prediction processing as performed in intra predictor 124, inter predictor 126, and prediction controller 128. The prediction parameters may include the selected prediction signal (e.g., motion vectors, prediction type or prediction mode employed in intra predictor 124 or inter predictor 126), or any index, flag, or value that is based on, or is indicative of, the prediction processing performed in intra predictor 124, inter predictor 126, and prediction controller 128.

In some implementations, prediction controller 128 operates in merge mode to optimize motion vectors calculated for a current picture using both the intra prediction signal from the intra predictor 124 and the inter prediction signal from the inter predictor 126. FIG. 9B illustrates one example of a process for deriving a motion vector in a current picture in merge mode.

First, a prediction MV list is generated, in which prediction MV candidates are registered. Examples of prediction MV candidates include: spatially neighboring prediction MV, which are MVs of encoded blocks positioned in the spatial vicinity of the target block; temporally neighboring prediction MVs, which are MVs of blocks in encoded reference pictures that neighbor a block in the same location as the target block; a coupled prediction MV, which is an MV generated by combining the MV values of the spatially neighboring prediction MV and the temporally neighboring prediction MV; and a zero prediction MV, which is an MV whose value is zero.

Next, the MV of the target block is determined by selecting one prediction MV from among the plurality of prediction MVs registered in the prediction MV list.

Further, in a variable-length encoder, a merge_idx, which is a signal indicating which prediction MV is selected, is written and encoded into the stream.

Note that the prediction MVs registered in the prediction MV list illustrated in FIG. 9B constitute one example. The number of prediction MVs registered in the prediction MV list may be different from the number illustrated in FIG. 9B, and the prediction MVs registered in the prediction MV list may omit one or more of the types of prediction MVs given in the example in FIG. 9B, and the prediction MVs registered in the prediction MV list may include one or more types of prediction MVs in addition to and different from the types given in the example in FIG. 9B.

The final MV may be determined by performing DMVR (dynamic motion vector refreshing) processing (to be described later) by using the MV of the target block derived in merge mode.

FIG. 9C is a conceptual diagram illustrating an example of DMVR processing to determine an MV.

First, the most appropriate MV which is set for the current block (e.g., in merge mode) is considered to be the candidate MV. Then, according to candidate MV(L0), a reference pixel is identified in a first reference picture (L0) which is an encoded picture in L0 direction. Similarly, according to candidate MV(L1), a reference pixel is identified in a second reference picture (L1) which is an encoded picture in L1 direction. The reference pixels are then averaged to form a template.

Next, using the template, the surrounding regions of the candidate MVs of the first and second reference pictures (L0) and (L1) are searched, and the MV with the lowest cost is determined to be the final MV. The cost value may be calculated, for example, using the difference between each pixel value in the template and each pixel value in the regions searched, using the candidate MVs, etc.

Note that the configuration and operation of the processes described here are fundamentally the same in both the encoder side and the decoder side, to be described below.

Any processing other than the processing described above may be used, as long as the processing is capable of deriving the final MV by searching the surroundings of the candidate MV.

Next, a description is given of an example of a mode that generates a prediction image (a prediction) using LIC (local illumination compensation) processing.

Figure 9D:
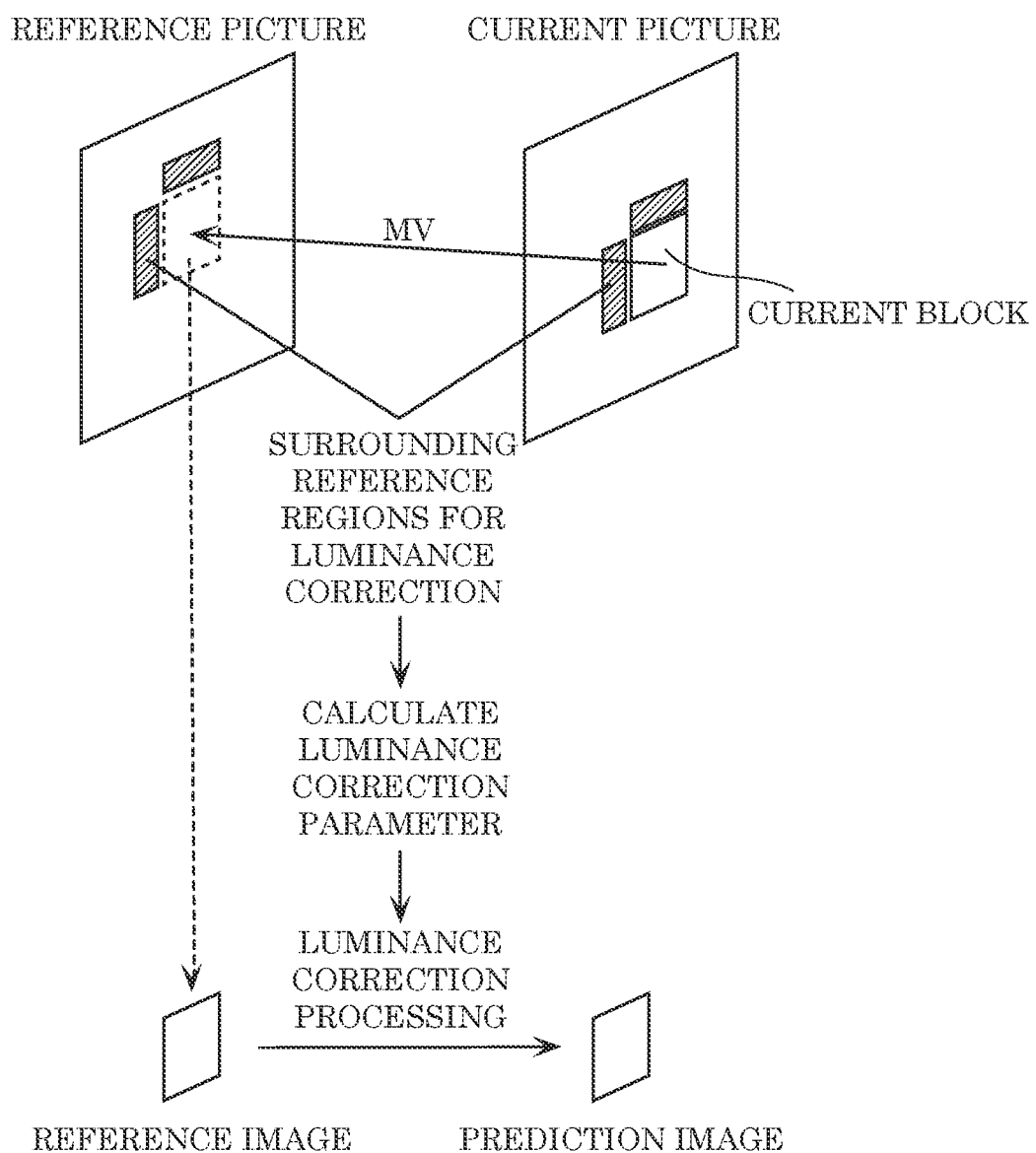
FIG. 9D illustrates one example of a prediction image generation method using a luminance correction process performed by LIC (local illumination compensation) processing.

FIG. 9D illustrates one example of a prediction image generation method using a luminance correction process performed by LIC processing.

First, from an encoded reference picture, an MV is derived to obtain a reference image corresponding to the current block.

Next, for the current block, information indicating how the luminance value changed between the reference picture and the current picture is obtained, based on the luminance pixel values of the encoded neighboring left reference region and the encoded neighboring upper reference region in the current picture, and based on the luminance pixel values in the same locations in the reference picture as specified by the MV. The information indicating how the luminance value changed is used to calculate a luminance correction parameter.

The prediction image for the current block is generated by performing a luminance correction process, which applies the luminance correction parameter on the reference image in the reference picture specified by the MV.

Note that the shape of the surrounding reference region(s) illustrated in FIG. 9D is just one example; the surrounding reference region may have a different shape.

Furthermore, although a prediction image is generated from a single reference picture in this example, in cases in which a prediction image is generated from a plurality of reference pictures, the prediction image may be generated after performing a luminance correction process, as described above, on the reference images obtained from the reference pictures.

One example of a method for determining whether to implement LIC processing is using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change, and implements LIC processing when encoding. The encoder sets the lic_flag to a value of "0" when the block does not belong to a region of luminance change, and performs encoding implementing LIC processing. The decoder may switch between implementing LIC processing or not by decoding the lic_flag written in the stream and performing the decoding in accordance with the flag value.

One example of a different method of determining whether to implement LIC processing includes discerning whether LIC processing was determined to be implemented for a surrounding block. In one specific example, when merge mode is used on the current block, it is determined whether LIC processing was applied in the encoding of the surrounding encoded block, which was selected when deriving the MV in merge mode. Then, the determination is used to determine whether to implement LIC processing or not for the current block. Note that in this example also, the same applies to the processing performed on the decoder side.

Decoder

Figure 10:
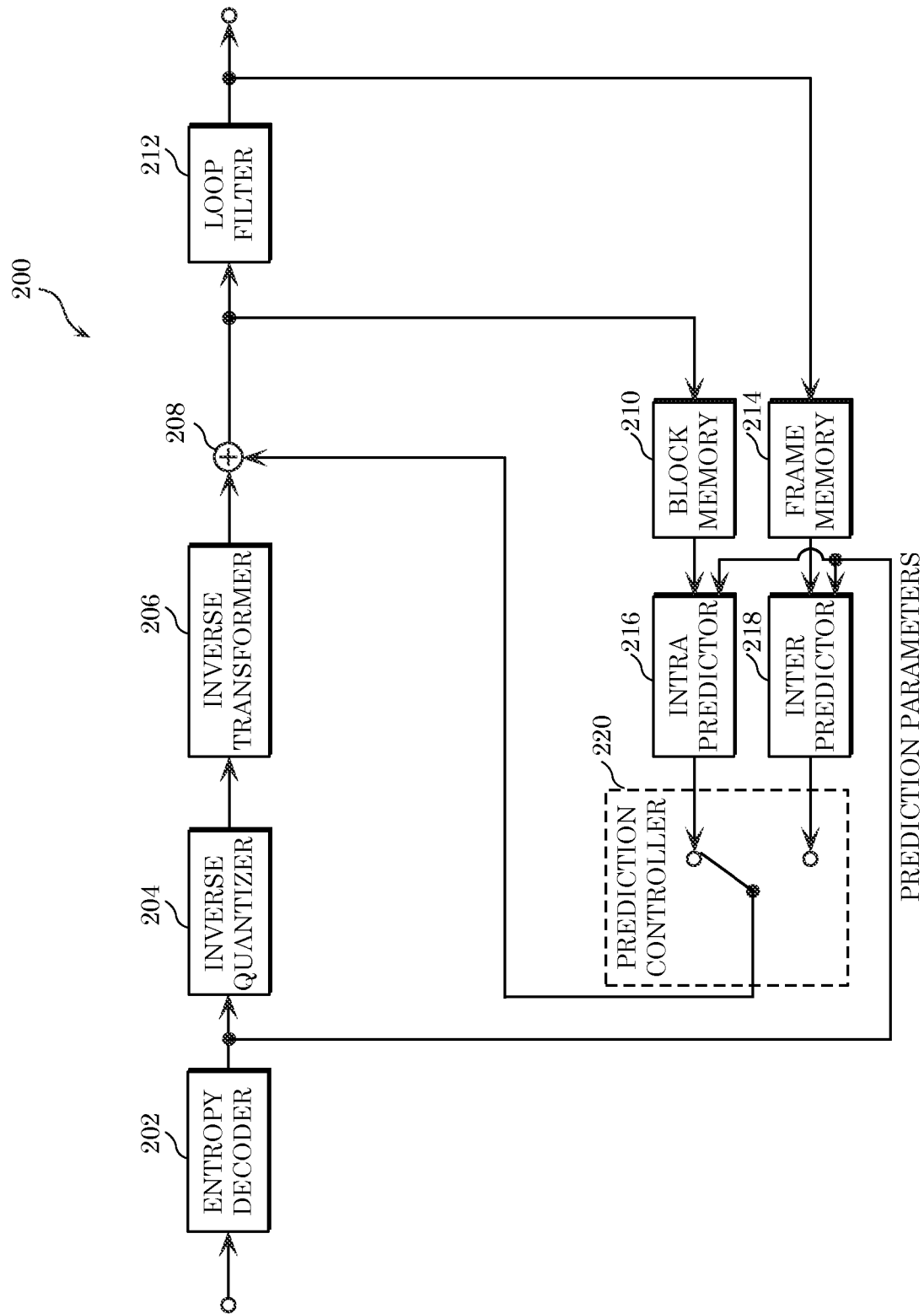
FIG. 10 is a block diagram illustrating a functional configuration of the decoder according to an embodiment.

Next, a decoder capable of decoding an encoded signal (encoded bitstream) output from encoder 100 will be described. FIG. 10 is a block diagram illustrating a functional configuration of decoder 200 according to an embodiment. Decoder 200 is a moving picture decoder that decodes a moving picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

(Entropy Decoder)

Entropy decoder 202 entropy decodes an encoded bitstream. More specifically, for example, entropy decoder 202 arithmetic decodes an encoded bitstream into a binary signal. Entropy decoder 202 then debinarizes the binary signal. Entropy decoder 202 outputs quantized coefficients of each block to inverse quantizer 204. Entropy decoder 202 may also output the prediction parameters, which may be included in the encoded bitstream (see FIG. 1), to intra predictor 216, inter predictor 218, and prediction controller 220 so that they can carry out the same prediction processing as performed on the encoder side in intra predictor 124, inter predictor 126, and prediction controller 128.

(Inverse Quantizer)

Inverse quantizer 204 inverse quantizes quantized coefficients of a block to be decoded (hereinafter referred to as a current block), which are inputted from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

(Inverse Transformer)

Inverse transformer 206 restores prediction errors (residuals) by inverse transforming transform coefficients, which are inputted from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

(Adder)

Adder 208 reconstructs the current block by summing prediction errors, which are inputted from inverse transformer 206, and prediction samples, which is an input from prediction controller 220. Adder 208 then outputs the reconstructed block to block memory 210 and loop filter 212.

(Block Memory)

Block memory 210 is storage for storing blocks in a picture to be decoded (hereinafter referred to as a current picture) for reference in intra prediction. More specifically, block memory 210 stores reconstructed blocks output from adder 208.

(Loop Filter)

Loop filter 212 applies a loop filter to blocks reconstructed by adder 208, and outputs the filtered reconstructed blocks to frame memory 214 and, for example, to a display device.

When information indicating the enabling or disabling of ALF parsed from an encoded bitstream indicates enabled, one filter from among a plurality of filters is selected based on direction and activity of local gradients, and the selected filter is applied to the reconstructed block.

(Frame Memory)

Frame memory 214 is storage for storing reference pictures used in inter prediction, and is also referred to as a frame buffer. More specifically, frame memory 214 stores reconstructed blocks filtered by loop filter 212.

(Intra Predictor)

Intra predictor 216 generates a prediction signal (intra prediction signal) by intra prediction with reference to a block or blocks in the current picture as stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream (in the prediction parameters outputted from entropy decoder 202, for example), intra predictor 216 corrects post-intra-prediction pixel values based on horizontal/vertical reference pixel gradients.

(Inter Predictor)

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block based on motion compensation using motion information (for example, a motion vector) parsed from an encoded bitstream (in the prediction parameters outputted from entropy decoder 202, for example), and outputs the inter prediction signal to prediction controller 220.

When the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation (prediction) using the derived motion information.

Moreover, when BIO mode is to be applied, inter predictor 218 derives a motion vector based on a model assuming uniform linear motion. Further, when the information parsed from the encoded bitstream indicates that affine motion compensation prediction mode is to be applied, inter predictor 218 derives a motion vector of each sub-block based on motion vectors of neighboring blocks.

(Prediction Controller)

Prediction controller 220 selects either the intra prediction signal or the inter prediction signal, and outputs the selected prediction signal to adder 208. Furthermore, prediction controller 220 may perform various functions and operations, such as merge mode (see FIG. 9B), DMVR processing (see FIG. 9C), and LIC processing (FIG. 9D) as described above in reference to prediction controller 128 on the encoder side. In general, the configuration, functions and operations of prediction controller 220, inter predictor 218 and intra predictor 216 on the decoder side may correspond to the configuration, functions and operations of prediction controller 128, inter predictor 126 and intra predictor 124 on the encoder side.

Embodiment 1

[Outline]

An encoder according to this embodiment encodes a block of an image, and includes a processor and memory connected to the processor. Using the memory, the processor: writes a parameter into a bitstream; determines whether the parameter written is equal to a determined value; when the parameter written is equal to the determined value, predicts block partitioning information and partitions a block into a plurality of sub blocks using the block partitioning information predicted; when the parameter written is not equal to the determined value, partitions a block into a plurality of sub blocks without using the block partitioning information predicted; and encodes a sub block included in the plurality of sub blocks in an encoding process including a transform process and/or a prediction process. The determined value may be predetermined.

This makes it possible to predict block partitioning information when the parameter is equal to a determined value. Partitioning a block using the predicted block partitioning information makes it possible to reduce the amount of coding pertaining to block partitioning information and improve compression efficiency.

For example, in the encoder according to this embodiment, a process to predict the block partitioning information may include a process of generating the block partitioning information using block information from a previously encoded block.

This makes it possible to predict block partitioning information using block information for a previously encoded block, which makes it possible to improve the prediction accuracy of block partitioning information and reduce the amount of coding.

A decoder according to this embodiment decodes a block of an image, and includes a processor and memory. Using the memory, the processor: parses a parameter from a bitstream; determines whether the parameter parsed is equal to a determined value; when the parameter parsed is equal to the determined value, predicts block partitioning information and partitions a block into a plurality of sub blocks using the block partitioning information predicted; when the parameter parsed is not equal to the determined value, partitions a block into a plurality of sub blocks without using the block partitioning information predicted; and decodes a sub block included in the plurality of sub blocks in a decoding process including an inverse transform process and/or a prediction process. The determined value may be predetermined.

This makes it possible to predict block partitioning information when the parameter is equal to a determined value. Partitioning a block using the predicted block partitioning information makes it possible to reduce the amount of coding pertaining to block partitioning information and improve compression efficiency.

For example, in the decoder according to this embodiment, a process to predict the block partitioning information may include a process of generating the block partitioning information using block information from a previously decoded block.

This makes it possible to predict block partitioning information using block information for a previously decoded block, which makes it possible to improve the prediction accuracy of block partitioning information and reduce the amount of coding.

General or specific aspects of the present disclosure may be realized as a system, method, integrated circuit, computer program, computer readable medium such as a CD-ROM, or any given combination thereof.

Figure 11:
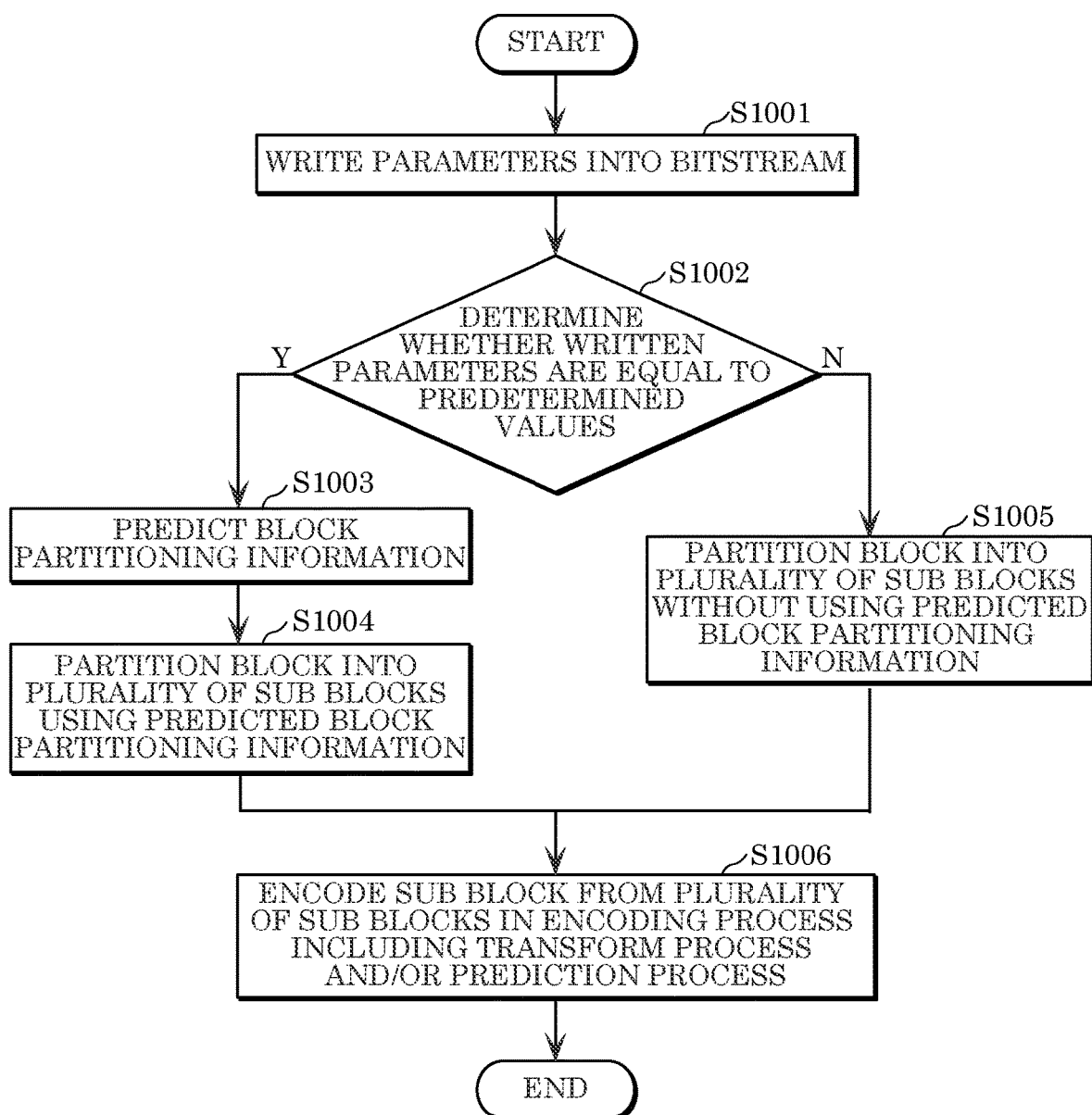
FIG. 11 is a flow chart of one example of a video encoding process according to Embodiment 1.
Figure 12:
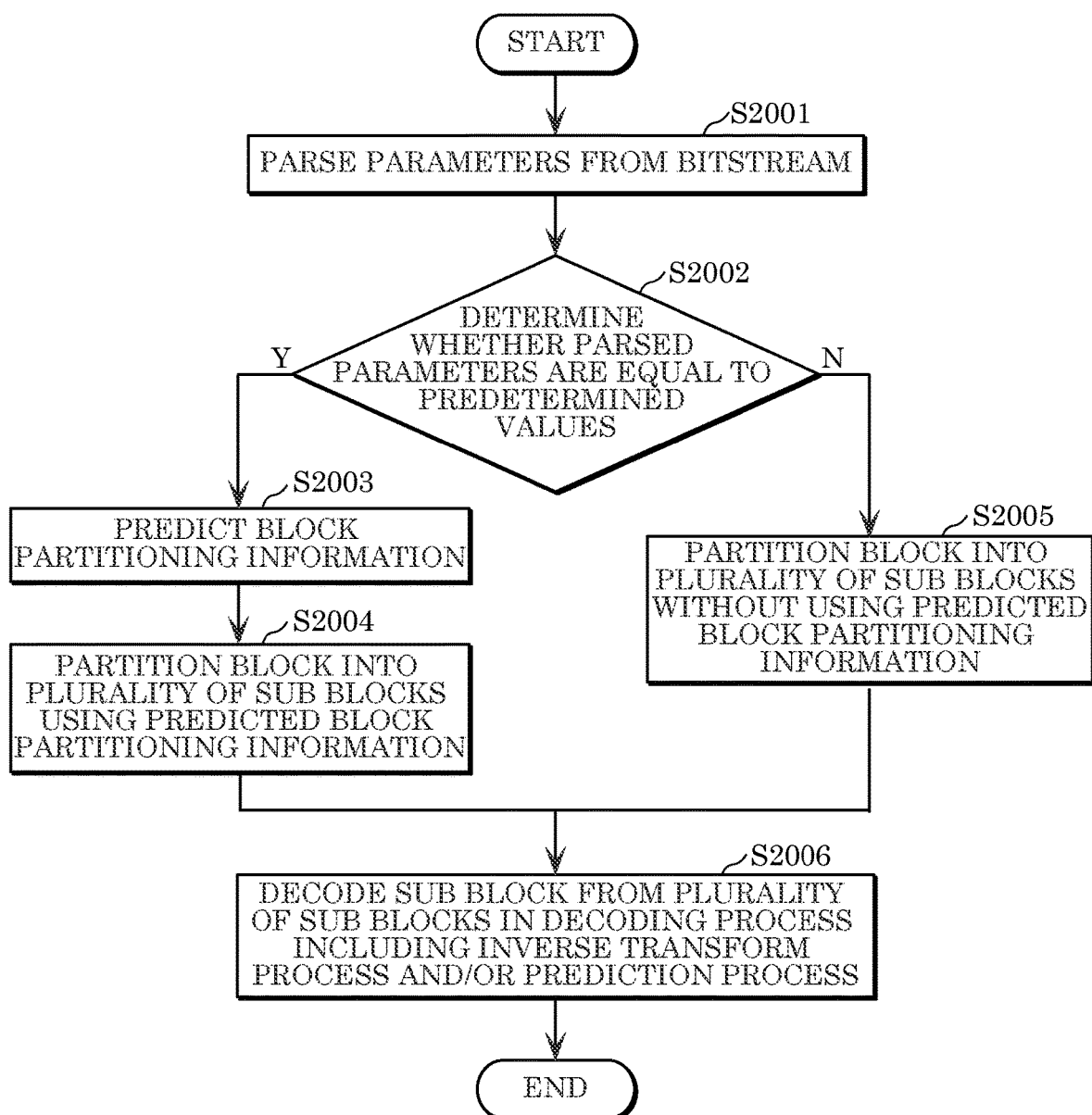
FIG. 12 is a flow chart of one example of a video decoding process according to Embodiment 1.
Figure 35:
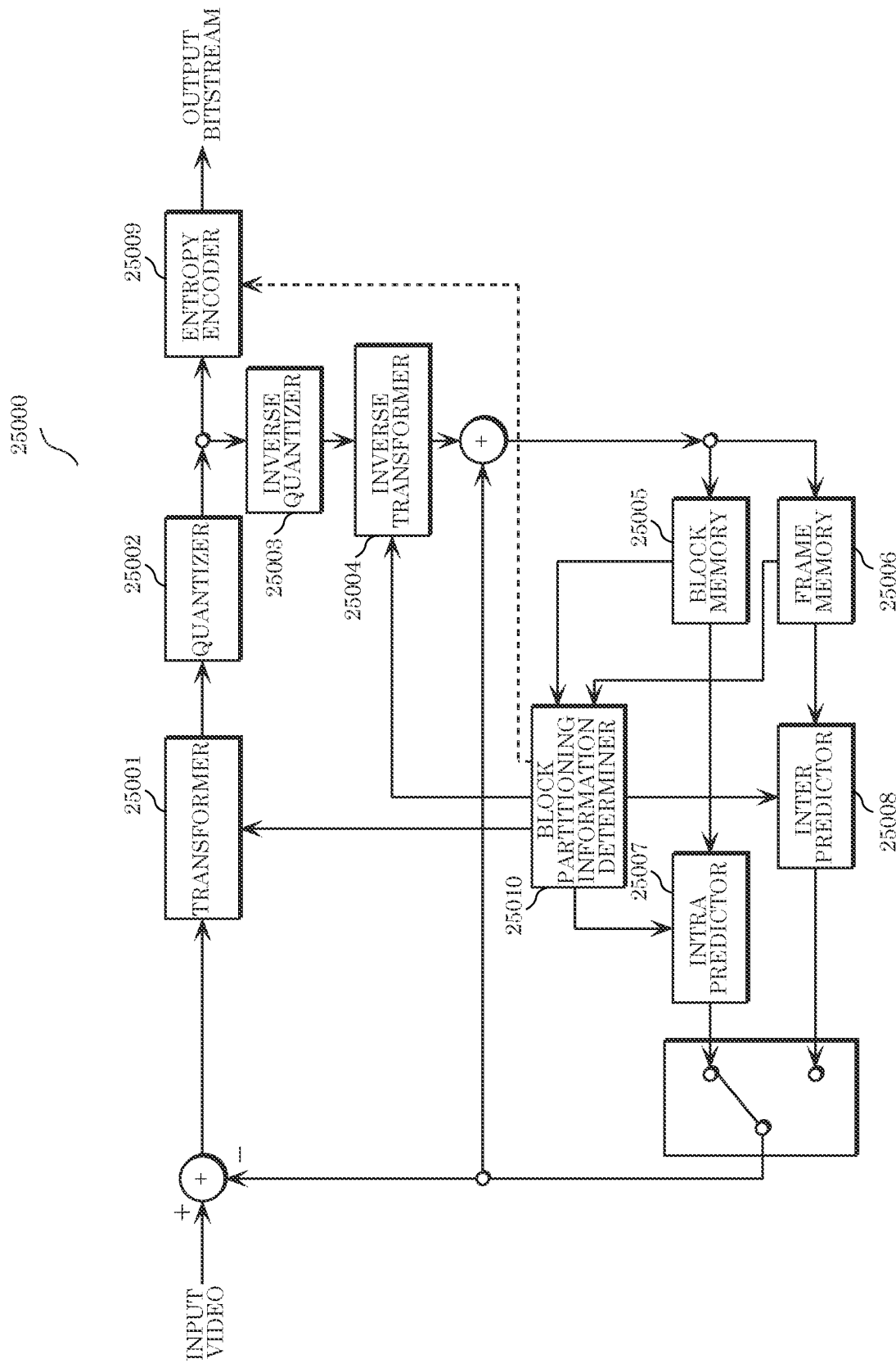
FIG. 35 is a block diagram illustrating a structure of a video/image encoder according to an embodiment.
Figure 36:
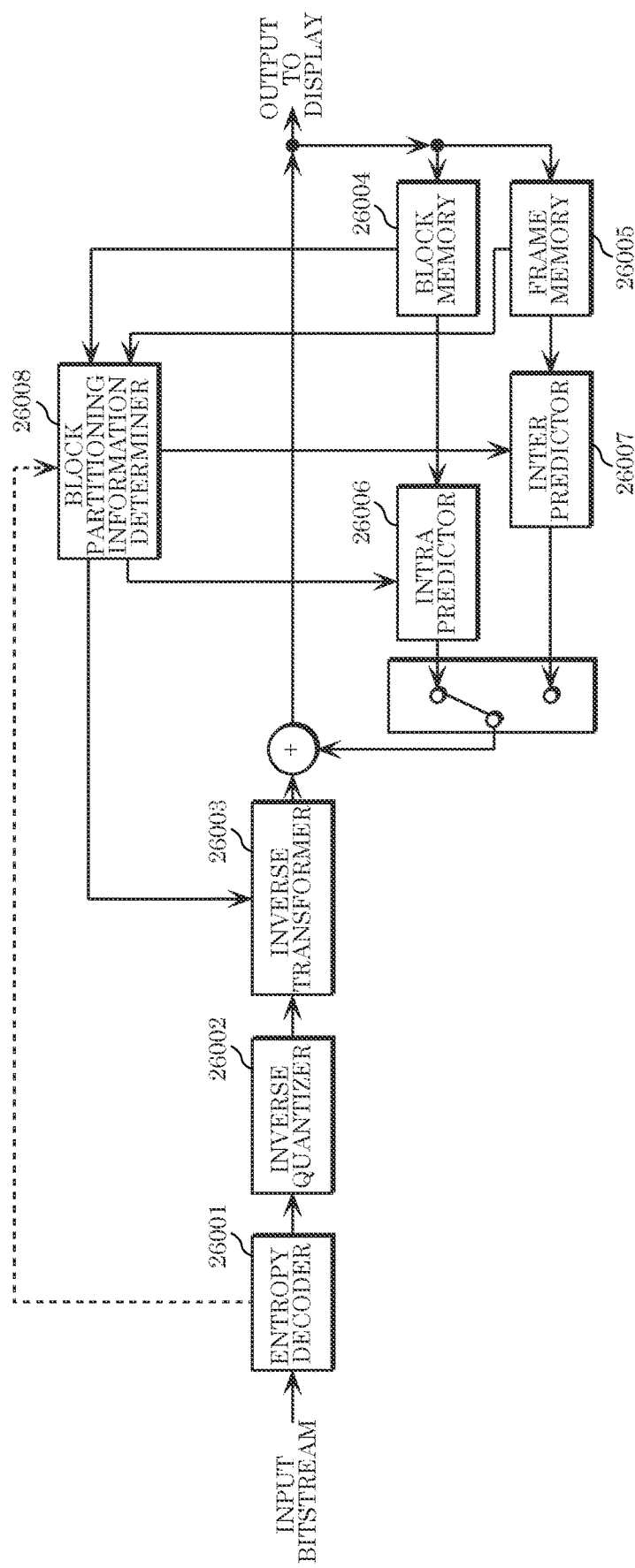
FIG. 36 is a block diagram illustrating a structure of a video/image decoder according to an embodiment.

Hereinafter, methods for encoding and decoding video will be described according to an embodiment as illustrated in FIG. 11 and FIG. 12. Moreover, apparatuses for encoding and decoding video will be described according to an embodiment as illustrated in FIG. 35 and FIG. 36.

[Encoding Process]

FIG. 11 illustrates one example of a video encoding process according to Embodiment 1.

Figure 37:
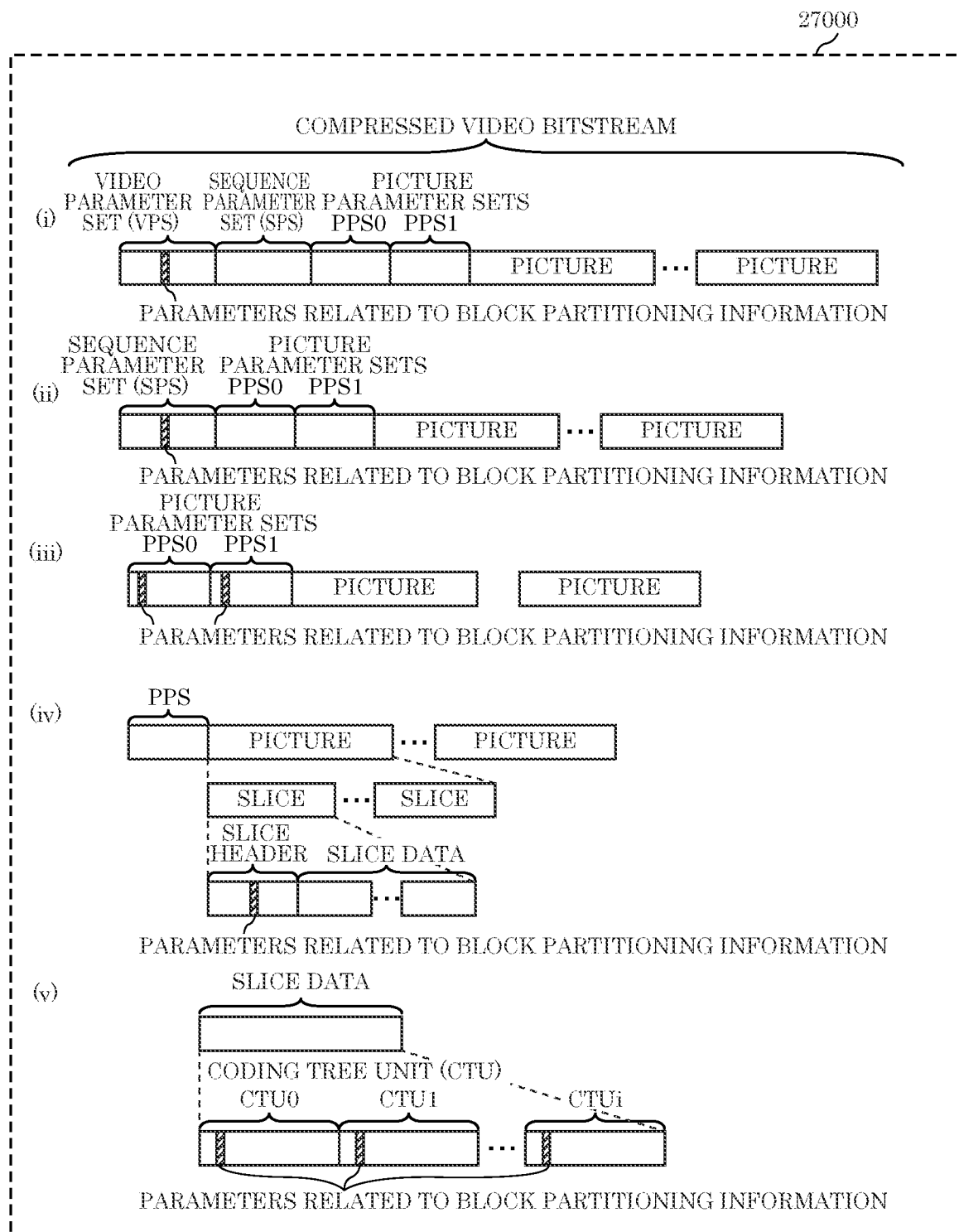
FIG. 37 illustrates possible locations of the parameters in a compressed video bitstream.

As a first step S1001, parameters are written into a bitstream. FIG. 37 shows the possible locations of the above mentioned parameters in a compressed video bitstream. The written parameters include one or more parameters for identifying whether the prediction of block partitioning information is enabled. For example, the one or more parameters can include a flag to indicate whether the prediction of block partitioning information is enabled.

Next, at step S1002, whether the written parameters are equal to determined values is determined. The determined values may be predetermined.

If the written parameters are equal to determined values (Y in S1002), block partitioning information is predicted at step S1003 and a block is then partitioned into a plurality of sub blocks using the predicted block partitioning information at step S1004. For example, the predicted block partitioning information can be used as an initial block partitioning information. The initial block partitioning information will then be updated to the final block partitioning information.

The final block partitioning information is decided against other possible block partitioning information during intra and inter prediction processes based on a lowest rate distortion cost. The difference information between the predicted block partitioning information and final block partitioning information will be written into a bitstream for a decoder to generate the corresponding final block partitioning information based on the same predicted block partitioning information. Coding the difference information instead of the final block partitioning information reduces the bits required to signal the final block partitioning information.

Figure 41:
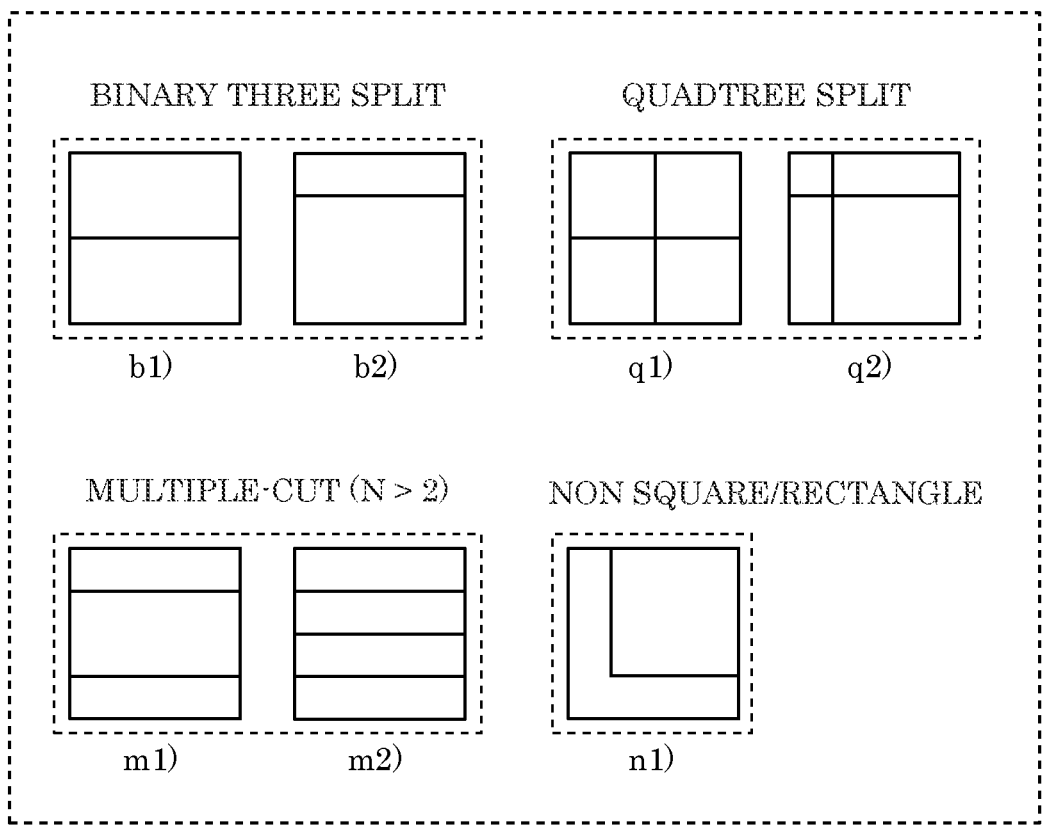
FIG. 41 illustrates examples of partitioning methods and block partition structure modification.

The partitioning methods, for example, can be a binary split as shown by b1) and b2) in FIG. 41, a quad-tree split as shown by q1) and q2) in FIG. 41, a multiple cut/split as shown by m1) and m2) in FIG. 41, or a non square/rectangle split as shown by n1) in FIG. 41. The geometries (shape and/or size) of different sub blocks can be different such as the asymmetrical binary split as shown by b2) in FIG. 41, an asymmetrical quad-tree split as shown by q2) in FIG. 41, a non-equal size multiple-cut as shown by m1) in FIG. 41, or a non square/rectangle split as shown by n1) in FIG. 41.

Figure 38:
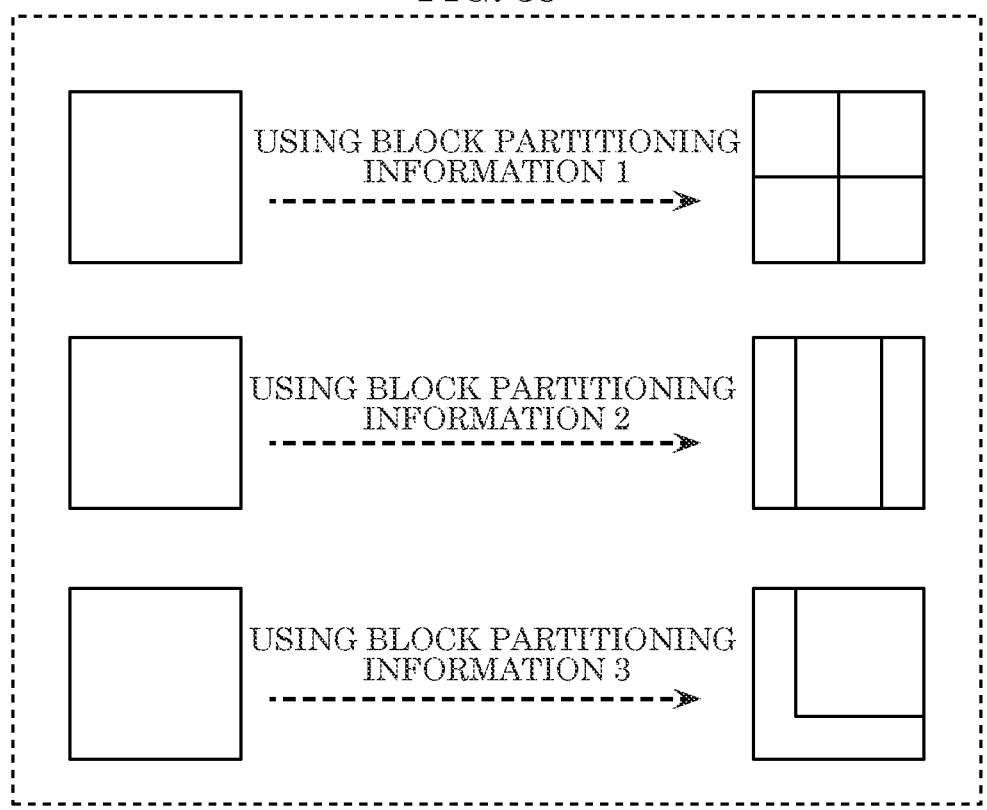
FIG. 38 illustrates different block partitions depending on block partitioning information.

Here, the block partitioning information can be predicted according to block information (for example, block partition structure, intra prediction or inter prediction mode, intra prediction direction, motion vector, reference picture, quantization parameters, and partitioning depth) from previously encoded blocks. Using block partitioning information will result in partitioning a block into a plurality of sub blocks. As shown in FIG. 38, using different block partitioning information will result in partitioning a block into a plurality of sub blocks with different heights, widths, or shapes.

Block partition structure from a previously encoded block can be directly used as the predicted block partition structure for the current block.

Figure 39:
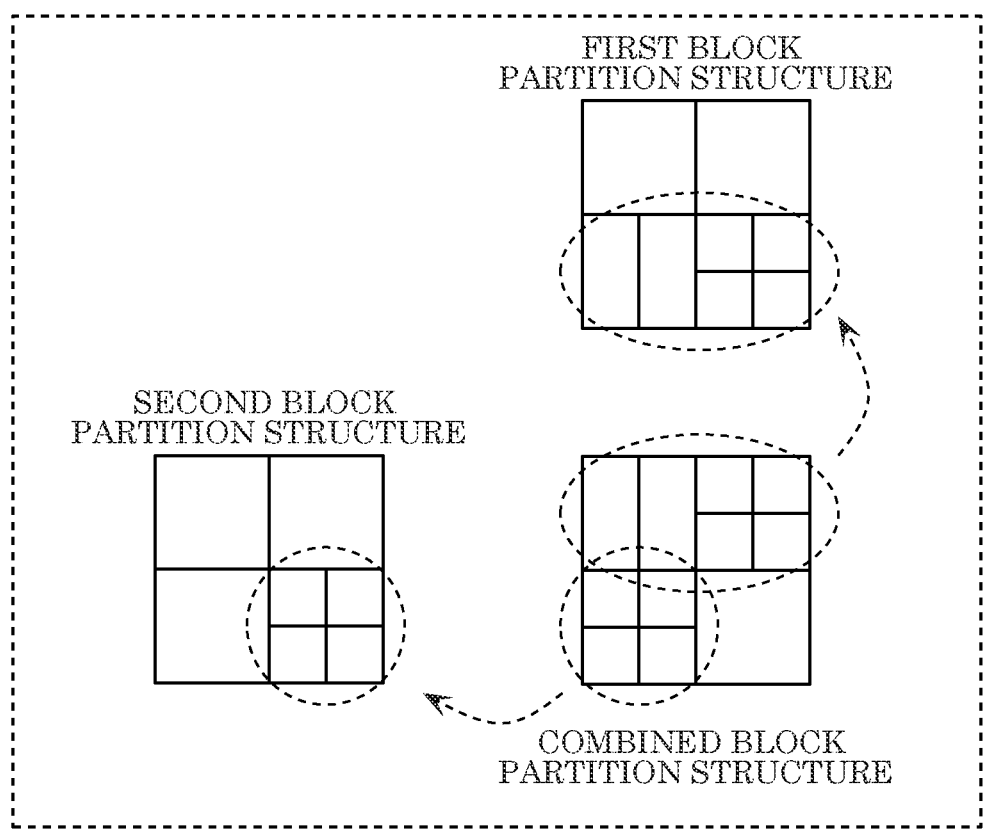
FIG. 39 illustrates one example of combinations of block partition structures.

Block partition structures from two or more previously encoded blocks can also be combined (for example, the top half uses block partition structure from the top block and the left half uses block partition structure from the left block as shown in FIG. 39) to derive a new block partition structure as the predicted block partition structure for the current block.

One example of how to select previously encoded blocks is to select encoded blocks having same intra/inter prediction mode as current block. Specifically, if the current block is an inter predicted block, one or more of the previously encoded blocks that were encoded using inter prediction will be selected.

Figure 40:
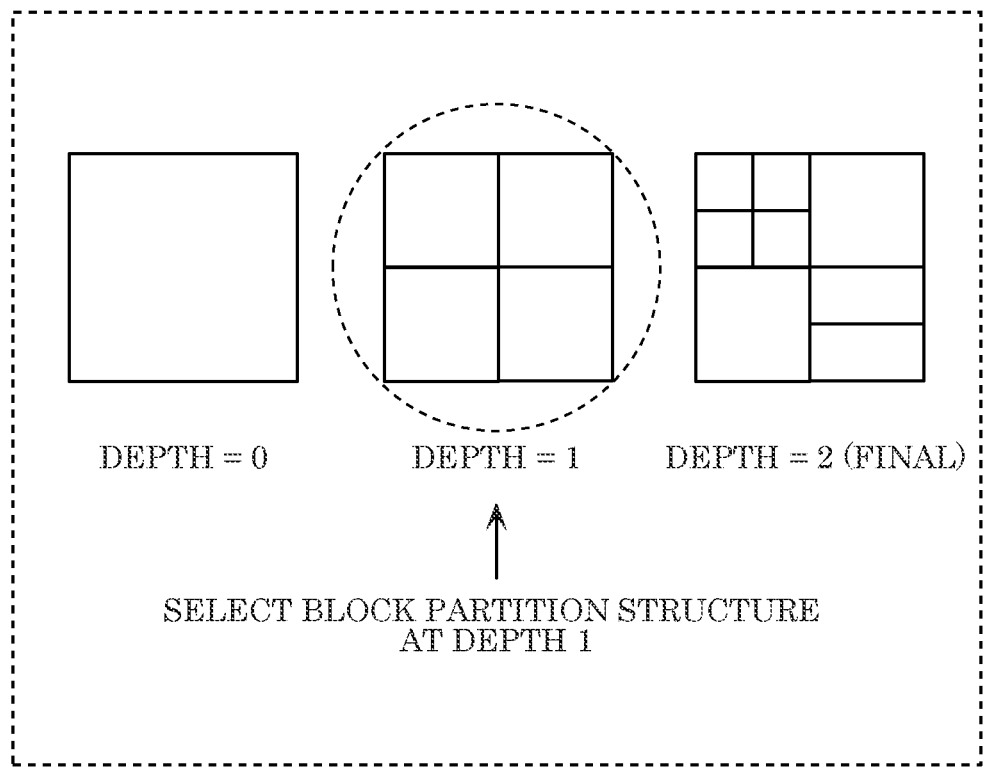
FIG. 40 illustrates one example of block partition structure modification.

Block partition structure from a previously encoded block can also be modified (for example, use block partition structure with less partition depth as shown in FIG. 40) to derive a new block partition structure as the predicted block partition structure for the current block.

Block partitioning information may be a set of parameters that indicate whether a block is horizontally split or vertically split. Block partitioning information may also be a set of parameters that include a determined block width and a determined block height for all sub blocks in a block. The determined block width and the determined block height may be predetermined.

Predicted block partitioning information may differ based on intra prediction direction information from previously encoded blocks. For example, intra prediction direction information from specific neighbouring block locations may be used to predict whether the current block is to be split vertically or horizontally into smaller blocks. For example, if intra prediction direction information from a top neighbouring block is determined to be a vertical direction or close to vertical direction, block partitioning information including a vertical split can be predicted for the current block. Similarly, if intra prediction direction information from a left neighbouring block is determined to be a horizontal direction or close to a horizontal direction, a block partitioning information including a horizontal split can be predicted for the current block.

Block partitioning information may be a set of parameters that include an index to select one candidate partition structure from a determined candidate list of block partition structures. The determined candidate list may be predetermined. Here, block partition structure visually presents geometries of all sub blocks in a block, as shown in FIG. 38.

Block partitioning information may be predicted according to intra/inter prediction modes from previously encoded blocks. When prediction modes from the encoded blocks are intra prediction mode, determined block partitioning information can be predicted to partition a block into a plurality of sub blocks with smaller block sizes. The determined block partitioning information may be predetermined. When prediction modes from the encoded blocks are inter prediction mode, other determined block partitioning information can be predicted to partition a block into a plurality of sub blocks with larger block sizes. The determined block partitioning information may be predetermined.

Block partitioning information can also be predicted according to motion vectors from previously encoded blocks. When a difference between the motion vectors from the encoded blocks and the motion vectors from current block is bigger than a determined threshold, determined block partitioning information can be predicted to partition a block into a plurality of sub blocks with smaller block sizes. On the other hand, when a difference between the motion vectors from the encoded blocks and the motion vectors from current block is not greater than a determined threshold, other determined block partitioning information can be predicted to partition a block into a plurality of sub blocks with larger block sizes. The determined block partitioning information may be predetermined, and the determined thresholds may be predetermined.

Block partitioning information may be predicted according to quantization parameters from previously encoded blocks. For example, when the values of quantization parameters from the encoded blocks are smaller than a determined value, determined block partitioning information can be predicted to partition a block into a plurality of sub blocks with smaller block sizes. When the values of quantization parameters from the encoded blocks are not smaller than a determined value, other determined block partitioning information can be predicted to partition a block into a plurality of sub blocks with larger block sizes. The determined block partitioning information may be predetermined, and the determined values may be predetermined.

Block partitioning information may be predicted according to reference picture information from previously encoded blocks. For example, when reference pictures from the encoded blocks are temporally near to the current image or when the reference pictures from the encoded blocks are similar to one another, determined block partitioning information can be predicted to partition a block into a plurality of sub blocks with larger block sizes. When reference pictures from the encoded blocks are not near to the current image or when the reference pictures from the encoded blocks are not similar to one another, other determined block partitioning information can be predicted to partition a block into a plurality of sub blocks with smaller block sizes. The determined block partitioning information may be predetermined.

Block partitioning information may be predicted according to partitioning depths from previously encoded blocks. For example, when partitioning depths from the encoded blocks are larger than a determined value (for example, determined depth value equals to 4), determined block partitioning information can be predicted to partition a block into a plurality of sub blocks with smaller block sizes. When partitioning depths from the encoded blocks are not larger than determined value (for example, depth equals to 2), other determined block partitioning information can be predicted to partition a block into a plurality of sub blocks with larger block sizes. The determined block partitioning information may be predetermined, and the determined values may be predetermined.

Block partitioning information may also be predicted according to partitioning information from previously encoded blocks of a frame different than current frame. For example, block partitioning information (which includes split information) for the current block, or the current block's split information can be predicted from a previously encoded block (e.g., a collocated block, the last encoded block or an encoded block identified by a motion vector) from an encoded frame which is different from current frame.

If the written parameters are not equal to determined values (N in S1002), a block is partitioned into a plurality of sub blocks without using the predicted block partitioning information at step S1005. The partitioning methods, for example, can be a binary split as shown by b1) and b2) in FIG. 41, a quad-tree split as shown by q1) and q2) in FIG. 41, a multiple cut/split as shown by m1) and m2) in FIG. 41, or a non square/rectangle split as shown by n1) in FIG. 41. The geometries (shape and/or size) of different sub blocks can be different such as the asymmetrical binary split as shown by b2) in FIG. 41, an asymmetrical quad-tree split as shown by q2) in FIG. 41, a non-equal size multiple-cut as shown by m1) in FIG. 41, or a non square/rectangle split as shown by n1) in FIG. 41. The determined values may be predetermined.

At step S1006, a sub block from the plurality of sub blocks is encoded in an encoding process. Here, the encoding process includes a transform process and/or a prediction process. The transform process may be performed on a per block basis similar to the sub block size.

[Encoder]

FIG. 35 is a block diagram which shows a structure of a video/image encoder according to an embodiment.

Video encoder 25000 is for encoding an input video/image bitstream on a block-by-block basis so as to generate an encoded output bitstream. As shown in FIG. 35, video encoder 25000 includes transformer 25001, quantizer 25002, inverse quantizer 25003, inverse transformer 25004, block memory 25005, frame memory 25006, intra predictor 25007, inter predictor 25008, entropy encoder 25009 and block partitioning information determiner 25010.

An input video is inputted to an adder, and the added value is outputted to transformer 25001. Transformer 25001 transforms the added values into frequency coefficients at the derived block partitioning information from block partitioning information determiner 25010, and outputs the resulting frequency coefficients to quantizer 25002. Quantizer 25002 quantizes the inputted frequency coefficients, and outputs the resulting quantized values to inverse quantizer 25003 and entropy encoder 25009.

Inverse quantizer 25003 inversely quantizes the quantized values outputted from quantizer 25002, and outputs the frequency coefficients to the inverse transformer 25004. Inverse transformer 25004 performs inverse frequency transform on the frequency coefficients at the derived block partitioning information from block partitioning information determiner 25010, so as to transform the frequency coefficients into sample values of the bitstream, and outputs the resulting sample values to an adder.

The adder adds the sample values of the bitstream outputted from inverse transformer 25004 to the predicted video/image values outputted from intra predictor 25007/inter predictor 25008, and outputs the resulting added values to block memory 25005 or frame memory 25006 for further prediction.

Block partitioning information determiner 25010 collects block information from block memory 25005 or frame memory 25006 to derive block partitioning information and parameters related to block partitioning information. Here, using the derived block partitioning information will result in partitioning a block into a plurality of sub blocks.

Intra predictor 25007/inter predictor 25008 searches within reconstructed videos/images stored in block memory 25005 or from reconstructed videos/images in frame memory 25006 at the derived block partitioning information from block partitioning information determiner 25010, and estimates a video/image area which is, for example, most similar to the input videos/images for prediction.

Entropy encoder 25009 encodes the quantized values outputted from quantizer 25002, encodes parameters from block partitioning information determiner 25010, and outputs a bitstream.

[Decoding Process]

FIG. 12 illustrates one example of a video decoding process according to Embodiment 1.

As a first step S2001, parameters are parsed from a bitstream. FIG. 37 shows the parsable locations of the above mentioned parameters in a compressed video bitstream. The parsed parameters include one or more parameters for identifying whether the prediction of block partitioning information is enabled. For example, the one or more parameters can include a flag to indicate whether the prediction of block partitioning information is enabled.

Next, at step S2002, whether the parsed parameters are equal to determined values is determined. The determined values may be predetermined.

If the parsed parameters are equal to determined values (Y in S2002), block partitioning information is predicted at step S2003 and a block is then partitioned into a plurality of sub blocks using the predicted block partitioning information at step S2004. The determined values may be predetermined. For example, the predicted block partitioning information can be used as initial block partitioning information. The initial block partitioning information will then be updated to the final block partitioning information according to the difference information between the predicted block partitioning information and final block partitioning information, which has been parsed from the bitstream. The partitioning methods, for example, can be a binary split as shown by b1) and b2) in FIG. 41, a quad-tree split as shown by q1) and q2) in FIG. 41, a multiple cut/split as shown by m1) and m2) in FIG. 41, or a non square/rectangle split as shown by n1) in FIG. 41. The geometries (shape and/or size) of different sub blocks can be different such as the asymmetrical binary split as shown by b2) in FIG. 41, an asymmetrical quad-tree split as shown by q2) in FIG. 41, a non-equal size multiple-cut as shown by m1) in FIG. 41, or a non square/rectangle split as shown by n1) in FIG. 41.

Here, the block partitioning information can be predicted according to block information (for example, block partition structure, intra prediction or inter prediction mode, intra prediction direction, motion vector, reference picture, quantization parameters, and partitioning depth) from previously decoded blocks. Using block partitioning information will result in partitioning a block into a plurality of sub blocks. As shown in FIG. 38, using different block partitioning information will result in partitioning a block into a plurality of sub blocks with different heights, widths, or shapes.

Block partition structure from a previously decoded block can be directly used as the predicted block partition structure for the current block.

Block partition structures from two or more previously decoded blocks can also be combined (for example, the top half uses the block partition structure from the top block and the left half uses the block partition structure from the left block as shown in FIG. 39) to derive a new block partition structure as the predicted block partition structure for the current block. One example of how to select previously decoded blocks is to select decoded blocks having same intra/inter prediction mode as current block. Specifically, if the current block is an inter predicted block, one or more of the previously decoded blocks that were decoded using inter prediction will be selected.

Block partition structure from a previously decoded block can also be modified (for example, use block partition structure with less partition depth as shown in FIG. 40) to derive a new block partition structure as the predicted block partition structure for the current block.

Block partitioning information may be a set of parameters that indicate whether a block is horizontally split or vertically split. Block partitioning information may also be a set of parameters that include a determined block width and a determined block height for all sub blocks in a block. The determined block width and the determined block height may be predetermined.

Predicted block partitioning information may differ based on intra prediction direction information from previously decoded blocks. For example, intra prediction direction information from specific neighbouring block locations may be used to predict whether the current block is to be split vertically or horizontally into smaller blocks. For example, when intra prediction direction information from a top neighbouring block is determined to be a vertical direction or close to vertical direction, block partitioning information including a vertical split can be predicted for current block. Similarly, if intra prediction direction information from a left neighbouring block is determined to be a horizontal direction or close to a horizontal direction, a block partitioning information including a horizontal split can be predicted for the current block.

Block partitioning information may be a set of parameters that include an index to select one candidate partition structure from a determined candidate list of block partition structures. The determined candidate list may be predetermined. Here, block partition structure visually presents geometries of all sub blocks in a block, as shown in FIG. 38.

Block partitioning information may be predicted according to intra/inter prediction modes from previously decoded blocks. When prediction modes from the decoded blocks are intra prediction mode, determined block partitioning information can be predicted to partition a block into a plurality of sub blocks with smaller block sizes. When prediction modes from the decoded blocks are inter prediction mode, other determined block partitioning information can be predicted to partition a block into a plurality of sub blocks with larger block sizes. The determined block partitioning information may be predetermined.

Block partitioning information can also be predicted according to motion vectors from previously decoded blocks. When a difference between the motion vectors from the decoded blocks and the motion vectors from current block is bigger than a determined threshold, determined block partitioning information can be predicted to partition a block into a plurality of sub blocks with smaller block sizes. On the other hand, when a difference between the motion vectors from the decoded blocks and the motion vectors from current block is not greater than a determined threshold, other determined block partitioning information can be predicted to partition a block into a plurality of sub blocks with larger block sizes. The determined thresholds and the determined block partitioning information may be predetermined.

Block partitioning information may be predicted according to quantization parameters from previously decoded blocks. For example, when the values of quantization parameters from the decoded blocks are smaller than a determined value, determined block partitioning information can be predicted to partition a block into a plurality of sub blocks with smaller block sizes. When the values of quantization parameters from the decoded blocks are not smaller than a determined value, other determined block partitioning information can be predicted to partition a block into a plurality of sub blocks with larger block sizes. The determined values and the determined block partitioning information may be predetermined.

Block partitioning information may be predicted according to reference picture information from previously decoded blocks. For example, when reference pictures from the decoded blocks are temporally near to the current image or when the reference pictures from the decoded blocks are similar to one another, determined block partitioning information can be predicted to partition a block into a plurality of sub blocks with larger block sizes. When reference pictures from the decoded blocks are not near to the current image or when the reference pictures from the decoded blocks are not similar to one another, other determined block partitioning information can be predicted to partition a block into a plurality of sub blocks with smaller block sizes. The determined block partitioning information may be predetermined.

Block partitioning information may be predicted according to partitioning depths from previously decoded blocks. For example, when partitioning depths from the decoded blocks are larger than a determined value (for example, determined depth value equals to 4), determined block partitioning information can be predicted to partition a block into a plurality of sub blocks with smaller block sizes. When partitioning depths from the decoded blocks are not larger than a determined value (for example, depth equals to 2), other determined block partitioning information can be predicted to partition a block into a plurality of sub blocks with larger block sizes. The determined values and the determined block partitioning information may be predetermined.

Block partitioning information may also be predicted according to partitioning information from previously decoded blocks of a frame different than current frame. For example, block partitioning information (which includes split information) for the current block, or the current block's split information can be predicted from a previously decoded block (e.g., a collocated block, the last decoded block or a decoded block identified by a motion vector) from a decoded frame which is different from current frame.

If the written parameters are not equal to determined values (N in S2002), a block is partitioned into a plurality of sub blocks without using the predicted block partitioning information at step S2005. The partitioning methods, for example, can be a binary split as shown by b1) and b2) in FIG. 41, a quad-tree split as shown by q1) and q2) in FIG. 41, a multiple cut/split as shown by m1) and m2) in FIG. 41, or a non square/rectangle split as shown by n1) in FIG. 41. The geometries (shape and/or size) of different sub blocks can be different such as the asymmetrical binary split as shown by b2) in FIG. 41, an asymmetrical quad-tree split as shown by q2) in FIG. 41, a non-equal size multiple-cut as shown by m1) in FIG. 41, or a non square/rectangle split as shown by n1) in FIG. 41. The determined values may be predetermined.

At step S2006, a sub block from the plurality of sub blocks is decoded in a decoding process. Here, the decoding process includes an inverse transform process and/or a prediction process. The inverse transform process may be performed on a per block basis similar to the sub block size.

[Decoder]

FIG. 36 is a block diagram which shows a structure of a video/image decoder according to an embodiment.

The video decoder 26000 is an apparatus for decoding an input coded bitstream on a block-by-block basis and outputting videos/images, and includes, as shown in FIG. 36, entropy decoder 26001, inverse quantizer 26002, inverse transformer 26003, block memory 26004, frame memory 26005, intra predictor 26006, inter predictor 26007 and block partitioning information determiner 26008.

An input encoded bitstream is inputted to entropy decoder 26001. After the input encoded bitstream is inputted to entropy decoder 26001, entropy decoder 26001 decodes the input encoded bitstream, outputs parameters to block partitioning information determiner 26008, and outputs the decoded values to inverse quantizer 26002.

Inverse quantizer 26002 inversely quantizes the decoded values, and outputs the frequency coefficients to inverse transformer 26003. Inverse transformer 26003 performs inverse frequency transform on the frequency coefficients at the derived block partitioning information from block partitioning information determiner 26008 to transform the frequency coefficients into sample values, and outputs the resulting sample values to an adder.

The adder adds the resulting sample values to the predicted video/image values outputted from intra predictor 26006/inter predictor 26007, and outputs the resulting added values to a display, and outputs the resulting added values to block memory 26004 or frame memory 26005 for further prediction.

Block partitioning information determiner 26008 collects block information from block memory 26004 or frame memory 26005 to derive block partitioning information using the decoded parameters from entropy decoder 26001. Here, using the derived block partitioning information will result in partitioning a block into a plurality of sub blocks.

In addition, intra predictor 26006/inter predictor 26007 searches within videos/images stored in block memory 26004 or from reconstructed videos/images in frame memory 26005 at the derived block partitioning information from the block partitioning information determiner 26008, and estimates a video/image area which is, for example, most similar to the videos/images of the decoded blocks for prediction.

Embodiment 2

[Outline]

An encoder according to this embodiment encodes a block of an image, and includes a processor and memory connected to the processor. Using the memory, the processor: writes a parameter into a bitstream; selects at least one previously encoded block from a plurality of previously encoded blocks using the parameter written; retrieves block information from the at least one previously encoded block selected; partitions a current block into a plurality of sub blocks using the block information retrieved; and encodes a sub block included in the plurality of sub blocks in an encoding process including a transform process and/or a prediction process.

This makes it possible to adaptively select a previously encoded block to partition the current block, using the parameter. Partitioning a block into a plurality of sub blocks using the block information for a selected previously encoded block makes it possible to reduce the amount of coding pertaining to block partitioning information and improve compression efficiency.

For example, in the encoder according to this embodiment, the current block and the plurality of previously encoded blocks may be different blocks, and at least one of the plurality of previously encoded blocks may be included in a same frame as the current block or another frame which is different from the frame including the current block.

This makes it possible to select a previously encoded block to partition a block from among a plurality of mutually different previously encoded blocks, which makes it possible to partition the current block using block information suitable for partitioning the block. As a result, it is possible to reduce the amount of coding pertaining to block partitioning information and improve compression efficiency.

For example, in the encoder according to this embodiment, the block information retrieved may include at least one of information related to block partition structure, information related to an intra prediction mode or an inter prediction mode, information related to an intra prediction direction, information related to a motion vector, information related to a reference picture, information related to a quantization parameter, and information related to a partitioning depth.

This makes it possible to use information appropriate as block information, which makes it possible to partition the current block using the block information further suitable for block partitioning. As a result, it is possible to reduce the amount of coding pertaining to block partitioning information and improve compression efficiency.

A decoder according to this embodiment decodes a block of an image, and includes a processor and memory. Using the memory, the processor: parses a parameter from a bitstream; selects at least one previously decoded block from a plurality of previously decoded blocks using the parameter parsed; retrieves block information from the at least one previously decoded block selected; partitions a current block into a plurality of sub blocks using the block information retrieved; and decodes a sub block included in the plurality of sub blocks in a decoding process including an inverse transform process and/or a prediction process.

This makes it possible to adaptively select a previously decoded block to partition the current block, using the parameter. Partitioning a block into a plurality of sub blocks using the block information for a selected previously decoded block makes it possible to reduce the amount of coding pertaining to block partitioning information and improve compression efficiency.

For example, in the decoder according to this embodiment, the current block and the plurality of previously decoded blocks may be different blocks, and at least one of the plurality of previously decoded blocks may be included in a same frame as the current block or another frame which is different from the frame including the current block.

This makes it possible to select a previously decoded block to partition a block from among a plurality of mutually different previously decoded blocks, which makes it possible to partition the current block using block information suitable for partitioning the block. As a result, it is possible to reduce the amount of coding pertaining to block partitioning information and improve compression efficiency.

For example, in the decoder according to this embodiment, the block information retrieved may include at least one of information related to block partition structure, information related to an intra prediction mode or an inter prediction mode, information related to an intra prediction direction, information related to a motion vector, information related to a reference picture, information related to a quantization parameter, and information related to a partitioning depth.

This makes it possible to use information appropriate as block information, which makes it possible to partition the current block using the block information further suitable for block partitioning. As a result, it is possible to reduce the amount of coding pertaining to block partitioning information and improve compression efficiency.

General or specific aspects of the present disclosure may be realized as a system, method, integrated circuit, computer program, computer readable medium such as a CD-ROM, or any given combination thereof.

Figure 13:
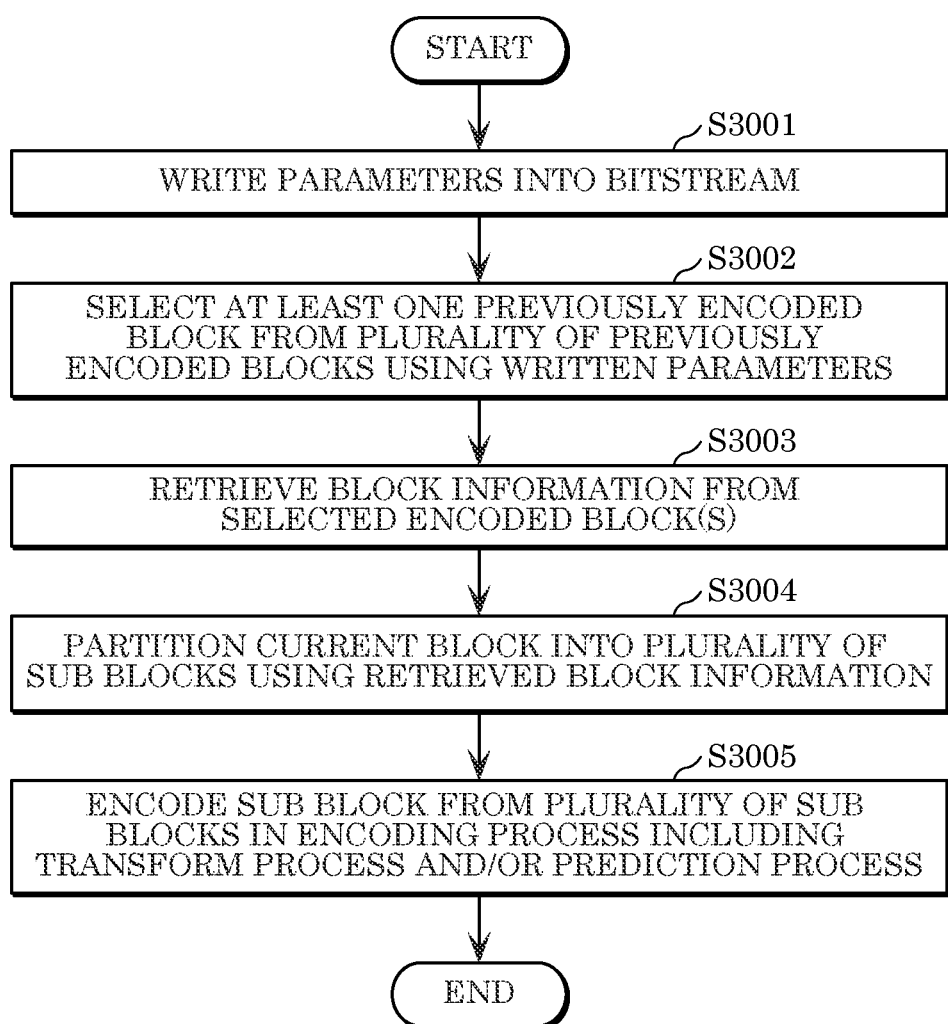
FIG. 13 is a flow chart of one example of a video encoding process according to Embodiment 2.
Figure 14:
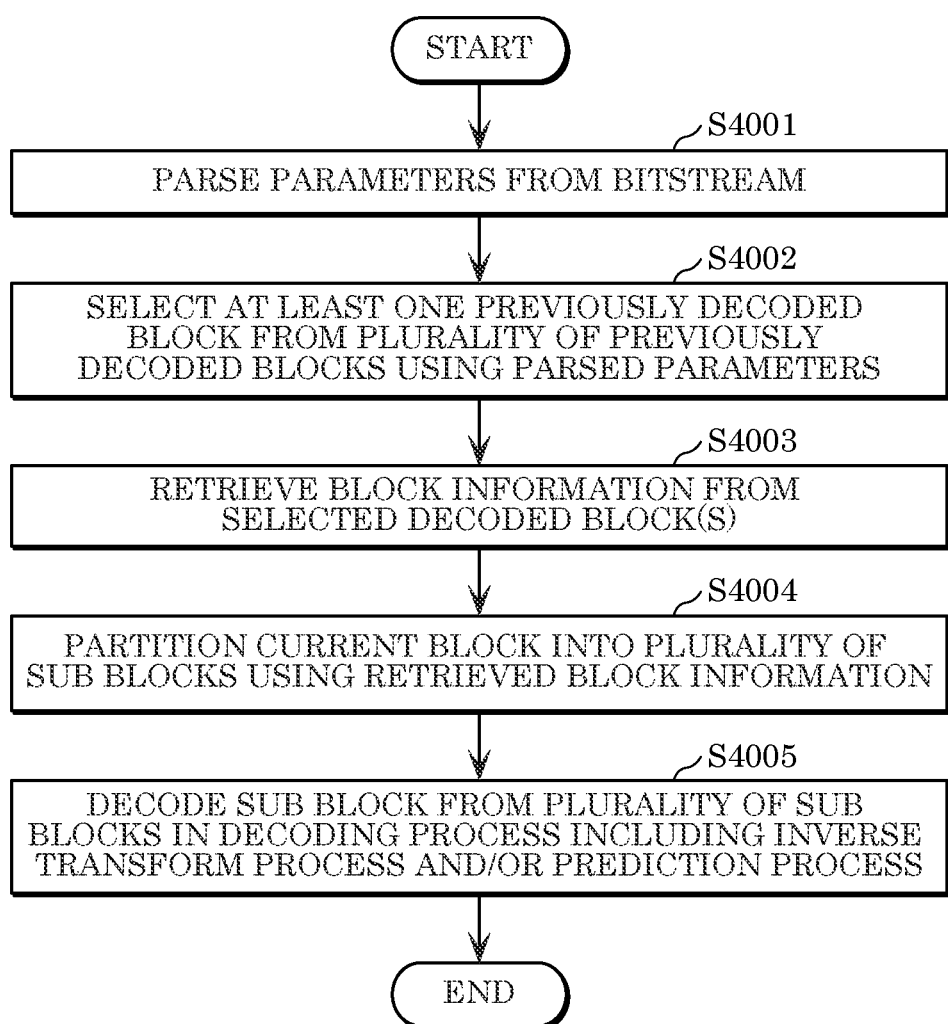
FIG. 14 is a flow chart of one example of a video decoding process according to Embodiment 2.

Hereinafter, methods for encoding and decoding video will be described according to an embodiment as illustrated in FIG. 13 and FIG. 14.

[Encoding Process]

FIG. 13 illustrates one example of a video encoding process according to Embodiment 2.

As a first step S3001, parameters are written into a bitstream. FIG. 37 shows the possible locations of the above mentioned parameters in a compressed video bitstream. The written parameters include one or more parameters for selecting one or more previously encoded block or block information from a determined candidate list. The determined candidate list may be predetermined.

Next, at step S3002, at least one previously encoded block is selected from a plurality of previously encoded blocks using the written parameters. Where either at least one previously encoded block is from the same frame as the current block (for example, a neighbouring block to current block) or at least one previously encoded block is from another frame which is different from the frame that contains the current block (for example, a collocated block to the current block, or a motion compensated block whose position is obtained by using a motion vector of the current block, or the last encoded block from the latest encoded frame which is different from current frame).

At step S3003, block information is retrieved from the selected encoded block.

A current block is then partitioned into a plurality of sub blocks using the retrieved block information at step S3004. FIG. 38 shows an example of partitioning the current block into a plurality of sub blocks using the retrieved block information.

To partition a block into sub blocks, the block partitioning information for the block is derived. Here, the block partitioning information is derived according to block information (for example, block partition structure, intra prediction or inter prediction mode, intra prediction direction, motion vector, reference picture, quantization parameters, and partitioning depth) from previously encoded blocks. Using block partitioning information will result in partitioning a block into a plurality of sub blocks. As shown in FIG. 38, using different block partitioning information will result in partitioning a block into a plurality of sub blocks with different heights, widths, or shapes.

A block partition structure from a selected previously encoded block can be directly used as the block partition structure for the current block.

Block partition structures from two or more selected previously encoded blocks can also be combined (for example, the top half uses the block partition structure from the top block and the left half uses the block partition structure from the left block as shown in FIG. 39) to derive a new block partition structure as the block partition structure for the current block.

A block partition structure from a selected previously encoded block can also be modified (for example, use block partition structure with less partition depth as shown in FIG. 40) to derive a new block partition structure as the block partition structure for the current block.

Block partitioning information may be a set of parameters that indicate whether a block is horizontally split or vertically split. Block partitioning information may also be a set of parameters that include a determined block width and a determined block height for all sub blocks in a block. The determined block width and the determined block height may be predetermined.

Block partitioning information may differ based on intra prediction direction information from selected previously encoded blocks. For example, intra prediction direction information from specific neighbouring block locations can be used to determine whether the current block is to be split vertically or horizontally into smaller blocks. For example, when intra-prediction direction information from a top neighbouring block is determined to be a vertical direction or close to vertical direction, a block partitioning information including a vertical split can be derived for the current block. Similarly, if intra-prediction direction information from a left neighbouring block is determined to be a horizontal direction or close to a horizontal direction, a block partitioning information including a horizontal split can be derived for the current block.

Block partitioning information may be a set of parameters that include an index to select one candidate partition structure from a determined candidate list of block partition structures. The determined candidate list may be predetermined. Here, block partition structure visually presents geometries of all sub blocks in a block, as shown in FIG. 38.

Block partitioning information may be derived according to intra/inter prediction modes from selected previously encoded blocks. For example, when prediction modes from the selected encoded blocks are intra prediction mode, determined block partitioning information can be derived to partition a block into a plurality of sub blocks with smaller block sizes. Moreover, for example, when prediction modes from the selected encoded blocks are inter prediction mode, other determined block partitioning information can be derived to partition a block into a plurality of sub blocks with larger block sizes. The determined block partitioning information may be predetermined.

Block partitioning information may also be derived according to motion vectors from selected previously encoded blocks. When a difference between the motion vectors from the selected encoded blocks and the motion vectors from current block is bigger than a determined threshold, determined block partitioning information can be derived to partition a block into a plurality of sub blocks with smaller block sizes. On the other hand, when a difference between the motion vectors from the selected encoded blocks and the motion vectors from current block is not greater than a determined threshold, other determined block partitioning information can be derived to partition a block into a plurality of sub blocks with larger block sizes. The determined thresholds and the determined block partitioning information may be predetermined.

Block partitioning information may be derived according to quantization parameters from selected previously encoded blocks. For example, when the values of quantization parameters from the selected encoded blocks are smaller than a determined value, determined block partitioning information can be derived to partition a block into a plurality of sub blocks with smaller block sizes. Moreover, for example, when the values of quantization parameters from the selected encoded blocks are not smaller than a determined value, other determined block partitioning information can be derived to partition a block into a plurality of sub blocks with larger block sizes. The determined values and the determined block partitioning information may be predetermined.

Block partitioning information may be derived according to reference picture information from selected previously encoded blocks. For example, when reference pictures from the selected encoded blocks are temporally near to the current image or when the reference pictures from the selected encoded blocks are similar to one another, determined block partitioning information can be derived to partition a block into a plurality of sub blocks with larger block sizes. When reference pictures from the selected encoded blocks are not near to the current image or when the reference pictures from the selected encoded blocks are not similar to one another, other determined block partitioning information can be derived to partition a block into a plurality of sub blocks with smaller block sizes. The determined block partitioning information may be predetermined.

Block partitioning information may be derived according to partitioning depths from selected previously encoded blocks. For example, when partitioning depths from the selected encoded blocks are larger than a determined value (for example, determined depth value equals to 4), determined block partitioning information can be derived to partition a block into a plurality of sub blocks with smaller block sizes. When partitioning depths from the selected encoded blocks are not larger than determined value (for example, depth equals to 2), other determined block partitioning information can be derived to partition a block into a plurality of sub blocks with larger block sizes. The determined values and the determined block partitioning information may be predetermined.

Block partitioning information may also be derived according to split information from previously encoded blocks of a frame different than the current frame. For example, block partitioning information (which includes split information) for current block, or the current block's split information can be derived from block information of a previously encoded block (e.g., a collocated block, the last encoded block, or an encoded block identified by a motion vector) from an encoded frame which is different from current frame.

At step S3005, a sub block from the plurality of sub blocks is encoded in an encoding process. Here, the encoding process includes a transform process and/or a prediction process. The transform process may be performed on a per block basis similar to the sub block size.

[Encoder]

The structure of the video/image encoder according to this embodiment is the same as illustrated in FIG. 35 described in Embodiment 1. Accordingly, duplicate depiction and description is omitted.

[Decoding Process]

FIG. 14 illustrates one example of a video decoding process according to Embodiment 2.

As a first step S4001, parameters are parsed from a bitstream. FIG. 37 shows the parsable locations of the above mentioned parameters in a compressed video bitstream. The parsed parameters include one or more parameters for selecting one or more previously decoded block or block information from a determined candidate list. The determined candidate list may be predetermined.

Next, at step S4002, at least one previously decoded block is selected from a plurality of previously decoded blocks using the parsed parameters. Where either at least one previously decoded block is from the same frame as the current block (for example, a neighbouring block to current block) or at least one previously decoded block is from another frame which is different from the frame that contains the current block (for example, a collocated block to current block, or a motion compensated block whose position is obtained using a motion vector of the current block, or the last decoded block from the latest decoded frame which is different from current frame).

At step S4003, block information is retrieved from the selected decoded block.

A current block is then partitioned into a plurality of sub blocks using the retrieved block information at step S4004. FIG. 38 shows an example of partitioning the current block into a plurality of sub blocks using the retrieved block information.

To partition a block into sub blocks, the block partitioning information for the block is derived. Here, the block partitioning information can be derived according to block information (for example, block partition structure, intra prediction or inter prediction mode, intra prediction direction, motion vector, reference picture, quantization parameters, and partitioning depth) from previously decoded blocks. Using block partitioning information will result in partitioning a block into a plurality of sub blocks. As shown in FIG. 38, using different block partitioning information will result in partitioning a block into a plurality of sub blocks with different heights, widths, or shapes.

A block partition structure from a selected previously decoded block can be directly used as the block partition structure for the current block.

Block partition structures from two or more selected previously decoded blocks can be combined (for example, the top half uses the block partition structure from the top block and the left half uses the block partition structure from left block as shown in FIG. 39) to derive a new block partition structure as the block partition structure for the current block. A block partition structure from a selected previously decoded block can also be modified (for example, use block partition structure with less partition depth as shown in FIG. 40) to derive a new block partition structure as the block partition structure for the current block.

Block partitioning information may be a set of parameters that indicate whether a block is horizontally split or vertically split. Block partitioning information may also be a set of parameters that include a determined block width and a determined block height for all sub blocks in a block. The determined block width and the determined block height may be predetermined.

Block partitioning information may differ based on intra prediction direction information from selected previously decoded blocks. For example, intra prediction direction information from specific neighbouring block locations can be used to determine whether the current block is to be split vertically or horizontally into smaller blocks. For example, when intra-prediction direction information from a top neighbouring block is determined to be a vertical direction or close to vertical direction, a block partitioning information including a vertical split can be derived for the current block. Similarly, if intra-prediction direction information from a left neighbouring block is determined to be a horizontal direction or close to a horizontal direction, a block partitioning information including a horizontal split can be derived for the current block.

Block partitioning information may be a set of parameters that include an index to select one candidate partition structure from a determined candidate list of block partition structures. The determined candidate list may be predetermined. Here, block partition structure visually presents geometries of all sub blocks in a block, as shown in FIG. 38.

Block partitioning information may be derived according to intra/inter prediction modes from selected previously decoded blocks. For example, when prediction modes from the selected decoded blocks are intra prediction mode, determined block partitioning information can be derived to partition a block into a plurality of sub blocks with smaller block sizes. Moreover, for example, when prediction modes from the selected decoded blocks are inter prediction mode, other determined block partitioning information can be derived to partition a block into a plurality of sub blocks with larger block sizes. The determined block partitioning information may be predetermined.

Block partitioning information may also be derived according to motion vectors from selected previously decoded blocks. When a difference between the motion vectors from the selected decoded blocks and the motion vectors from current block is bigger than a determined threshold, determined block partitioning information can be derived to partition a block into a plurality of sub blocks with smaller block sizes. On the other hand, when a difference between the motion vectors from the selected decoded blocks and the motion vectors from current block is not greater than a determined threshold, other determined block partitioning information can be derived to partition a block into a plurality of sub blocks with larger block sizes. The determined thresholds and the determined block partitioning information may be predetermined.

Block partitioning information may be derived according to quantization parameters from selected previously decoded blocks. For example, when the values of quantization parameters from the selected decoded blocks are smaller than a determined value, determined block partitioning information can be derived to partition a block into a plurality of sub blocks with smaller block sizes. Moreover, for example, when the values of quantization parameters from the selected decoded blocks are not smaller than a determined value, other determined block partitioning information can be derived to partition a block into a plurality of sub blocks with larger block sizes. The determined values and the determined block partitioning information may be predetermined.

Block partitioning information may be derived according to reference picture information from selected previously decoded blocks. For example, when reference pictures from the decoded blocks are temporally near to the current image or when the reference pictures from the decoded blocks are similar to one another, determined block partitioning information can be derived to partition a block into a plurality of sub blocks with larger block sizes. When reference pictures from the decoded blocks are not near to the current image or when the reference pictures from the decoded blocks are not similar to one another, other determined block partitioning information can be derived to partition a block into a plurality of sub blocks with smaller block sizes. The determined block partitioning information may be predetermined.

Block partitioning information may be derived according to partitioning depths from selected previously decoded blocks. For example, when partitioning depths from the selected decoded blocks are larger than a determined value (for example, determined depth value equals to 4), determined block partitioning information can be derived to partition a block into a plurality of sub blocks with smaller block sizes. When partitioning depths from the selected decoded blocks are not larger than a determined value (for example, depth equals to 2), other determined block partitioning information can be derived to partition a block into a plurality of sub blocks with larger block sizes. The determined values and the determined block partitioning information may be predetermined.

Block partitioning information may also be predicted according to partitioning information from previously decoded blocks of a frame different than current frame. For example, block partitioning information (which includes split information) for the current block, or the current block's split information can be derived from block information of a previously decoded block (e.g., a collocated block, the last decoded block or a decoded block identified by a motion vector) from a decoded frame which is different from current frame.

At step S4005, a sub block from the plurality of sub blocks is decoded in a decoding process. Here, the decoding process includes an inverse transform process and/or a prediction process. The inverse transform process may be performed on a per block basis similar to the sub block size.

[Decoder]

The structure of the video/image decoder according to this embodiment is the same as illustrated in FIG. 36 described in Embodiment 1. Accordingly, duplicate depiction and description is omitted.

Embodiment 3

[Outline]

An encoder according to this embodiment encodes a block of an image. The encoder includes a processor and memory connected to the processor. Using the memory, the processor: initializes block partitioning information, wherein using the block partitioning information initialized will result in partitioning a block into a plurality of sub blocks of a first set of geometries; writes a parameter into a bitstream; modifies the block partitioning information initialized into modified block partitioning information using the parameter written, wherein using the modified block partitioning information will result in partitioning a block into a plurality of sub blocks of a set of geometries which is different from the first set of geometries; modifies geometries of a plurality of sub blocks using the modified block partitioning information; and encodes a sub block included in the plurality of sub blocks in an encoding process including a transform process and/or a prediction process.

This makes it possible to adaptively modify the initialized block partitioning information to modified block partitioning information, using a parameter. The geometries of a plurality of sub blocks can be modified using this modified block partitioning information. As a result, it is possible to reduce the amount of coding pertaining to block partitioning information and improve compression efficiency.

For example, in the encoder according to this embodiment, geometry may indicate at least a shape, a height, or a width of a block.

This makes it possible to use the shape and/or size of a block as the geometry.

For example, in the encoder according to this embodiment, a process to initialize the block partitioning information may include a process of selecting block partitioning information from a determined list of block partitioning information. The determined list may be predetermined.

This makes it possible to initialize block partitioning information by selecting block partitioning information from a determined list. Accordingly, information identifying block partitioning information in the list may be included in block partitioning information, and it is possible to reduce the amount of coding pertaining to block partitioning information and improve compression efficiency.

For example, in the encoder according to this embodiment, a process to initialize the block partitioning information may include a process of generating block partitioning information using a determined parameter related to a geometry. The determined parameter may be predetermined.

This makes it possible to initialize block partitioning information by generating block partitioning information using a parameter.

For example, in the encoder according to this embodiment, a process to initialize the block partitioning information may include determining a partitioning depth based on at least one of a picture type of a current block and a quantization parameter.

This makes it possible to determine a partition depth based on the picture type of the current block and/or quantization parameters in block partitioning information initialization. Accordingly, it is possible to determine partition depth based on information existing in the bitstream, and reduce the amount of coding pertaining to block partitioning information. Furthermore, by using the picture type of the current block and/or quantization parameters, it is possible to initialize block partitioning information at a partition depth suitable for the current block, which improves compression efficiency.

For example, in the encoder according to this embodiment, the parameter written may include a difference between a partition depth indicated by the block partitioning information initialized and a partition depth indicated by the modified block partitioning information.

This makes it possible to modify block partition depth using a parameter, which makes it possible to use sub blocks more suitable for encoding. As a result, it is possible to improve compression efficiency.

A decoder according to this embodiment decodes a block of an image. The decoder includes a processor and memory connected to the processor. Using the memory, the processor: initializes block partitioning information, wherein using the block partitioning information initialized will result in partitioning a block into a plurality of sub blocks of a first set of geometries; parses a parameter from a bitstream; modifies the block partitioning information initialized into modified block partitioning information using the parameter parsed, wherein using the modified block partitioning information will result in partitioning a block into a plurality of sub blocks of a set of geometries which is different from the first set of geometries; modifies geometries of a plurality of sub blocks using the modified block partitioning information; and decodes a sub block included in the plurality of sub blocks in a decoding process including an inverse transform process and/or a prediction process.

This makes it possible to adaptively modify the initialized block partitioning information to modified block partitioning information, using a parameter. The geometries of a plurality of sub blocks can be modified using this modified block partitioning information. As a result, it is possible to reduce the amount of coding pertaining to block partitioning information and improve compression efficiency.

For example, in the decoder according to this embodiment, geometry may indicate at least a shape, a height, or a width of a block.

This makes it possible to use the shape and/or size of a block as the geometry.

For example, in the decoder according to this embodiment, a process to initialize the block partitioning information may include a process of selecting block partitioning information from a determined list of block partitioning information. The determined list may be predetermined.

This makes it possible to initialize block partitioning information by selecting block partitioning information from a determined list. Accordingly, information identifying block partitioning information in the list may be included in block partitioning information, and it is possible to reduce the amount of coding pertaining to block partitioning information and improve compression efficiency.

For example, in the decoder according to this embodiment, a process to initialize the block partitioning information may include a process of generating block partitioning information using a determined parameter related to a geometry. The determined parameter may be predetermined.

This makes it possible to initialize block partitioning information by generating block partitioning information using a parameter.

For example, in the decoder according to this embodiment, a process to initialize the block partitioning information may include determining a partitioning depth based on at least one of a picture type of a current block and a quantization parameter.

This makes it possible to determine a partition depth based on the picture type of the current block and/or quantization parameters in block partitioning information initialization. Accordingly, it is possible to determine partition depth based on information existing in the bitstream, and reduce the amount of coding pertaining to block partitioning information. Furthermore, by using the picture type of the current block and/or quantization parameters, it is possible to initialize block partitioning information at a partition depth suitable for the current block, which improves compression efficiency.

For example, in the decoder according to this embodiment, the parameter parsed may include a difference between a partition depth indicated by the block partitioning information initialized and a partition depth indicated by the modified block partitioning information.

This makes it possible to modify block partition depth using a parameter, which makes it possible to use sub blocks more suitable for encoding. As a result, it is possible to improve compression efficiency.

General or specific aspects of the present disclosure may be realized as a system, method, integrated circuit, computer program, computer readable medium such as a CD-ROM, or any given combination thereof.

Figure 15:
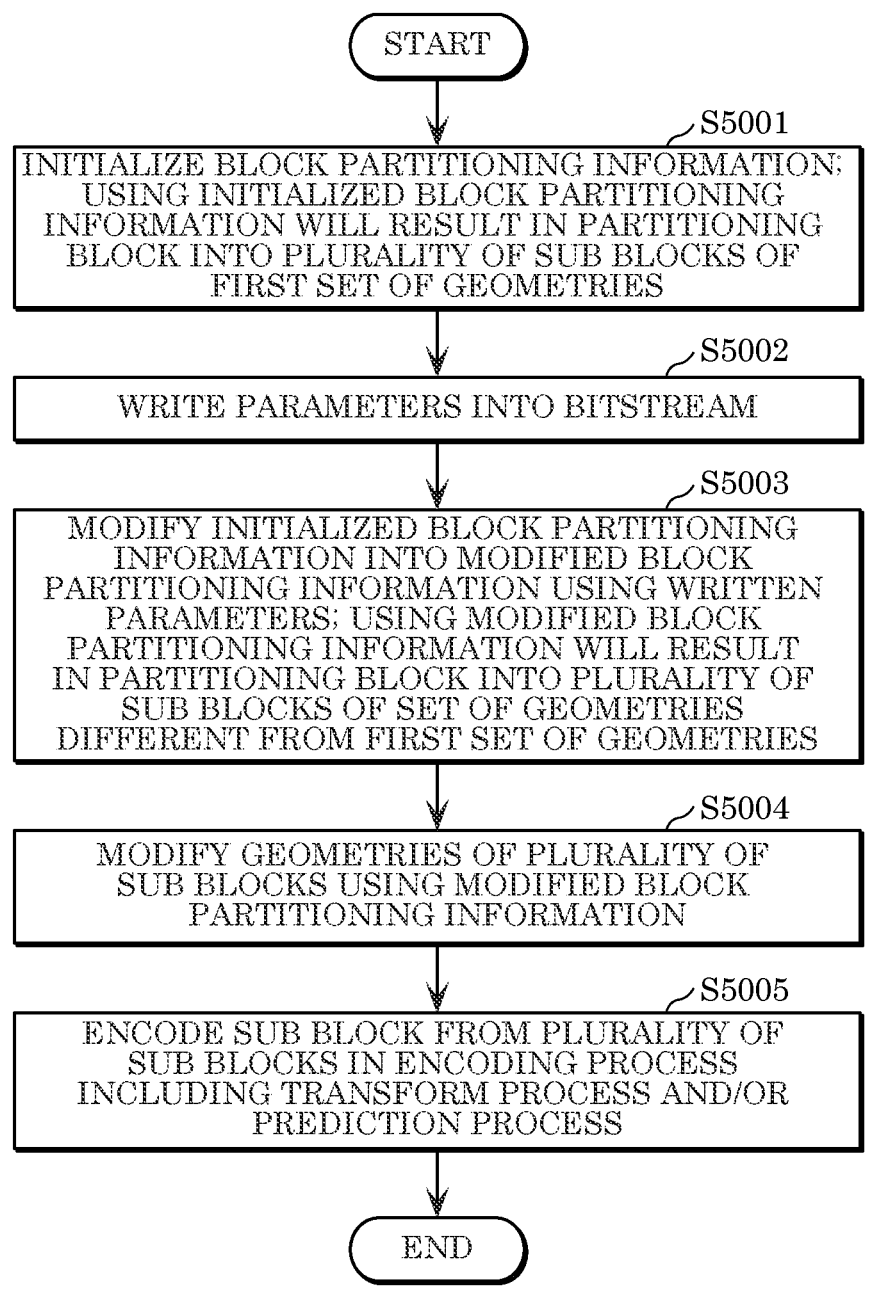
FIG. 15 is a flow chart of one example of a video encoding process according to Embodiment 3.
Figure 16:
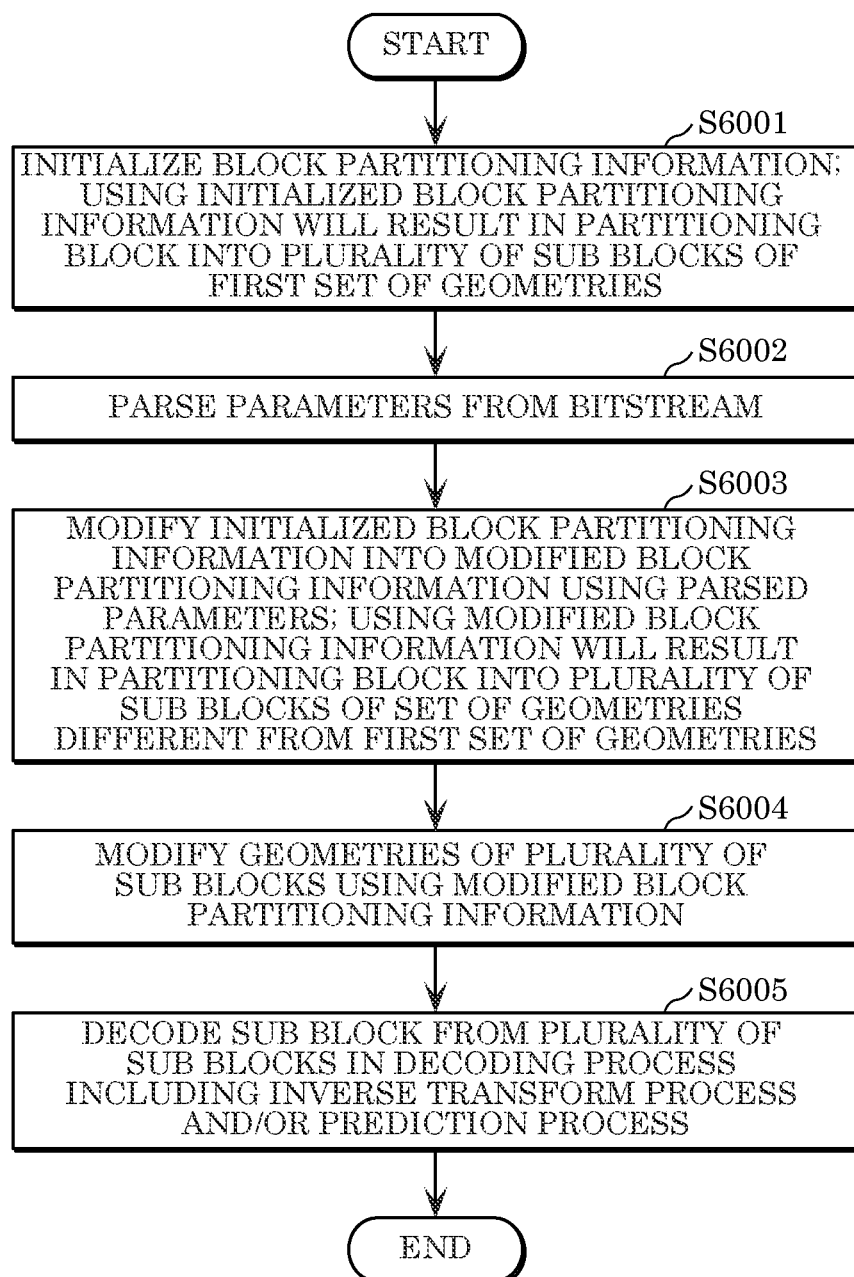
FIG. 16 is a flow chart of one example of a video decoding process according to Embodiment 3.

Hereinafter, methods for encoding and decoding video will be described according to an embodiment as illustrated in FIG. 15 and FIG. 16.

[Encoding Process]

FIG. 15 illustrates one example of a video encoding process according to Embodiment 3.

As a first step S5001, block partitioning information is initialized. Using the initialized block partitioning information (hereinafter "initial block partitioning information") will result in partitioning a block into a plurality of sub blocks of a first set of geometries. As shown in FIG. 38, using different block partitioning information will result in partitioning a block into a plurality of sub blocks with different heights, widths, or shapes.

Block partition structure from a previously encoded block can be directly used as the initialized block partition structure for the current block.

Block partition structures from two or more previously encoded blocks can also be combined (for example, the top half uses block partition structure from the top block and the left half uses block partition structure from the left block as shown in FIG. 39) to derive a new block partition structure as the initialized block partition structure for the current block. One example of how to select previously encoded blocks is to select encoded blocks having same intra/inter prediction mode as current block. Specifically, if the current block is an inter predicted block, one or more of the previously encoded blocks that were encoded using inter prediction will be selected.

Block partition structure from a previously encoded block can also be modified (for example, use block partition structure with less partition depth as shown in FIG. 40) to derive a new block partition structure as the initialized block partition structure for the current block.

Initial block partitioning information may be a set of parameters that indicate whether a block is horizontally split or vertically split. Initial block partitioning information may also be a set of parameters that include a determined block width and a determined block height for all sub blocks in a block. The determined block width and the determined block height may be predetermined.

Initial block partitioning information may differ based on intra prediction direction information from previously encoded blocks. For example, intra prediction direction information from specific neighbouring block locations can be used to determine whether the current block is to be split vertically or horizontally into smaller blocks. For example, when intra prediction direction information from a top neighbouring block is determined to be a vertical direction or close to vertical direction, block partitioning information for the current block can be initialized to block partitioning information including a vertical split. Similarly, if intra-prediction direction information from a left neighbouring block is determined to be a horizontal direction or close to a horizontal direction, block partitioning information for the current block can be initialized to a block partitioning information including a horizontal split.

Initial block partitioning information may be a set of parameters that include an index to select one candidate partition structure from a determined candidate list of block partition structures. The determined list may be predetermined. Here, initialized block partition structure visually presents geometries of all sub blocks in a block, as shown in FIG. 38.

Block partitioning information can be initialized according to intra/inter prediction modes from previously encoded blocks. For example, when prediction modes from the encoded blocks are intra prediction mode, block partitioning information can be initialized to determined block partitioning information for partitioning a block into a plurality of sub blocks with smaller block sizes. Moreover, for example, when prediction modes from the encoded blocks are inter prediction mode, block partitioning information can be initialized to other determined block partitioning information for partitioning a block into a plurality of sub blocks with larger block sizes. The determined block partitioning information may be predetermined.

Block partitioning information may also be initialized according to motion vectors from previously encoded blocks. For example, when a difference between the motion vectors from the encoded blocks and the motion vectors from current block is bigger than a determined threshold, block partitioning information can be initialized to determined block partitioning information for partitioning a block into a plurality of sub blocks with smaller block sizes. On the other hand, when a difference between the motion vectors from the encoded blocks and the motion vectors from current block is not greater than a determined threshold, the block partitioning information can be initialized to other determined block partitioning information for partitioning a block into a plurality of sub blocks with larger block sizes. The determined thresholds and the determined block partitioning information may be predetermined.

Block partitioning information may be initialized according to quantization parameters from previously encoded blocks. For example, when the values of quantization parameters from the encoded blocks are smaller than a determined value, the block partitioning information can be initialized to determined block partitioning information for partitioning a block into a plurality of sub blocks with smaller block sizes. Moreover, for example, when the values of quantization parameters from the encoded blocks are not smaller than a determined value, the block partitioning information can be initialized to other determined block partitioning information for partitioning a block into a plurality of sub blocks with larger block sizes. The determined values and the determined block partitioning information may be predetermined.

Block partitioning information may be initialized according to reference picture information from previously encoded blocks. For example, when reference pictures from the encoded blocks are temporally near to the current image or when the reference pictures from the encoded blocks are similar to one another, the block partitioning information can be initialized to determined block partitioning information for partitioning a block into a plurality of sub blocks with larger block sizes. When reference pictures from the encoded blocks are not near to the current image or when the reference pictures from the encoded blocks are not similar to one another, the block partitioning information can be initialized to other determined block partitioning information for partitioning a block into a plurality of sub blocks with smaller block sizes. The determined block partitioning information may be predetermined.

Block partitioning information may be initialized according to partitioning depths from previously encoded blocks. For example, when partitioning depths from the encoded blocks are larger than a determined value (for example, determined depth value equals to 4), the block partitioning information can be initialized to determined block partitioning information for partitioning a block into a plurality of sub blocks with smaller block sizes. When partitioning depths from the encoded blocks are not larger than determined value (for example, depth equals to 2), the block partitioning information can be initialized to other determined block partitioning information for partitioning a block into a plurality of sub blocks with larger block sizes. The determined values and the determined block partitioning information may be predetermined.

Block partitioning information may also be initialized according to split information from previously encoded blocks of a frame different than the current frame. For example, block partitioning information (which includes split information) for the current block, or the current block's split information can be initialized from a previously encoded block (e.g., a collocated block, the last encoded block or an encoded block identified by a motion vector) from an encoded frame which is different from current frame.

Next, at step S5002, parameters are written into a bitstream. FIG. 37 shows the possible locations of the above mentioned parameters in a compressed video bitstream.

At step S5003, the initial block partitioning information is then modified into modified block partitioning information using the written parameters. Here, using the modified block partitioning information will result in partitioning a block into a plurality of sub blocks of a set of geometries which is different as the first set of geometries. The written parameters include one or more parameters for modifying initial block partitioning information into modified block partitioning information.

Figure 42A:
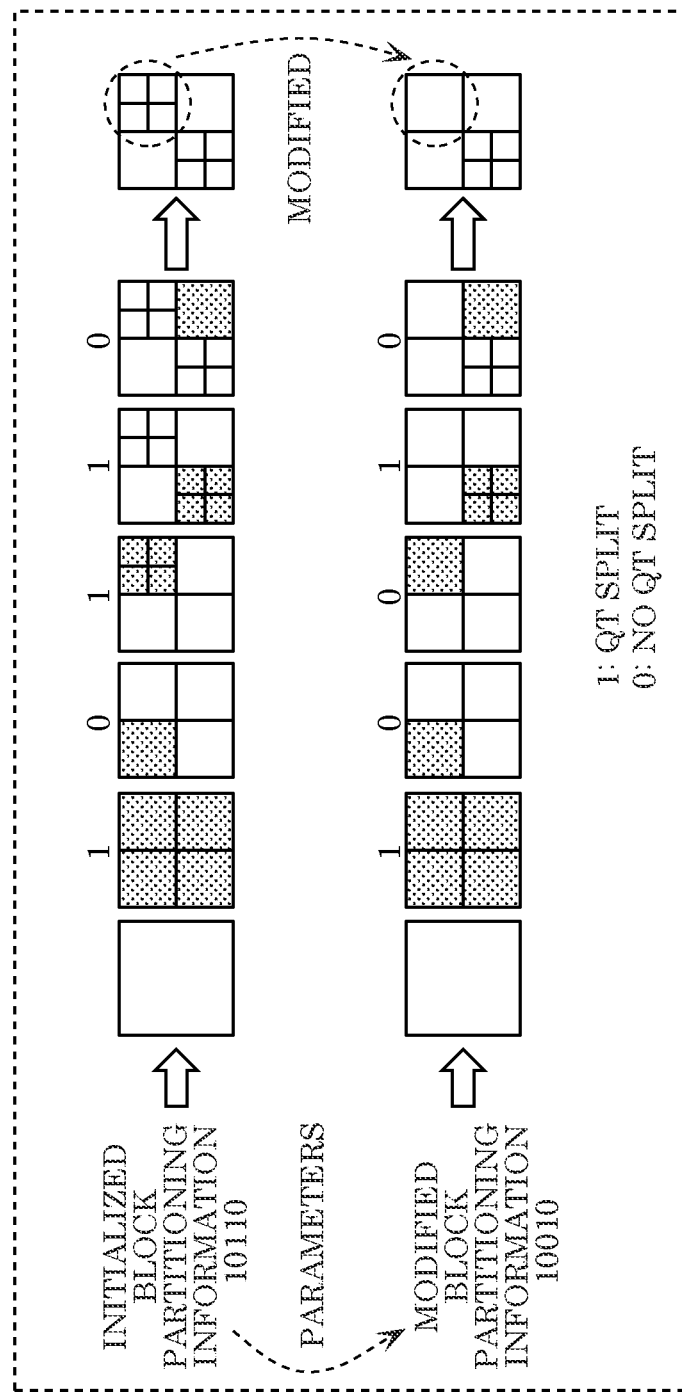
FIG. 42A illustrates one example of initialized block partition structure modification.

For example, the written parameters can include a split flag to split a block into a plurality of sub blocks. As shown in FIG. 42A, using the parameters will change the value of the quad-tree (QT) split flag and modifies the initialized block partition structure.

Figure 42B:
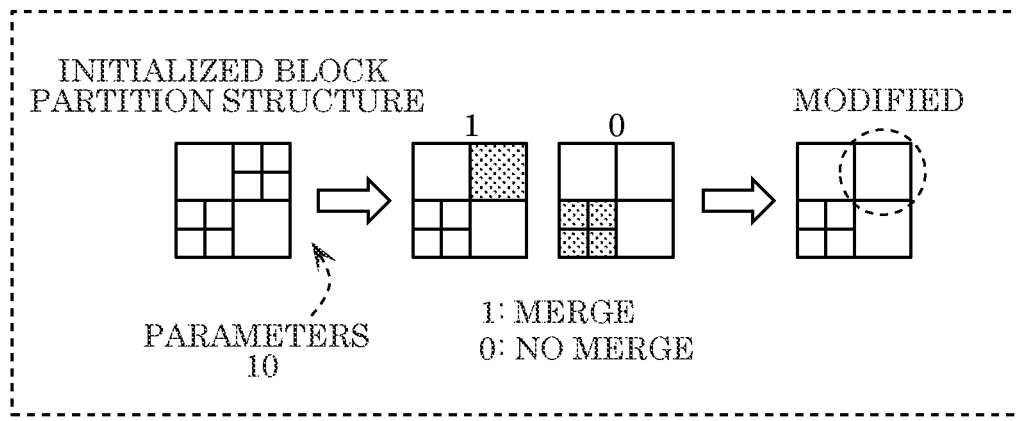
FIG. 42B illustrates one example of initialized block partition structure modification.
Figure 43:
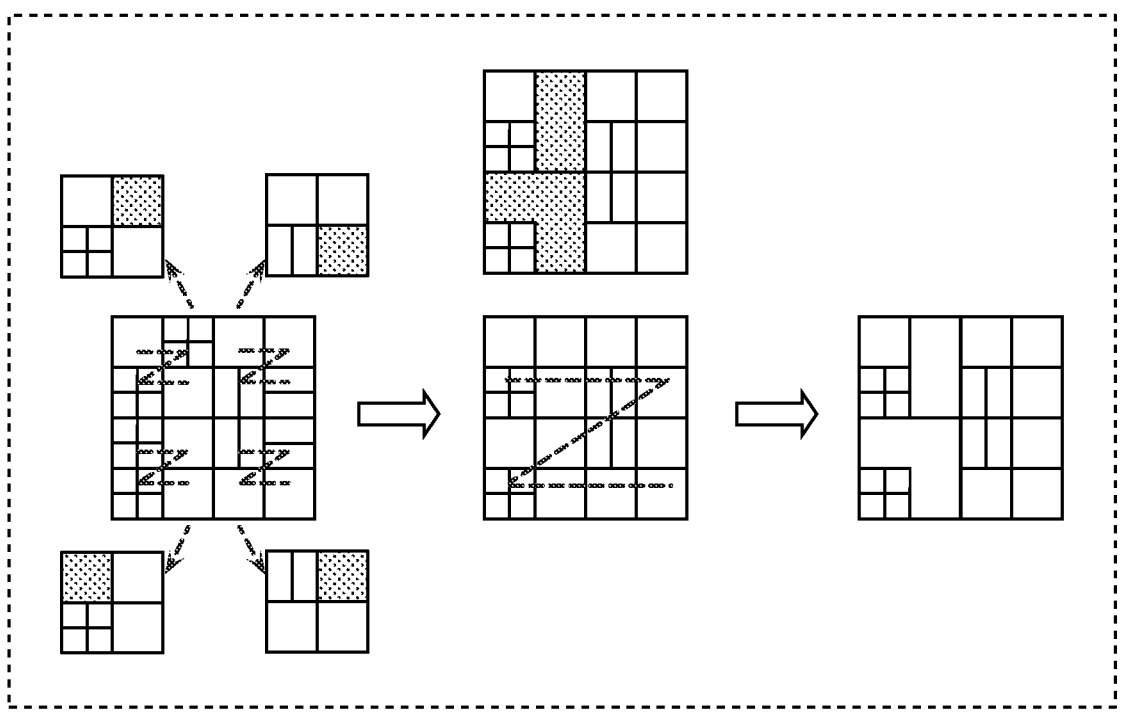
FIG. 43 illustrates one example of initialized block partition structure modification.

For another example, the written parameters can include merge flags to hierarchically merge smaller blocks into bigger blocks based on a determined scanning order (e.g., raster-scan or z-scan). The determined scanning order may be predetermined. As shown in FIG. 42B, using the parameters will merge a plurality of blocks into a bigger block and causes the initialized block partition structure modified. An example of hierarchically merging smaller blocks into bigger blocks is shown in FIG. 43.

Figure 42C:
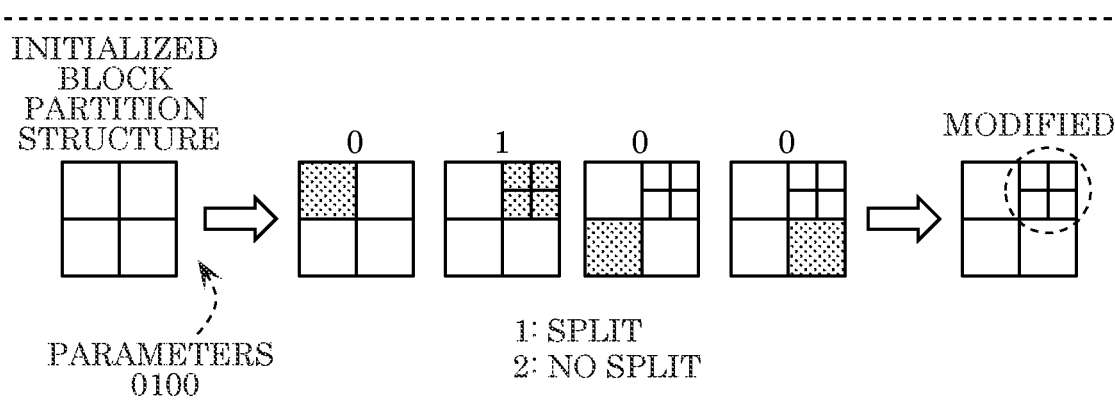
FIG. 42C illustrates one example of initialized block partition structure modification.

For another example, the written parameters can include split enable flags to hierarchically split bigger blocks into smaller blocks based on a determined scanning order (e.g., raster-scan or z-scan). The determined scanning order may be predetermined. As shown in FIG. 42C, using the parameters will split a block into a plurality of smaller sub blocks and will modify the initialized block partition structure.

For another example, the written parameters can include a difference between the partition depth indicated by the initial block partitioning information and the partition depth indicated by the modified block partitioning information. Using the parameter swill modify the block partition depth.

The combination of different partitioning methods such as splitting a block and merging smaller blocks to create the final block partition structure is also possible. Control parameters which include one or more switch parameter(s) or flag(s) to indicate whether a merge enable flag or a split enable flag is used, can be included in a header of the bitstream.

Using initial block partitioning information or modified block partitioning information will result in different block partition structures based on different partitioning methods. The partitioning methods, for example, can be a binary split as shown by b1) and b2) in FIG. 41, a quad-tree split as shown by q1) and q2) in FIG. 41, a multiple cut/split as shown by m1) and m2) in FIG. 41, or a non square/rectangle split as shown by n1) in FIG. 41. The geometries (shape and/or size) of different sub blocks can be different such as the asymmetrical binary split as shown by b2) in FIG. 41, an asymmetrical quad-tree split as shown by q2) in FIG. 41, a non-equal size multiple-cut as shown by m1) in FIG. 41, or a non square/rectangle split as shown by n1) in FIG. 41.

The written parameters, for example, can also indicate if no modification is needed. If no modification is needed, steps S5003 and S5004 can be skipped. Correspondingly, a block will be partitioned into a plurality of sub blocks using the initial block partitioning information before going to step S5005. At step S5005, encoding in an encoding process of a sub block from said plurality of sub blocks partitioned using modified block partitioning information will be replaced by encoding in an encoding process of a sub block from said plurality of sub blocks partitioned using initial block partitioning information.

The geometries of a plurality of sub blocks are modified using the modified block partitioning information at S5004.

At step S5005, a sub block from said plurality of sub blocks is encoded in an encoding process. Here, the encoding process includes a transform process and/or a prediction process. The transform process may be performed on a per block basis similar to the sub block size.

[Encoder]

The structure of the video/image encoder according to this embodiment is the same as illustrated in FIG. 35 described in Embodiment 1. Accordingly, duplicate depiction and description is omitted.

[Decoding Process]

FIG. 16 illustrates one example of a video decoding process according to Embodiment 3.

As a first step S6001, block partitioning information is initialized. Using the initial block partitioning information will result in partitioning a block into a plurality of sub blocks of a first set of geometries. As shown in FIG. 38, using different block partitioning information will result in partitioning a block into a plurality of sub blocks with different heights, widths, or shapes.

Block partition structure from a previously decoded block can be directly used as the initialized block partition structure for the current block.

Block partition structures from two or more previously decoded blocks can also be combined (for example, the top half uses block partition structure from the top block and the left half uses block partition structure from the left block as shown in FIG. 39) to derive a new block partition structure as the initialized block partition structure for the current block. One example of how to select previously decoded blocks is to select decoded blocks having same intra/inter prediction mode as current block. Specifically, if the current block is an inter predicted block, one or more of the previously decoded blocks that were decoded using inter prediction will be selected.

Block partition structure from a previously decoded block can also be modified (for example, use block partition structure with less partition depth as shown in FIG. 40) to derive a new block partition structure as the initialized block partition structure for the current block.

Initial block partitioning information may be a set of parameters that indicate whether a block is horizontally split or vertically split. Initial block partitioning information may also be a set of parameters that include a determined block width and a determined block height for all sub blocks in a block. The determined block width and the determined block height may be predetermined.

Initial block partitioning information may differ based on intra prediction direction information from previously decoded blocks. For example, intra prediction direction information from specific neighbouring block locations can be used to determine whether the current block is to be split vertically or horizontally into smaller blocks. For example, when intra prediction direction information from a top neighbouring block is determined to be a vertical direction or close to vertical direction, block partitioning information for the current block can be initialized to block partitioning information including a vertical split. Similarly, if intra-prediction direction information from a left neighbouring block is determined to be a horizontal direction or close to a horizontal direction, block partitioning information for the current block can be initialized to a block partitioning information including a horizontal split.

Initial block partitioning information may be a set of parameters that include an index to select one candidate partition structure from a determined candidate list of block partition structures. The determined candidate list may be predetermined. Here, initialized block partition structure visually presents geometries of all sub blocks in a block, as shown in FIG. 38.

Block partitioning information can be initialized according to intra/inter prediction modes from previously decoded blocks. When prediction modes from the decoded blocks are intra prediction mode, block partitioning information can be initialized to determined block partitioning information for partitioning a block into a plurality of sub blocks with smaller block sizes. Moreover, for example, when prediction modes from the decoded blocks are inter prediction mode, block partitioning information can be initialized to other determined block partitioning information for partitioning a block into a plurality of sub blocks with larger block sizes. The determined block partitioning information may be predetermined.

Block partitioning information may also be initialized according to motion vectors from previously decoded blocks. For example, when a difference between the motion vectors from the decoded blocks and the motion vectors from current block is bigger than a determined threshold, block partitioning information can be initialized to determined block partitioning information for partitioning a block into a plurality of sub blocks with smaller block sizes. On the other hand, when a difference between the motion vectors from the decoded blocks and the motion vectors from current block is not greater than a determined threshold, the block partitioning information can be initialized to other determined block partitioning information for partitioning a block into a plurality of sub blocks with larger block sizes. The determined thresholds and the determined block partitioning information may be predetermined.

Block partitioning information may be initialized according to quantization parameters from previously decoded blocks. For example, when the values of quantization parameters from the decoded blocks are smaller than a determined value, the block partitioning information can be initialized to determined block partitioning information for partitioning a block into a plurality of sub blocks with smaller block sizes. Moreover, for example, when the values of quantization parameters from the decoded blocks are not smaller than a determined value, the block partitioning information can be initialized to other determined block partitioning information for partitioning a block into a plurality of sub blocks with larger block sizes. The determined values and the determined block partitioning information may be predetermined.

Block partitioning information may be initialized according to reference picture information from previously decoded blocks. For example, when reference pictures from the decoded blocks are temporally near to the current image or when the reference pictures from the decoded blocks are similar to one another, the block partitioning information can be initialized to determined block partitioning information for partitioning a block into a plurality of sub blocks with larger block sizes. When reference pictures from the decoded blocks are not near to the current image or when the reference pictures from the decoded blocks are not similar to one another, the block partitioning information can be initialized to other determined block partitioning information for partitioning a block into a plurality of sub blocks with smaller block sizes. The determined block partitioning information may be predetermined.

Block partitioning information may be initialized according to partitioning depths from previously decoded blocks. For example, when partitioning depths from the decoded blocks are larger than a determined value (for example, determined depth value equals to 4), the block partitioning information can be initialized to determined block partitioning information for partitioning a block into a plurality of sub blocks with smaller block sizes. When partitioning depths from the decoded blocks are not larger than determined value (for example, depth equals to 2), the block partitioning information can be initialized to other determined block partitioning information for partitioning a block into a plurality of sub blocks with larger block sizes. The determined values and the determined block partitioning information may be predetermined.

Block partitioning information may also be initialized according to partitioning information from previously decoded blocks of a frame different than current frame. For example, block partitioning information (which includes split information) for the current block, or the current block's split information can be initialized from a previously decoded block (e.g., a collocated block, the last decoded block or a decoded block identified by a motion vector) from a decoded frame which is different from current frame.

Next, at step S6002, parameters are parsed from a bitstream. FIG. 37 shows the parsable locations of the above mentioned parameters in a compressed video bitstream.

At step S6003, the initial block partitioning information is then modified into modified block partitioning information using the parsed parameters. Here, using the modified block partitioning information will result in partitioning a block into a plurality of sub blocks of a set of geometries which is different as the first set of geometries. The parsed parameters include one or more parameters for modifying initial block partitioning information into modified block partitioning information.

For example, the parsed parameters can include a split flag to split a block into a plurality of sub blocks. As shown in FIG. 42A, using the parameters will change the value of the quad-tree (QT) split flag and modifies the initialized block partition structure.

For another example, the parsed parameters can include merge flags to hierarchically merge smaller blocks into bigger blocks based on a determined scanning order (e.g., raster-scan or z-scan). The determined scanning order may be predetermined. As shown in FIG. 42B, using the parameters will merge a plurality of blocks into a bigger block and causes the initialized block partition structure modified. An example of hierarchically merging smaller blocks into bigger blocks is shown in FIG. 43.

For another example, the parsed parameters can include split enable flags to hierarchically split bigger blocks into smaller blocks based on determined scanning order (e.g., raster-scan or z-scan). As shown in FIG. 42C, using the parameters will split a block into a plurality of smaller sub blocks and will modify the initialized block partition structure. The determined scanning order may be predetermined.

For another example, the parsed parameters can include a difference between the partition depth indicated by the initial block partitioning information and the partition depth indicated by the modified block partitioning information. Using the parameter swill modify the block partition depth.

The combination of different partitioning methods such as splitting a block and merging smaller blocks to create the final block partition structure is also possible. Control parameters which include one or more switch parameter(s) or flag(s) to indicate whether a merge enable flag or a split enable flag is used, can be included in a header of the bitstream.

Using initial block partitioning information or modified block partitioning information will result in different block partition structures based on different partitioning methods. The partitioning methods, for example, can be a binary split as shown by b1) and b2) in FIG. 41, a quad-tree split as shown by q1) and q2) in FIG. 41, a multiple cut/split as shown by m1) and m2) in FIG. 41, or a non square/rectangle split as shown by n1) in FIG. 41. The geometries (shape and/or size) of different sub blocks can be different such as the asymmetrical binary split as shown by b2) in FIG. 41, an asymmetrical quad-tree split as shown by q2) in FIG. 41, a non-equal size multiple-cut as shown by m1) in FIG. 41, or a non square/rectangle split as shown by n1) in FIG. 41.

The parsed parameters, for example, can also indicate if no modification is needed. If no modification is needed, steps S6003 and S6004 can be skipped. Correspondingly, a block will be partitioned into a plurality of sub blocks using the initial block partitioning information before going to step S6005. At step S6005, decoding in a decoding process of a sub block from said plurality of sub blocks partitioned using modified block partitioning information will be replaced by decoding in a decoding process of a sub block from said plurality of sub blocks partitioned using initial block partitioning information.

The geometries of a plurality of sub blocks are modified using the modified block partitioning information at S6004.

At step S6005, a sub block from the plurality of sub blocks is decoded in a decoding process. Here, the decoding process includes an inverse transform process and/or a prediction process. The inverse transform process may be performed on a per block basis similar to the sub block size.

[Decoder]

The structure of the video/image decoder according to this embodiment is the same as illustrated in FIG. 36 described in Embodiment 1. Accordingly, duplicate depiction and description is omitted.

Note that in this embodiment, default block partitioning information may be used as initial block partitioning information. For example, the default block partitioning information is defined block partitioning information. For example, the default block partitioning information may be block partitioning information that is defined in a standard. Moreover, for example, the default block partitioning information may be block partitioning information that is written in a header for a higher-level element than the block. Note that when default block partitioning information is used, in steps S5001 and S6001, obtaining of the default block partitioning information is performed instead of the initializing of the block partitioning information. The defined block partitioning information may be predefined.

Note that in this embodiment, initialization based on block information for a previously encoded or decoded block is given as an example of block partitioning information initialization, but the block partitioning information initialization is not limited to this example. For example, in the block partitioning information initialization, partition depth may be determined based on at least one of the picture type (I, P, or B picture) of the current block and quantization parameters of the current block.

More specifically, for example, when the current block is an I picture type, the block partitioning information may be initialized to block partitioning information for partitioning a block at a relatively deep partitioning depth. Moreover, for example, when the current block is a P or B picture type, the block partitioning information may be initialized to block partitioning information for partitioning a block at a relatively shallow partitioning depth.

Moreover, for example, the partitioning depth in the initial block partitioning information may be determined based on quantization parameters of the current block. More specifically, when a quantization parameter of the current block is less than a determined value, the block partitioning information may be initialized to block partitioning information for partitioning a block at a relatively deep partitioning depth. Moreover, for example, when a quantization parameter of the current block is greater than or equal to a determined value, the block partitioning information may be initialized to block partitioning information for partitioning a block at a relatively shallow partitioning depth. The determined value may be predetermined.

Embodiment 4

[Outline]

An encoder according to this embodiment encodes a block of an image, and includes a processor and memory connected to the processor. Using the memory, the processor: writes a parameter into a bitstream; partitions a block into a plurality of sub blocks; merges at least two sub blocks included in the plurality of sub blocks into a merged block using the parameter written; and encodes the merged block in an encoding process including a transform process and/or a prediction process.

This makes it possible to combine at least two sub blocks using a parameter. Accordingly, it is possible to modify the partitioning of the current block using the parameter, which makes it possible to use sub blocks more suitable for encoding. As a result, it is possible to improve compression efficiency.

A decoder according to this embodiment decodes a block of an image, and includes a processor and memory connected to the processor. Using the memory, the processor: parses a parameter from a bitstream; partitions a block into a plurality of sub blocks; merges at least two sub blocks included in the plurality of sub blocks into a merged block using the parameter parsed; and decodes the merged block in a decoding process including an inverse transform process and/or a prediction process.

This makes it possible to combine at least two sub blocks using a parameter. Accordingly, it is possible to modify the partitioning of the current block using the parameter, which makes it possible to use sub blocks more suitable for decoding. As a result, it is possible to improve compression efficiency.

General or specific aspects of the present disclosure may be realized as a system, method, integrated circuit, computer program, computer readable medium such as a CD-ROM, or any given combination thereof.

Figure 17:
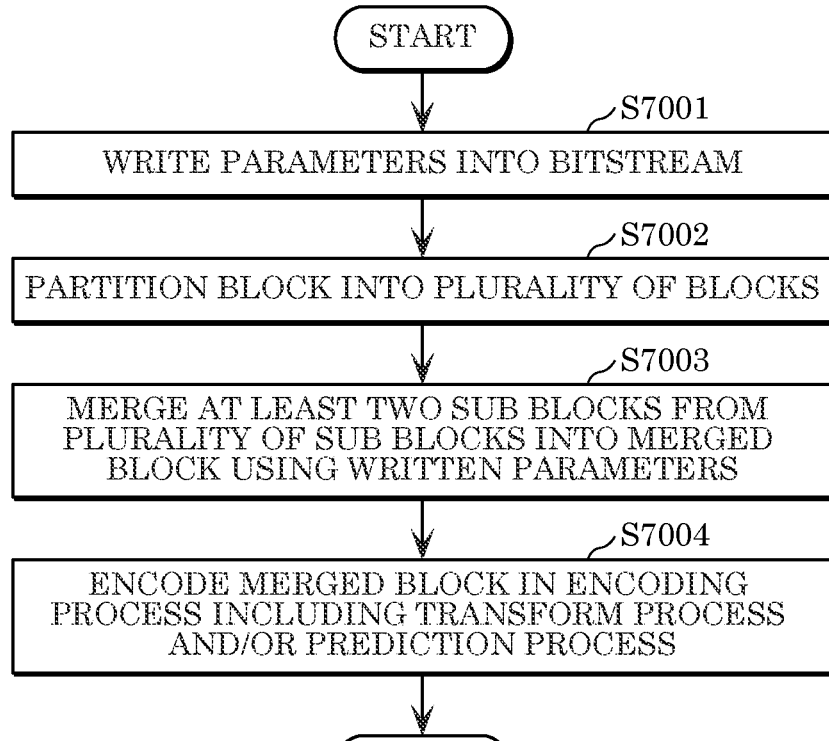
FIG. 17 is a flow chart of one example of a video encoding process according to Embodiment 4.
Figure 18:
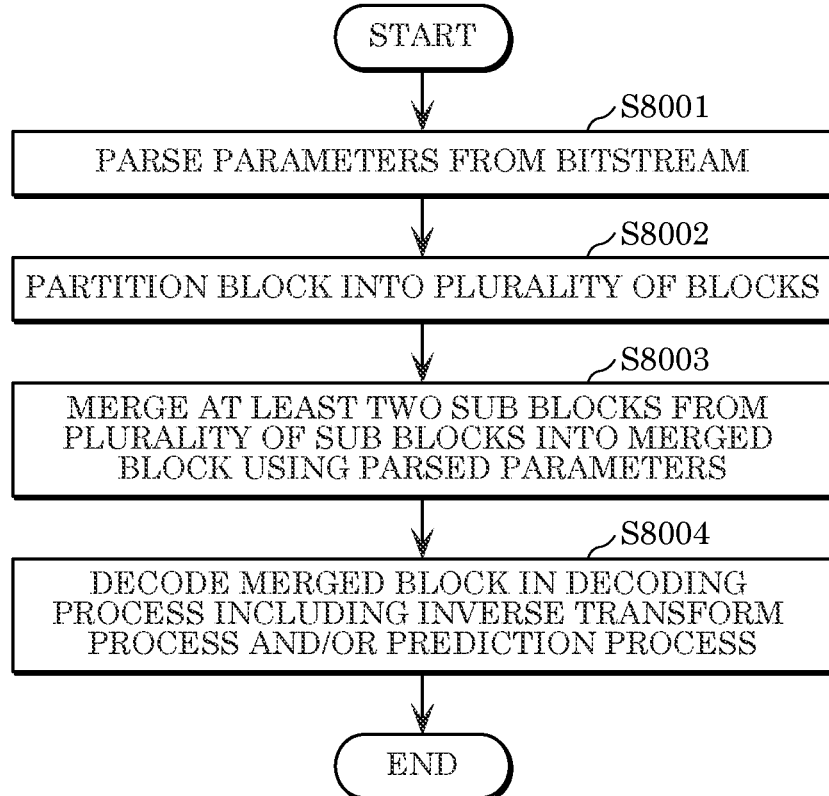
FIG. 18 is a flow chart of one example of a video decoding process according to Embodiment 4.

Hereinafter, methods for encoding and decoding video will be described according to an embodiment as illustrated in FIG. 17 and FIG. 18.

[Encoding Process]

FIG. 17 illustrates one example of a video encoding process according to Embodiment 4.

As a first step S7001, parameters are written into a bitstream. FIG. 37 shows the possible locations of the above mentioned parameters in a compressed video bitstream.

Next, at step S7002, a block is partitioned into a plurality of sub blocks using initial block partitioning information. As shown in FIG. 38, using different block partitioning information will result in partitioning a block into a plurality of sub blocks with different heights, widths, or shapes.

Block partition structure from a previously encoded block can be directly used as the initialized block partition structure for the current block. Moreover, default block partition structure can be used as the initialized block partition structure for the current block.

Block partition structures from two or more previously encoded blocks can also be combined (for example, the top half uses block partition structure from the top block and the left half uses block partition structure from the left block as shown in FIG. 39) to derive a new block partition structure as the initialized block partition structure for the current block. One example of how to select previously encoded blocks is to select encoded blocks having same intra/inter prediction mode as current block. Specifically, if the current block is an inter predicted block, one or more of the previously encoded blocks that were encoded using inter prediction will be selected.

Block partition structure from a previously encoded block can also be modified (for example, use block partition structure with less partition depth as shown in FIG. 40) to derive a new block partition structure as the initialized block partition structure for the current block.

Initial block partitioning information may be a set of parameters that indicate whether a block is horizontally split or vertically split. Initial block partitioning information may also be a set of parameters that include a determined block width and a determined block height for all sub blocks in a block. The determined block width and the determined block height may be predetermined.

Initial block partitioning information may differ based on intra prediction direction information from previously encoded blocks. For example, intra prediction direction information from specific neighbouring block locations can be used to determine whether the current block is to be split vertically or horizontally into smaller blocks. For example, when intra prediction direction information from a top neighbouring block is determined to be a vertical direction or close to vertical direction, block partitioning information for the current block can be initialized to block partitioning information including a vertical split. Similarly, if intra-prediction direction information from a left neighbouring block is determined to be a horizontal direction or close to a horizontal direction, block partitioning information for the current block can be initialized to a block partitioning information including a horizontal split.

Initial block partitioning information may be a set of parameters that include an index to select one candidate partition structure from a determined candidate list of block partition structures. Here, initialized block partition structure visually presents geometries of all sub blocks in a block, as shown in FIG. 38. The determined candidate list may be predetermined.

Block partitioning information can be initialized according to intra/inter prediction modes from previously encoded blocks. For example, when prediction modes from the encoded blocks are intra prediction mode, block partitioning information can be initialized to determined block partitioning information for partitioning a block into a plurality of sub blocks with smaller block sizes. Moreover, for example, when prediction modes from the encoded blocks are inter prediction mode, block partitioning information can be initialized to other determined block partitioning information for partitioning a block into a plurality of sub blocks with larger block sizes. The determined block partitioning information may be predetermined.

Block partitioning information may also be initialized according to motion vectors from previously encoded blocks. For example, when a difference between the motion vectors from the encoded blocks and the motion vectors from current block is bigger than a determined threshold, block partitioning information can be initialized to determined block partitioning information for partitioning a block into a plurality of sub blocks with smaller block sizes. On the other hand, when a difference between the motion vectors from the encoded blocks and the motion vectors from current block is not greater than a determined threshold, the block partitioning information can be initialized to other determined block partitioning information for partitioning a block into a plurality of sub blocks with larger block sizes. The determined thresholds and the determined block partitioning information may be predetermined.

Block partitioning information may be initialized according to quantization parameters from previously encoded blocks. For example, when the values of quantization parameters from the encoded blocks are smaller than a determined value, the block partitioning information can be initialized to determined block partitioning information for partitioning a block into a plurality of sub blocks with smaller block sizes. Moreover, for example, when the values of quantization parameters from the encoded blocks are not smaller than a determined value, the block partitioning information can be initialized to other determined block partitioning information for partitioning a block into a plurality of sub blocks with larger block sizes. The determined values and the determined block partitioning information may be predetermined.

Block partitioning information may be initialized according to reference picture information from previously encoded blocks. For example, when reference pictures from the encoded blocks are temporally near to the current image or when the reference pictures from the encoded blocks are similar to one another, the block partitioning information can be initialized to determined block partitioning information for partitioning a block into a plurality of sub blocks with larger block sizes. When reference pictures from the encoded blocks are not near to the current image or when the reference pictures from the encoded blocks are not similar to one another, the block partitioning information can be initialized to other determined block partitioning information for partitioning a block into a plurality of sub blocks with smaller block sizes. The determined block partitioning information may be predetermined.

Block partitioning information may be initialized according to partitioning depths from previously encoded blocks. For example, when partitioning depths from the encoded blocks are larger than a determined value (for example, determined depth value equals to 4), the block partitioning information can be initialized to determined block partitioning information for partitioning a block into a plurality of sub blocks with smaller block sizes. When partitioning depths from the encoded blocks are not larger than determined value (for example, depth equals to 2), the block partitioning information can be initialized to other determined block partitioning information for partitioning a block into a plurality of sub blocks with larger block sizes. The determined values and the determined block partitioning information may be predetermined.

Block partitioning information may also be initialized according to split information from previously encoded blocks of a frame different than the current frame. For example, block partitioning information (which includes split information) for the current block, or the current block's split information can be initialized from a previously encoded block (e.g., a collocated block, the last encoded block or an encoded block identified by a motion vector) from an encoded frame which is different from current frame.

At step S7003, at least two sub blocks from the plurality of sub blocks is merged into a merged block using the written parameters. For example, the written parameters can include merge flags to hierarchically merge smaller blocks into bigger blocks based on a determined scanning order (e.g., raster-scan or z-scan). As shown in FIG. 42B, using the parameters will merge a plurality of blocks into a bigger block and causes the initialized block partition structure modified. An example of hierarchically merging smaller blocks into bigger blocks is shown in FIG. 43. The determined scanning order may be predetermined.

Different partitioning methods can be used to derive block partition structures before and after the merging process at step S7003. The partitioning methods, for example, can be a binary split as shown by b1) and b2) in FIG. 41, a quad-tree split as shown by q1) and q2) in FIG. 41, a multiple cut/split as shown by m1) and m2) in FIG. 41, or a non square/rectangle split as shown by n1) in FIG. 41. The geometries (shape and/or size) of different sub blocks can be different such as the asymmetrical binary split as shown by b2) in FIG. 41, an asymmetrical quad-tree split as shown by q2) in FIG. 41, a non-equal size multiple-cut as shown by m1) in FIG. 41, or a non square/rectangle split as shown by n1) in FIG. 41.

The written parameters, for example, can also indicate that no merging is needed. If no merging is needed, S7003 can be skipped. Correspondingly, a block will be partitioned into a plurality of sub blocks using the initial block partitioning information before going to step S7004. At step S7004, a sub block instead of the merged block is encoded in an encoding process.

At step S7004, the merged block is encoded in an encoding process. Here, the encoding process includes a transform process and/or a prediction process. The transform process may be performed on a per block basis similar to the sub block size.

[Encoder]

The structure of the video/image encoder according to this embodiment is the same as illustrated in FIG. 35 described in Embodiment 1. Accordingly, duplicate depiction and description is omitted.

[Decoding Process]

FIG. 18 illustrates one example of a video decoding process according to Embodiment 4.

As a first step S8001, parameters are parsed from a bitstream. FIG. 37 shows the parsable locations of the above mentioned parameters in a compressed video bitstream.

Next, at step S8002, a block is partitioned into a plurality of sub blocks using initial block partitioning information. As shown in FIG. 38, using different block partitioning information will result in partitioning a block into a plurality of sub blocks with different heights, widths, or shapes.

Block partition structure from a previously decoded block can be directly used as the initialized block partition structure for the current block.

Block partition structures from two or more previously decoded blocks can also be combined (for example, the top half uses block partition structure from the top block and the left half uses block partition structure from the left block as shown in FIG. 39) to derive a new block partition structure as the initialized block partition structure for the current block. One example of how to select previously decoded blocks is to select decoded blocks having same intra/inter prediction mode as current block. Specifically, if the current block is an inter predicted block, one or more of the previously decoded blocks that were decoded using inter prediction will be selected.

Block partition structure from a previously decoded block can also be modified (for example, use block partition structure with less partition depth as shown in FIG. 40) to derive a new block partition structure as the initialized block partition structure for the current block.

Initial block partitioning information may be a set of parameters that indicate whether a block is horizontally split or vertically split. Initial block partitioning information may be a set of parameters that include a determined block width and a determined block height for all sub blocks in a block. The determined block width and the determined block height may be predetermined.

Initial block partitioning information may differ based on intra prediction direction information from previously decoded blocks. For example, intra prediction direction information from specific neighbouring block locations can be used to determine whether the current block is to be split vertically or horizontally into smaller blocks. For example, when intra prediction direction information from a top neighbouring block is determined to be a vertical direction or close to vertical direction, block partitioning information for the current block can be initialized to block partitioning information including a vertical split. Similarly, if intra-prediction direction information from a left neighbouring block is determined to be a horizontal direction or close to a horizontal direction, block partitioning information for the current block can be initialized to a block partitioning information including a horizontal split.

Initial block partitioning information may be a set of parameters that include an index to select one candidate partition structure from a determined candidate list of block partition structures. Here, initialized block partition structure visually presents geometries of all sub blocks in a block, as shown in FIG. 38. The determined candidate list may be predetermined.

Block partitioning information can be initialized according to intra/inter prediction modes from previously decoded blocks. When prediction modes from the decoded blocks are intra prediction mode, block partitioning information can be initialized to determined block partitioning information for partitioning a block into a plurality of sub blocks with smaller block sizes. Moreover, for example, when prediction modes from the decoded blocks are inter prediction mode, block partitioning information can be initialized to other determined block partitioning information for partitioning a block into a plurality of sub blocks with larger block sizes. The determined block partitioning information may be predetermined.

Block partitioning information may also be initialized according to motion vectors from previously decoded blocks. For example, when a difference between the motion vectors from the decoded blocks and the motion vectors from current block is bigger than a determined threshold, block partitioning information can be initialized to determined block partitioning information for partitioning a block into a plurality of sub blocks with smaller block sizes. On the other hand, when a difference between the motion vectors from the decoded blocks and the motion vectors from current block is not greater than a determined threshold, the block partitioning information can be initialized to other determined block partitioning information for partitioning a block into a plurality of sub blocks with larger block sizes. The determined thresholds and the determined block partitioning information may be predetermined.

Block partitioning information may be initialized according to quantization parameters from previously decoded blocks. For example, when the values of quantization parameters from the decoded blocks are smaller than a determined value, the block partitioning information can be initialized to determined block partitioning information for partitioning a block into a plurality of sub blocks with smaller block sizes. Moreover, for example, when the values of quantization parameters from the decoded blocks are not smaller than a determined value, the block partitioning information can be initialized to other determined block partitioning information for partitioning a block into a plurality of sub blocks with larger block sizes. The determined values and the determined block partitioning information may be predetermined.

Block partitioning information may be initialized according to reference picture information from previously decoded blocks. For example, when reference pictures from the decoded blocks are temporally near to the current image or when the reference pictures from the decoded blocks are similar to one another, the block partitioning information can be initialized to determined block partitioning information for partitioning a block into a plurality of sub blocks with larger block sizes. When reference pictures from the decoded blocks are not near to the current image or when the reference pictures from the decoded blocks are not similar to one another, the block partitioning information can be initialized to other determined block partitioning information for partitioning a block into a plurality of sub blocks with smaller block sizes. The determined block partitioning information may be predetermined.

Block partitioning information may be initialized according to partitioning depths from previously decoded blocks. For example, when partitioning depths from the decoded blocks are larger than a determined value (for example, determined depth value equals to 4), the block partitioning information can be initialized to determined block partitioning information for partitioning a block into a plurality of sub blocks with smaller block sizes. When partitioning depths from the decoded blocks are not larger than determined value (for example, depth equals to 2), the block partitioning information can be initialized to other determined block partitioning information for partitioning a block into a plurality of sub blocks with larger block sizes. The determined values and the determined block partitioning information may be predetermined.

Block partitioning information may also be initialized according to partitioning information from previously decoded blocks of a frame different than current frame. For example, block partitioning information (which includes split information) for the current block, or the current block's split information can be initialized from a previously decoded block (e.g., a collocated block, the last decoded block or a decoded block identified by a motion vector) from a decoded frame which is different from current frame.

At step S8003, at least two sub blocks from the plurality of sub blocks is merged into a merged block using the parsed parameters. For example, the parsed parameters can include merge flags to hierarchically merge smaller blocks into bigger blocks based on determined scanning order (e.g., raster-scan or z-scan). As shown in FIG. 42B, using the parameters will merge a plurality of blocks into a bigger block and causes the initialized block partition structure modified. An example of hierarchically merging smaller blocks into bigger blocks is shown in FIG. 43. The determined scanning order may be predetermined.

Different partitioning methods can be used to derive block partition structures before and after the merging process at step S8003. The partitioning methods, for example, can be a binary split as shown by b1) and b2) in FIG. 41, a quad-tree split as shown by q1) and q2) in FIG. 41, a multiple cut/split as shown by m1) and m2) in FIG. 41, or a non square/rectangle split as shown by n1) in FIG. 41. The geometries (shape and/or size) of different sub blocks can be different such as the asymmetrical binary split as shown by b2) in FIG. 41, an asymmetrical quad-tree split as shown by q2) in FIG. 41, a non-equal size multiple-cut as shown by m1) in FIG. 41, or a non square/rectangle split as shown by n1) in FIG. 41.

The parsed parameters, for example, can also indicate if no merging is needed. If no merging is needed, S8003 can be skipped. Correspondingly, a block will be partitioned into a plurality of sub blocks using the initial block partitioning information before going to step S8004. At step S8004, a sub block instead of the merged block is decoded in a decoding process.

At step S8004, a merged block is decoded in a decoding process. Here, the decoding process includes an inverse transform process and/or a prediction process. The transform process may be performed on a per block basis similar to the sub block size.

[Decoder]

The structure of the video/image decoder according to this embodiment is the same as illustrated in FIG. 36 described in Embodiment 1. Accordingly, duplicate depiction and description is omitted.

Embodiment 5

[Outline]

An encoder according to one aspect of the present disclosure encodes a block of an image, and includes a processor and memory connected to the processor. Using the memory, the processor: retrieves a geometry of a block; determines whether the geometry retrieved is equal to a determined geometry; when the geometry retrieved is equal to the determined geometry, partitions the block into a determined number of sub blocks of a first set of geometries; when the geometry retrieved is not equal to the determined geometry, partitions the block into the determined number of sub blocks of another set of geometries which is different from the first set of geometries; and encodes a sub block in an encoding process including a transform process and/or a prediction process. The determined geometry and the determined numbers of sub blocks may be predetermined.

This makes it possible to partition a block based on the geometry of the block. Accordingly, it is possible to reduce the amount of coding pertaining to block partitioning information and improve compression efficiency. Furthermore, usage of block geometry can contribute to the generation of sub blocks suitable more for encoding and to the improvement in compression efficiency.

For example, in the encoder according to this embodiment, geometry may indicate at least a shape, a height, or a width of a block.

This makes it possible to use the shape and/or size of a block as the geometry.

For example, in the encoder according to this embodiment, at least one of a height and a width of the sub block may be a power of two.

This makes it possible to partition a block so that at least one of the height and the width of a sub block is a power of 2. Accordingly, it is possible to obtain sub blocks in sizes suitable for encoding, and improve compression efficiency.

A decoder according to one aspect of the present disclosure decodes a block of an image, and includes a processor and memory connected to the processor. Using the memory, the processor: retrieves a geometry of a block; determines whether the geometry retrieved is equal to a determined geometry; when the geometry retrieved is equal to the determined geometry, partitions the block into a determined number of sub blocks of a first set of geometries; when the geometry retrieved is not equal to the determined geometry, partitions the block into the determined number of sub blocks of another set of geometries which is different from the first set of geometries; and decodes a sub block in a decoding process including an inverse transform process and/or a prediction process. The determined geometry and the determined numbers of sub blocks may be predetermined.

This makes it possible to partition a block based on the geometry of the block. Accordingly, it is possible to reduce the amount of coding pertaining to block partitioning information and improve compression efficiency. Furthermore, usage of block geometry can contribute to the generation of sub blocks suitable more for encoding and to the improvement in compression efficiency.

For example, in the decoder according to this embodiment, geometry may indicate at least a shape, a height, or a width of a block.

This makes it possible to use the shape and/or size of a block as the geometry.

For example, in the decoder according to this embodiment, at least one of a height and a width of the sub block may be a power of two.

This makes it possible to partition a block so that at least one of the height and the width of a sub block is a power of 2. Accordingly, it is possible to use sub blocks in sizes suitable for decoding, and improve compression efficiency.

General or specific aspects of the present disclosure may be realized as a system, method, integrated circuit, computer program, computer readable medium such as a CD-ROM, or any given combination thereof.

Figure 19:
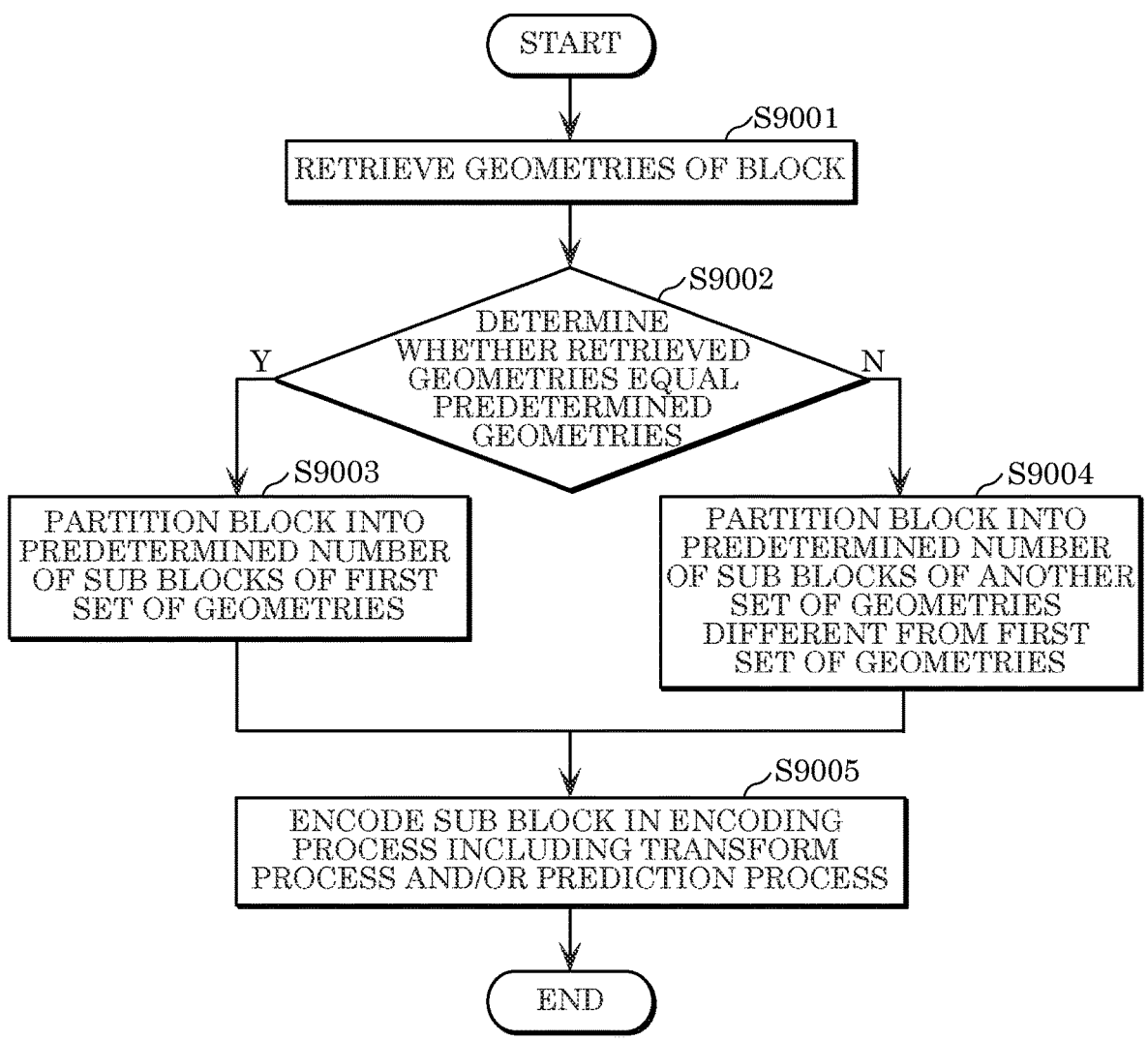
FIG. 19 is a flow chart of one example of a video encoding process according to Embodiment 5.
Figure 20:
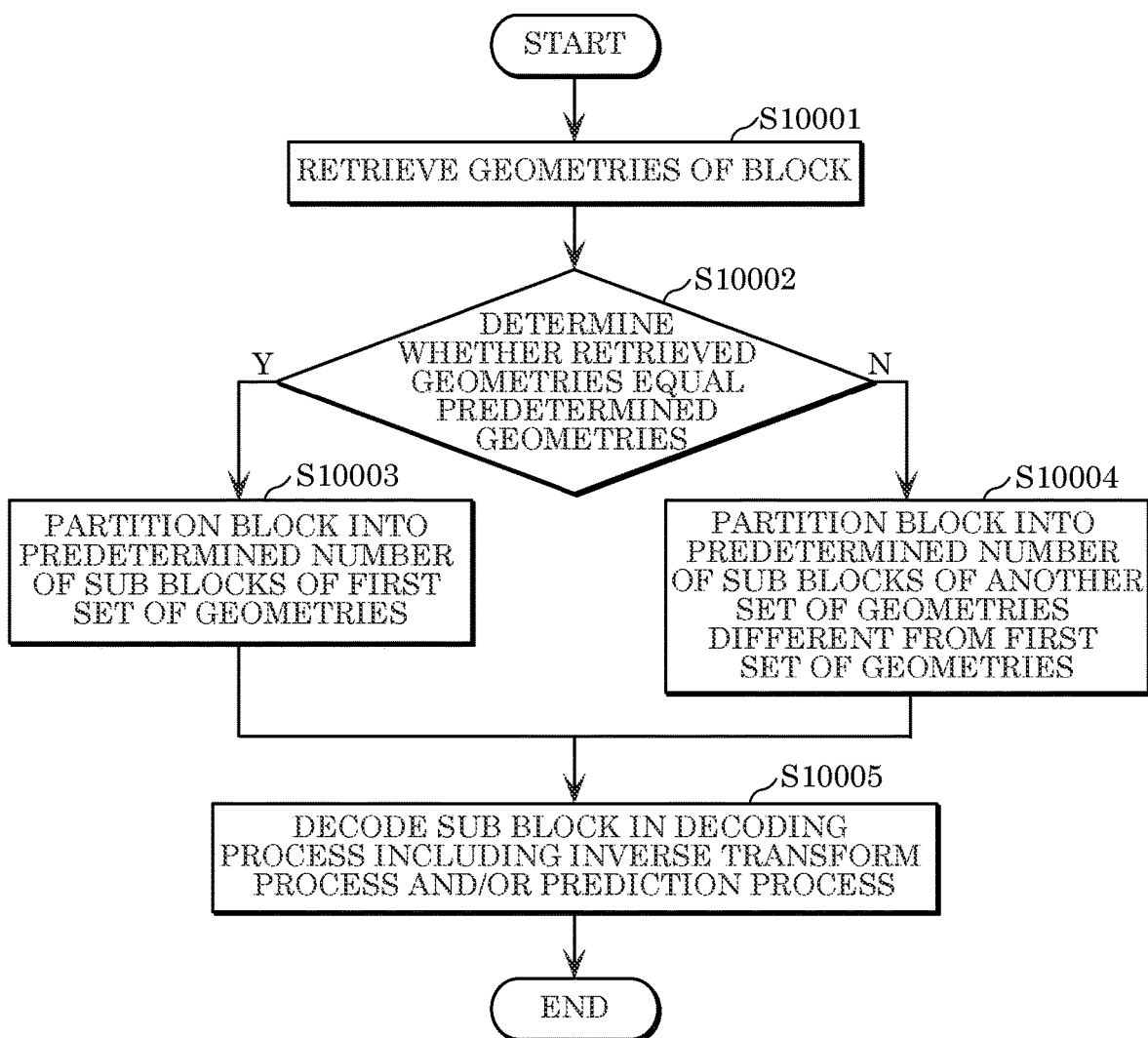
FIG. 20 is a flow chart of one example of a video decoding process according to Embodiment 5.

Hereinafter, methods for encoding and decoding video will be described according to an embodiment as illustrated in FIG. 19 and FIG. 20.

[Encoding Process]

FIG. 19 illustrates one example of a video encoding process according to Embodiment 5.

Figure 44:
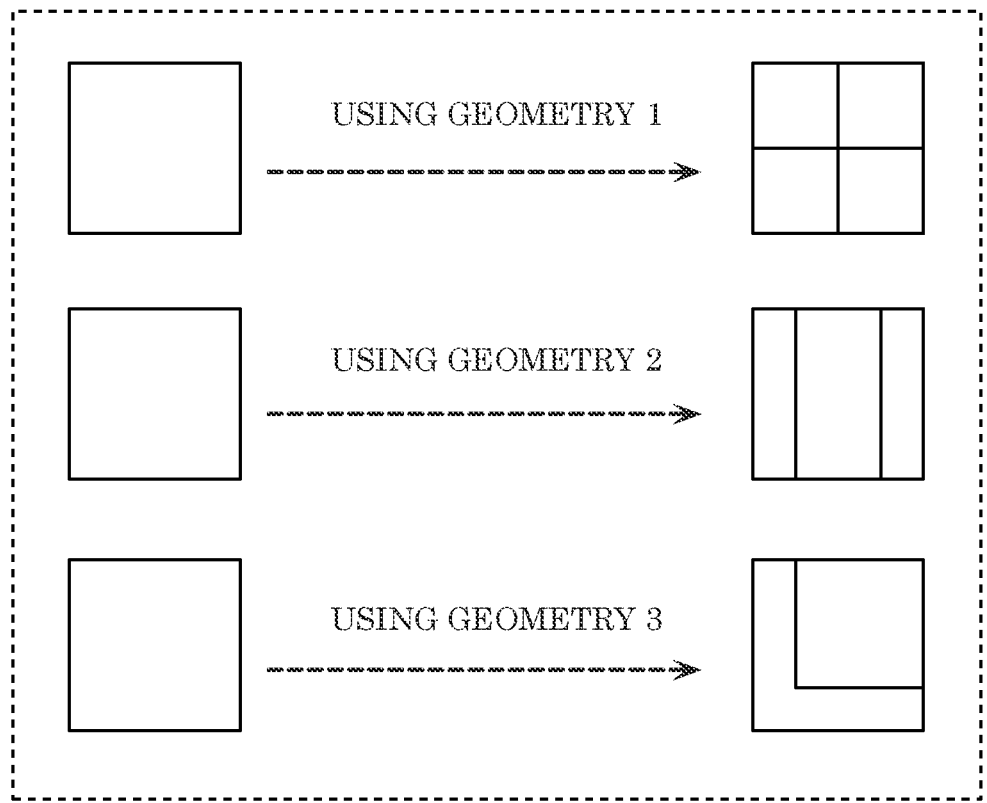
FIG. 44 illustrates different block partitions depending on geometry.

As a first step S9001, geometries of a block are retrieved. Here, geometry indicates at least a shape, or a height, or a width of a block. As shown in FIG. 44, using different geometries will result in partitioning a block into a plurality of sub blocks with different shape, or block height, or block width.

Next, at step S9002, whether the retrieved geometries are equal to determined geometries is determined. The determined geometries may be predetermined.

If the retrieved geometries are equal to the determined geometries (Y in S9002), the block is partitioned into a determined number of sub blocks of first set of geometries at step S9003. If the retrieved geometries are not equal to the determined geometries (N in S9002), the block is partitioned into the determined number of sub blocks of another set of geometries which is different from the first set of geometries at step S9004. The determined geometries and the determined numbers of sub blocks may be predetermined.

Figure 45A:
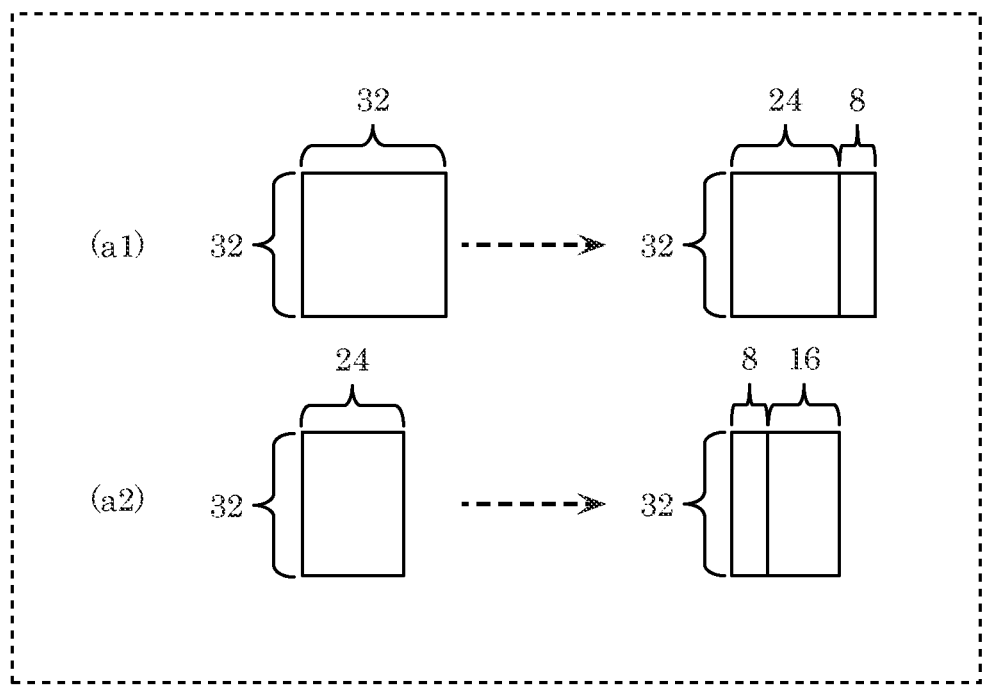
FIG. 45A illustrates an example of partitioning blocks into sub blocks of different geometries based on different block geometries.

For example, when the determined number of sub blocks is set to 2, for example, as shown in (a1) in FIG. 45A, the block can be vertically split into 2 sub blocks with a 1:3 or 3:1 ratio when block width (e.g., 32) is a power of two. On the other hand, as shown in (a2) in FIG. 45A, the block can be vertically split into 2 sub blocks with a 1:2 or 1:2 ratio when the width (e.g., 24) is not a power of two. Similarly, a block can be horizontally split into two sub blocks according to whether the block height of the block is a power of two.

Figure 45B:
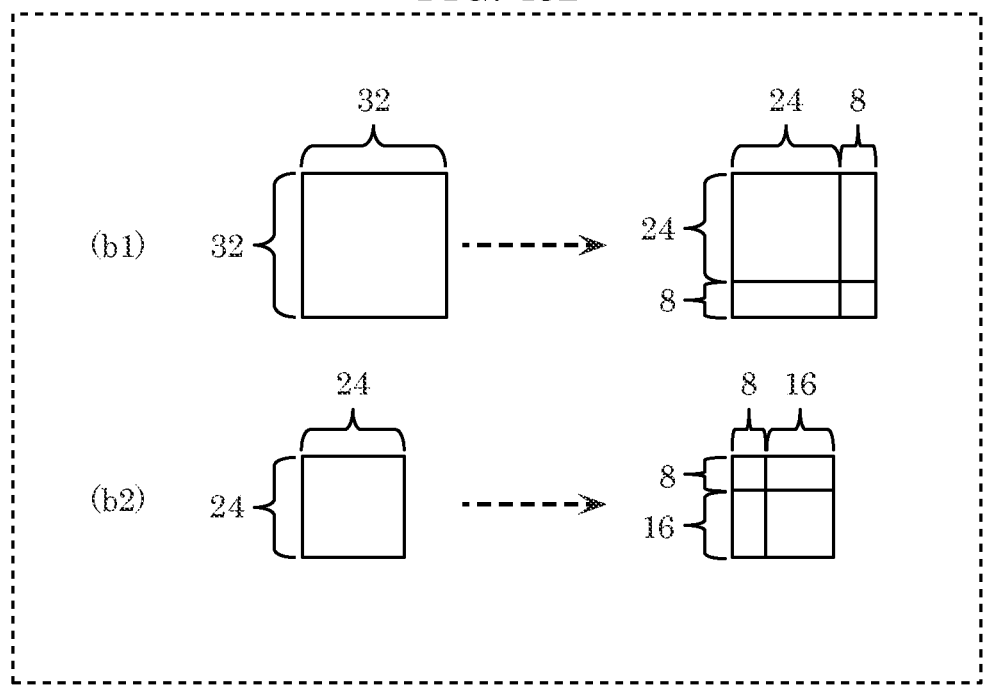
FIG. 45B illustrates an example of partitioning blocks into sub blocks of different geometries based on different block geometries.
Figure 45C:
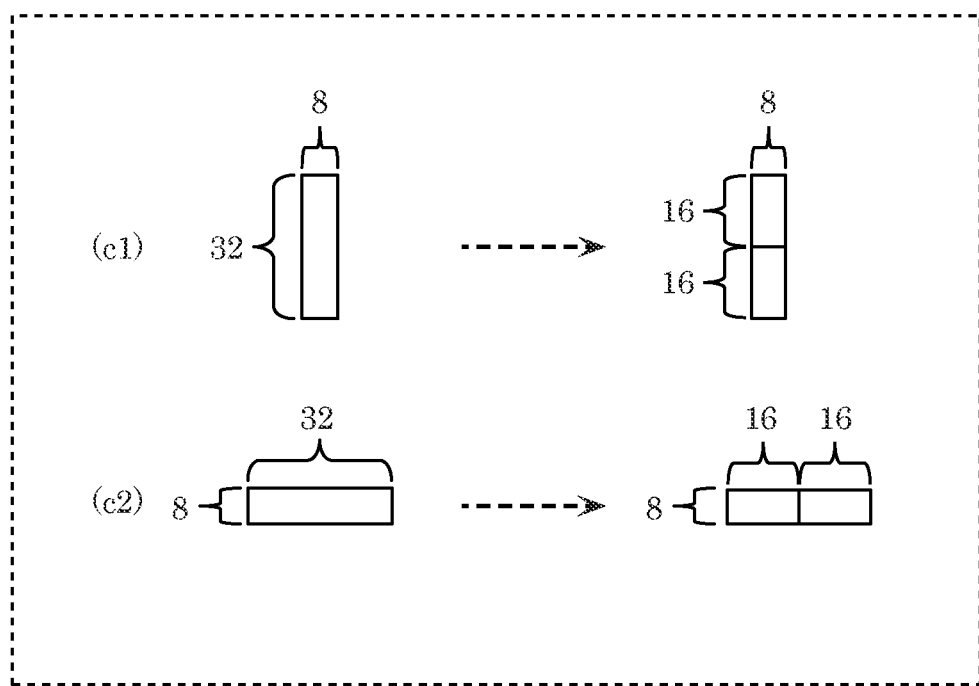
FIG. 45C illustrates an example of partitioning blocks into sub blocks of different geometries based on different block geometries.

As another example, as shown in (c1) in FIG. 45C, when the determined number of sub blocks is set to 2, the block can be horizontally split into 2 sub blocks with equal size if block width (e.g., 8) is smaller than block height (e.g., 32). On the other hand, as shown in (c2) in FIG. 45C, the block can be vertically split into 2 sub blocks with equal size if the width (e.g., 32) is larger than block height (e.g., 8).

When the determined number of sub blocks is set to 4, for example, as shown in (b1) in FIG. 45B, the block can be split into 4 sub blocks where the width of the largest sub block is 3 times the width of the smallest sub block when block width (e.g., 32) of the block is a power of two. On the other hand, as shown in (b2) FIG. 45B, the block can be split into 4 sub blocks where the width of the largest sub block is 2 times the width of the smallest sub block when block width (e.g., 24) of the block is not a power of two.

Figure 45D:
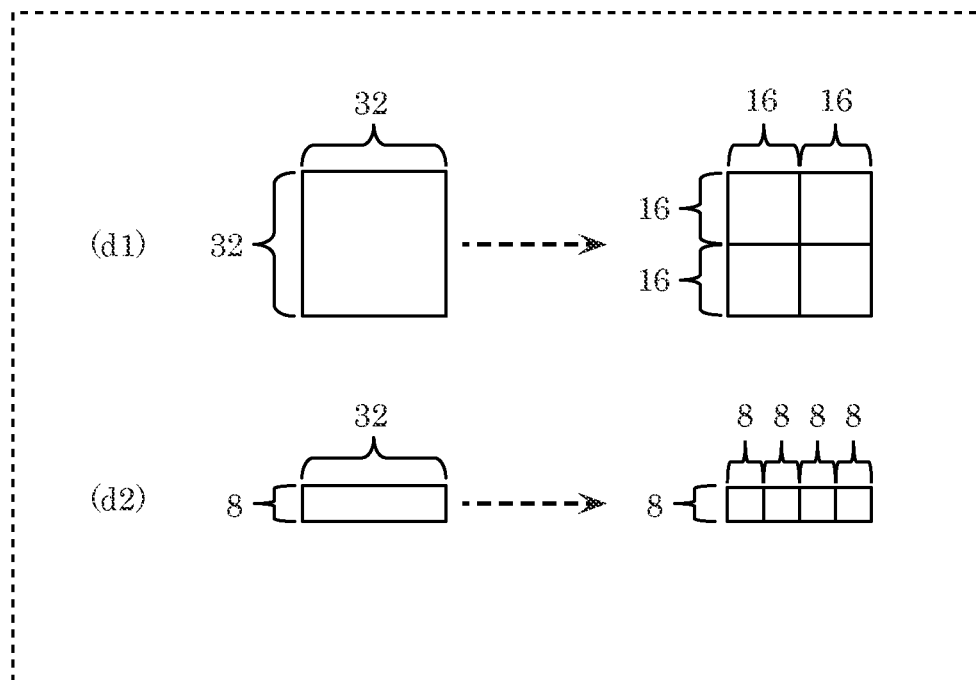
FIG. 45D illustrates an example of partitioning blocks into sub blocks of different geometries based on different block geometries.

As another example, when the determined number of sub blocks is set to 4, as shown in (d1) in FIG. 45D, when block width (e.g., 32) of a block is the same as block height (e.g., 32) of the block, the block can be equally split at both vertical and horizontal directions. When block width (e.g., 32) of the block is four times block height of the block (e.g., 8), as shown in (d2) in FIG. 45D, the block can be equally split at vertical direction. Similarly, when block height (e.g., 32) of the block is four times block width of the block (e.g., 8), the block can be equally split at horizontal direction.

As illustrated in FIG. 45A through FIG. 45D, in this embodiment, at least one of sub block height and width is a power of 2. Note that the sub block height and/or width need not be limited to a power of 2.

At step S9005, a sub block is encoded in an encoding process. Here, the encoding process includes a transform process and/or a prediction process. The transform process may be performed on a per block basis similar to the sub block size.

[Encoder]

The structure of the video/image encoder according to this embodiment is the same as illustrated in FIG. 35 described in Embodiment 1. Accordingly, duplicate depiction and description is omitted.

[Decoding Process]

FIG. 20 illustrates one example of a video decoding process according to Embodiment 5.

As a first step S10001, geometries of a block are retrieved. Here, geometry indicates at least a shape, or a height, or a width of a block. As shown in FIG. 44, using different geometries will result in partitioning a block into a plurality of sub blocks with different shape, or block height, or block width.

Next, at step S10002, whether the retrieved geometries are equal to determined geometries is determined. The determined geometries may be predetermined.

If the retrieved geometries are equal to the determined geometries (Y in S10002), the block is partitioned into a determined number of sub blocks of first set of geometries at step S10003. If the retrieved geometries are not equal to the determined geometries (N in S10002), the block is partitioned into the determined number of sub blocks of another set of geometries which is different from the first set of geometries at step S10004. The determined geometries and the determined numbers of sub blocks may be predetermined.

For example, when the determined number of sub blocks is set to 2, for example, as shown in (a1) in FIG. 45A, the block can be vertically split into 2 sub blocks with a 1:3 or 3:1 ratio when block width (e.g., 32) is a power of two. On the other hand, as shown in (a2) in FIG. 45A, the block can be vertically split into 2 sub blocks with a 1:2 or 1:2 ratio when the width (e.g., 24) is not a power of two. Similarly, a block can be horizontally split into two sub blocks according to whether the block height of the block is a power of two.

As another example, as shown in (c1) in FIG. 45C, when the determined number of sub blocks is set to 2, the block can be horizontally split into 2 sub blocks with equal size if block width (e.g., 8) is smaller than block height (e.g., 32). On the other hand, as shown in (c2) in FIG. 45C, the block can be vertically split into 2 sub blocks with equal size if the width (e.g., 32) is larger than block height (e.g., 8).

When the determined number of sub blocks is set to 4, for example, as shown in (b1) in FIG. 45B, the block can be split into 4 sub blocks where the width of the largest sub block is 3 times the width of the smallest sub block when block width (e.g., 32) of the block is a power of two. On the other hand, as shown in (b2) FIG. 45B, the block can be split into 4 sub blocks where the width of the largest sub block is 2 times the width of the smallest sub block when block width (e.g., 24) of the block is not a power of two.

As another example, when the determined number of sub blocks is set to 4, as shown in (d1) in FIG. 45D, when block width (e.g., 32) of a block is the same as block height (e.g., 32) of the block, the block can be equally split at both vertical and horizontal directions. When block width (e.g., 32) of the block is four times block height of the block (e.g., 8), as shown in (d2) in FIG. 45D, the block can be equally split at vertical direction. Similarly, when block height (e.g., 32) of the block is four times block width of the block (e.g., 8), the block can be equally split at horizontal direction.

As illustrated in FIG. 45A through FIG. 45D, in this embodiment, at least one of sub block height and width is a power of 2. Note that the sub block height and/or width need not be limited to a power of 2.

At step S10005, a sub block is decoded in a decoding process. Here, the decoding process includes an inverse transform process and/or a prediction process. The inverse transform process may be performed on a per block basis similar to the sub block size.

[Decoder]

The structure of the video/image decoder according to this embodiment is the same as illustrated in FIG. 36 described in Embodiment 1. Accordingly, duplicate depiction and description is omitted.

Embodiment 6

[Outline]

An encoder according to this embodiment encodes a block of an image, and includes a processor and memory connected to the processor. Using the memory, the processor: writes a parameter into a bitstream; determines whether the parameter written is equal to a determined value; when the parameter written is equal to the determined value, partitions the block into a determined number of sub blocks of a first set of geometries; when the parameter written is not equal to the determined value, partitions the block into the determined number of sub blocks of another set of geometries which is different from the first set of geometries; and encodes a sub block in an encoding process including a transform process and/or a prediction process.

This makes it possible to switch between geometry sets for a determined number of partitioned sub blocks based on whether the parameter is equal to the determined value or not. The determined numbers of sub blocks and the determined values may be predetermined.

For example, in the encoder according to this embodiment, geometry may indicate at least a shape, a height, or a width of a block.

This makes it possible to use the shape and/or size of a block as the geometry.

For example, in the encoder according to this embodiment, at least one of a height and a width of the sub block may be a power of two.

This makes it possible to partition a block so that at least one of the height and the width of a sub block is a power of 2. Accordingly, it is possible to obtain sub blocks in sizes suitable for encoding, and improve compression efficiency.

A decoder according to one aspect of the present disclosure decodes a block of an image, and includes a processor and memory connected to the processor. Using the memory, the processor: parses a parameter from a bitstream; determines whether the parameter parsed is equal to a determined value; when the parameter parsed is equal to the determined value, partitions the block into a determined number of sub blocks of a first set of geometries; when the parameter parsed is not equal to the determined value, partitions the block into the determined number of sub blocks of another set of geometries which is different from the first set of geometries; and decodes a sub block in a decoding process including an inverse transform process and/or a prediction process. The determined numbers of sub blocks and the determined values may be predetermined.

This makes it possible to switch between geometry sets for a determined number of partitioned sub blocks based on whether the parameter is equal to the determined value or not.

For example, in the decoder according to this embodiment, geometry may indicate at least a shape, a height, or a width of a block.

This makes it possible to use the shape and/or size of a block as the geometry.

For example, in the decoder according to this embodiment, at least one of a height and a width of the sub block may be a power of two.

This makes it possible to partition a block so that at least one of the height and the width of a sub block is a power of 2. Accordingly, it is possible to use sub blocks in sizes suitable for decoding, and improve compression efficiency.

General or specific aspects of the present disclosure may be realized as a system, method, integrated circuit, computer program, computer readable medium such as a CD-ROM, or any given combination thereof.

Figure 21:
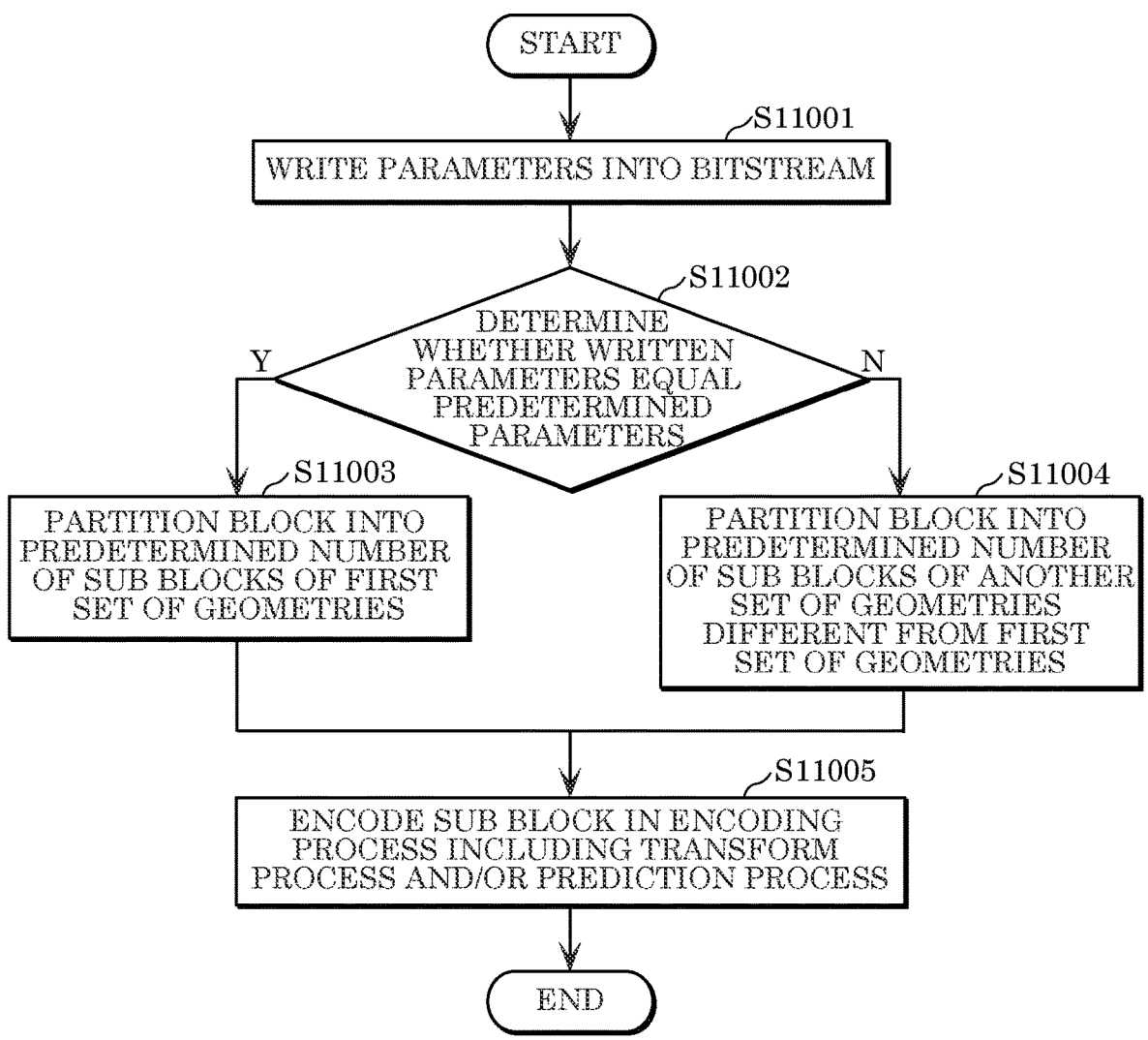
FIG. 21 is a flow chart of one example of a video encoding process according to Embodiment 6.
Figure 22:
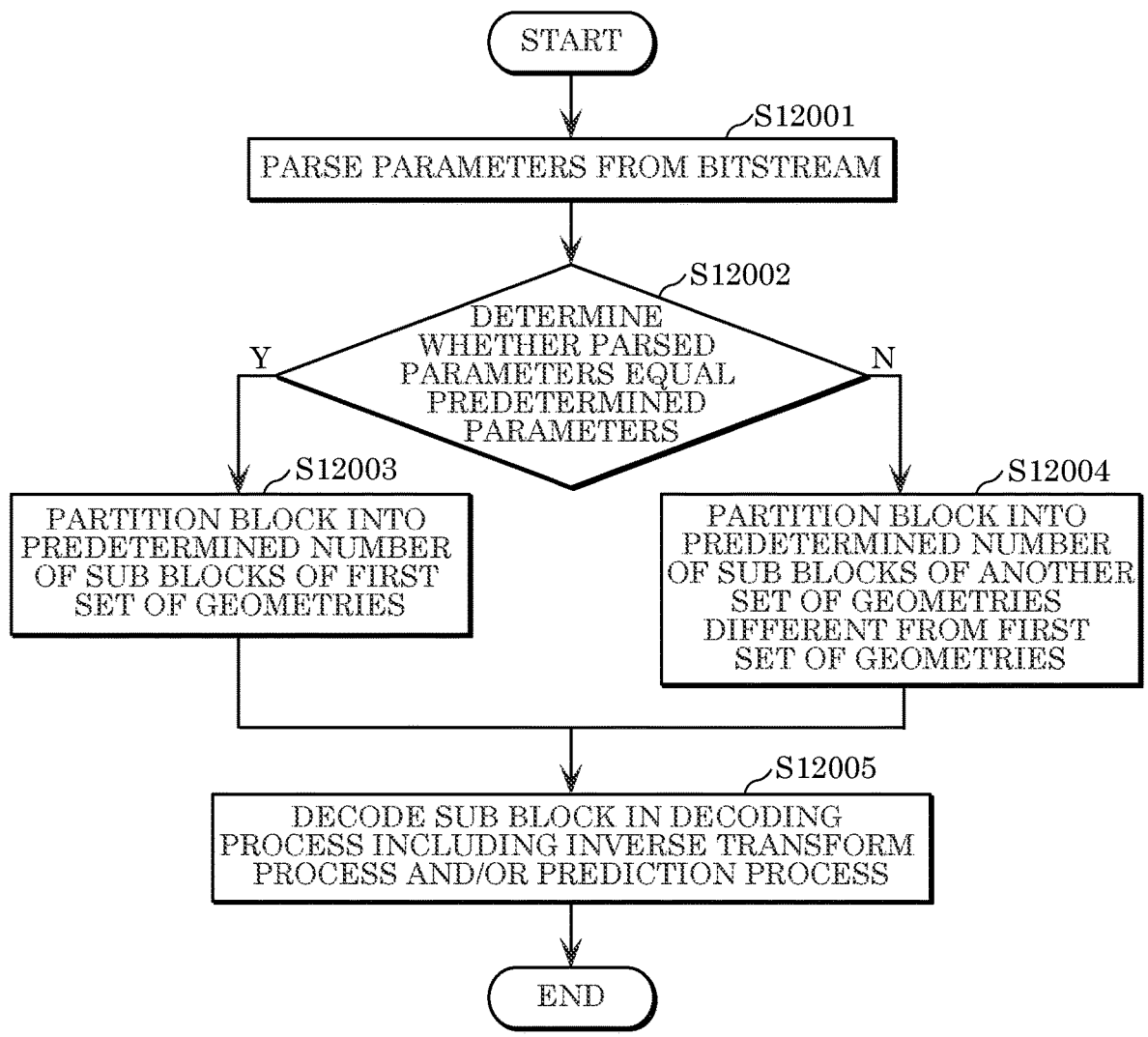
FIG. 22 is a flow chart of one example of a video decoding process according to Embodiment 6.

Hereinafter, methods for encoding and decoding video will be described according to an embodiment as illustrated in FIG. 21 and FIG. 22.

[Encoding Process]

FIG. 21 illustrates one example of a video encoding process according to Embodiment 6.

As a first step S11001, parameters are written into a bitstream. FIG. 37 shows the possible locations of the above mentioned parameters in a compressed video bitstream.

Next, at step S11002, whether the written parameters are equal to determined values is determined. The determined values may be predetermined.

If the written parameters are equal to the determined values (Y in S11002), the block is partitioned into a determined number of sub blocks of first set of geometries at step S11003. If the written parameters are not equal to the determined values (N in S11002), the block is partitioned into the determined number of sub blocks of another set of geometries which is different from the first set of geometries at step S11004. The determined numbers of sub blocks and the determined values may be predetermined.

The written parameters can indicate partitioning mode (e.g., quad-tree/binary/multiple tree partition, horizontal/vertical partition, symmetric/asymmetric partition, and ratio of block width/height of sub blocks).

Figure 46A:
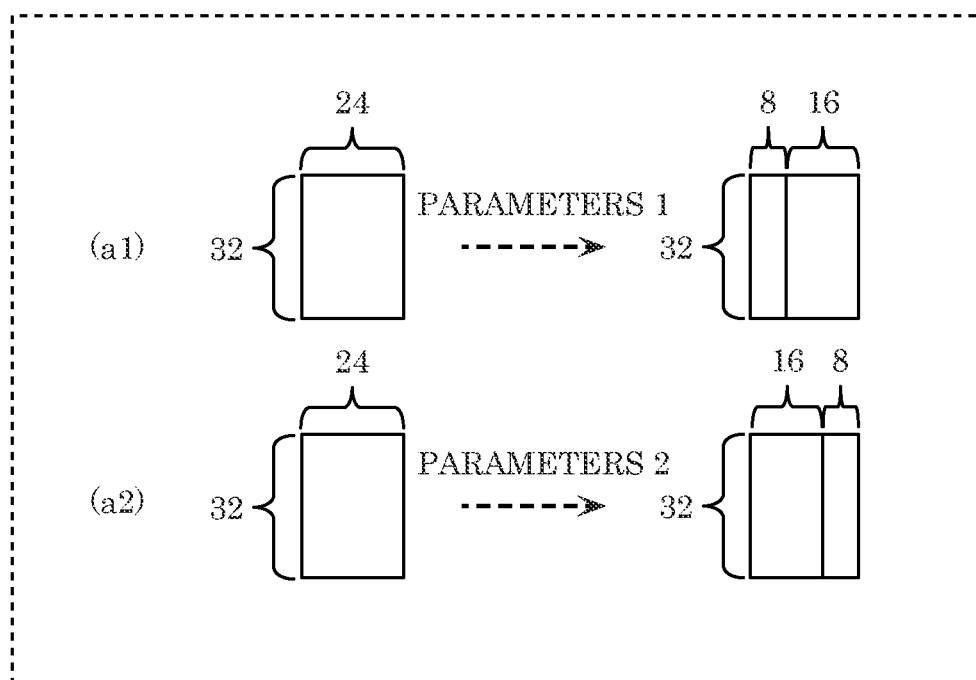
FIG. 46A illustrates an example of partitioning blocks into sub blocks of different geometries based on different parameters.

For a 24×32 block, for example, as shown in (a1) in FIG. 46A, the written parameters can indicate the partition is a binary partition, the partition is a vertical partition, and ratio of block width of the two sub blocks is 1:2. As such, the 24×32 block is partitioned into a 8×32 sub block and a 16×32 sub block.

As another example, for a 24×32 block, as shown in (a2) in FIG. 46A, the written parameters can indicate the partition is a binary partition, the partition is a vertical partition, and ratio of block width of the two sub blocks is 2:1. As such, the 24×32 block is partitioned into a 16×32 sub block and a 8×32 sub block.

Figure 46B:
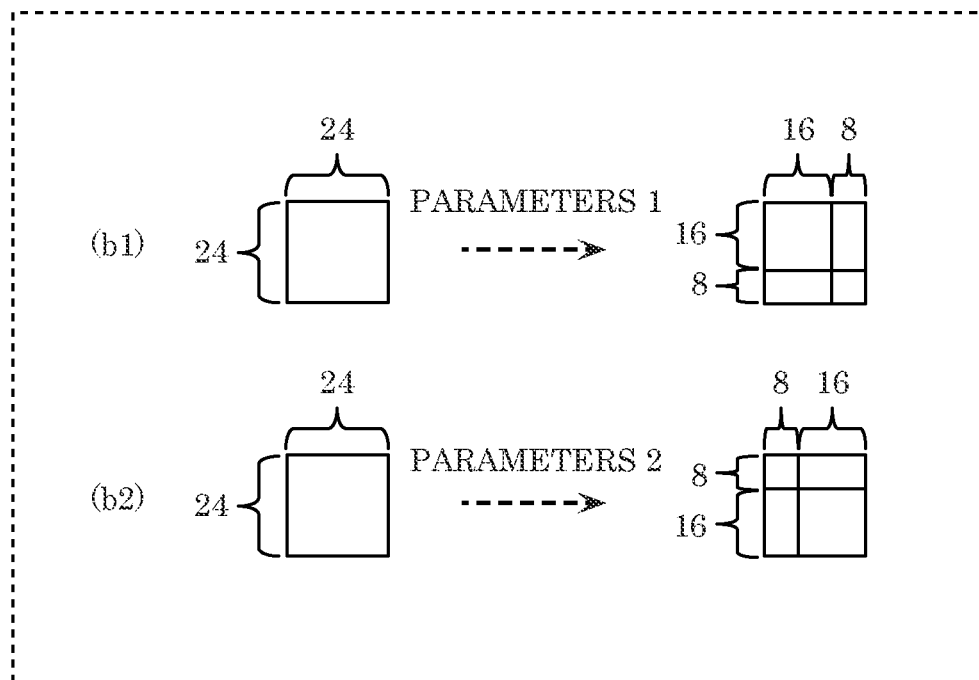
FIG. 46B illustrates an example of partitioning blocks into sub blocks of different geometries based on different parameters.

For example, for a 24×24 block, as shown in (b1) in FIG. 46B, the written parameters can indicate the partition is a quad-tree partition, top left sub block is the largest sub block, and ratio of block width of the largest and smallest sub blocks is 2:1. As such, the 24×24 block is partitioned into a 16×16 sub block, a 8×16 sub block, a 16×8 sub block, and a 8×8 sub block.

As another example, for a 24×24 block, as shown in (b2) in FIG. 46B, the written parameters can indicate the partition is a quad-tree partition, bottom right sub block is the largest sub block, and ratio of block width of the largest and smallest sub blocks is 2:1. As such, the 24×24 block is partitioned into a 8×8 sub block, a 16×8 sub block, a 8×16 sub block, and a 16×16 sub block.

Figure 46C:
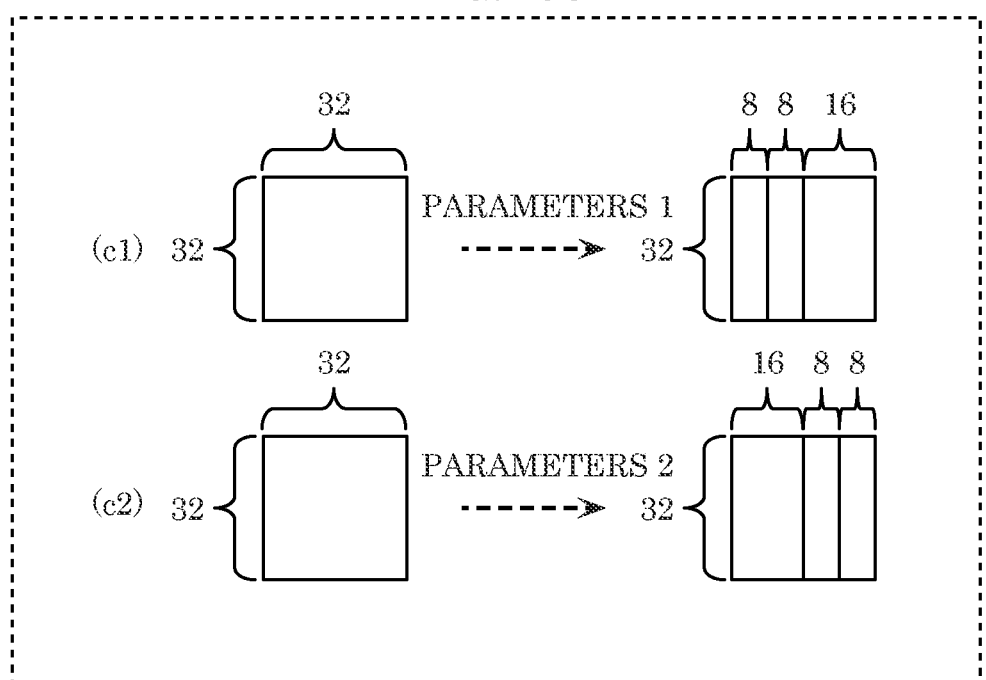
FIG. 46C illustrates an example of partitioning blocks into sub blocks of different geometries based on different parameters.

For example, for a 32×32 block, as shown in (c1) FIG. 46C, the written parameters can indicate the partition is a triple partition, the partition is a vertical partition, and ratio of block width of sub blocks is 1:1:2. As such, the 32×32 block is partitioned into two 8×32 sub blocks and a 16×32 sub block.

As another example, for a 32×32 block, as shown in (c2) in FIG. 46C, the written parameters can indicate the partition is a triple partition, the partition is a vertical partition, and ratio of block width of sub blocks is 2:1:1. As such, the 32×32 block is partitioned into a 16×32 sub block and two 8×16 sub blocks.

Figure 46D:
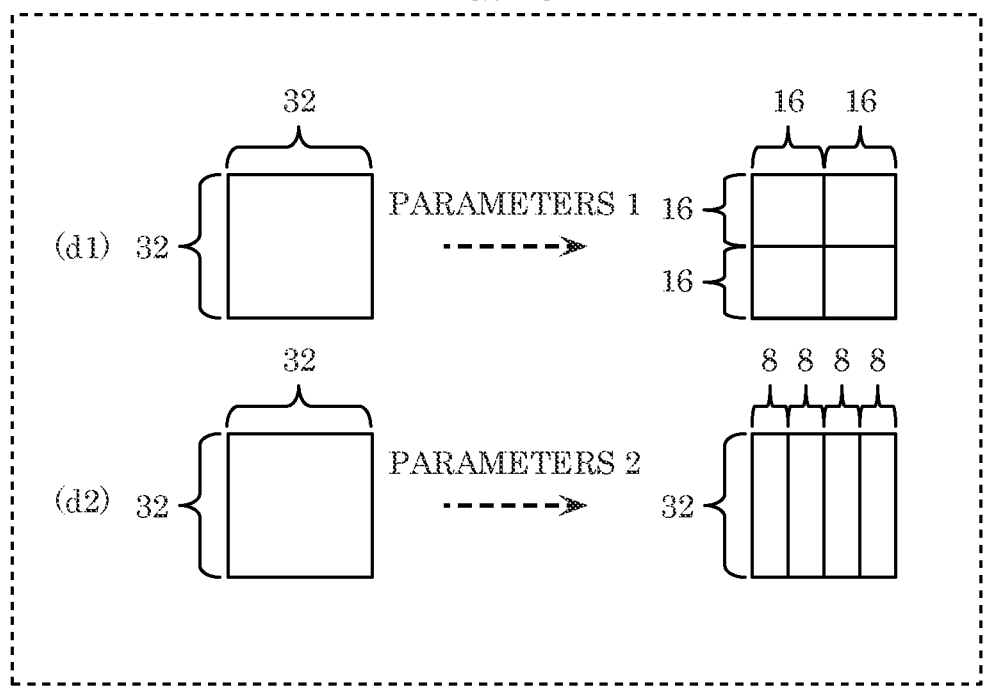
FIG. 46D illustrates an example of partitioning blocks into sub blocks of different geometries based on different parameters.

For example, for a 32×32 block, as shown in (d1) FIG. 46D, the written parameters can indicate the partition is a quad-tree partition, and partition includes both vertical and horizontal directions. As such, the 32×32 block is partitioned into four 16×16 sub blocks.

As another example, for a 32×32 block, as shown in (d2) in FIG. 46D, the written parameters can indicate the partition is a quad-tree partition, and partition includes only vertical directions. As such, the 32×32 block is partitioned into four 8×32 sub blocks. As illustrated in FIG. 46A through FIG. 46D, in this embodiment, at least one of sub block height and width is a power of 2. Note that the sub block height and/or width need not be limited to a power of 2.

At step S11005, a sub block is encoded in an encoding process. Here, the encoding process includes a transform process and/or a prediction process. The transform process may be performed on a per block basis similar to the sub block size.

[Encoder]

The structure of the video/image encoder according to this embodiment is the same as illustrated in FIG. 35 described in Embodiment 1. Accordingly, duplicate depiction and description is omitted.

[Decoding Process]

FIG. 22 illustrates one example of a video decoding process according to Embodiment 6.

As a first step S12001, parameters are parsed from a bitstream. FIG. 37 shows the parsable locations of the above mentioned parameters in a compressed video bitstream.

Next, at step S12002, whether the parsed parameters are equal to determined values is determined. The determined values may be predetermined.

If the parsed parameters are equal to the determined values (Y in S12002), the block is partitioned into a determined number of sub blocks of first set of geometries at step S12003. If the parsed parameters are not equal to the determined values (N in S12002), the block is partitioned into the determined number of sub blocks of another set of geometries which is different from the first set of geometries at step S12004. The determined numbers of sub blocks and the determined values may be predetermined.

The parsed parameters can indicate partitioning mode (e.g., quad-tree/binary/multiple tree partition, horizontal/vertical partition, symmetric/asymmetric partition, and ratio of block width/height of sub blocks).

For a 24×32 block, for example, as shown in (a1) in FIG. 46A, the parsed parameters can indicate the partition is a binary partition, the partition is a vertical partition, and ratio of block width of the two sub blocks is 1:2. As such, the 24×32 block is partitioned into a 8×32 sub block and a 16×32 sub block.

As another example, for a 24×32 block, as shown in (a2) in FIG. 46A, the parsed parameters can indicate the partition is a binary partition, the partition is a vertical partition, and ratio of block width of the two sub blocks is 2:1. As such, the 24×32 block is partitioned into a 16×32 sub block and a 8×32 sub block.

For example, for a 24×24 block, as shown in (Ill) in FIG. 46B, the parsed parameters can indicate the partition is a quad-tree partition, top left sub block is the largest sub block, and ratio of block width of the largest and smallest sub blocks is 2:1. As such, the 24×24 block is partitioned into a 16×16 sub block, a 8×16 sub block, a 16×8 sub block, and a 8×8 sub block.

As another example, for a 24×24 block, as shown in (b2) in FIG. 46B, the parsed parameters can indicate the partition is a quad-tree partition, bottom right sub block is the largest sub block, and ratio of block width of the largest and smallest sub blocks is 2:1. As such, the 24×24 block is partitioned into a 8×8 sub block, a 16×8 sub block, a 8×16 sub block, and a 16×16 sub block.

For example, for a 32×32 block, as shown in (c1) FIG. 46C, the parsed parameters can indicate the partition is a triple partition, the partition is a vertical partition, and ratio of block width of sub blocks is 1:1:2. As such, the 32×32 block is partitioned into two 8×32 sub blocks and a 16×32 sub block.

As another example, for a 32×32 block, as shown in (c2) in FIG. 46C, the parsed parameters can indicate the partition is a triple partition, the partition is a vertical partition, and ratio of block width of sub blocks is 2:1:1. As such, the 32×32 block is partitioned into a 16×32 sub block and two 8×16 sub blocks.

For example, for a 32×32 block, as shown in (d1) FIG. 46D, the parsed parameters can indicate the partition is a quad-tree partition, and partition includes both vertical and horizontal directions. As such, the 32×32 block is partitioned into four 16×16 sub blocks.

As another example, for a 32×32 block, as shown in (d2) in FIG. 46D, the parsed parameters can indicate the partition is a quad-tree partition, and partition includes only vertical directions. As such, the 32×32 block is partitioned into four 8×32 sub blocks.

As illustrated in FIG. 46A through FIG. 46D, in this embodiment, at least one of sub block height and width is a power of 2. Note that the sub block height and/or width need not be limited to a power of 2.

At step S12005, a sub block is decoded in a decoding process. Here, the decoding process includes an inverse transform process and/or a prediction process. The inverse transform process may be performed on a per block basis similar to the sub block size.

[Decoder]

The structure of the video/image encoder according to this embodiment is the same as illustrated in FIG. 36 described in Embodiment 1. Accordingly, duplicate depiction and description is omitted.

Embodiment 7

[Outline]

An encoder according to one aspect of the present disclosure encodes a block of an image, and includes a processor and memory connected to the processor. Using the memory, the processor: retrieves a geometry of a block; determines whether the geometry retrieved is equal to a determined geometry; when the geometry retrieved is equal to the determined geometry, partitions the block into a first number of sub blocks; when the geometry retrieved is not equal to the determined geometry, partitions the block into a number of sub blocks which is not equal to the first number; and encodes a sub block in an encoding process including a transform process and/or a prediction process. The determined geometry may be predetermined.

This makes it possible to partition a block into a number of sub blocks that is based on the geometry of the block. Accordingly, it is possible to reduce the amount of coding pertaining to block partitioning information and improve compression efficiency. Furthermore, it is possible to make the number of sub blocks depend on the geometry of the block. As a result, it is possible to more efficiently partition a block and improve compression efficiency.

For example, in the encoder according to this embodiment, geometry may indicate at least a shape, a height, or a width of a block.

This makes it possible to use the shape and/or size of a block as the geometry.

For example, in the encoder according to this embodiment, at least one of a height and a width of the sub block may be a power of two.

This makes it possible to partition a block so that at least one of the height and the width of a sub block is a power of 2. Accordingly, it is possible to obtain sub blocks in sizes suitable for encoding, and improve compression efficiency.

A decoder according to one aspect of the present disclosure decodes a block of an image, and includes a processor and memory connected to the processor. Using the memory, the processor: retrieves a geometry of a block; determines whether the geometry retrieved is equal to a determined geometry; when the geometry retrieved is equal to the determined geometry, partitions the block into a first number of sub blocks; when the geometry retrieved is not equal to the determined geometry, partitions the block into a number of sub blocks which is not equal to the first number; and decodes a sub block in a decoding process including an inverse transform process and/or a prediction process. The determined geometry may be predetermined.

This makes it possible to partition a block into a number of sub blocks that is based on the geometry of the block. Accordingly, it is possible to reduce the amount of coding pertaining to block partitioning information and improve compression efficiency. Furthermore, it is possible to make the number of sub blocks depend on the geometry of the block. As a result, it is possible to more efficiently partition a block and improve compression efficiency.

For example, in the decoder according to this embodiment, geometry may indicate at least a shape, a height, or a width of a block.

This makes it possible to use the shape and/or size of a block as the geometry.

For example, in the decoder according to this embodiment, at least one of a height and a width of the sub block may be a power of two.

This makes it possible to partition a block so that at least one of the height and the width of a sub block is a power of 2. Accordingly, it is possible to use sub blocks in sizes suitable for decoding, and improve compression efficiency.

General or specific aspects of the present disclosure may be realized as a system, method, integrated circuit, computer program, computer readable medium such as a CD-ROM, or any given combination thereof.

Figure 23:
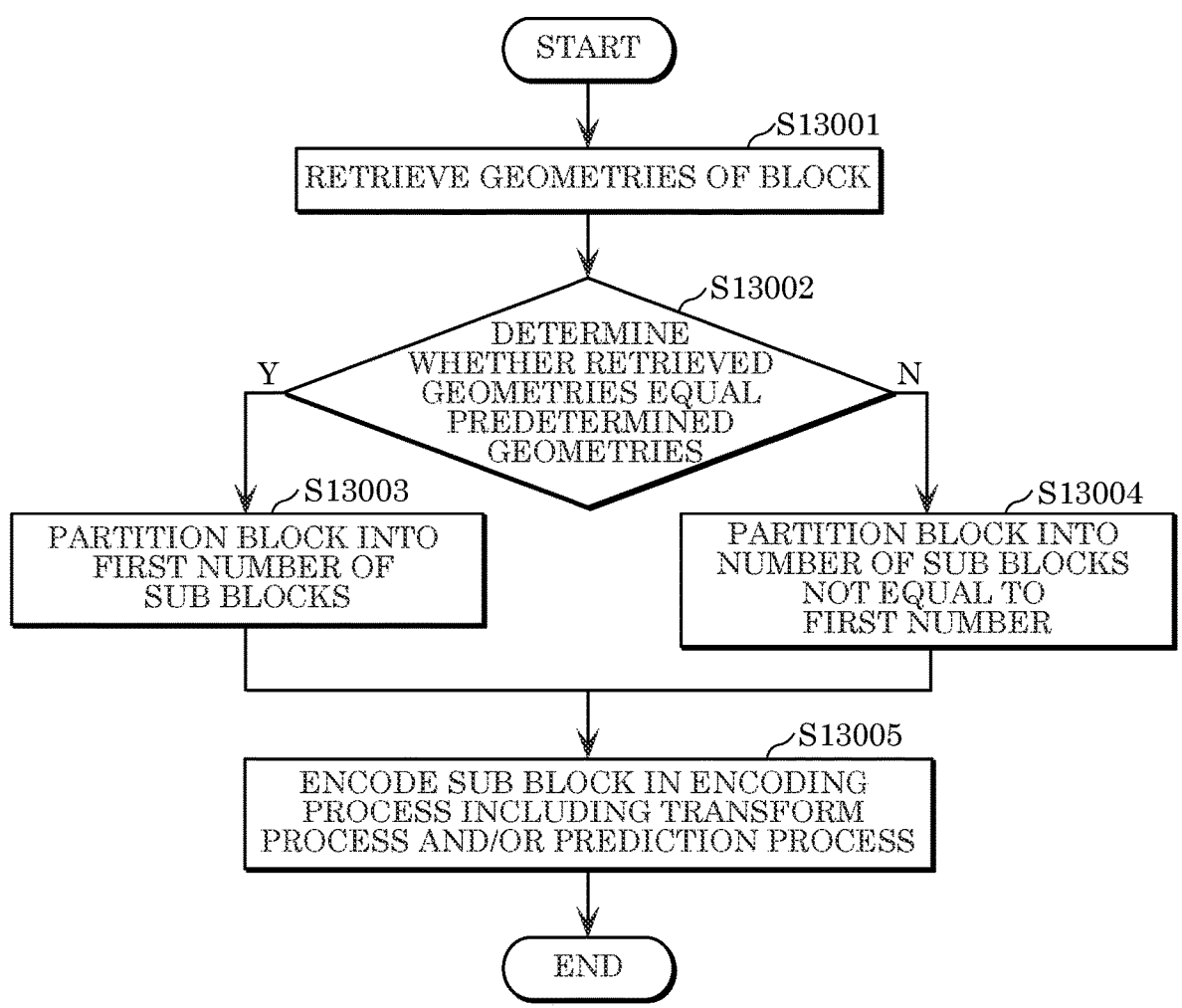
FIG. 23 is a flow chart of one example of a video encoding process according to Embodiment 7.
Figure 24:
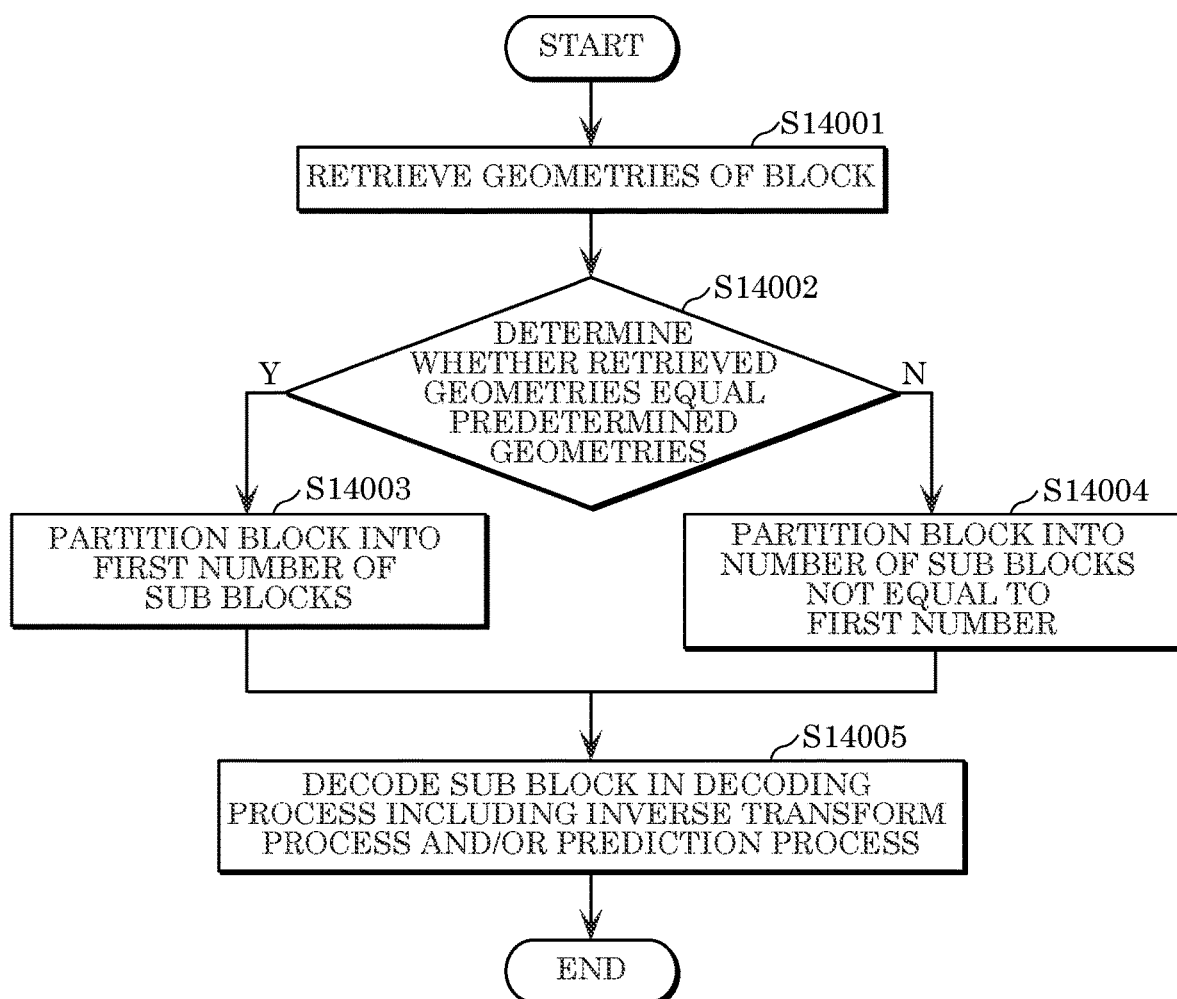
FIG. 24 is a flow chart of one example of a video decoding process according to Embodiment 7.

Hereinafter, methods for encoding and decoding video will be described according to an embodiment as illustrated in FIG. 23 and FIG. 24.

[Encoding Process]

FIG. 23 illustrates one example of a video encoding process according to Embodiment 7.

As a first step S13001, geometries of a block are retrieved. Here, geometry indicates at least a shape, or a height, or a width of a block. As shown in FIG. 44, using different geometries will result in partitioning a block into a plurality of sub blocks with different shape, or block height, or block width.

Next, at step S13002, whether the retrieved geometries are equal to determined geometries is determined. The determined geometries may be predetermined.

If the retrieved geometries are equal to the determined geometries (Y in S13002), the block is partitioned into a first number of sub blocks at step S13003. If the retrieved geometries are not equal to the determined geometries (N in S13002), the block is partitioned into a number, which is not equal to said first number, of sub blocks at step S13004.

Figure 47A:
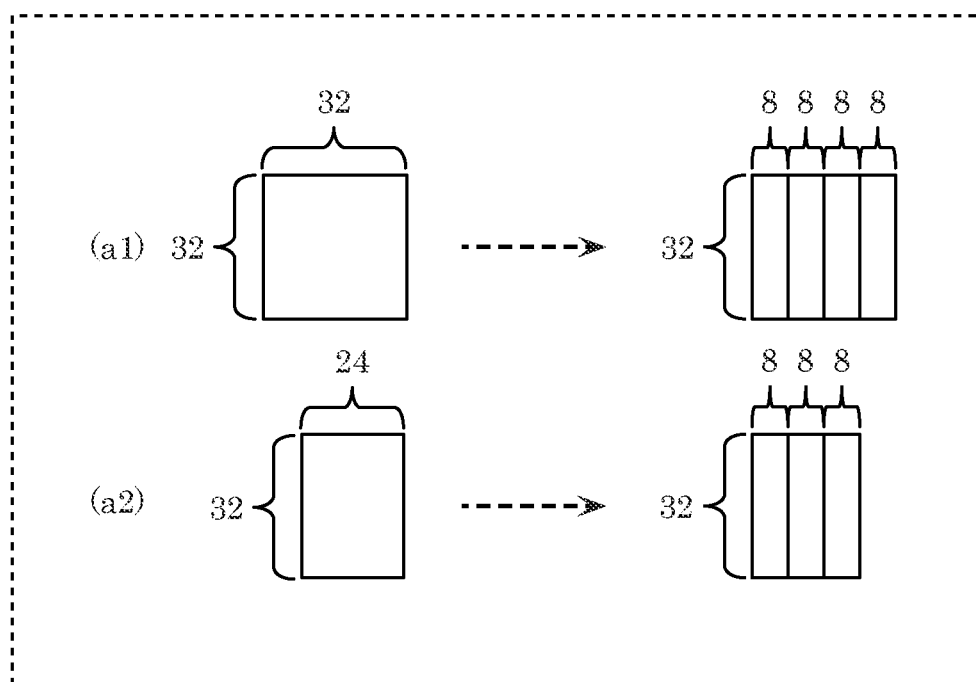
FIG. 47A illustrates an example of partitioning blocks into a different number of sub blocks based on different block geometries.

For example, as shown in (a1) in FIG. 47A, a block (e.g., 32×32) can be vertically split into 4 sub blocks of same sizes (e.g., 8×32) when the block width of the block is a power of two. On the other hand, as shown in (a2) in FIG. 47A, a block (e.g., 24×32) can be vertically split into 3 sub blocks at same sizes (e.g., 8×32) when the block width of the block is not a power of two.

Figure 47B:
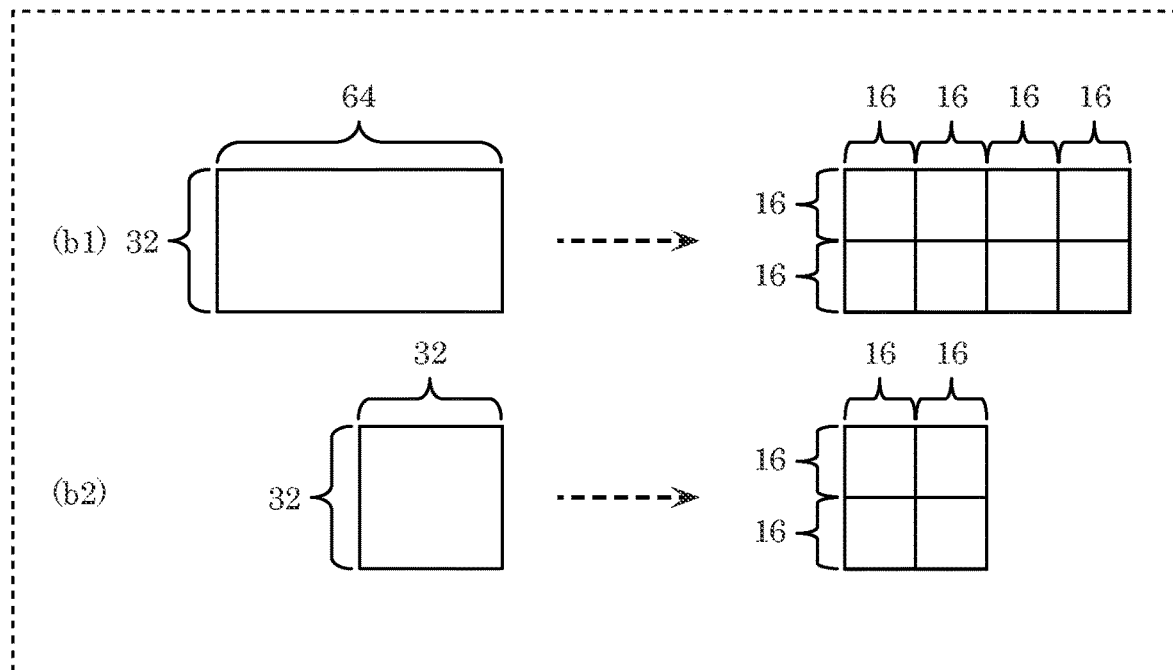
FIG. 47B illustrates an example of partitioning blocks into a different number of sub blocks based on different block geometries.

As another example, as shown in (b1) in FIG. 47B, a block (e.g., 64×32) can be equally split into 8 sub blocks of equal size (e.g., 16×16) when both the block width and the block height of the block are power of two while the block width is 2 times the block height. On the other hand, as shown in (b2) in FIG. 47B, a block (e.g., 32×32) can be equally split into 4 sub blocks with equal size (e.g., 16×16) when both the block width and the block height of the block are power of two and the block width is same as the block height.

As illustrated in FIG. 47A through FIG. 47B, in this embodiment, at least one of sub block height and width is a power of 2. Note that the sub block height and/or width need not be limited to a power of 2.

At step S13005, a sub block is encoded in an encoding process. Here, the encoding process includes a transform process and/or a prediction process. The transform process may be performed on a per block basis similar to the sub block size.

[Encoder]

The structure of the video/image encoder according to this embodiment is the same as illustrated in FIG. 35 described in Embodiment 1. Accordingly, duplicate depiction and description is omitted.

[Decoding Process]

FIG. 24 illustrates one example of a video decoding process according to Embodiment 7.

As a first step S14001, geometries of a block are retrieved. Here, geometry indicates at least a shape, or a height, or a width of a block. As shown in FIG. 44, using different geometries will result in partitioning a block into a plurality of sub blocks with different shape, or block height, or block width.

Next, at step S14002, whether the retrieved geometries are equal to determined geometries is determined. The determined geometries may be predetermined.

If the retrieved geometries are equal to the determined geometries (Y in S14002), the block is partitioned into a first number of sub blocks at step S14003. If the retrieved geometries are not equal to the determined geometries (N in S14002), the block is partitioned into a number, which is not equal to said first number, of sub blocks at step S14004.

For example, as shown in (a1) in FIG. 47A, a block (e.g., 32×32) can be vertically split into 4 sub blocks of same sizes (e.g., 8×32) when the block width of the block is a power of two. On the other hand, as shown in (a2) in FIG. 47A, a block (e.g., 24×32) can be vertically split into 3 sub blocks at same sizes (e.g., 8×32) when the block width of the block is not a power of two.

As another example, as shown in (b1) in FIG. 47B, a block (e.g., 64×32) can be equally split into 8 sub blocks of equal size (e.g., 16×16) when both the block width and the block height of the block are power of two while the block width is 2 times the block height. On the other hand, as shown in (b2) in FIG. 47B, a block (e.g., 32×32) can be equally split into 4 sub blocks with equal size (e.g., 16×16) when both the block width and the block height of the block are power of two and the block width is same as the block height.

As illustrated in FIG. 47A through FIG. 47B, in this embodiment, at least one of sub block height and width is a power of 2. Note that the sub block height and/or width need not be limited to a power of 2.

At step S14005, a sub block is decoded in a decoding process. Here, the decoding process includes an inverse transform process and/or a prediction process. The inverse transform process may be performed on a per block basis similar to the sub block size.

[Decoder]

The structure of the video/image encoder according to this embodiment is the same as illustrated in FIG. 36 described in Embodiment 1. Accordingly, duplicate depiction and description is omitted.

Embodiment 8

[Outline]

An encoder according to this embodiment encodes a block of an image, and includes a processor and memory connected to the processor. Using the memory, the processor: writes a parameter into a bitstream; determines whether the parameter written is equal to a determined value; when the parameter written is equal to the determined value, partitions the block into a first number of sub blocks, wherein the first number is larger than two when a process for partitioning the block is in a single vertical or horizontal direction, and larger than three when the process for partitioning the block is not in a single vertical or horizontal direction; when the parameter written is not equal to the determined value, partitions the block into a second number of sub blocks which is not equal to the first number, wherein the second number is larger than two when the process for partitioning the block is in a single vertical or horizontal direction, and larger than three when the process for partitioning the block is not in a single vertical or horizontal direction; and encodes a sub block in an encoding process including a transform process and/or a prediction process. The determined value may be predetermined.

This makes it possible to switch between the number of partitioned sub blocks based on whether the parameter is equal to the determined value or not.

A decoder according to this embodiment decodes a block of an image, and includes a processor and memory connected to the processor. Using the memory, the processor: parses a parameter from a bitstream; determines whether the parameter parsed is equal to a determined value; when the parameter parsed is equal to the determined value, partitions the block into a first number of sub blocks, wherein the first number is larger than two when a process for partitioning the block is in a single vertical or horizontal direction, and larger than three when the process for partitioning the block is not in a single vertical or horizontal direction; when the parameter parsed is not equal to the determined value, partitions the block into a second number of sub blocks which is not equal to the first number, wherein the second number is larger than two when the process for partitioning the block is in a single vertical or horizontal direction, and larger than three when the process for partitioning the block is not in a single vertical or horizontal direction; and decodes a sub block in a decoding process including an inverse transform process and/or a prediction process.

This makes it possible to switch between the number of partitioned sub blocks based on whether the parameter is equal to the determined value or not.

General or specific aspects of the present disclosure may be realized as a system, method, integrated circuit, computer program, computer readable medium such as a CD-ROM, or any given combination thereof.

Figure 25:
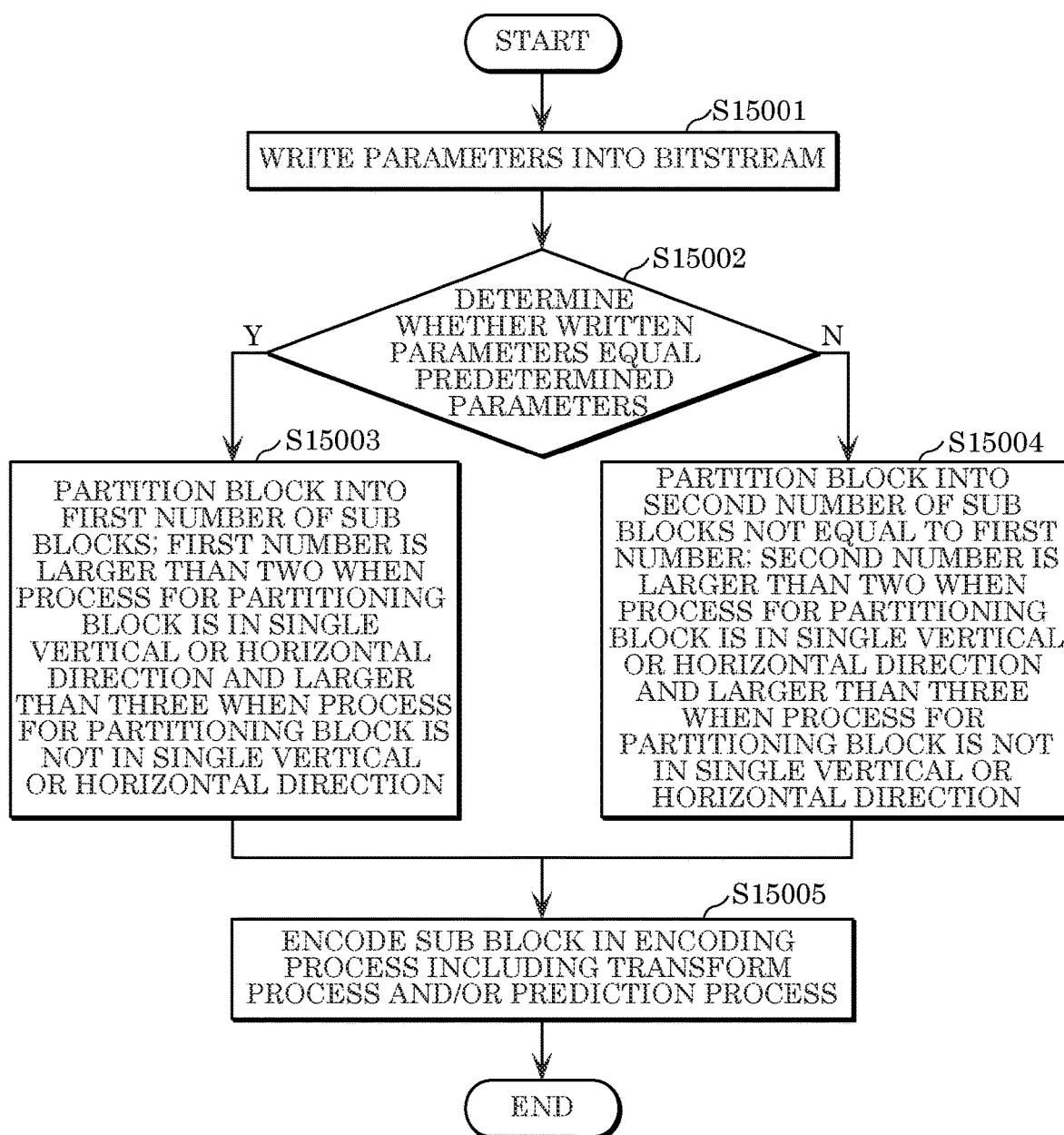
FIG. 25 is a flow chart of one example of a video encoding process according to Embodiment 8.
Figure 26:
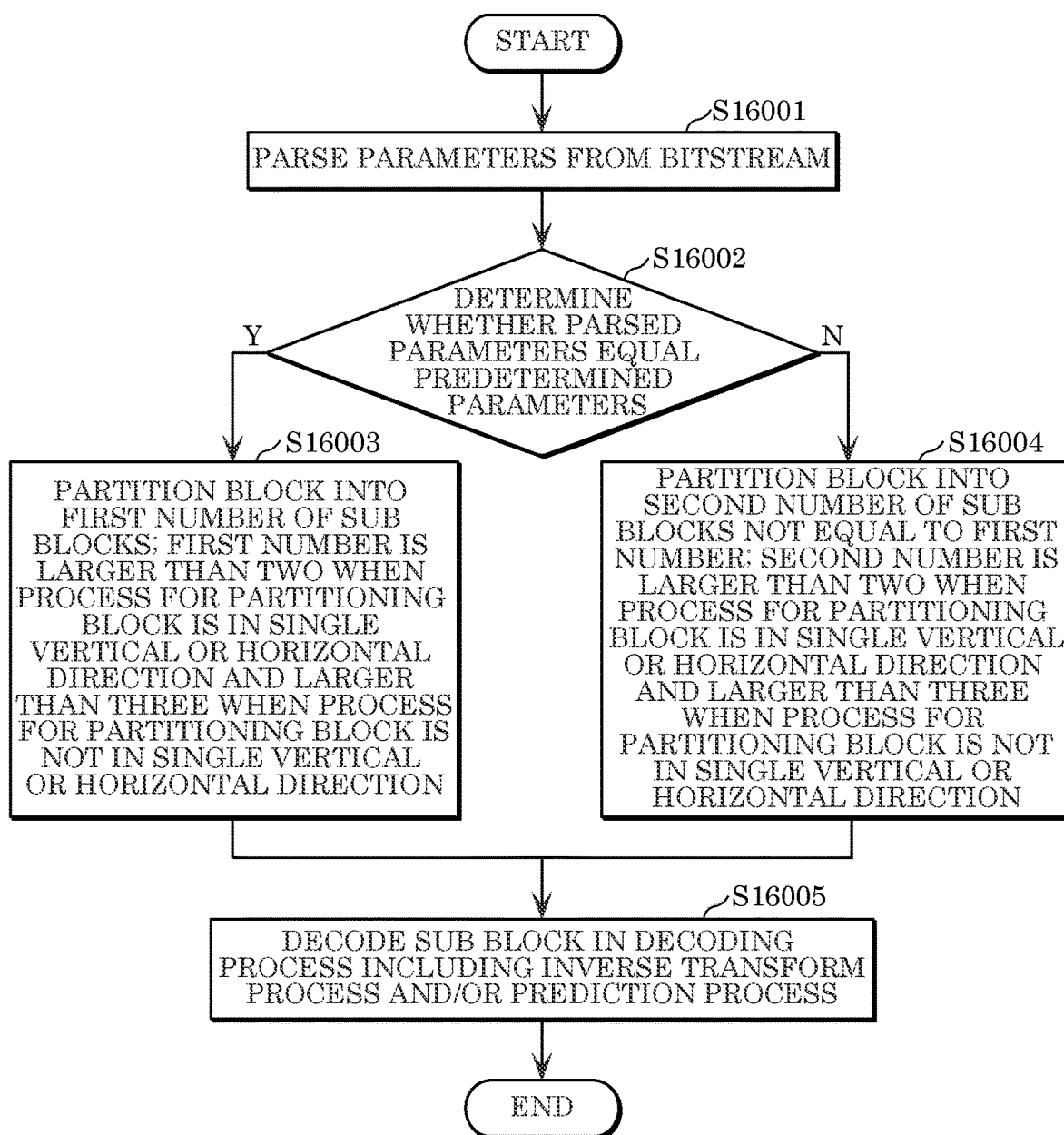
FIG. 26 is a flow chart of one example of a video decoding process according to Embodiment 8.

Hereinafter, methods for encoding and decoding video will be described according to an embodiment as illustrated in FIG. 25 and FIG. 26.

[Encoding Process]

FIG. 25 illustrates one example of a video encoding process according to Embodiment 8.

As a first step S15001, parameters are written into a bitstream. FIG. 37 shows the possible locations of the above mentioned parameters in a compressed video bitstream.

Next, at step S15002, whether the written parameters are equal to determined values is determined. The determined values may be predetermined.

If the written parameters are equal to the determined values (Y in S15002), the block is partitioned into a first number of sub blocks at step S15003. Here, the first number is larger than two when the process for partitioning the block is in a single vertical or horizontal direction, and larger than three when the process for partitioning the block is not in a single vertical or horizontal direction. If the written parameters are not equal to the determined values (N in S15002), the block is partitioned into a second number, which is not equal to the first number, of sub blocks at step S15004. Here, the second number is larger than two when the process for partitioning the block is in a single vertical or horizontal direction, and larger than three when the process for partitioning the block is not in a single vertical or horizontal direction.

Figure 48A:
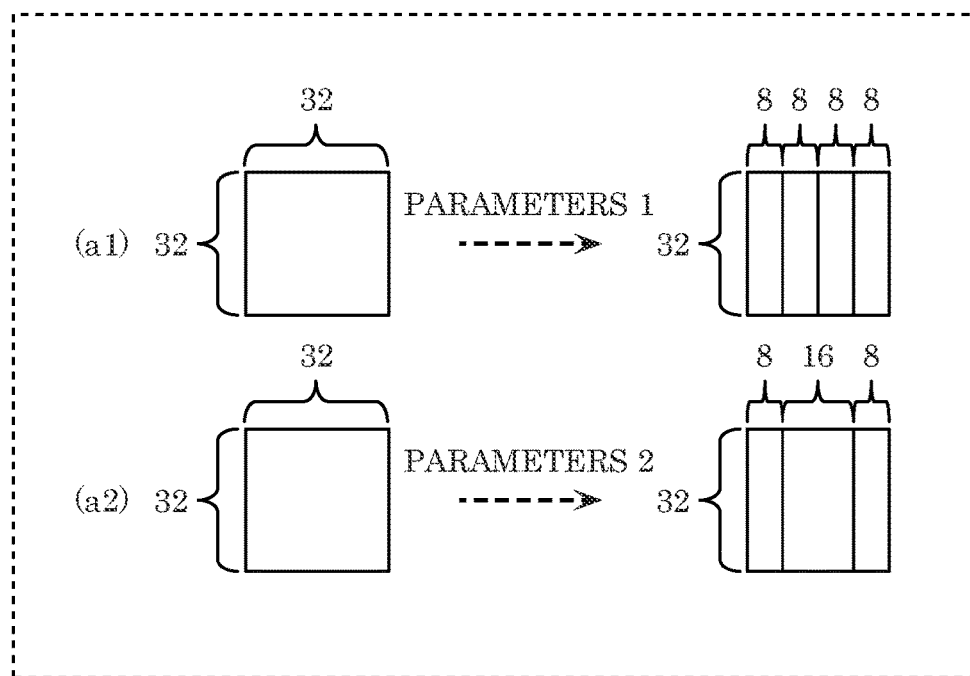
FIG. 48A illustrates an example of partitioning blocks into a different number of sub blocks based on different parameters.

For example, for a 32×32 block, as shown in (a1) FIG. 48A, the written parameters can indicate the partition is a quad-tree partition, and the partition includes only vertical directions. As such, the 32×32 block is partitioned into four 8×32 sub blocks.

As another example, for a 32×32 block, as shown in (a2) in FIG. 48A, the written parameters can indicate the partition is a triple partition, the partition is a vertical partition, and ratio of block width of sub blocks is 1:2:1. As such, the 32×32 block is partitioned into a 8×32 sub block, a 16×32 sub block, and a 8×32 sub block.

Figure 48B:
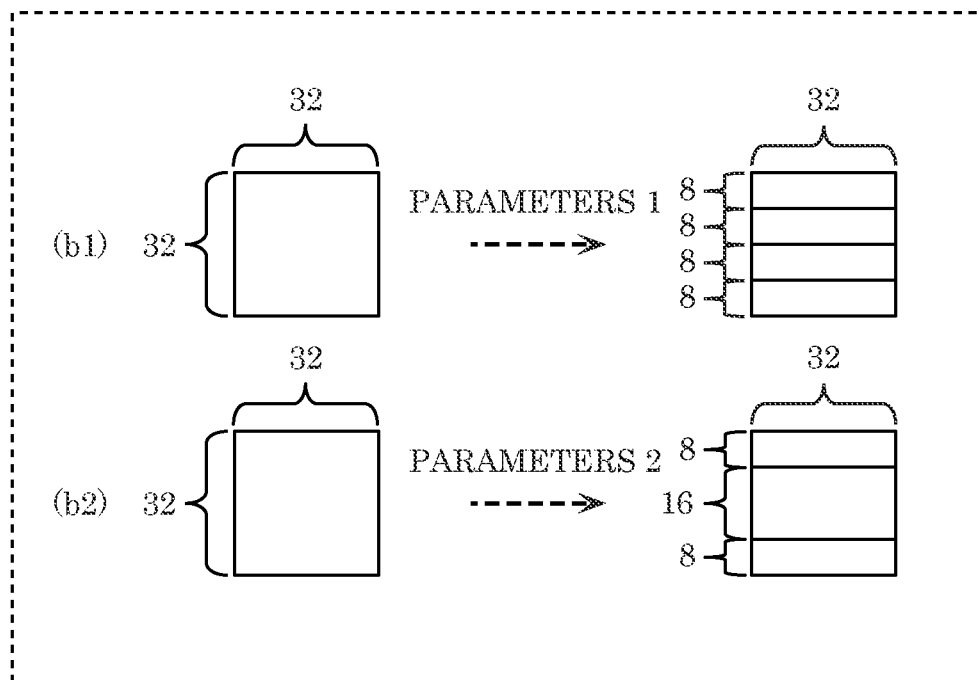
FIG. 48B illustrates an example of partitioning blocks into a different number of sub blocks based on different parameters.

For example, for a 32×32 block, as shown in (b1) FIG. 48B, the written parameters can indicate the partition is a quad-tree partition, and the partition includes only horizontal directions. As such, the 32×32 block is partitioned into four 32×8 sub blocks.

As another example, for a 32×32 block, as shown in (b2) in FIG. 48B, the written parameters can indicate the partition is a triple partition, the partition is a horizontal partition, and ratio of block height of sub blocks is 1:2:1. As such, the 32×32 block is partitioned into a 32×8 sub block, a 32×16 sub block, and a 32×8 sub block.

Figure 48C:
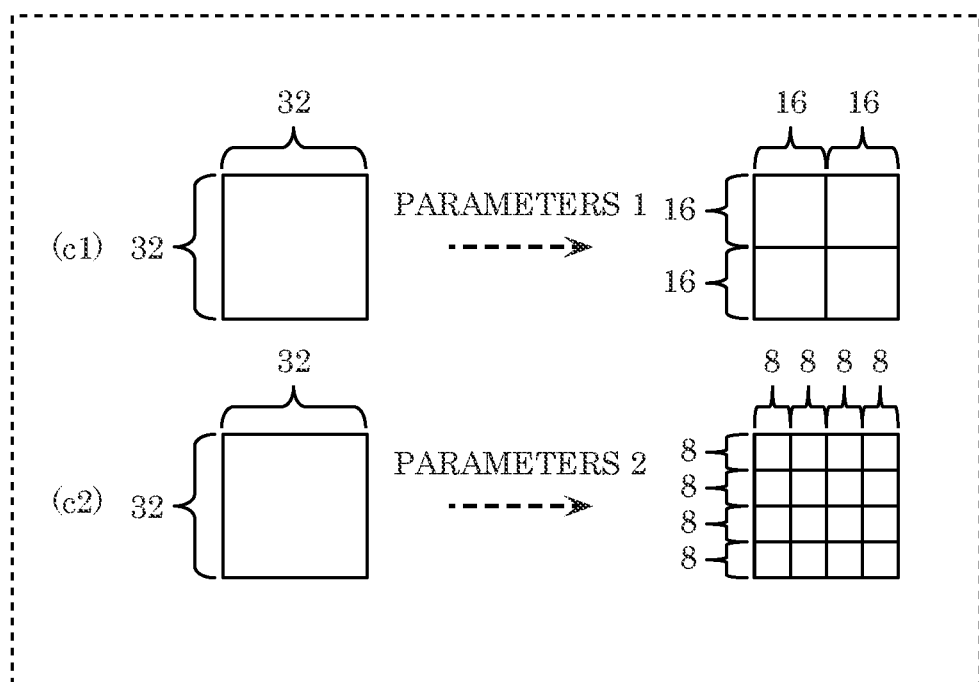
FIG. 48C illustrates an example of partitioning blocks into a different number of sub blocks based on different parameters.

For example, for a 32×32 block, as shown in (c1) FIG. 48C, the written parameters can indicate the partition is a quad-tree partition, the partition includes both vertical and horizontal directions. As such, the 32×32 block is partitioned into four 16×16 sub blocks.

As another example, for a 32×32 block, as shown in (c2) in FIG. 48C, the written parameters can indicate the partition is a multiple partition, the partition includes both vertical and horizontal directions, and the number of sub blocks is 16. As such, the 32×32 block is partitioned into sixteen 8×8 sub blocks.

At step S15005, a sub block is encoded in an encoding process. Here, the encoding process includes a transform process and/or a prediction process. The transform process may be performed on a per block basis similar to the sub block size.

[Encoder]

The structure of the video/image encoder according to this embodiment is the same as illustrated in FIG. 35 described in Embodiment 1. Accordingly, duplicate depiction and description is omitted.

[Decoding Process]

FIG. 26 illustrates one example of a video decoding process according to Embodiment 8.

As a first step S16001, parameters are parsed from a bitstream. FIG. 37 shows the parsable locations of the above mentioned parameters in a compressed video bitstream.

Next, at step S16002, whether the parsed parameters are equal to determined values is determined. The determined values may be predetermined.

If the parsed parameters are equal to the determined values (Y in S16002), the block is partitioned into a first number of sub blocks at step S16003. Here, the first number is larger than two when the process for partitioning the block is in a single vertical or horizontal direction, and larger than three when the process for partitioning the block is not in a single vertical or horizontal direction. If the parsed parameters are not equal to the determined values (N in S16002), the block is partitioned into a second number, which is not equal to the first number, of sub blocks at step S16004. Here, the second number is larger than two when the process for partitioning the block is in a single vertical or horizontal direction, and larger than three when the process for partitioning the block is not in a single vertical or horizontal direction.

For example, for a 32×32 block, as shown in (a1) FIG. 48A, the parsed parameters can indicate the partition is a quad-tree partition, and the partition includes only vertical directions. As such, the 32×32 block is partitioned into four 8×32 sub blocks.

As another example, for a 32×32 block, as shown in (a2) in FIG. 48A, the parsed parameters can indicate the partition is a triple partition, the partition is a vertical partition, and ratio of block width of sub blocks is 1:2:1. As such, the 32×32 block is partitioned into a 8×32 sub block, a 16×32 sub block, and a 8×32 sub block.

For example, for a 32×32 block, as shown in (b1) FIG. 48B, the parsed parameters can indicate the partition is a quad-tree partition, and the partition includes only horizontal directions. As such, the 32×32 block is partitioned into four 32×8 sub blocks.

As another example, for a 32×32 block, as shown in (b2) in FIG. 48B, the parsed parameters can indicate the partition is a triple partition, the partition is a horizontal partition, and ratio of block height of sub blocks is 1:2:1. As such, the 32×32 block is partitioned into a 32×8 sub block, a 32×16 sub block, and a 32×8 sub block.

For example, for a 32×32 block, as shown in (c1) FIG. 48C, the parsed parameters can indicate the partition is a quad-tree partition, the partition includes both vertical and horizontal directions. As such, the 32×32 block is partitioned into four 16×16 sub blocks.

As another example, for a 32×32 block, as shown in (c2) in FIG. 48C, the parsed parameters can indicate the partition is a multiple partition, the partition includes both vertical and horizontal directions, and the number of sub blocks is 16. As such, the 32×32 block is partitioned into sixteen 8×8 sub blocks.

At step S16005, a sub block is decoded in a decoding process. Here, the decoding process includes an inverse transform process and/or a prediction process. The inverse transform process may be performed on a per block basis similar to the sub block size.

[Decoder]

The structure of the video/image encoder according to this embodiment is the same as illustrated in FIG. 36 described in Embodiment 1. Accordingly, duplicate depiction and description is omitted.

Embodiment 9

[Outline]

An encoder according to this embodiment encodes a block of an image, and includes a processor and memory connected to the processor. Using the memory, the processor: writes a partition candidate selection parameter into a bitstream; selects a smaller set of block partitioning information from a larger determined set of block partitioning information using the partition candidate selection parameter written; writes a partition selection parameter into the bitstream; identifies block partitioning information from only the smaller set of block partitioning information selected, using the partition selection parameter written, wherein using the block partitioning information identified will result in partitioning a block into a plurality of sub blocks of a set of geometries, and using different block partitioning information will result in partitioning a block into a plurality of sub blocks of a different set of geometries; partitions a block into a plurality of sub blocks using the block partitioning information identified; and encodes a sub block in an encoding process including a transform process and/or a prediction process. The determined set of block partitioning information may be predetermined.

This makes it possible to select block partitioning information in stages from among a determined block partitioning information set, using two parameters. Accordingly, so long as the smaller block partitioning information set is appropriately classified, it is possible to make an effective selection. As a result, it is possible to reduce the amount of coding pertaining to block partitioning information and improve compression efficiency.

For example, in the encoder according to this embodiment, geometry may indicate at least a shape, a height, or a width of a block.

This makes it possible to use the shape and/or size of a block as the geometry.

A decoder according to this embodiment decodes a block of an image, and includes a processor and memory connected to the processor. Using the memory, the processor: parses a partition candidate selection parameter from a bitstream; selects a smaller set of block partitioning information from a larger determined set of block partitioning information using the partition candidate selection parameter parsed; parses a partition selection parameter from the bitstream; identifies block partitioning information from only the smaller set of block partitioning information selected, using the partition selection parameter parsed, wherein using the block partitioning information identified will result in partitioning a block into a plurality of sub blocks of a set of geometries, and using different block partitioning information will result in partitioning a block into a plurality of sub blocks of a different set of geometries; partitions a block into a plurality of sub blocks using the block partitioning information identified; and decodes a sub block in a decoding process including an inverse transform process and/or a prediction process.

This makes it possible to select block partitioning information in stages from among a determined block partitioning information set, using two parameters. Accordingly, so long as the smaller block partitioning information set is appropriately classified, it is possible to make an effective selection. As a result, it is possible to reduce the amount of coding pertaining to block partitioning information and improve compression efficiency.

For example, in the decoder according to this embodiment, geometry may indicate at least a shape, a height, or a width of a block.

This makes it possible to use the shape and/or size of a block as the geometry.

General or specific aspects of the present disclosure may be realized as a system, method, integrated circuit, computer program, computer readable medium such as a CD-ROM, or any given combination thereof.

Figure 27:
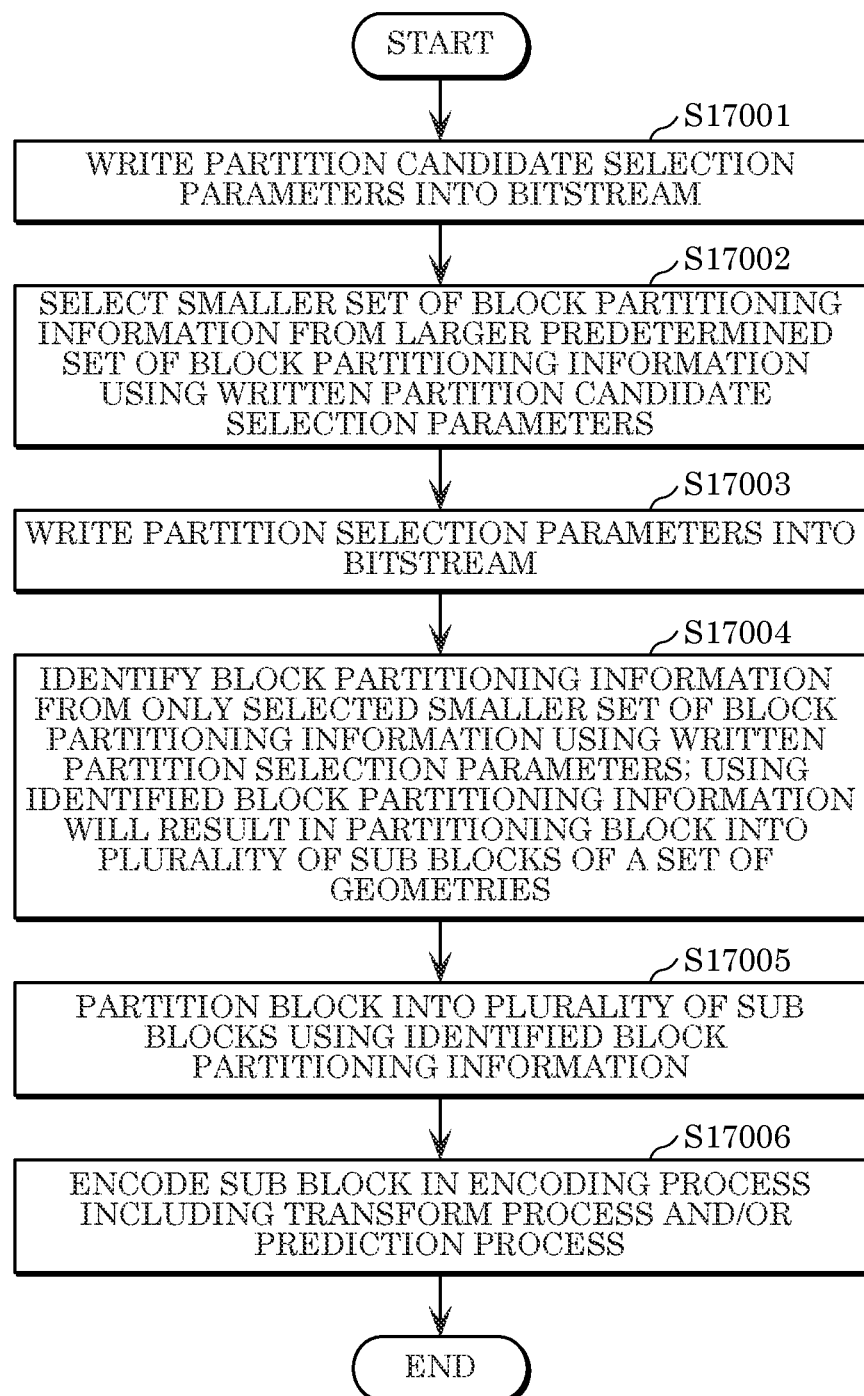
FIG. 27 is a flow chart of one example of a video encoding process according to Embodiment 9.
Figure 28:
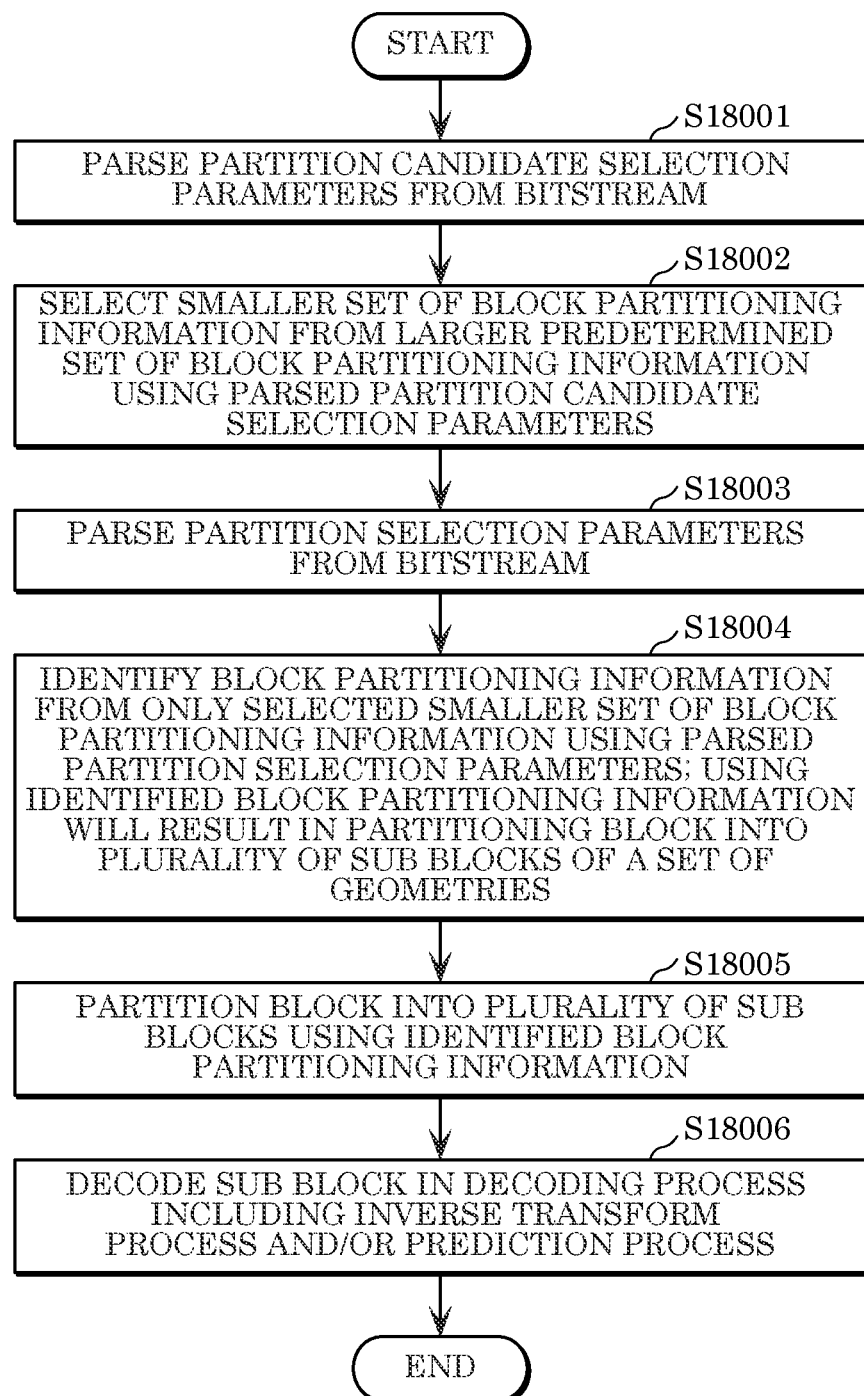
FIG. 28 is a flow chart of one example of a video decoding process according to Embodiment 9.

Hereinafter, methods for encoding and decoding video will be described according to an embodiment as illustrated in FIG. 27 and FIG. 28.

[Encoding Process]

FIG. 27 illustrates one example of a video encoding process according to Embodiment 9.

As a first step S17001, partition candidate selection parameters are written into a bitstream. FIG. 37 shows the possible locations of the partition candidate selection parameters in a compressed video bitstream.

Next, at step S17002, a smaller set of block partitioning information is selected from a larger determined set of block partitioning information using the written partition candidate selection parameters. The determined set of block partitioning information may be predetermined.

The written partition candidate selection parameters, for example, can include an index to select a set of block partitioning information from two or more sets of block partitioning information.

Figure 49A:
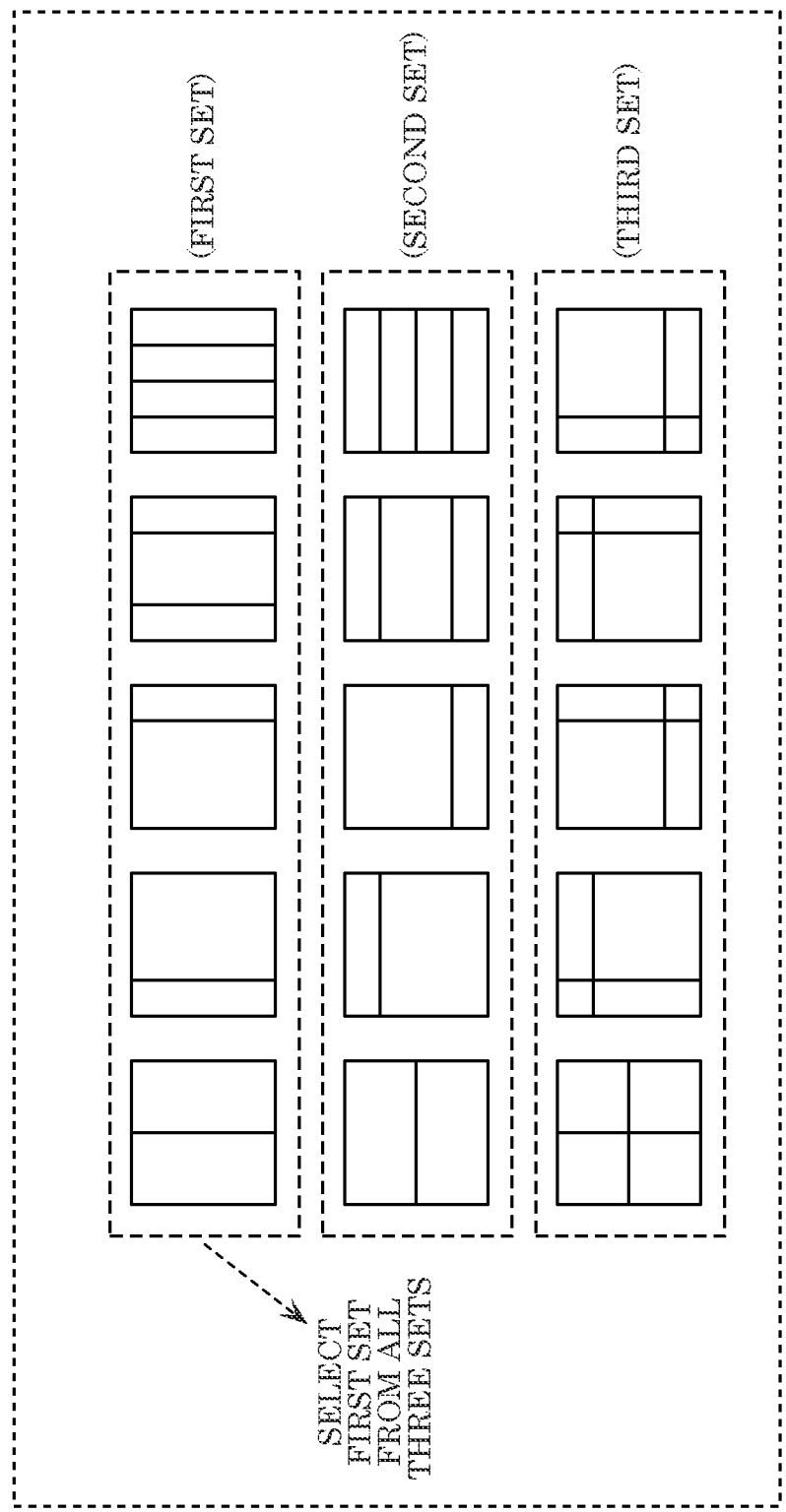
FIG. 49A illustrates an example of selecting block partitioning information from a set of block partitioning information.

Block partitioning information using different partitioning methods (e.g., vertical partition, horizontal partition, and quad-tree partition) can be categorized into different groups (sets) of block partitioning information. For example, as shown in FIG. 49A, there are three groups of block partitioning information, specifically a vertical partition group (first set), a horizontal partition group (second set), and a quad-tree partition group (third set). The vertical partition group supports vertical partition only, the horizontal partition group supports horizontal partition only, and the quad-tree partition group supports quad-tree partition only. If the value of the index equals 0, the vertical partition group will be selected. If the value of the index equals 1, the horizontal partition group will be selected. If the value of the index equals 2, the quad-tree partition group will be selected.

Block partitioning information of previously encoded blocks at different image locations can also be categorized into different groups of block partitioning information. For example, block partitioning information from top-left, top, and top-right blocks can be categorized as a top block partition group (first set). Block partitioning information from bottom-left and left blocks can be categorized as a left block partition group (second set). Block partitioning information from collocated and motion compensated reference blocks can be categorized as a temporal block partition group (third set). If the value of the index equals 0, the top block partition group will be selected. If the value of the index equals 1, the left block partition group will be selected. If the value of the index equals 2, the temporal block partition group will be selected.

Figure 49B:
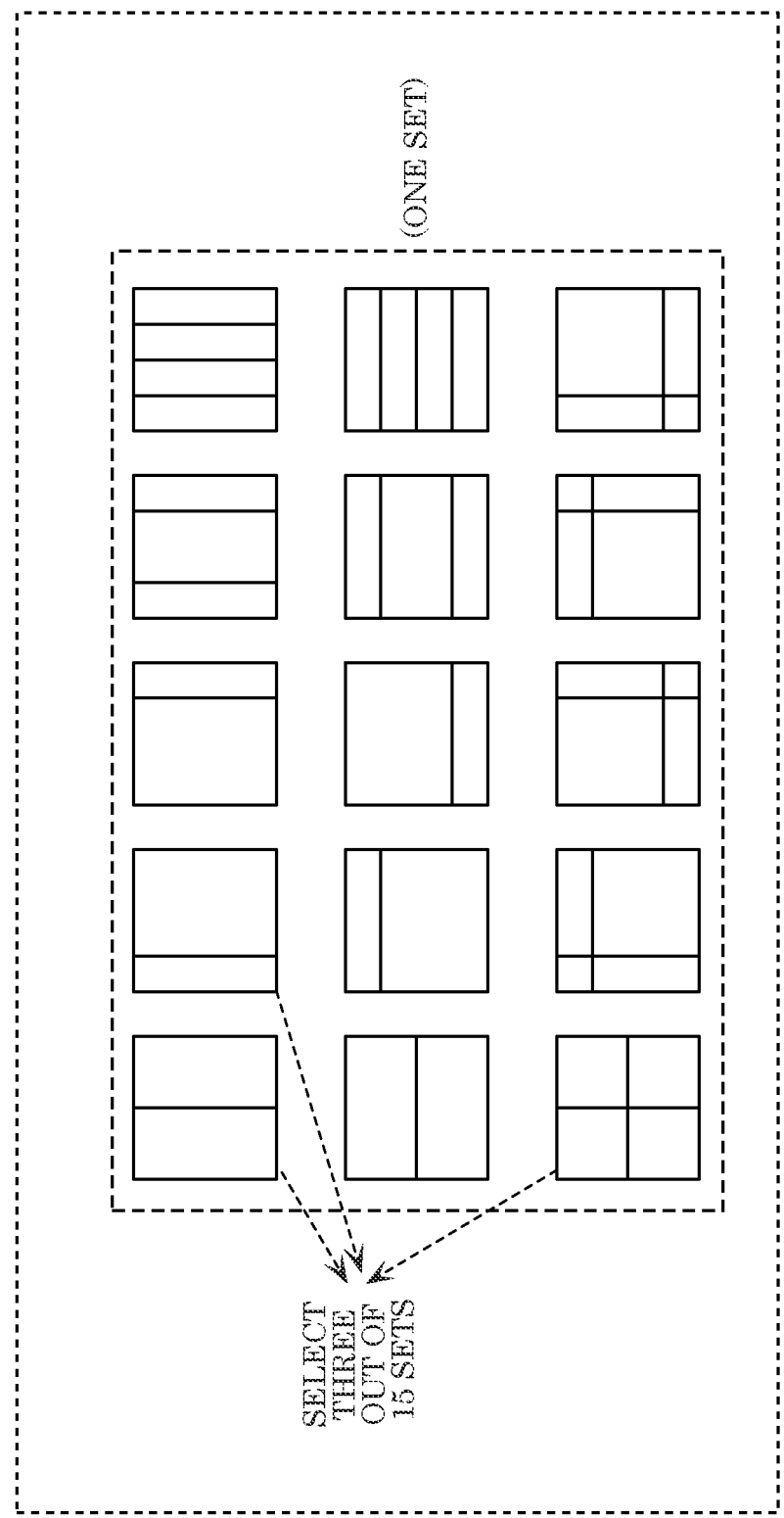
FIG. 49B illustrates an example of selecting block partitioning information from a set of block partitioning information.

As another example, the written partition candidate selection parameters can include parameters/indices to select one or more select block partitioning information from a set of block partitioning information as shown in FIG. 49B.

Block partitioning information may be a set of parameters that indicate whether a block is horizontally split or vertically split. Block partitioning information may be a set of parameters that include a determined block width and a determined block height for all sub blocks in a block. The determined block width and the determined block height may be predetermined. Block partitioning information may also be a set of parameters that include an index to select one candidate partition structure from a determined candidate list of block partition structures. The determined list of candidate block partition structures may be predetermined. Here, block partition structure visually presents geometries of all sub blocks in a block, as shown in FIG. 38.

As a first step S17003, partition selection parameters are written into a bitstream. FIG. 37 shows the possible locations of the partition selection parameter in a compressed video bitstream.

Next, at step S17004, block partitioning information is identified only from the selected smaller set of block partitioning information using the written partition selection parameters. Here, using the identified block partitioning information will result in partitioning a block into a plurality of sub blocks of a set of geometries, and using different block partitioning information will result in partitioning a block into a plurality of sub blocks of a different set of geometries.

The written partition selection parameters, for example, can include an index to select one of the block partitioning information from the selected smaller set of block partitioning information.

As an example, as shown in FIG. 49A, a vertical partition group (first set) is selected as the smaller set of block partitioning information at S17002. In the vertical partition group, there are three different block partition structures according to three different block partitioning information. If the value of the index equals 0, the first block partition structure in the vertical partition group will be identified. If the value of the index equals 1, the second block partition structure in the vertical partition group will be identified. If the value of the index equals 2, the third block partition structure in the vertical partition group will be identified.

As another example, block partitioning information from top-left, top, and top-right blocks are categorized as a top block partition group which has been selected as the smaller set of block partitioning information at S17002. If the value of the index equals 0, the block partition structure from top-left block will be identified. If the value of the index equals 1, the block partition structure from top block will be identified. If the value of the index equals 2, the block partition structure from top-right block will be identified.

As another example, the written partition selection parameters can include a plurality of split/merge flags to derive the block partitioning information from initial block partitioning information.

A block is then partitioned into a plurality of sub blocks using the identified block partitioning information at step S17005.

At step S17006, a sub block is encoded in an encoding process. Here, the encoding process includes a transform process and/or a prediction process. The transform process may be performed on a per block basis similar to the sub block size.

[Encoder]

The structure of the video/image encoder according to this embodiment is the same as illustrated in FIG. 35 described in Embodiment 1. Accordingly, duplicate depiction and description is omitted.

[Decoding Process]

FIG. 28 illustrates one example of a video decoding process according to Embodiment 9.

As a first step S18001, partition candidate selection parameters are parsed from a bitstream. FIG. 37 shows the parsable locations of the partition candidate selection parameters in a compressed video bitstream.

Next, at step S18002, a smaller set of block partitioning information is selected from a larger determined set of block partitioning information using the parsed partition candidate selection parameters. The determined set of block partitioning information may be predetermined.

The parsed partition candidate selection parameters, for example, can include an index to select a set of block partitioning information from two or more sets of block partitioning information.

Block partitioning information using different partitioning methods (e.g., vertical partition, horizontal partition, and quad-tree partition) can be categorized into different groups (sets) of block partitioning information. For example, as shown in FIG. 49A, there are three groups of block partitioning information, specifically a vertical partition group (first set), a horizontal partition group (second set), and a quad-tree partition group (third set). The vertical partition group supports vertical partition only, the horizontal partition group supports horizontal partition only, and the quad-tree partition group supports quad-tree partition only. If the value of the index equals 0, the vertical partition group will be selected. If the value of the index equals 1, the horizontal partition group will be selected. If the value of the index equals 2, the quad-tree partition group will be selected.

Block partitioning information of previously decoded blocks at different image locations can also be categorized into different groups of block partitioning information. For example, block partitioning information from top-left, top, and top-right blocks can be categorized as top block partition group (first set). Block partitioning information from bottom-left and left blocks can be categorized as left block partition group (second set). Block partitioning information from collocated and motion compensated reference blocks can be categorized as temporal block partition group (third set). If the value of the index equals 0, the top block partition group will be selected. If the value of the index equals 1, the left block partition group will be selected. If the value of the index equals 2, the temporal block partition group will be selected.

As another example, the parsed partition candidate selection parameters can include parameters/indices to select one or more select block partitioning information from a set of block partitioning information as shown in FIG. 49B.

Block partitioning information may be a set of parameters that indicate whether a block is horizontally split or vertically split. Block partitioning information may be a set of parameters that include a determined block width and a determined block height for all sub blocks in a block. The determined block width and the determined block height may be predetermined. Block partitioning information may also be a set of parameters that include an index to select one candidate partition structure from a determined candidate list of block partition structures. The determined candidate list of block partition structures may be predetermined. Here, block partition structure visually presents geometries of all sub blocks in a block, as shown in FIG. 38.

Next, at step S18003, partition selection parameters are parsed from a bitstream. FIG. 37 shows the parsable locations of the partition selection parameters in a compressed video bitstream.

Next, at step S18004, block partitioning information is identified only from the selected smaller set of block partitioning information using the parsed partition selection parameters. Here, using the identified block partitioning information will result in partitioning a block into a plurality of sub blocks of a set of geometries, and using different block partitioning information will result in partitioning a block into a plurality of sub blocks of a different set of geometries.

The parsed partition selection parameters, for example, can include an index to select one of the block partitioning information from the selected smaller set of block partitioning information.

As an example, as shown in FIG. 49A, a vertical partition group (first set) is selected as the smaller set of block partitioning information at S18002. In the vertical partition group, there are three different block partition structures according to three different block partitioning information. If the value of the index equals 0, the first block partition structure in the vertical partition group will be identified. If the value of the index equals 1, the second block partition structure in the vertical partition group will be identified. If the value of the index equals 2, the third block partition structure in the vertical partition group will be identified.

As another example, block partitioning information from top-left, top, and top-right blocks are categorized as a top block partition group which has been selected as the smaller set of block partitioning information at S18002. If the value of the index equals 0, the block partition structure from top-left block will be identified. If the value of the index equals 1, the block partition structure from top block will be identified. If the value of the index equals 2, the block partition structure from top-right block will be identified.

As another example, the parsed partition selection parameters can include a plurality of split/merge flags to derive the block partitioning information from initial block partitioning information.

A block is then partitioned into a plurality of sub blocks using the identified block partitioning information at step S18005.

At step S18006, a sub block is decoded in a decoding process. Here, the decoding process includes an inverse transform process and/or a prediction process. The inverse transform process may be performed on a per block basis similar to the sub block size.

[Decoder]

The structure of the video/image encoder according to this embodiment is the same as illustrated in FIG. 36 described in Embodiment 1. Accordingly, duplicate depiction and description is omitted.

Embodiment 10

[Outline]

An encoder according to this embodiment encodes a block of an image, and includes a processor and memory connected to the processor. Using the memory, the processor: writes a parameter into a bitstream; retrieves block information from one or more previously encoded blocks; selecting a smaller set of block partitioning information from a larger determined set of block partitioning information using the block information retrieved; identifying block partitioning information from only the smaller set of block partitioning information selected, using the parameter written, wherein using the block partitioning information identified will result in partitioning a block into a plurality of sub blocks of a set of geometries, and using different block partitioning information will result in partitioning a block into a plurality of sub blocks of a different set of geometries; partitioning a current block into a plurality of sub blocks using the block partitioning information identified; and encoding a sub block in an encoding process including a transform process and/or a prediction process. The determined set of block partitioning information may be predetermined.

This makes it possible to narrow down the selectable block partitioning information from among determined block partitioning information, based on block information for a previously encoded block, and makes it possible to reduce the amount of coding pertaining to parameter(s) for selecting block partitioning information. As a result, it is possible to improve compression efficiency.

For example, in the encoder according to this embodiment, geometry may indicate at least a shape, a height, or a width of a block.

This makes it possible to use the shape and/or size of a block as the geometry.

For example, in the encoder according to this embodiment, the current block and the one or more previously encoded blocks may be different blocks, and at least one of the one or more previously encoded blocks may be included in a same frame as the current block or another frame which is different from the frame including the current block.

This makes it possible to retrieve block information from one or more previously encoded mutually different blocks, and select a more suitable smaller block partitioning information set. As a result, it is possible to reduce the amount of coding pertaining to block partitioning information and improve compression efficiency.

For example, in the encoder according to this embodiment, the block information retrieved may include at least one of information related to block partition structure, information related to an intra prediction mode or an inter prediction mode, information related to an intra prediction direction, information related to a motion vector, information related to a reference picture, information related to a quantization parameter, and information related to a partitioning depth.

This makes it possible to use information that is more suitable for selecting the smaller block partitioning information set as block information.

A decoder according to this embodiment decodes a block of an image, and includes a processor and memory connected to the processor. Using the memory, the processor: parses a parameter from a bitstream; retrieves block information from one or more previously decoded blocks; selects a smaller set of block partitioning information from a larger determined set of block partitioning information using the block information retrieved; identifies block partitioning information from only the smaller set of block partitioning information selected, using the parameter parsed, wherein using the block partitioning information identified will result in partitioning a block into a plurality of sub blocks of a set of geometries, and using different block partitioning information will result in partitioning a block into a plurality of sub blocks of a different set of geometries; partitions a current block into a plurality of sub blocks using the block partitioning information identified; and decodes a sub block in a decoding process including an inverse transform process and/or a prediction process. The determined set of block partitioning information may be predetermined.

This makes it possible to narrow down the selectable block partitioning information from among determined block partitioning information, based on block information for a previously decoded block, and makes it possible to reduce the amount of coding pertaining to parameter(s) for selecting block partitioning information. As a result, it is possible to improve compression efficiency.

For example, in the decoder according to this embodiment, geometry may indicate at least a shape, a height, or a width of a block.

This makes it possible to use the shape and/or size of a block as the geometry.

For example, in the decoder according to this embodiment, the current block and the one or more previously decoded blocks may be different blocks, and at least one of the one or more previously decoded blocks may be included in a same frame as the current block or another frame which is different from the frame including the current block.

This makes it possible to retrieve block information from one or more previously decoded mutually different blocks, and select a more suitable smaller block partitioning information set. As a result, it is possible to reduce the amount of coding pertaining to block partitioning information and improve compression efficiency.

For example, in the decoder according to this embodiment, the block information retrieved may include at least one of information related to block partition structure, information related to an intra prediction mode or an inter prediction mode, information related to an intra prediction direction, information related to a motion vector, information related to a reference picture, information related to a quantization parameter, and information related to a partitioning depth.

This makes it possible to use information that is more suitable for selecting the smaller block partitioning information set as block information.

General or specific aspects of the present disclosure may be realized as a system, method, integrated circuit, computer program, computer readable medium such as a CD-ROM, or any given combination thereof.

Figure 29:
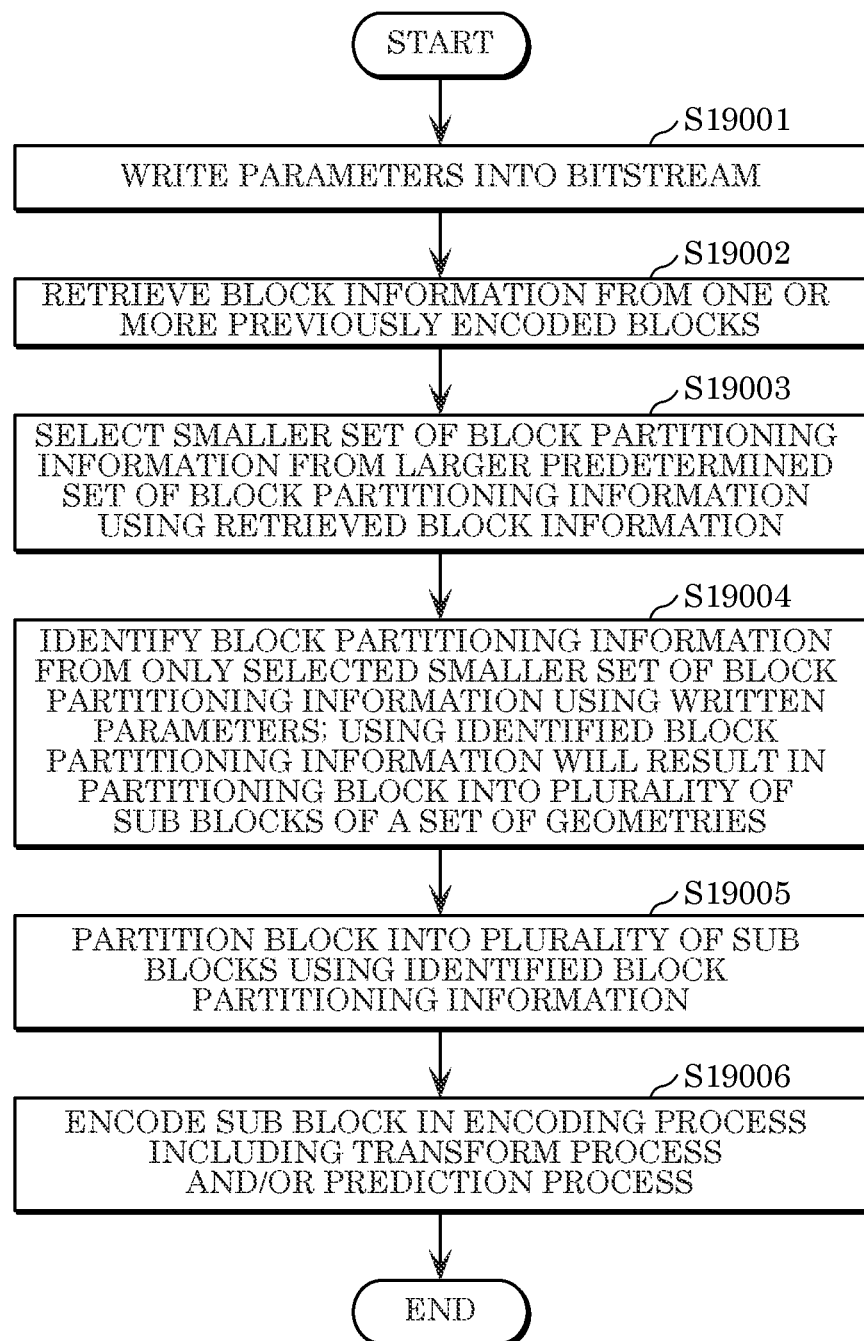
FIG. 29 is a flow chart of one example of a video encoding process according to Embodiment 10.
Figure 30:
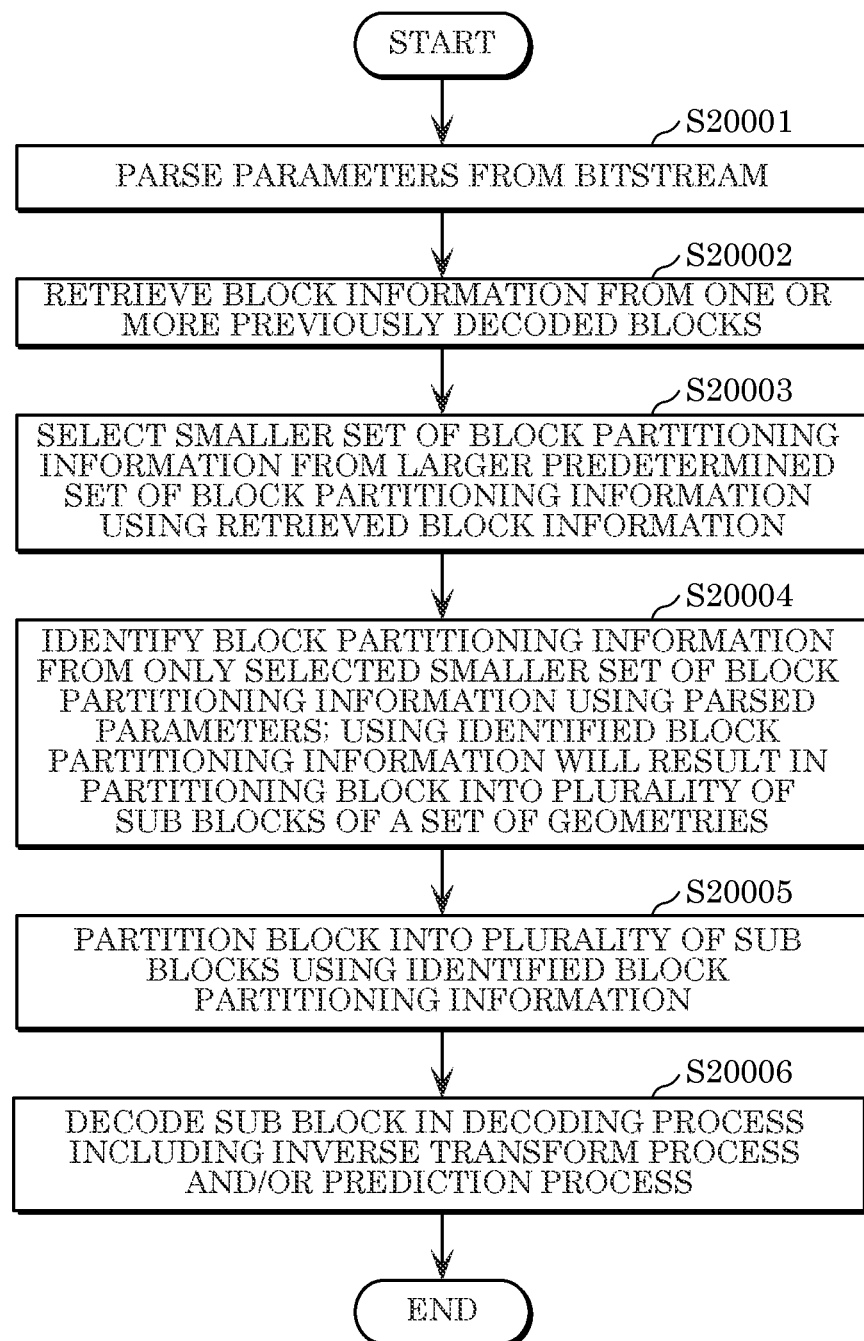
FIG. 30 is a flow chart of one example of a video decoding process according to Embodiment 10.

Hereinafter, methods for encoding and decoding video will be described according to an embodiment as illustrated in FIG. 29 and FIG. 30.

[Encoding Process]

FIG. 29 illustrates one example of a video encoding process according to Embodiment 10.

As a first step S19001, parameters are written into a bitstream. FIG. 37 shows the possible locations of the parameters in a compressed video bitstream.

Next at step S19002, block information (for example, location, block partition structure, intra prediction or inter prediction mode, intra prediction direction, motion vector, reference picture, quantization parameters, and partitioning depth) is retrieved from one or more previously encoded blocks.

At step S19003, a smaller set of block partitioning information is selected from a larger determined set of block partitioning information using the retrieved block information. The determined set of block partitioning information may be predetermined.

Figure 50:
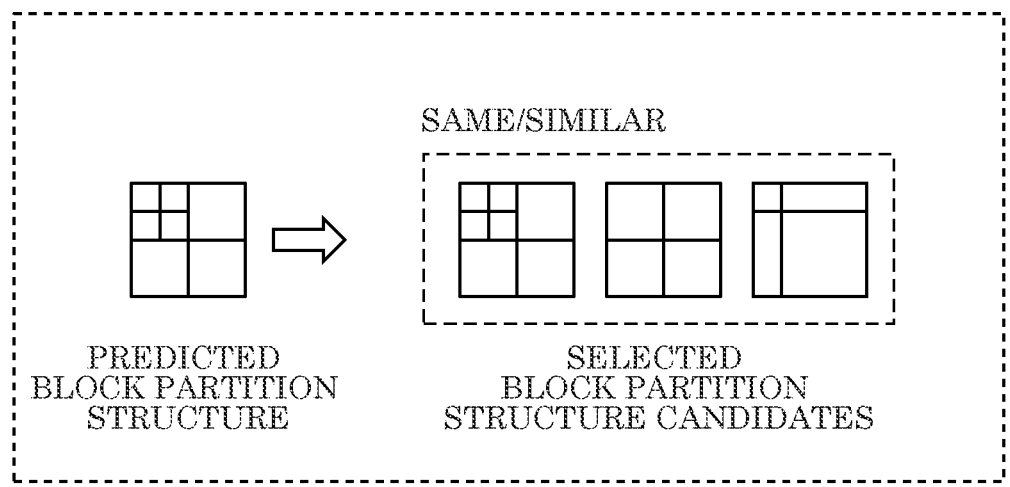
FIG. 50 illustrates an example of selecting block partition structure based on predicted block partition structure.

For example, predicted block partitioning information can be firstly derived using the retrieved block information. The block partitioning information from the larger determined set of block partitioning information, which has similar block partition structure as the predicted block partitioning information, will then be selected and added to the smaller set of block partitioning information. To select these block partitioning information, for example, the block partition structures with only a vertical split will be selected (FIG. 49A: first set) if the predicted block partitioning information indicates that only a vertical split is to be used. To select these block partitioning information, for example, the block partition structures with only a horizontal split will be selected (FIG. 49A: second set) if the predicted block partitioning information indicates that only a horizontal split is to be used. As another example, to select these block partitioning information, the block partition structures with same/similar geometries of sub blocks as the block partition structure according to the predicted block partitioning information will be selected, as shown in FIG. 50.

Block partitioning information may be a set of parameters that indicate whether a block is horizontally split or vertically split. Block partitioning information may also be a set of parameters that include a determined block width and a determined block height for all sub blocks in a block. The determined block width and the determined block height may be predetermined. Block partitioning information may be a set of parameters that include an index to select one candidate partition structure from a determined candidate list of block partition structures. The determined list of candidate block partition structures may be predetermined.

Here, block partition structure visually presents geometries of all sub blocks in a block, as shown in FIG. 38.

Block partition structure from a previously encoded block can be directly used as the predicted block partition structure for the current block.

Block partition structures from two or more previously encoded blocks can also be combined (for example, the top half uses block partition structure from the top block and the left half uses block partition structure from the left block as shown in FIG. 39) to derive a new block partition structure as the predicted block partition structure for the current block. One example of how to select previously encoded blocks is to select encoded blocks having same intra/inter prediction mode as current block. Specifically, if the current block is an inter predicted block, one or more of the previously encoded blocks that were encoded using inter prediction will be selected.

Block partition structure from a previously encoded block can also be modified (for example, use block partition structure with less partition depth as shown in FIG. 40) to derive a new block partition structure as the predicted block partition structure for the current block.

Predicted block partitioning information may differ based on intra prediction direction information from previously encoded blocks. For example, intra prediction direction information from specific neighbouring block locations may be used to predict whether the current block is to be split vertically or horizontally into smaller blocks. For example, when intra prediction direction information from a top neighbouring block is determined to be a vertical direction or close to vertical direction, block partitioning information including a vertical split can be predicted for current block. Similarly, if intra prediction direction information from a left neighbouring block is determined to be a horizontal direction or close to a horizontal direction, a block partitioning information including a horizontal split can be predicted for the current block.

Block partitioning information may be predicted according to intra/inter prediction modes from previously encoded blocks. When prediction modes from the encoded blocks are intra prediction mode, determined block partitioning information can be predicted to partition a block into a plurality of sub blocks with smaller block sizes. When prediction modes from the encoded blocks are inter prediction mode, other determined block partitioning information can be predicted to partition a block into a plurality of sub blocks with larger block sizes. The determined block partitioning information may be predetermined.

Block partitioning information can also be predicted according to motion vectors from previously encoded blocks. When a difference between the motion vectors from the encoded blocks and the motion vectors from current block is bigger than a determined threshold, determined block partitioning information can be predicted to partition a block into a plurality of sub blocks with smaller block sizes. On the other hand, when a difference between the motion vectors from the encoded blocks and the motion vectors from current block is not greater than a determined threshold, other determined block partitioning information can be predicted to partition a block into a plurality of sub blocks with larger block sizes. The determined thresholds and the determined block partitioning information may be predetermined.

Block partitioning information may be predicted according to quantization parameters from previously encoded blocks. For example, when the values of quantization parameters from the encoded blocks are smaller than a determined value, determined block partitioning information can be predicted to partition a block into a plurality of sub blocks with smaller block sizes. When the values of quantization parameters from the encoded blocks are not smaller than a determined value, other determined block partitioning information can be predicted to partition a block into a plurality of sub blocks with larger block sizes. The determined values and the determined block partitioning information may be predetermined.

Block partitioning information may be predicted according to reference picture information from previously encoded blocks. For example, when reference pictures from the encoded blocks are temporally near to the current image or when the reference pictures from the encoded blocks are similar to one another, determined block partitioning information can be predicted to partition a block into a plurality of sub blocks with larger block sizes. When reference pictures from the encoded blocks are not near to the current image or when the reference pictures from the encoded blocks are not similar to one another, other determined block partitioning information can be predicted to partition a block into a plurality of sub blocks with smaller block sizes. The determined block partitioning information may be predetermined.

Block partitioning information may be predicted according to partitioning depths from previously encoded blocks. For example, when partitioning depths from the encoded blocks are larger than a determined value (for example, determined depth value equals to 4), determined block partitioning information can be predicted to partition a block into a plurality of sub blocks with smaller block sizes. When partitioning depths from the encoded blocks are not larger than determined value (for example, depth equals to 2), other determined block partitioning information can be predicted to partition a block into a plurality of sub blocks with larger block sizes. The determined values and the determined block partitioning information may be predetermined.

Block partitioning information may also be predicted according to partitioning information from previously encoded blocks of a frame different than current frame. For example, block partitioning information (which includes split information) for the current block, or the current block's split information can be predicted from a previously encoded block (e.g., a collocated block, the last encoded block or an encoded block identified by a motion vector) from an encoded frame which is different from current frame.

Block partitioning information of previously encoded blocks at different image locations can also be categorized into different groups of block partitioning information. For example, block partitioning information from top-left, top, and top-right blocks can be categorized as a top block partition group (first set). Block partitioning information from bottom-left and left blocks can be categorized as left block partition group (second set). Block partitioning information from collocated and motion compensated reference blocks can be categorized as temporal block partition group (third set). If the value of the index equals 0, the top block partition group will be selected. If the value of the index equals 1, the left block partition group will be selected. If the value of the index equals 2, the temporal block partition group will be selected.

Next at step S19004, block partitioning information is identified only from the selected smaller set of block partitioning information using the written parameters. Here, using the identified block partitioning information will result in partitioning a block into a plurality of sub blocks of a set of geometries, and using different block partitioning information will result in partitioning a block into a plurality of sub blocks of a different set of geometries. The written partition selection parameters, for example, can include an index to select one of the block partitioning information from the selected smaller set of block partitioning information.

For example, block partitioning information from top-left, top, and top-right blocks are categorized as a top block partition group which has been selected as the smaller set of block partitioning information at S19003. If the value of the index equals 0, the block partition structure from top-left block will be identified. If the value of the index equals 1, the block partition structure from top block will be identified. If the value of the index equals 2, the block partition structure from top-right block will be identified.

As another example, the written parameters can include a plurality of split/merge flags to derive the block partitioning information from an initial block partitioning information.

A block is then partitioned into a plurality of sub blocks using the identified block partitioning information at step S19005.

At step S19006, a sub block is encoded in an encoding process. Here, the encoding process includes a transform process and/or a prediction process. The transform process may be performed on a per block basis similar to the sub block size.

[Encoder]

The structure of the video/image encoder according to this embodiment is the same as illustrated in FIG. 35 described in Embodiment 1. Accordingly, duplicate depiction and description is omitted.

[Decoding Process]

FIG. 30 illustrates one example of a video decoding process according to Embodiment 10.

As a first step S20001, parameters are parsed from a bitstream. FIG. 37 shows the parsable locations of the parameters in a compressed video bitstream.

Next at step S20002, block information (for example, location, block partition structure, intra prediction or inter prediction mode, intra prediction direction, motion vector, reference picture, quantization parameters, and partitioning depth) is retrieved from one or more previously decoded blocks.

At step S20003, a smaller set of block partitioning information is selected from a larger determined set of block partitioning information using the retrieved block information. The determined set of block partitioning information may be predetermined.

For example, predicted block partitioning information can be firstly derived using the retrieved block information. The block partitioning information from the larger determined set of block partitioning information, which has similar block partition structure as the predicted block partitioning information, will then be selected and added to the smaller set of block partitioning information. To select these block partitioning information, for example, the block partition structures with only a vertical split will be selected (FIG. 49A: first set) if the predicted block partitioning information indicates that only a vertical split is to be used. To select these block partitioning information, for example, the block partition structures with only a horizontal split will be selected (FIG. 49A: second set) if the predicted block partitioning information indicates that only a horizontal split is to be used. As another example, to select these block partitioning information, the block partition structures with same/similar geometries of sub blocks as the block partition structure according to the predicted block partitioning information will be selected, as shown in FIG. 50.

Block partitioning information may be a set of parameters that indicate whether a block is horizontally split or vertically split. Block partitioning information may also be a set of parameters that include a determined block width and a determined block height for all sub blocks in a block. The determined block width and the determined block height may be predetermined. Block partitioning information may be a set of parameters that include an index to select one candidate partition structure from a determined candidate list of block partition structures. The determined candidate list of block partition structures may be predetermined. Here, block partition structure visually presents geometries of all sub blocks in a block, as shown in FIG. 38.

Block partition structure from a previously decoded block can be directly used as the predicted block partition structure for the current block.

Block partition structures from two or more previously decoded blocks can also be combined (for example, the top half uses the block partition structure from the top block and the left half uses the block partition structure from the left block as shown in FIG. 39) to derive a new block partition structure as the predicted block partition structure for the current block. One example of how to select previously decoded blocks is to select decoded blocks having same intra/inter prediction mode as current block. Specifically, if the current block is an inter predicted block, one or more of the previously decoded blocks that were decoded using inter prediction will be selected.

Block partition structure from a previously decoded block can also be modified (for example, use block partition structure with less partition depth as shown in FIG. 40) to derive a new block partition structure as the predicted block partition structure for the current block.

Predicted block partitioning information may differ based on intra prediction direction information from previously decoded blocks. For example, intra prediction direction information from specific neighbouring block locations may be used to predict whether the current block is to be split vertically or horizontally into smaller blocks. For example, when intra prediction direction information from a top neighbouring block is determined to be a vertical direction or close to vertical direction, block partitioning information including a vertical split can be predicted for current block. Similarly, if intra prediction direction information from a left neighbouring block is determined to be a horizontal direction or close to a horizontal direction, a block partitioning information including a horizontal split can be predicted for the current block.

Block partitioning information may be predicted according to intra/inter prediction modes from previously decoded blocks. When prediction modes from the decoded blocks are intra prediction mode, determined block partitioning information can be predicted to partition a block into a plurality of sub blocks with smaller block sizes. When prediction modes from the decoded blocks are inter prediction mode, other determined block partitioning information can be predicted to partition a block into a plurality of sub blocks with larger block sizes. The determined block partitioning information may be predetermined.

Block partitioning information can also be predicted according to motion vectors from previously decoded blocks. When a difference between the motion vectors from the decoded blocks and the motion vectors from current block is bigger than a determined threshold, determined block partitioning information can be predicted to partition a block into a plurality of sub blocks with smaller block sizes. On the other hand, when a difference between the motion vectors from the decoded blocks and the motion vectors from current block is not greater than a determined threshold, other determined block partitioning information can be predicted to partition a block into a plurality of sub blocks with larger block sizes. The determined thresholds and the determined block partitioning information may be predetermined.

Block partitioning information may be predicted according to quantization parameters from previously decoded blocks. For example, when the values of quantization parameters from the decoded blocks are smaller than a determined value, determined block partitioning information can be predicted to partition a block into a plurality of sub blocks with smaller block sizes. When the values of quantization parameters from the decoded blocks are not smaller than a determined value, other determined block partitioning information can be predicted to partition a block into a plurality of sub blocks with larger block sizes. The determined values and the determined block partitioning information may be predetermined.

Block partitioning information may be predicted according to reference picture information from previously decoded blocks. For example, when reference pictures from the decoded blocks are temporally near to the current image or when the reference pictures from the decoded blocks are similar to one another, determined block partitioning information can be predicted to partition a block into a plurality of sub blocks with larger block sizes. When reference pictures from the decoded blocks are not near to the current image or when the reference pictures from the decoded blocks are not similar to one another, other determined block partitioning information can be predicted to partition a block into a plurality of sub blocks with smaller block sizes. The determined block partitioning information may be predetermined.

Block partitioning information may be predicted according to partitioning depths from previously decoded blocks. For example, when partitioning depths from the decoded blocks are larger than a determined value (for example, determined depth value equals to 4), determined block partitioning information can be predicted to partition a block into a plurality of sub blocks with smaller block sizes. When partitioning depths from the decoded blocks are not larger than determined value (for example, depth equals to 2), other determined block partitioning information can be predicted to partition a block into a plurality of sub blocks with larger block sizes. The determined values and the determined block partitioning information may be predetermined.

Block partitioning information may also be predicted according to partitioning information from previously decoded blocks of a frame different than current frame. For example, block partitioning information (which includes split information) for the current block, or the current block's split information can be predicted from a previously decoded block (e.g., a collocated block, the last decoded block or a decoded block identified by a motion vector) from a decoded frame which is different from current frame.

Block partitioning information of previously decoded blocks at different image locations can also be categorized into different groups of block partitioning information. For example, block partitioning information from top-left, top, and top-right blocks can be categorized as a top block partition group (first set). Block partitioning information from bottom-left and left blocks can be categorized as left block partition group (second set). Block partitioning information from collocated and motion compensated reference blocks can be categorized as temporal block partition group (third set). If the value of the index equals 0, the top block partition group will be selected. If the value of the index equals 1, the left block partition group will be selected. If the value of the index equals 2, the temporal block partition group will be selected.

Next at step S20004, block partitioning information is identified only from the selected smaller set of block partitioning information using the parsed parameters. Here, using the identified block partitioning information will result in partitioning a block into a plurality of sub blocks of a set of geometries, and using different block partitioning information will result in partitioning a block into a plurality of sub blocks of a different set of geometries.

The parsed partition selection parameters, for example, can include an index to select one of the block partitioning information from the selected smaller set of block partitioning information.

For example, block partitioning information from top-left, top, and top-right blocks are categorized as a top block partition group which has been selected as the smaller set of block partitioning information at S20003. If the value of the index equals 0, the block partition structure from top-left block will be identified. If the value of the index equals 1, the block partition structure from top block will be identified. If the value of the index equals 2, the block partition structure from top-right block will be identified.

As another example, the parsed partition selection parameters can include a plurality of split/merge flags to derive the block partitioning information from initial block partitioning information.

A block is then partitioned into a plurality of sub blocks using the identified block partitioning information at step S20005.

At step S20006, a sub block is decoded in a decoding process. Here, the decoding process includes an inverse transform process and/or a prediction process. The inverse transform process may be performed on a per block basis similar to the sub block size.

[Decoder]

The structure of the video/image encoder according to this embodiment is the same as illustrated in FIG. 36 described in Embodiment 1. Accordingly, duplicate depiction and description is omitted.

Embodiment 11

[Outline]

An encoder according to this embodiment encodes a block of an image, and includes a processor and memory connected to the processor. Using the memory, the processor: writes a list modification parameter into a bitstream; modifies a determined list of block partitioning information into a modified list of block partitioning information using the list modification parameter written; writes a partition selection parameter into the bitstream; selects block partitioning information from only the modified list of block partitioning information using the partition selection parameter written, wherein using the block partitioning information selected will result in partitioning a block into a plurality of sub blocks; partitions a block into a plurality of sub blocks using the block partitioning information selected; and encodes a sub block included in the plurality of sub blocks in an encoding process including a transform process and/or a prediction process. The determined list of block partitioning information may be predetermined.

This makes it possible to modify a determined list of block partitioning information using a list modification parameter from a bitstream. Accordingly, it is possible to reduce the amount of coding pertaining to block partitioning information and improve compression efficiency.

For example, in the encoder according to this embodiment, modifying the determined list of block partitioning information may include reordering the determined list of block partitioning information to generate the modified list of block partitioning information, and the partition selection parameter may be encoded using fewer bits to indicate block partitioning information earlier in list order than block partitioning information later in list order.

This makes it possible to reorder a determined list of block partitioning information using a list modification parameter from a bitstream. Accordingly, it is easier to place block partitioning information that is more likely to be selected at the top of the list, which makes it possible to reduce the amount of coding pertaining to block partitioning information.

For example, in the encoder according to this embodiment, modifying the determined list of block partitioning information may include inserting additional partitioning information into the determined list of block partitioning information to generate a longer list of block partitioning information.

This makes it possible to insert additional block partitioning information into a determined list of block partitioning information using a list modification parameter from a bitstream. Accordingly, it is easier to add block partitioning information suitable for block partitioning to the list, and possible to improve compression efficiency.

A decoder according to this embodiment decodes a block of an image, and includes a processor and memory connected to the processor. Using the memory, the processor: parses a list modification parameter from a bitstream; modifies a determined list of block partitioning information into a modified list of block partitioning information using the list modification parameter parsed; parses a partition selection parameter from the bitstream; selects block partitioning information from only the modified list of block partitioning information using the partition selection parameter parsed, wherein using the block partitioning information selected will result in partitioning a block into a plurality of sub blocks; partitions a block into a plurality of sub blocks using the block partitioning information selected; and decodes a sub block included in the plurality of sub blocks in a decoding process including an inverse transform process and/or a prediction process.

This makes it possible to modify a determined list of block partitioning information using a list modification parameter from a bitstream. Accordingly, it is possible to reduce the amount of coding pertaining to block partitioning information and improve compression efficiency.

For example, in the decoder according to this embodiment, modifying the determined list of block partitioning information may include reordering the determined list of block partitioning information to generate the modified list of block partitioning information, and the partition selection parameter may be encoded using fewer bits to indicate block partitioning information earlier in list order than block partitioning information later in list order.

This makes it possible to reorder a determined list of block partitioning information using a list modification parameter from a bitstream. Accordingly, it is easier to place block partitioning information that is more likely to be selected at the top of the list, which makes it possible to reduce the amount of coding pertaining to block partitioning information.

For example, in the decoder according to this embodiment, modifying the determined list of block partitioning information may include inserting additional partitioning information into the determined list of block partitioning information to generate a longer list of block partitioning information.

This makes it possible to insert additional block partitioning information into a determined list of block partitioning information using a list modification parameter from a bitstream. Accordingly, it is easier to add block partitioning information suitable for block partitioning to the list, and possible to improve compression efficiency.

General or specific aspects of the present disclosure may be realized as a system, method, integrated circuit, computer program, computer readable medium such as a CD-ROM, or any given combination thereof.

Figure 31:
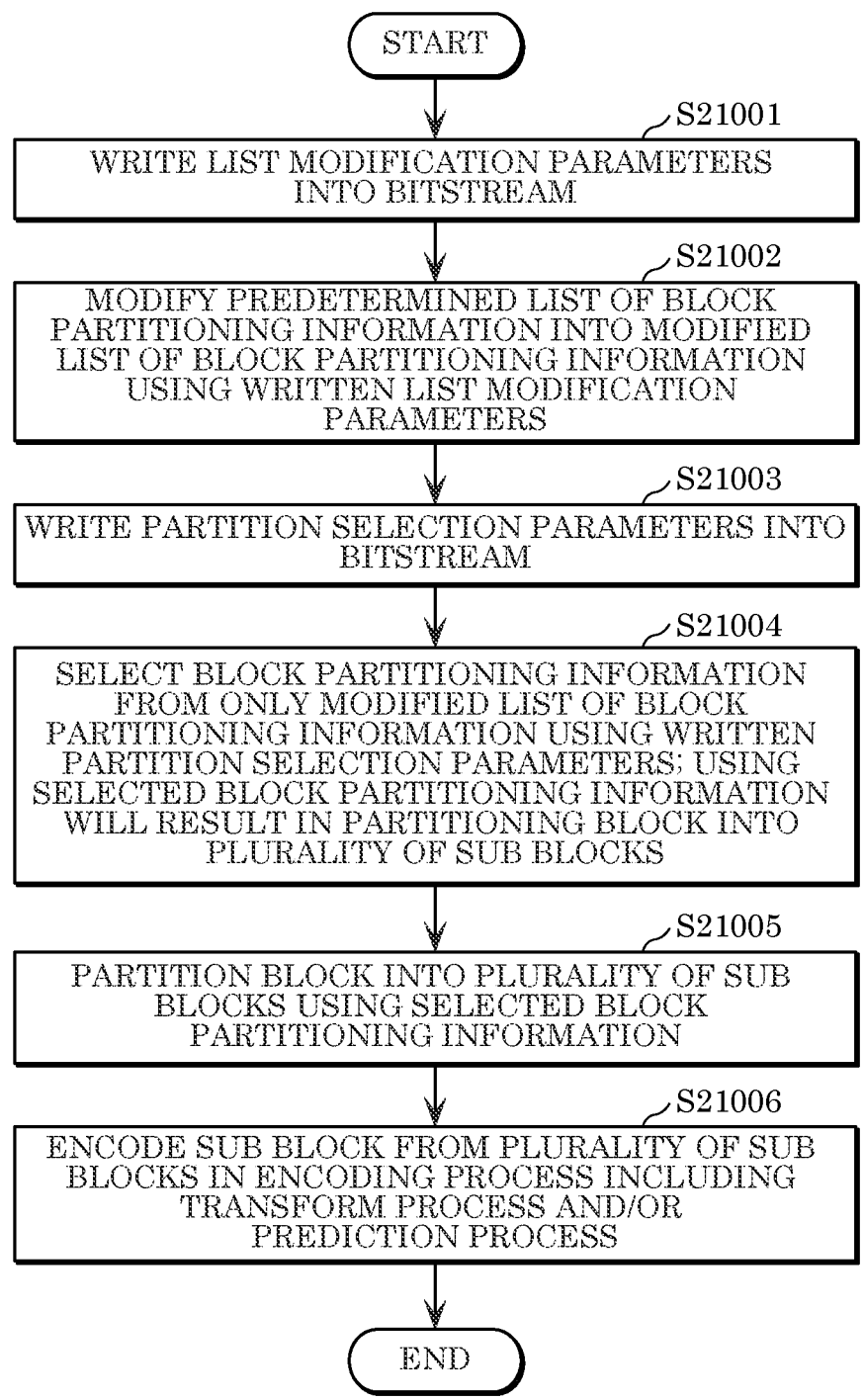
FIG. 31 is a flow chart of one example of a video encoding process according to Embodiment 11.
Figure 32:
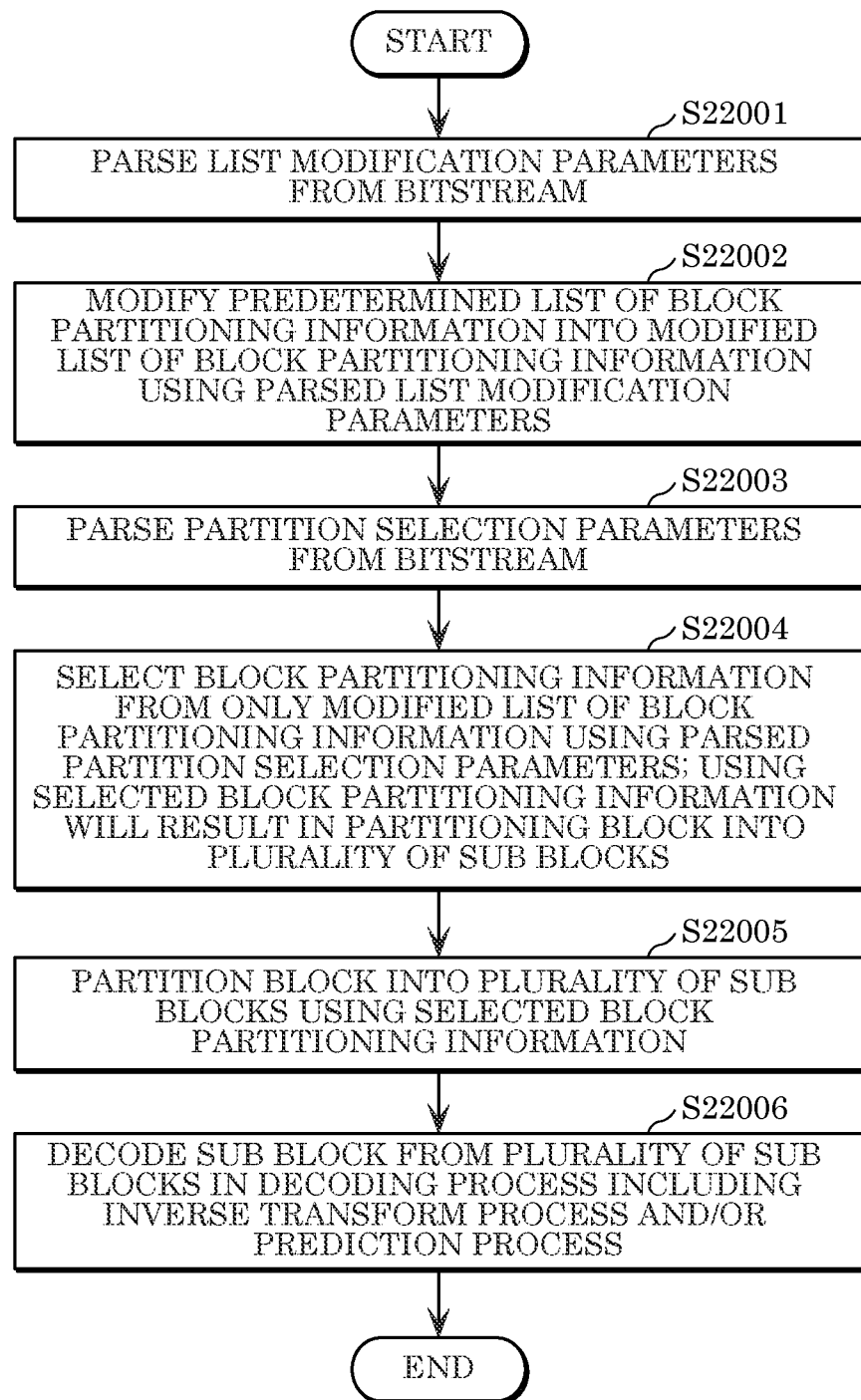
FIG. 32 is a flow chart of one example of a video decoding process according to Embodiment 11.

Hereinafter, methods for encoding and decoding video will be described according to an embodiment as illustrated in FIG. 31 and FIG. 32.

[Encoding Process]

FIG. 31 illustrates one example of a video encoding process according to Embodiment 11.

As a first step S21001, list modification parameters are written into a bitstream. FIG. 37 shows the possible locations of the parameters in a compressed video bitstream.

Figure 51:
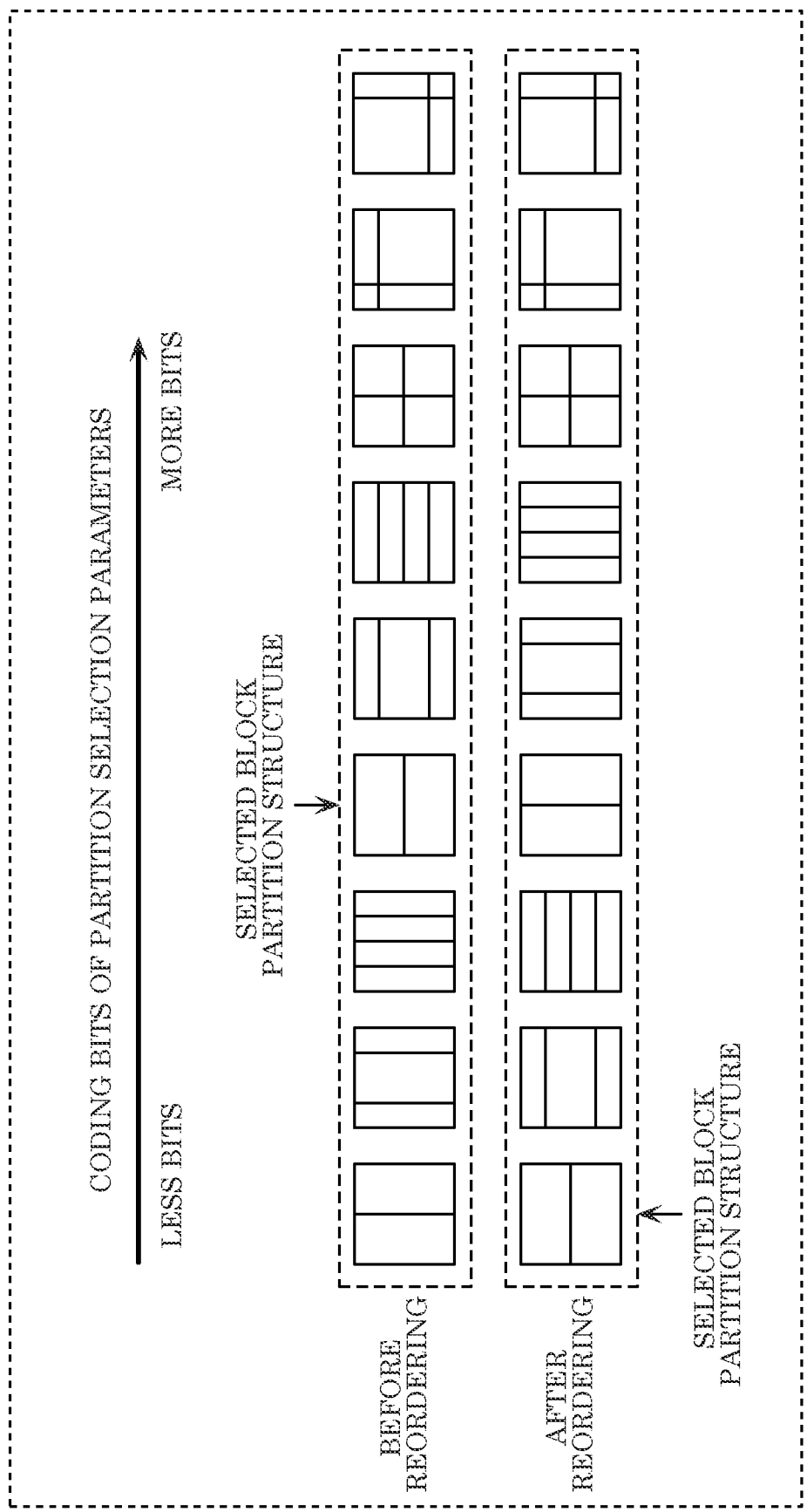
FIG. 51 illustrates an example of reordering a block partitioning information list.

Next, at step S21002, a determined list of block partitioning information is modified into a modified list of block partitioning information using the written list modification parameters. The determined list of block partitioning information may be predetermined. For example, the modification can be a process to reorder the determined list of block partitioning information to generate a modified list of block partitioning information. Here, partition selection parameters are coded using lesser bits to indicate block partitioning information earlier in the order of the list than block partitioning information later in the order of the list. With reordering, the selected block partitioning information will be placed earlier in the list and the coding bits of partition selection parameters will be reduced, as shown in FIG. 51.

Figure 52:
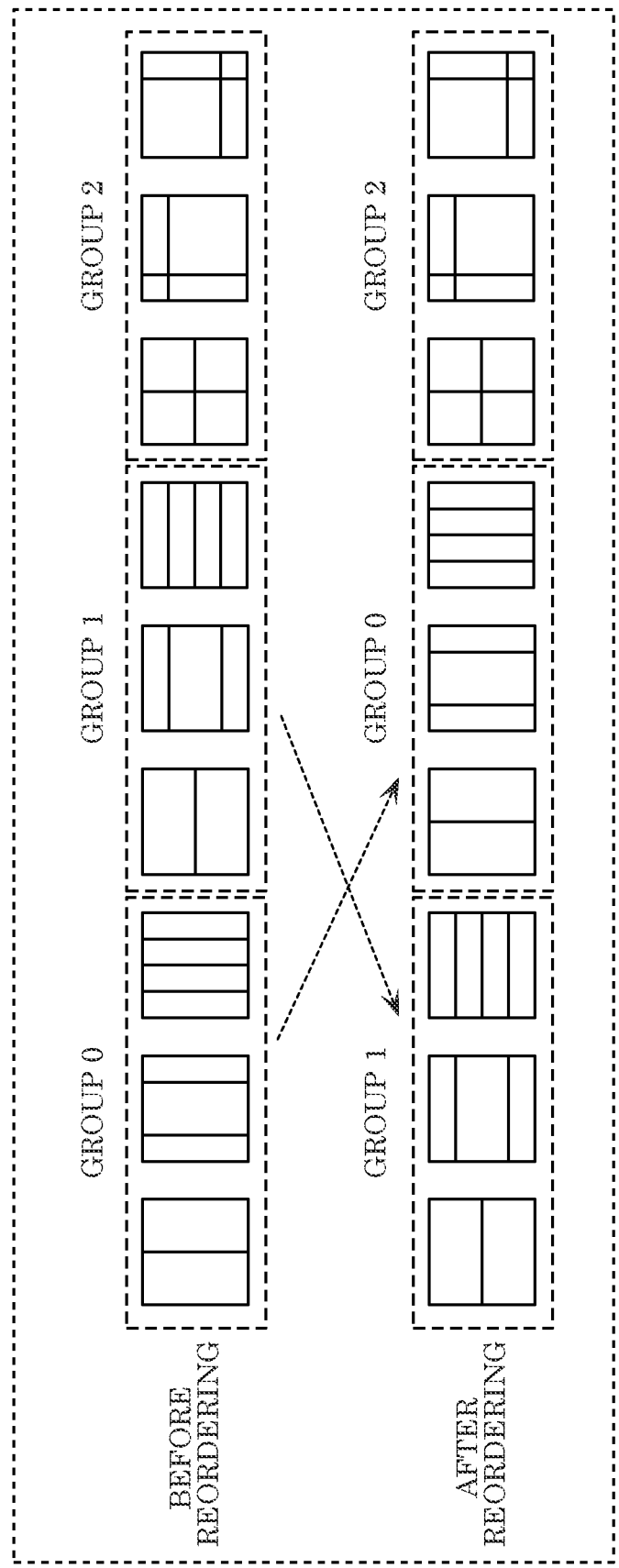
FIG. 52 illustrates an example of reordering a block partitioning information list.

To reorder the list, for example, the list can be classified into different groups of block partitioning information (e.g., vertical partition group, horizontal partition group, quad-tree partition group, and all partition group which includes all block partitioning information). By reordering these groups of block partitioning information, the reordering of the list is achieved as shown in FIG. 52. In this example, the list modification parameters can include parameters to indicate the order of each group of block partitioning in the modified list of block partitioning information.

Limitation of the block partitioning information in each group can be done implicitly by utilizing the geometries of a current block. For example, it is possible to limit usage to only partition that results in block width and block height being a power of two. For such block partitioning information, information resulting in either sub block width or sub block height that is not a power of two will not be used in the group.

As another example, the modification may be a process to insert additional block partitioning information into a determined list of block partitioning information to generate a longer list of block partitioning information. The coded bits of partition selection parameters will be reduced when the most likely block partitioning information is inserted at the front of the list. Here, partition selection parameters are coded using lesser bits to indicate block partitioning information earlier in the order of the list than block partitioning information later in the order of the list.

As another example, the modification can also be a process to remove block partitioning information from a determined list of block partitioning information to generate a shorter list of block partitioning information. The coded bits of partition selection parameters will be reduced when the unlikely block partitioning information before the most likely block partitioning information is removed. Here, partition selection parameters are coded using lesser bits to indicate block partitioning information earlier in the order of the list than block partitioning information later in the order of the list.

Reordering, insertion, and removal processes may be combined (e.g., reordering and insertion, or reordering and removal, or insertion and removal, or reordering, insertion, and removal).

Limitation of the block partitioning information in a list of block partitioning information can be done implicitly by utilizing the geometries of a current block. For example, it is possible to limit usage to only partition that results in block width and block height being a power of two. For such block partitioning information, information resulting in either sub block width or sub block height that is not a power of two will not be used in the list.

The list modification parameters, for example, can also indicate if no modification is needed. If no modification is needed, steps S21002 can be skipped. Accordingly, the modified list of block partitioning information is the same as the determined list of block partitioning information before going to step S21003.

At step S21003, partition selection parameters are written into a bitstream. FIG. 37 shows the possible locations of the parameters in a compressed video bitstream.

Next, at step S21004, block partitioning information is selected only from the modified list of block partitioning information using the written partition selection parameters. Here, using the selected block partitioning information will result in partitioning a block into a plurality of sub blocks. The written partition selection parameters, for example, can include an index to select one of the block partitioning information from the determined list of block partitioning information. As another example, the written partition selection parameters can include a plurality of split/merge flags to derive the block partitioning information from initial block partitioning information.

Figure 53:
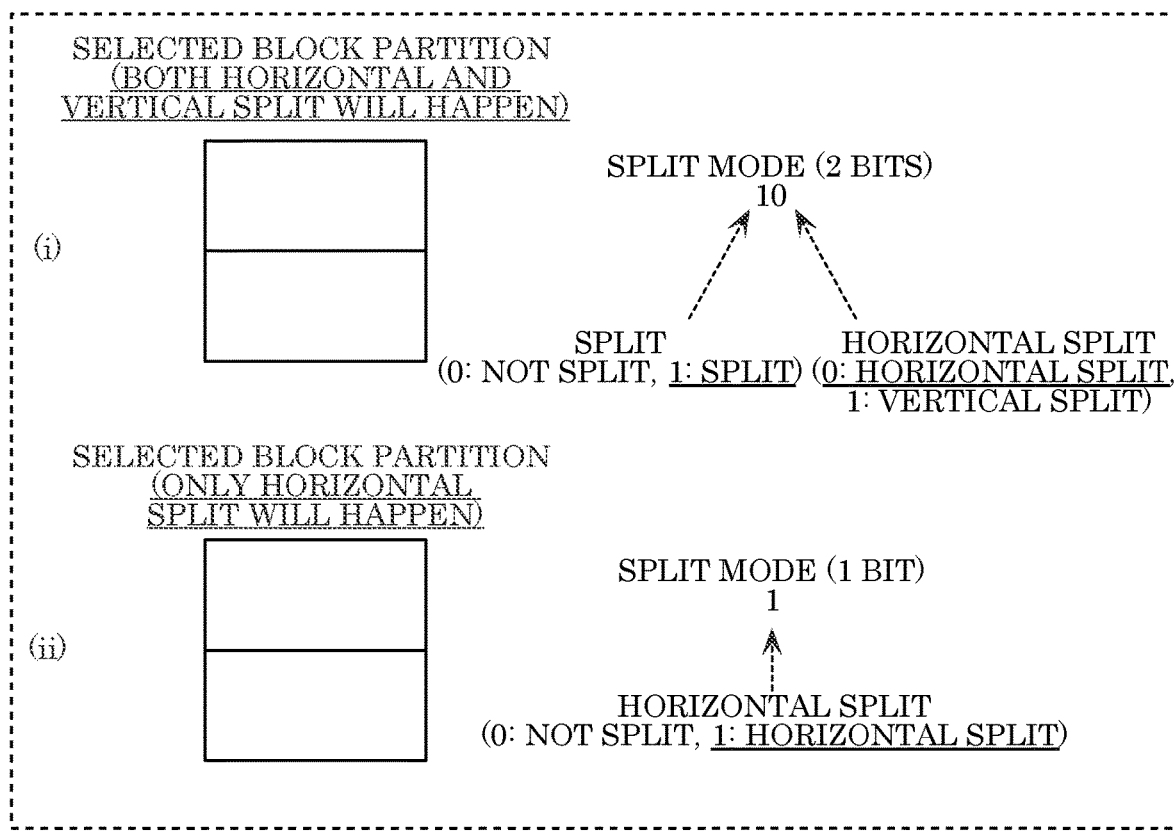
FIG. 53 illustrates the coding bits and meaning of partition selection parameters.

Coding bits and the meaning of the partition selection parameters varies depending on the selected block partitioning information. For example, when only horizontal partition happens according to the selected block partitioning information, there is no need to indicate whether the partition is a horizontal or vertical partition, and portioning a block simply means horizontally partitioning a block as shown in FIG. 53. On the other hand, when only vertical partition happens according to the selected block partitioning information, there is also no need to indicate whether the partition is a horizontal or vertical partition, and portioning a block simply means vertically partitioning a block.

At step S21005, a block is partitioned into a plurality of sub blocks using the selected block partitioning information. The selected block partitioning information, for example, can be final block partitioning information used for partitioning the block into sub blocks. As another example, the selected block partitioning information can also be predicted block partitioning information or initial block partitioning information. Final block partitioning information will be derived for partitioning the block into sub blocks based on the predicted block partitioning information or initial block partitioning information.

At step S21006, a sub block from the plurality of sub blocks is encoded in an encoding process. Here, the encoding process includes a transform process and/or a prediction process. The transform process may be performed on a per block basis similar to the sub block size.

[Encoder]

The structure of the video/image encoder according to this embodiment is the same as illustrated in FIG. 35 described in Embodiment 1. Accordingly, duplicate depiction and description is omitted.

[Decoding Process]

FIG. 32 illustrates one example of a video decoding process according to Embodiment 11.

As a first step S22001, list modification parameters are parsed from a bitstream. FIG. 37 shows the parsable locations of the parameters in a compressed video bitstream.

Next, at step S22002, a determined list of block partitioning information is modified into a modified list of block partitioning information using the parsed list modification parameters. The determined list of block partitioning information may be predetermined. For example, the modification can be a process to reorder the determined list of block partitioning information to generate a modified list of block partitioning information. Here, partition selection parameters are decoded using lesser bits to indicate block partitioning information earlier in the order of the list than block partitioning information later in the order of the list. With reordering, the selected block partitioning information will be placed earlier in the list and the coding bits of partition selection parameters will be reduced, as shown in FIG. 51.

To reorder the list, for example, the list can be classified into different groups of block partitioning information (e.g., vertical partition group, horizontal partition group, quad-tree partition group, and all partition group which includes all block partitioning information). By reordering these groups of block partitioning information, the reordering of the list is achieved as shown in FIG. 52. In this example, the list modification parameters can include parameters to indicate the order of each group of block partitioning in the modified list of block partitioning information.

Limitation of the block partitioning information in each group can be done implicitly by utilizing the geometries of a current block. For example, it is possible to limit usage to only partition that results in block width and block height being a power of two. For such block partitioning information, information resulting in either sub block width or sub block height that is not a power of two will not be used in the group.

As another example, the modification may be a process to insert additional block partitioning information into a determined list of block partitioning information to generate a longer list of block partitioning information. The decoded bits of partition selection parameters will be reduced when the most likely block partitioning information is inserted at the front of the list. Here, partition selection parameters are decoded using lesser bits to indicate block partitioning information earlier in the order of the list than block partitioning information later in the order of the list.

As another example, the modification can also be a process to remove block partitioning information from a determined list of block partitioning information to generate a shorter list of block partitioning information. The decoded bits of partition selection parameters will be reduced when the unlikely block partitioning information before the most likely block partitioning information is removed. Here, partition selection parameters are decoded using lesser bits to indicate block partitioning information earlier in the order of the list than block partitioning information later in the order of the list.

Reordering, insertion, and removal processes may be combined (e.g., reordering and insertion, or reordering and removal, or insertion and removal, or reordering, insertion, and removal).

Limitation of the block partitioning information in a list of block partitioning information can be done implicitly by utilizing the geometries of a current block. For example, it is possible to limit usage to only partition that results in block width and block height being a power of two. For such block partitioning information, information resulting in either sub block width or sub block height that is not a power of two will not be used in the list.

The list modification parameters, for example, can also indicate if no modification is needed. If no modification is needed, steps S22002 can be skipped. Accordingly, the modified list of block partitioning information is the same as the determined list of block partitioning information before going to step S22003.

At step S22003, partition selection parameters are parsed from a bitstream. FIG. 37 shows the parsable locations of the parameters in a compressed video bitstream.

Next, at step S22004, block partitioning information is selected only from the modified list of block partitioning information using the parsed partition selection parameters. Here, using the selected block partitioning information will result in partitioning a block into a plurality of sub blocks. The parsed partition selection parameters, for example, can include an index to select one of the block partitioning information from the determined list of block partitioning information. As another example, the parsed partition selection parameters can include a plurality of split/merge flags to derive the block partitioning information from initial block partitioning information.

Decoding bits and the meaning of the partition selection parameters varies depending on the selected block partitioning information. For example, when only horizontal partition happens according to the selected block partitioning information, there is no need to indicate whether the partition is a horizontal or vertical partition, and portioning a block simply means horizontally partitioning a block as shown in FIG. 53. On the other hand, when only vertical partition happens according to the selected block partitioning information, there is also no need to indicate whether the partition is a horizontal or vertical partition, and portioning a block simply means vertically partitioning a block.

At step S22005, a block is partitioned into a plurality of sub blocks using the selected block partitioning information. The selected block partitioning information, for example, can be final block partitioning information used for partitioning the block into sub blocks. As another example, the selected block partitioning information can also be predicted block partitioning information or initial block partitioning information. Final block partitioning information will be derived for partitioning the block into sub blocks based on the predicted block partitioning information or initial block partitioning information.

At step S22006, a sub block from the plurality of sub blocks is decoded in a decoding process. Here, the decoding process includes an inverse transform process and/or a prediction process. The inverse transform process may be performed on a per block basis similar to the sub block size.

[Decoder]

The structure of the video/image encoder according to this embodiment is the same as illustrated in FIG. 36 described in Embodiment 1. Accordingly, duplicate depiction and description is omitted.

Embodiment 12

[Outline]

An encoder according to this embodiment encodes a block of an image, and includes a processor and memory connected to the processor. Using the memory, the processor: retrieves block information from one or more previously encoded blocks; modifies a determined list of block partitioning information into a modified list of block partitioning information using the block information retrieved; writes a partition selection parameter into a bitstream; selects block partitioning information from only the modified list of block partitioning information using the partition selection parameter written, wherein using the block partitioning information selected will result in partitioning a block into a plurality of sub blocks; partitions a current block into a plurality of sub blocks using the block partitioning information selected; and encodes a sub block included in the plurality of sub blocks in an encoding process including a transform process and/or a prediction process. The determined list of block partitioning information may be predetermined.

This makes it possible to modify a determined list of block partitioning information using block information retrieved from a previously encoded block. Accordingly, it is possible to reduce the amount of coding pertaining to block partitioning information and improve compression efficiency.

For example, in the encoder according to this embodiment, modifying the determined list of block partitioning information may include reordering the determined list of block partitioning information to generate the modified list of block partitioning information, and the partition selection parameter may be encoded using fewer bits to indicate block partitioning information earlier in list order than block partitioning information later in list order.

This makes it possible to reorder a determined list of block partitioning information using block information retrieved from a previously encoded block. Accordingly, it is easier to place block partitioning information that is more likely to be selected at the top of the list, which makes it possible to reduce the amount of coding pertaining to block partitioning information.

For example, in the encoder according to this embodiment, modifying the determined list of block partitioning information may include inserting additional partitioning information into the determined list of block partitioning information to generate a longer list of block partitioning information.

This makes it possible to insert additional block partitioning information into a determined list of block partitioning information using block information retrieved from a previously encoded block. Accordingly, it is easier to add block partitioning information suitable for block partitioning to the list, and possible to improve compression efficiency.

For example, in the encoder according to this embodiment, the current block and the one or more previously encoded blocks may be different blocks, and at least one of the one or more previously encoded blocks may be included in a same frame as the current block or another frame which is different from the frame including the current block.

This makes it possible to retrieve block information from one or more previously encoded mutually different blocks, and more suitably modify the block partitioning information list. As a result, it is possible to improve compression efficiency.

For example, in the encoder according to this embodiment, the block information retrieved may include at least one of information related to block partition structure, information related to an intra prediction mode or an inter prediction mode, information related to an intra prediction direction, information related to a motion vector, information related to a reference picture, information related to a quantization parameter, and information related to a partitioning depth.

This makes it possible to use information appropriate as block information, which makes it possible to modify the block partitioning information list using block information further suitable for block partitioning. As a result, it is possible to reduce the amount of coding pertaining to block partitioning information and improve compression efficiency.

A decoder according to this embodiment decodes a block of an image, and includes a processor and memory connected to the processor. Using the memory, the processor: retrieves block information from one or more previously decoded blocks; modifies a determined list of block partitioning information into a modified list of block partitioning information using the block information retrieved; parses a partition selection parameter from a bitstream; selects block partitioning information from only the modified list of block partitioning information using the partition selection parameter parsed, wherein using the block partitioning information selected will result in partitioning a block into a plurality of sub blocks; partitions a current block into a plurality of sub blocks using the block partitioning information selected; and decodes a sub block included in the plurality of sub blocks in a decoding process including an inverse transform process and/or a prediction process.

This makes it possible to modify a determined list of block partitioning information using block information retrieved from a previously decoded block. Accordingly, it is possible to reduce the amount of coding pertaining to block partitioning information and improve compression efficiency.

For example, in the decoder according to this embodiment, modifying the determined list of block partitioning information may include reordering the determined list of block partitioning information to generate the modified list of block partitioning information, and the partition selection parameter may be encoded using fewer bits to indicate block partitioning information earlier in list order than block partitioning information later in list order.

This makes it possible to reorder a determined list of block partitioning information using block information retrieved from a previously decoded block. Accordingly, it is easier to place block partitioning information that is more likely to be selected at the top of the list, which makes it possible to reduce the amount of coding pertaining to block partitioning information.

For example, in the decoder according to this embodiment, modifying the determined list of block partitioning information may include inserting additional partitioning information into the determined list of block partitioning information to generate a longer list of block partitioning information.

This makes it possible to insert additional block partitioning information into a determined list of block partitioning information using block information retrieved from a previously decoded block. Accordingly, it is easier to add block partitioning information suitable for block partitioning to the list, and possible to improve compression efficiency.

For example, in the decoder according to this embodiment, the current block and the one or more previously decoded blocks may be different blocks, and at least one of the one or more previously decoded blocks may be included in a same frame as the current block or another frame which is different from the frame including the current block.

This makes it possible to retrieve block information from one or more previously decoded mutually different blocks, and more suitably modify the block partitioning information list. As a result, it is possible to improve compression efficiency.

For example, in the decoder according to this embodiment, the block information retrieved may include at least one of information related to block partition structure, information related to an intra prediction mode or an inter prediction mode, information related to an intra prediction direction, information related to a motion vector, information related to a reference picture, information related to a quantization parameter, and information related to a partitioning depth.

This makes it possible to use information appropriate as block information, which makes it possible to modify the block partitioning information list using block information further suitable for block partitioning. As a result, it is possible to reduce the amount of coding pertaining to block partitioning information and improve compression efficiency.

General or specific aspects of the present disclosure may be realized as a system, method, integrated circuit, computer program, computer readable medium such as a CD-ROM, or any given combination thereof.

Figure 33:
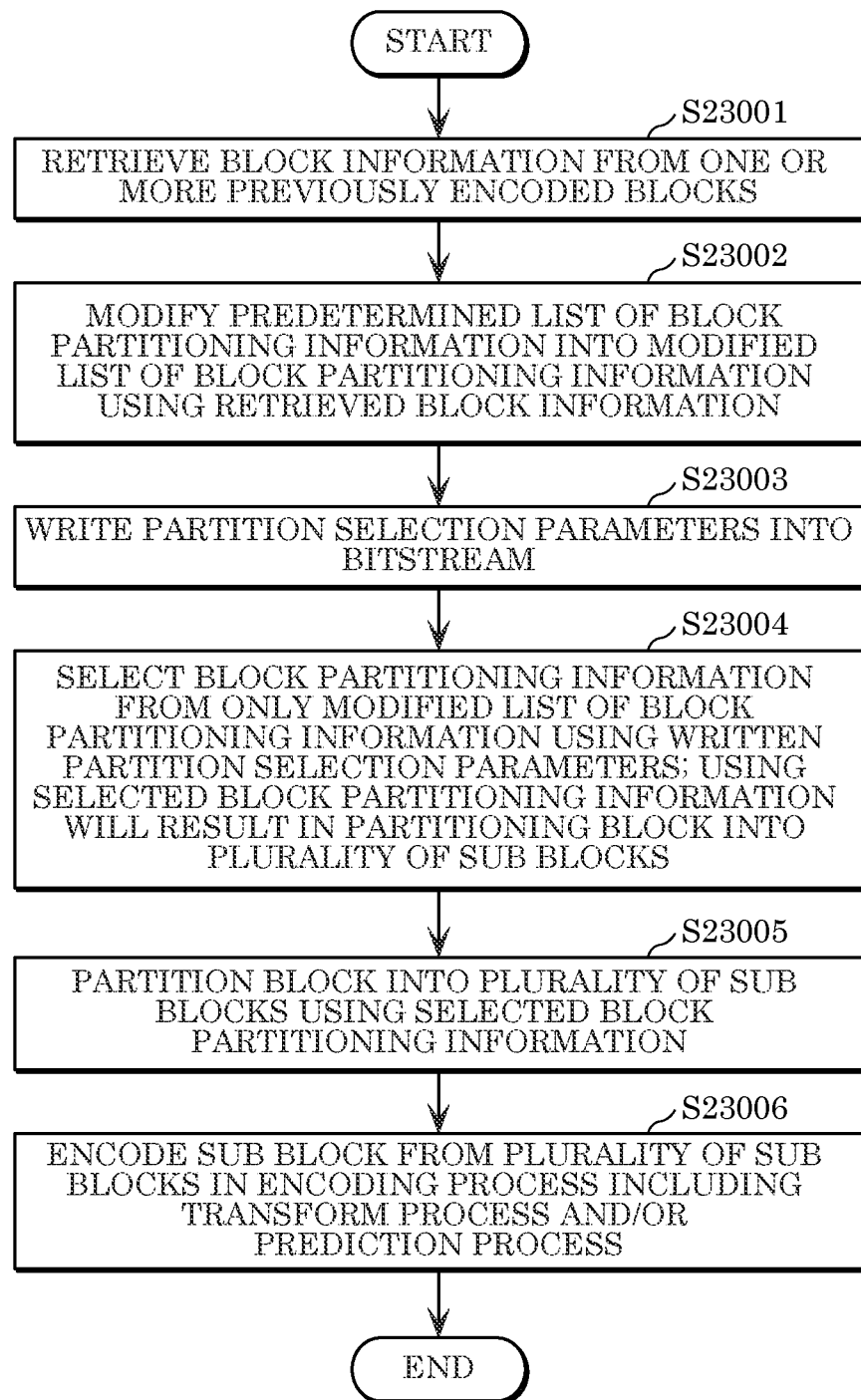
FIG. 33 is a flow chart of one example of a video encoding process according to Embodiment 12.
Figure 34:
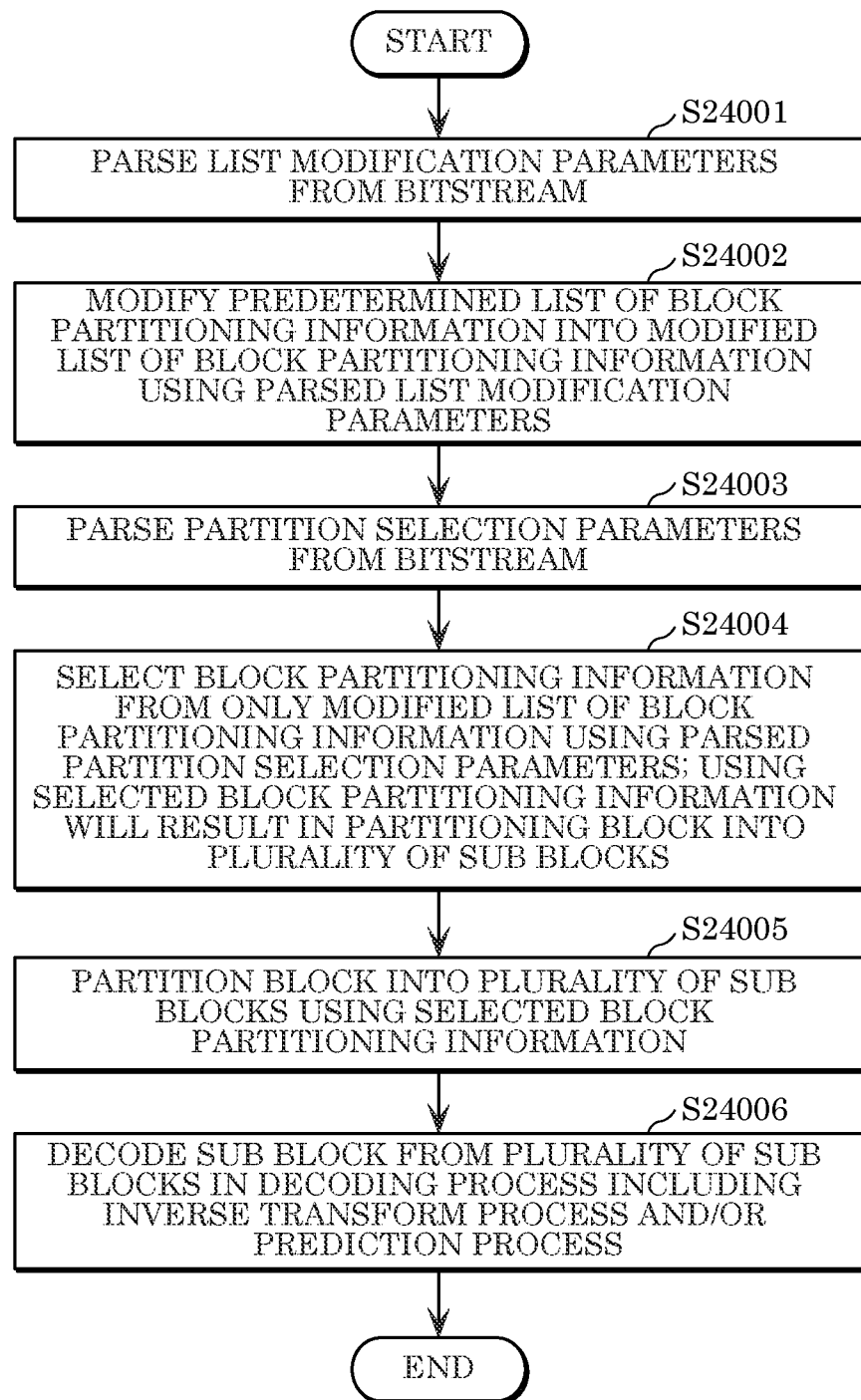
FIG. 34 is a flow chart of one example of a video decoding process according to Embodiment 12.

Hereinafter, methods for encoding and decoding video will be described according to an embodiment as illustrated in FIG. 33 and FIG. 34.

[Encoding Process]

FIG. 33 illustrates one example of a video encoding process according to Embodiment 12.

As a first step S23001, block information (for example, block partition structure, intra prediction or inter prediction mode, intra prediction direction, motion vector, reference picture, quantization parameters, and partitioning depth) is retrieved from one or more previously encoded blocks.

Next, at step S23002, a determined list of block partitioning information is modified into a modified list of block partitioning information using the retrieved block information. The determined list of block partitioning information may be predetermined. For example, the modification can be a process to reorder the determined list of block partitioning information to generate a modified list of block partitioning information. Here, partition selection parameters are coded using lesser bits to indicate block partitioning information earlier in the order of the list than block partitioning information later in the order of the list. With reordering, the selected block partitioning information will be placed earlier in the list and the coding bits of partition selection parameters will be reduced, as shown in FIG. 51.

To reorder the list, for example, the list can be classified into different groups of block partitioning information (e.g., vertical partition group, horizontal partition group, quad-tree partition group, and all partition group which includes all block partitioning information). By reordering these groups of block partitioning information, the reordering of the list is achieved as shown in FIG. 52. In this example, the list modification parameters can include parameters to indicate the order of each group of block partitioning in the modified list of block partitioning information.

Limitation of the block partitioning information in each group can be done implicitly by utilizing the geometries of a current block. For example, it is possible to limit usage to only partition that results in block width and block height being a power of two. For such block partitioning information, information resulting in either sub block width or sub block height that is not a power of two will not be used in the group.

As another example, the modification may be a process to insert additional block partitioning information into a determined list of block partitioning information to generate a longer list of block partitioning information. The coded bits of partition selection parameters will be reduced when the most likely block partitioning information is inserted at the front of the list. Here, partition selection parameters are coded using lesser bits to indicate block partitioning information earlier in the order of the list than block partitioning information later in the order of the list.

As another example, the modification can also be a process to remove block partitioning information from a determined list of block partitioning information to generate a shorter list of block partitioning information. The coded bits of partition selection parameters will be reduced when the unlikely block partitioning information before the most likely block partitioning information is removed. Here, partition selection parameters are coded using lesser bits to indicate block partitioning information earlier in the order of the list than block partitioning information later in the order of the list.

Reordering, insertion, and removal processes may be combined (e.g., reordering and insertion, or reordering and removal, or insertion and removal, or reordering, insertion, and removal).

Limitation of the block partitioning information in a list of block partitioning information can be done implicitly by utilizing the geometries of a current block. For example, it is possible to limit usage to only partition that results in block width and block height being a power of two. For such block partitioning information, information resulting in either sub block width or sub block height that is not a power of two will not be used in the list.

To use the retrieved block information for modifying the determined list of block partitioning information, first, predicted block partitioning information can be derived. For example, the block partitioning information from the determined list of block partitioning information, which has same/similar block partition structure as the predicted block partitioning information, will be moved forward in the list. For example, if the predicted block partition structures only include horizontal split, group 1 as shown in FIG. 52 (before reordering) will be moved to the front of the list as shown in FIG. 52 (after reordering).

Block partitioning information may be a set of parameters that indicate whether a block is horizontally split or vertically split. Block partitioning information may also be a set of parameters that include a determined block width and a determined block height for all sub blocks in a block. The determined block width and the determined block height may be predetermined. Block partitioning information may be a set of parameters that include an index to select one candidate partition structure from a determined candidate list of block partition structures. The determined candidate list of partitioning structures may be predetermined. Here, block partition structure visually presents geometries of all sub blocks in a block, as shown in FIG. 38.

Block partition structure from a previously encoded block can be directly used as the predicted block partition structure for the current block.

Block partition structures from two or more previously encoded blocks can also be combined (for example, the top half uses block partition structure from the top block and the left half uses block partition structure from the left block as shown in FIG. 39) to derive a new block partition structure as the predicted block partition structure for the current block. One example of how to select previously encoded blocks is to select encoded blocks having same intra/inter prediction mode as current block. Specifically, if the current block is an inter predicted block, one or more of the previously encoded blocks that were encoded using inter prediction will be selected.

Block partition structure from a previously encoded block can also be modified (for example, use block partition structure with less partition depth as shown in FIG. 40) to derive a new block partition structure as the predicted block partition structure for the current block.

Predicted block partitioning information may differ based on intra prediction direction information from previously encoded blocks. For example, intra prediction direction information from specific neighbouring block locations may be used to predict whether the current block is to be split vertically or horizontally into smaller blocks. For example, when intra prediction direction information from a top neighbouring block is determined to be a vertical direction or close to vertical direction, block partitioning information including a vertical split can be predicted for current block. Similarly, if intra prediction direction information from a left neighbouring block is determined to be a horizontal direction or close to a horizontal direction, a block partitioning information including a horizontal split can be predicted for the current block.

Block partitioning information may be predicted according to intra/inter prediction modes from previously encoded blocks. When prediction modes from the encoded blocks are intra prediction mode, determined block partitioning information can be predicted to partition a block into a plurality of sub blocks with smaller block sizes. When prediction modes from the encoded blocks are inter prediction mode, other determined block partitioning information can be predicted to partition a block into a plurality of sub blocks with larger block sizes. The determined block partitioning information may be predetermined.

Block partitioning information can also be predicted according to motion vectors from previously encoded blocks. When a difference between the motion vectors from the encoded blocks and the motion vectors from current block is bigger than a determined threshold, determined block partitioning information can be predicted to partition a block into a plurality of sub blocks with smaller block sizes. On the other hand, when a difference between the motion vectors from the encoded blocks and the motion vectors from current block is not greater than a determined threshold, other determined block partitioning information can be predicted to partition a block into a plurality of sub blocks with larger block sizes. The determined thresholds and the determined block partitioning information may be predetermined.

Block partitioning information may be predicted according to quantization parameters from previously encoded blocks. For example, when the values of quantization parameters from the encoded blocks are smaller than a determined value, determined block partitioning information can be predicted to partition a block into a plurality of sub blocks with smaller block sizes. When the values of quantization parameters from the encoded blocks are not smaller than a determined value, other determined block partitioning information can be predicted to partition a block into a plurality of sub blocks with larger block sizes. The determined values and the determined block partitioning information may be predetermined.

Block partitioning information may be predicted according to reference picture information from previously encoded blocks. For example, when reference pictures from the encoded blocks are temporally near to the current image or when the reference pictures from the encoded blocks are similar to one another, determined block partitioning information can be predicted to partition a block into a plurality of sub blocks with larger block sizes. When reference pictures from the encoded blocks are not near to the current image or when the reference pictures from the encoded blocks are not similar to one another, other determined block partitioning information can be predicted to partition a block into a plurality of sub blocks with smaller block sizes. The determined block partitioning information may be predetermined.

Block partitioning information may be predicted according to partitioning depths from previously encoded blocks. For example, when partitioning depths from the encoded blocks are larger than a determined value (for example, determined depth value equals to 4), determined block partitioning information can be predicted to partition a block into a plurality of sub blocks with smaller block sizes. When partitioning depths from the encoded blocks are not larger than determined value (for example, depth equals to 2), other determined block partitioning information can be predicted to partition a block into a plurality of sub blocks with larger block sizes. The determined values and the determined block partitioning information may be predetermined.

Block partitioning information may also be predicted according to partitioning information from previously encoded blocks of a frame different than current frame. For example, the context/s to be used to arithmetic encode block partitioning information (which includes split information) for the current block, or the current block's split information, can be predicted from a previously encoded block (e.g., a collocated block, the last encoded block or an encoded block identified by a motion vector) from an encoded frame which is different from current frame.

At step S23003, partition selection parameters are written into a bitstream. FIG. 37 shows the possible locations of the partition selection parameter in a compressed video bitstream.

Next, at step S23004, block partitioning information is selected only from the modified list of block partitioning information using the written partition selection parameters. Here, using the selected block partitioning information will result in partitioning a block into a plurality of sub blocks. The written partition selection parameters, for example, can include an index to select one of the block partitioning information from the determined list of block partitioning information. The determined list of block partitioning information may be predetermined. As another example, the written partition selection parameters can include a plurality of split/merge flags to derive the block partitioning information from initial block partitioning information.

Coding bits and the meaning of the partition selection parameters varies depending on the selected block partitioning information. For example, when only horizontal partition happens according to the selected block partitioning information, there is no need to indicate whether the partition is a horizontal or vertical partition, and portioning a block simply means horizontally partitioning a block as shown in FIG. 53. On the other hand, when only vertical partition happens according to the selected block partitioning information, there is also no need to indicate whether the partition is a horizontal or vertical partition, and portioning a block simply means vertically partitioning a block.

At step S23005, a block is partitioned into a plurality of sub blocks using the selected block partitioning information.

At step S23006, a sub block from the plurality of sub blocks is encoded in an encoding process. Here, the encoding process includes a transform process and/or a prediction process. The transform process may be performed on a per block basis similar to the sub block size.

[Encoder]

The structure of the video/image encoder according to this embodiment is the same as illustrated in FIG. 35 described in Embodiment 1. Accordingly, duplicate depiction and description is omitted.

[Decoding Process]

FIG. 34 illustrates one example of a video decoding process according to Embodiment 12.

As a first step S24001, block information (for example, block partition structure, intra prediction or inter prediction mode, intra prediction direction, motion vector, reference picture, quantization parameters, and partitioning depth) is retrieved from one or more previously decoded blocks.

Next, at step S24002, a determined list of block partitioning information is modified into a modified list of block partitioning information using the retrieved block information. The determined list of block partitioning information may be predetermined. For example, the modification can be a process to reorder the determined list of block partitioning information to generate a modified list of block partitioning information. Here, partition selection parameters are decoded using lesser bits to indicate block partitioning information earlier in the order of the list than block partitioning information later in the order of the list. With reordering, the selected block partitioning information will be placed earlier in the list and the coding bits of partition selection parameters will be reduced, as shown in FIG. 51.

To reorder the list, for example, the list can be classified into different groups of block partitioning information (e.g., vertical partition group, horizontal partition group, quad-tree partition group, and all partition group which includes all block partitioning information). By reordering these groups of block partitioning information, the reordering of the list is achieved as shown in FIG. 52. In this example, the list modification parameters can include parameters to indicate the order of each group of block partitioning in the modified list of block partitioning information.

Limitation of the block partitioning information in each group can be done implicitly by utilizing the geometries of a current block. For example, it is possible to limit usage to only partition that results in block width and block height being a power of two. For such block partitioning information, information resulting in either sub block width or sub block height that is not a power of two will not be used in the group.

As another example, the modification can be a process to insert additional partitioning information into said determined list of block partitioning information to generate a longer list of block partitioning information. The decoded bits of partition selection parameters will be reduced when the most likely block partitioning information is inserted at the front of the list. Here, partition selection parameters are decoded using lesser bits to indicate block partitioning information earlier in the order of the list than block partitioning information later in the order of the list.

As another example, the modification can also be a process to remove partitioning information from the determined list of block partitioning information to generate a shorter list of block partitioning information. The decoded bits of partition selection parameters will be reduced when the unlikely block partitioning information before the most likely block partitioning information is removed. Here, partition selection parameters are decoded using lesser bits to indicate block partitioning information earlier in the order of the list than block partitioning information later in the order of the list.

Reordering, insertion, and removal processes may be combined (e.g., reordering and insertion, or reordering and removal, or insertion and removal, or reordering, insertion, and removal).

Limitation of the block partitioning information in a list of block partitioning information can be done implicitly by utilizing the geometries of a current block. For example, it is possible to limit usage to only partition that results in block width and block height being a power of two. For such block partitioning information, information resulting in either sub block width or sub block height that is not a power of two will not be used in the list.

To use the retrieved block information for modifying the determined list of block partitioning information, first, predicted block partitioning information can be derived. For example, the block partitioning information from the determined list of block partitioning information, which has same/similar block partition structure as the predicted block partitioning information, will be moved forward in the list. For example, if the predicted block partition structures only include horizontal split, group 1 as shown in FIG. 52 (before reordering) will be moved to the front of the list as shown in FIG. 52 (after reordering).

Block partitioning information may be a set of parameters that indicate whether a block is horizontally split or vertically split. Block partitioning information may also be a set of parameters that include a determined block width and a determined block height for all sub blocks in a block. The determined block width and the determined block height may be predetermined. Block partitioning information may be a set of parameters that include an index to select one candidate partition structure from a determined candidate list of block partition structures. The determined candidate list of block partition structures may be predetermined. Here, block partition structure visually presents geometries of all sub blocks in a block, as shown in FIG. 38.

Block partition structure from a previously decoded block can be directly used as the predicted block partition structure for the current block.

Block partition structures from two or more previously decoded blocks can also be combined (for example, the top half uses the block partition structure from the top block and the left half uses the block partition structure from the left block as shown in FIG. 39) to derive a new block partition structure as the predicted block partition structure for the current block. One example of how to select previously decoded blocks is to select decoded blocks having same intra/inter prediction mode as current block. Specifically, if the current block is an inter predicted block, one or more of the previously decoded blocks that were decoded using inter prediction will be selected.

Block partition structure from a previously decoded block can also be modified (for example, use block partition structure with less partition depth as shown in FIG. 40) to derive a new block partition structure as the predicted block partition structure for the current block.

Predicted block partitioning information may differ based on intra prediction direction information from previously decoded blocks. For example, intra prediction direction information from specific neighbouring block locations may be used to predict whether the current block is to be split vertically or horizontally into smaller blocks. For example, when intra prediction direction information from a top neighbouring block is determined to be a vertical direction or close to vertical direction, block partitioning information including a vertical split can be predicted for current block. Similarly, if intra prediction direction information from a left neighbouring block is determined to be a horizontal direction or close to a horizontal direction, a block partitioning information including a horizontal split can be predicted for the current block.

Block partitioning information may be predicted according to intra/inter prediction modes from previously decoded blocks. When prediction modes from the decoded blocks are intra prediction mode, determined block partitioning information can be predicted to partition a block into a plurality of sub blocks with smaller block sizes. When prediction modes from the decoded blocks are inter prediction mode, other determined block partitioning information can be predicted to partition a block into a plurality of sub blocks with larger block sizes. The determined block partitioning information may be predetermined.

Block partitioning information can also be predicted according to motion vectors from previously decoded blocks. When a difference between the motion vectors from the decoded blocks and the motion vectors from current block is bigger than a determined threshold, determined block partitioning information can be predicted to partition a block into a plurality of sub blocks with smaller block sizes. On the other hand, when a difference between the motion vectors from the decoded blocks and the motion vectors from current block is not greater than a determined threshold, other determined block partitioning information can be predicted to partition a block into a plurality of sub blocks with larger block sizes. The determined thresholds and the determined block partitioning information may be predetermined.

Block partitioning information may be predicted according to quantization parameters from previously decoded blocks. For example, when the values of quantization parameters from the decoded blocks are smaller than a determined value, determined block partitioning information can be predicted to partition a block into a plurality of sub blocks with smaller block sizes. When the values of quantization parameters from the decoded blocks are not smaller than a determined value, other determined block partitioning information can be predicted to partition a block into a plurality of sub blocks with larger block sizes. The determined values and the determined block partitioning information may be predetermined.

Block partitioning information may be predicted according to reference picture information from previously decoded blocks. For example, when reference pictures from the decoded blocks are temporally near to the current image or when the reference pictures from the decoded blocks are similar to one another, determined block partitioning information can be predicted to partition a block into a plurality of sub blocks with larger block sizes. When reference pictures from the decoded blocks are not near to the current image or when the reference pictures from the decoded blocks are not similar to one another, other determined block partitioning information can be predicted to partition a block into a plurality of sub blocks with smaller block sizes. The determined block partitioning information may be predetermined.

Block partitioning information may be predicted according to partitioning depths from previously decoded blocks. For example, when partitioning depths from the decoded blocks are larger than a determined value (for example, determined depth value equals to 4), determined block partitioning information can be predicted to partition a block into a plurality of sub blocks with smaller block sizes. When partitioning depths from the decoded blocks are not larger than determined value (for example, depth equals to 2), other determined block partitioning information can be predicted to partition a block into a plurality of sub blocks with larger block sizes. The determined values and the determined block partitioning information may be predetermined.

Block partitioning information may also be predicted according to partitioning information from previously decoded blocks of a frame different than current frame. For example, the context/s to be used for arithmetic decoding block partitioning information (which includes split information) for the current block, or the current block's split information, can be predicted from a previously decoded block (e.g., a collocated block, the last decoded block or a decoded block identified by a motion vector) from a decoded frame which is different from current frame.

At step S24003, partition selection parameters are parsed from a bitstream. FIG. 37 shows the parsable locations of the partition selection parameters in a compressed video bitstream.

Next, at step S24004, block partitioning information is selected only from the modified list of block partitioning information using the parsed partition selection parameters. Here, using the selected block partitioning information will result in partitioning a block into a plurality of sub blocks. The parsed partition selection parameters, for example, can include an index to select one of the block partitioning information from the determined list of block partitioning information. The determined block partitioning information may be predetermined. As another example, the parsed partition selection parameters can include a plurality of split/merge flags to derive the block partitioning information from initial block partitioning information.

Decoding bits and the meaning of the partition selection parameters varies depending on the selected block partitioning information. For example, when only horizontal partition happens according to the selected block partitioning information, there is no need to indicate whether the partition is a horizontal or vertical partition, and portioning a block simply means horizontally partitioning a block as shown in FIG. 53. On the other hand, when only vertical partition happens according to the selected block partitioning information, there is also no need to indicate whether the partition is a horizontal or vertical partition, and portioning a block simply means vertically partitioning a block.

At step S24005, a block is partitioned into a plurality of sub blocks using the selected block partitioning information.

At step S24006, a sub block from the plurality of sub blocks is decoded in a decoding process. Here, the decoding process includes an inverse transform process and/or a prediction process. The inverse transform process may be performed on a per block basis similar to the sub block size.

[Decoder]

The structure of the video/image encoder according to this embodiment is the same as illustrated in FIG. 36 described in Embodiment 1. Accordingly, duplicate depiction and description is omitted.

Embodiment 13

In the above embodiments, the geometries of the block and/or sub blocks is not particularly restricted, but the geometries of the block and/or sub blocks may be restricted. For example, block width and height for the block and sub blocks may be limited to a power of 2 each. In particular, when a multiple partition including at least three odd-numbered child nodes is used, block width and height for the sub blocks may be limited to a power of 2 each. In such cases, block partitioning information indicating a block width and height for the sub block that is not a power of 2 is not used for block partition.

In other words, the encoder according to this embodiment encodes a block of an image, and includes a processor and memory connected to the processor. Using the memory, the processor: partitions a block into a plurality of sub blocks; and encodes a sub block included in the plurality of sub blocks in an encoding process including a transform process and/or a prediction process. The block is partitioned using a multiple partition including at least three odd-numbered child nodes. Each of a width and a height of each of the plurality of sub blocks is a power of two.

This makes it possible to partition a block into a plurality of sub blocks whose widths and heights are each a power of 2, even when the block is partitioned using a multiple partition including at least three odd-numbered child nodes. Accordingly, it is possible to obtain sub blocks in sizes suitable for encoding, and improve compression efficiency.

Moreover, the decoder according to this embodiment decodes a block of an image, and includes a processor and memory connected to the processor. Using the memory, the processor: partitions a block into a plurality of sub blocks; and decodes a sub block included in the plurality of sub blocks in a decoding process including an inverse transform process and/or a prediction process. The block is partitioned using a multiple partition including at least three odd-numbered child nodes. Each of a width and a height of each of the plurality of sub blocks is a power of two.

This makes it possible to partition a block into a plurality of sub blocks whose widths and heights are each a power of 2, even when the block is partitioned using a multiple partition including at least three odd-numbered child nodes. Accordingly, it is possible to obtain sub blocks in sizes suitable for decoding, and improve compression efficiency.

General or specific aspects of the present disclosure may be realized as a system, method, integrated circuit, computer program, computer readable medium such as a CD-ROM, or any given combination thereof.

Implementations and Applications

As described in each of the above embodiments, each functional or operational block can typically be realized as an MPU (micro processing unit) and memory, for example. Moreover, processes performed by each of the functional blocks may be realized as a program execution unit, such as a processor which reads and executes software (a program) recorded on a recording medium such as ROM. The software may be distributed. The software may be recorded on a variety of recording media such as semiconductor memory. Note that each functional block can also be realized as hardware (dedicated circuit).

The processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments will be described, as well as various systems that implement the application examples. Such a system may be characterized as including an image encoder that employs the image encoding method, an image decoder that employs the image decoding method, or an image encoder-decoder that includes both the image encoder and the image decoder. Other configurations of such a system may be modified on a case-by-case basis.

(Usage Examples)

Figure 54:
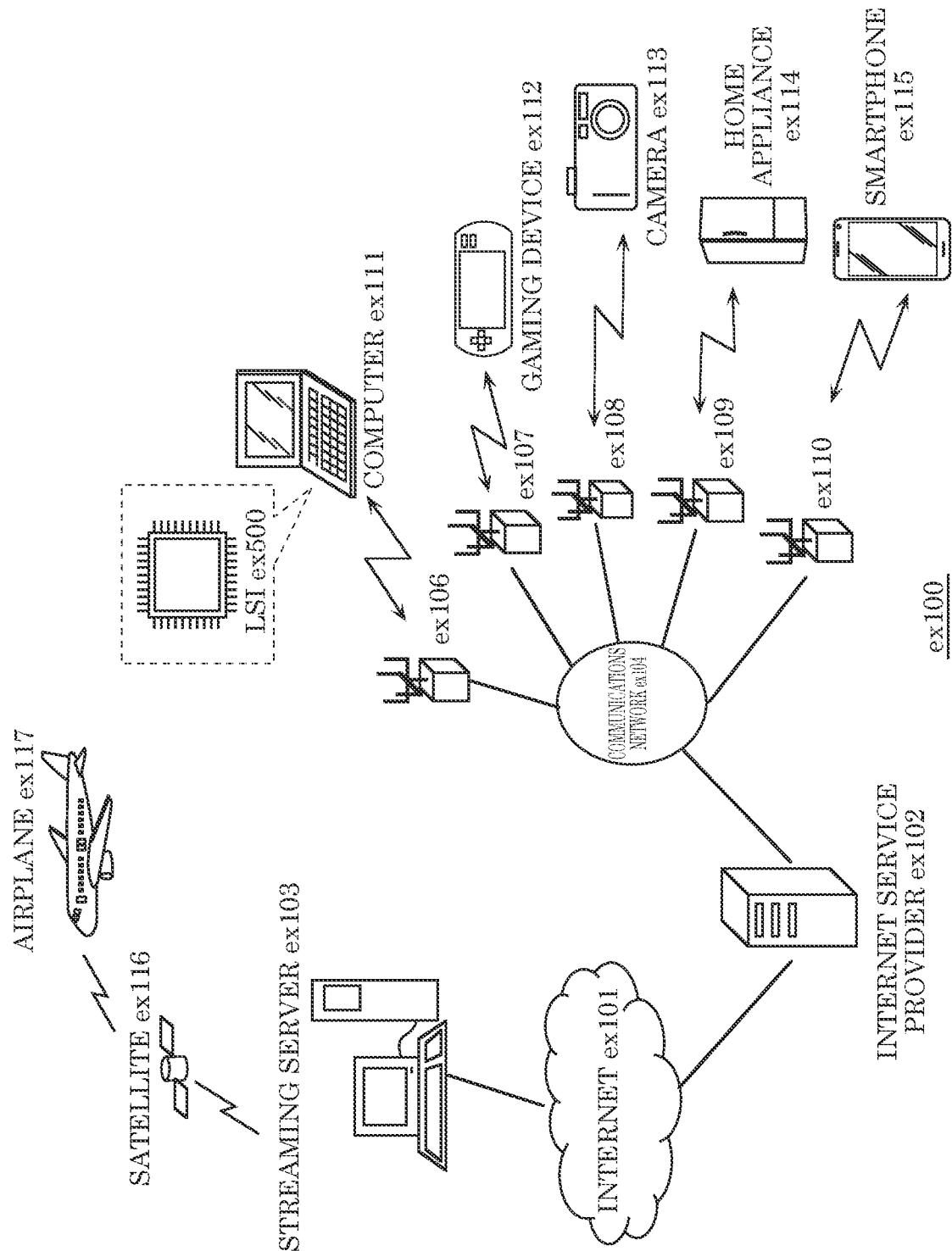
FIG. 54 illustrates an overall configuration of a content providing system for implementing a content distribution service.

FIG. 54 illustrates an overall configuration of content providing system ex100 suitable for implementing a content distribution service. The area in which the communication service is provided is divided into cells of desired sizes, and base stations ex106, ex107, ex108, ex109, and ex110, which are fixed wireless stations in the illustrated example, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above devices. In various implementations, the devices may be directly or indirectly connected together via a telephone network or near field communication, rather than via base stations ex106 through ex110. Further, streaming server ex103 may be connected to devices including computer ex111, gaming device ex112, camera ex113, home appliance ex114, and smartphone ex115 via, for example, internet ex101. Streaming server ex103 may also be connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the 2G, 3G, 3.9G, and 4G systems, as well as the next-generation 5G system.

Home appliance ex114 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) may perform the encoding processing described in the above embodiments on still-image or video content captured by a user via the terminal, may multiplex video data obtained via the encoding and audio data obtained by encoding audio corresponding to the video, and may transmit the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices may each function as the image decoder, according to one aspect of the present disclosure.

(Decentralized Processing)

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some type of error or change in connectivity due, for example, to a spike in traffic, it is possible to stream data stably at high speeds, since it is possible to avoid affected parts of the network by, for example, dividing the processing between a plurality of edge servers, or switching the streaming duties to a different edge server and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning (or content significance) of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos, and the server, on a per-unit basis. The units may be, for example, groups of pictures (GOP), pictures, or tiles resulting from dividing a picture. This makes it possible to reduce load times and achieve streaming that is closer to real time.

Since the videos are of approximately the same scene, management and/or instructions may be carried out by the server so that the videos captured by the terminals can be cross-referenced. Moreover, the server may receive encoded data from the terminals, change the reference relationship between items of data, or correct or replace pictures themselves, and then perform the encoding. This makes it possible to generate a stream with increased quality and efficiency for the individual items of data.

Furthermore, the server may stream video data after performing transcoding to convert the encoding format of the video data. For example, the server may convert the encoding format from MPEG to VP (e.g., VP9), and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

(3D, Multi-angle)

There has been an increase in usage of images or videos combined from images or videos of different scenes concurrently captured, or of the same scene captured from different angles, by a plurality of terminals such as camera ex113 and/or smartphone ex115. Videos captured by the terminals are combined based on, for example, the separately obtained relative positional relationship between the terminals, or regions in a video having matching feature points.

In addition to the encoding of two-dimensional moving pictures, the server may encode a still image based on scene analysis of a moving picture, either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. The server may separately encode three-dimensional data generated from, for example, a point cloud and, based on a result of recognizing or tracking a person or object using three-dimensional data, may select or reconstruct and generate a video to be transmitted to a reception terminal, from videos captured by a plurality of terminals.

This allows the user to enjoy a scene by freely selecting videos corresponding to the video capturing terminals, and allows the user to enjoy the content obtained by extracting a video at a selected viewpoint from three-dimensional data reconstructed from a plurality of images or videos. Furthermore, as with video, sound may be recorded from relatively different angles, and the server may multiplex audio from a specific angle or space with the corresponding video, and transmit the multiplexed video and audio.

In recent years, content that is a composite of the real world and a virtual world, such as virtual reality (VR) and augmented reality (AR) content, has also become popular. In the case of VR images, the server may create images from the viewpoints of both the left and right eyes, and perform encoding that tolerates reference between the two viewpoint images, such as multi-view coding (MVC), and, alternatively, may encode the images as separate streams without referencing. When the images are decoded as separate streams, the streams may be synchronized when reproduced, so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information. The server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a determined RGB value, such as a chroma key, and generate data in which areas other than the object are set as the background. The determined RGB value may be predetermined.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area, or inspect a region in further detail up close.

In situations in which a plurality of wireless connections are possible over near, mid, and far distances, indoors or outdoors, it may be possible to seamlessly receive content using a streaming system standard such as MPEG-DASH. The user may switch between data in real time while freely selecting a decoder or display apparatus including the user's terminal, displays arranged indoors or outdoors, etc. Moreover, using, for example, information on the position of the user, decoding can be performed while switching which terminal handles decoding and which terminal handles the displaying of content. This makes it possible to map and display information, while the user is on the move in route to a destination, on the wall of a nearby building in which a device capable of displaying content is embedded, or on part of the ground. Moreover, it is also possible to switch the bit rate of the received data based on the accessibility to the encoded data on a network, such as when encoded data is cached on a server quickly accessible from the reception terminal, or when encoded data is copied to an edge server in a content delivery service.

(Scalable Encoding)

Figure 55:
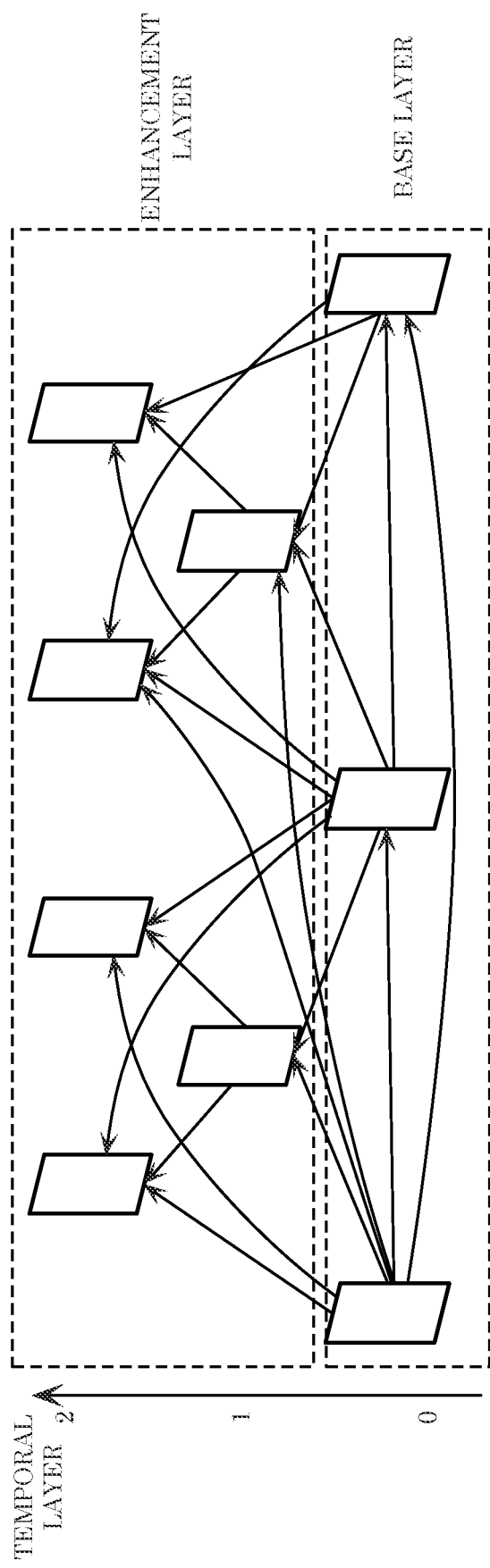
FIG. 55 illustrates one example of an encoding structure in scalable encoding.

The switching of content will be described with reference to a scalable stream, illustrated in FIG. 55, which is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 55. Note that there may be a plurality of individual streams that are of the same content but different quality. In other words, by determining which layer to decode based on internal factors, such as the processing ability on the decoder side, and external factors, such as communication bandwidth, the decoder side can freely switch between low resolution content and high resolution content while decoding. For example, in a case in which the user wants to continue watching, for example at home on a device such as a TV connected to the Internet, a video that the user had been previously watching on smartphone ex115 while on the move, the device can simply decode the same stream up to a different layer, which reduces the server side load.

Furthermore, in addition to the configuration described above, in which scalability is achieved as a result of the pictures being encoded per layer, with the enhancement layer being above the base layer, the enhancement layer may include metadata based on, for example, statistical information on the image. The decoder side may generate high image quality content by performing super-resolution imaging on a picture in the base layer based on the metadata. Super-resolution imaging may improve the SN ratio while maintaining resolution and/or increasing resolution. Metadata includes information for identifying a linear or a non-linear filter coefficient, as used in super-resolution processing, or information identifying a parameter value in filter processing, machine learning, or a least squares method used in super-resolution processing.

Figure 56:
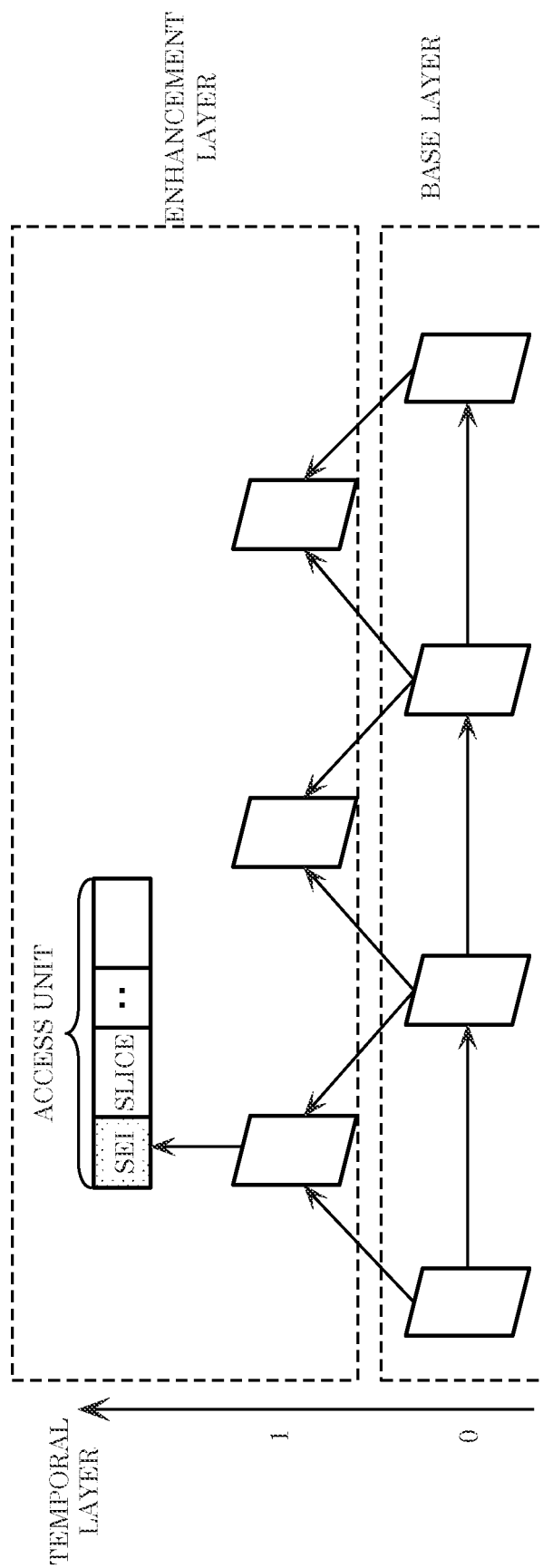
FIG. 56 illustrates one example of an encoding structure in scalable encoding.

Alternatively, a configuration may be provided in which a picture is divided into, for example, tiles in accordance with, for example, the meaning of an object in the image. On the decoder side, only a partial region is decoded by selecting a tile to decode. Further, by storing an attribute of the object (person, car, ball, etc.) and a position of the object in the video (coordinates in identical images) as metadata, the decoder side can identify the position of a desired object based on the metadata and determine which tile or tiles include that object. For example, as illustrated in FIG. 56, metadata may be stored using a data storage structure different from pixel data, such as an SEI (supplemental enhancement information) message in HEVC. This metadata indicates, for example, the position, size, or color of the main object.

Metadata may be stored in units of a plurality of pictures, such as stream, sequence, or random access units. The decoder side can obtain, for example, the time at which a specific person appears in the video, and by fitting the time information with picture unit information, can identify a picture in which the object is present, and can determine the position of the object in the picture.

(Web Page Optimization)

Figure 57:
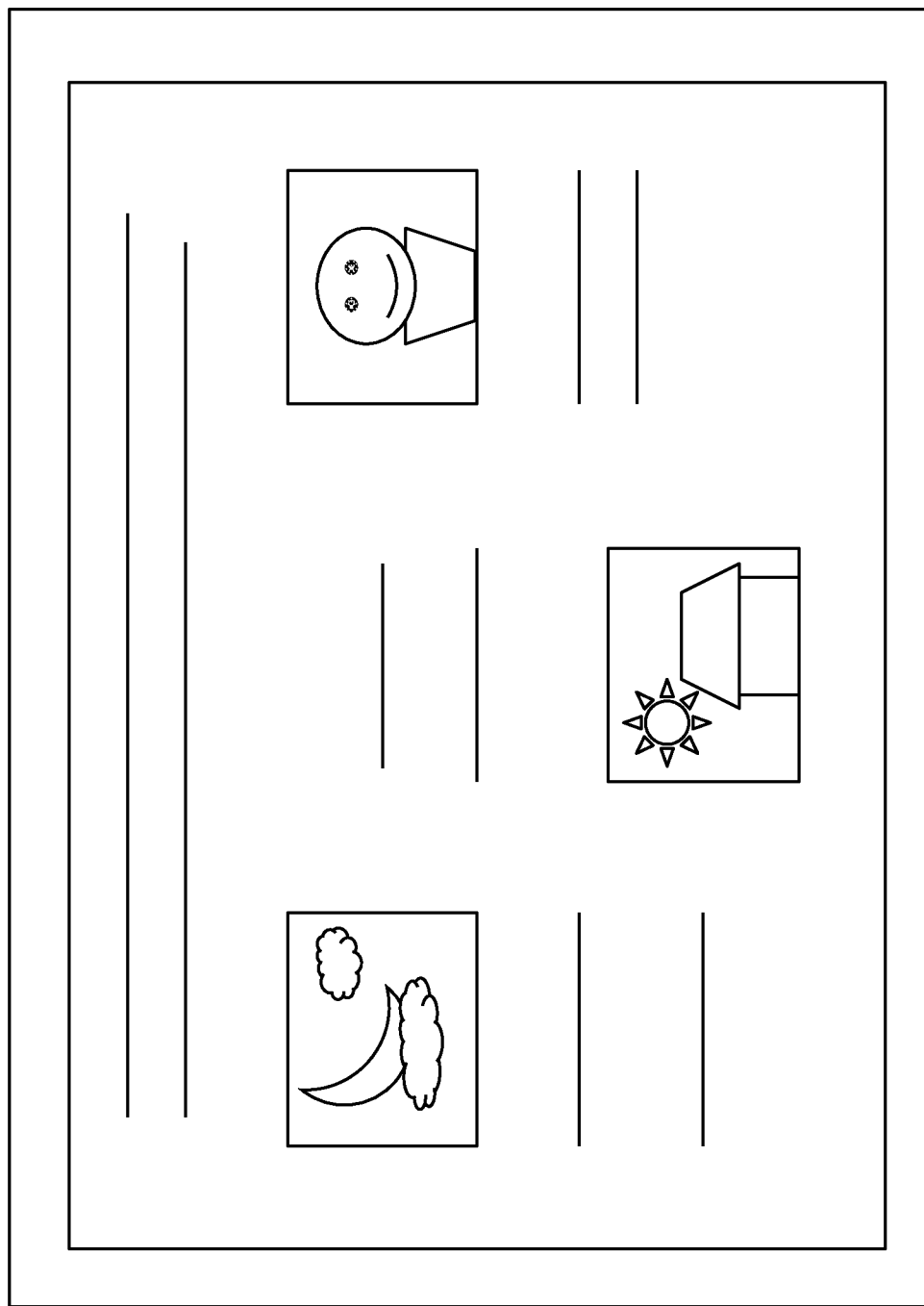
FIG. 57 illustrates an example of a display screen of a web page.
Figure 58:
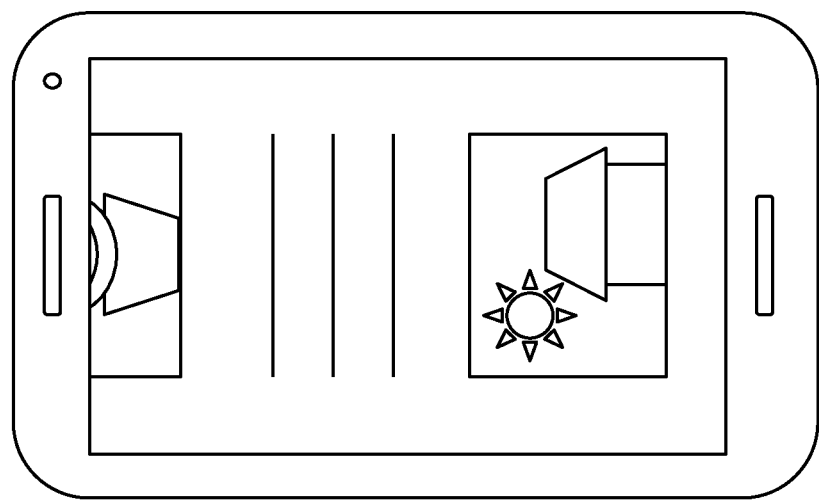
FIG. 58 illustrates an example of a display screen of a web page.

FIG. 57 illustrates an example of a display screen of a web page on computer ex111, for example. FIG. 58 illustrates an example of a display screen of a web page on smartphone ex115, for example. As illustrated in FIG. 57 and FIG. 58, a web page may include a plurality of image links that are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) may display, as the image links, still images included in the content or I pictures; may display video such as an animated gif using a plurality of still images or I pictures; or may receive only the base layer, and decode and display the video.

When an image link is selected by the user, the display apparatus performs decoding while giving the highest priority to the base layer. Note that if there is information in the HTML code of the web page indicating that the content is scalable, the display apparatus may decode up to the enhancement layer. Further, in order to guarantee real-time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Still further, the display apparatus may purposely ignore the reference relationship between pictures, and coarsely decode all B and P pictures as forward reference pictures, and then perform normal decoding as the number of pictures received over time increases.

(Autonomous Driving)

When transmitting and receiving still image or video data such as two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., containing the reception terminal is mobile, the reception terminal can seamlessly receive and perform decoding while switching between base stations among base stations ex106 through ex110 by transmitting information indicating the position of the reception terminal. Moreover, in accordance with the selection made by the user, the situation of the user, and/or the bandwidth of the connection, the reception terminal can dynamically select to what extent the metadata is received, or to what extent the map information, for example, is updated.

In content providing system ex100, the client can receive, decode, and reproduce, in real time, encoded information transmitted by the user.

(Streaming of Individual Content)

In content providing system ex100, in addition to high image quality, long content distributed by a video distribution entity, unicast or multicast streaming of low image quality, and short content from an individual are also possible. Such content from individuals is likely to further increase in popularity. The server may first perform editing processing on the content before the encoding processing, in order to refine the individual content. This may be achieved using the following configuration, for example.

In real time while capturing video or image content, or after the content has been captured and accumulated, the server performs recognition processing based on the raw data or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures, or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement, based on an image processing result. Alternatively, the server may generate and encode a video digest based on a result of an analysis of the meaning of a scene.

There may be instances in which individual content may include content that infringes a copyright, moral right, portrait rights, etc. Such instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Further, the server may be configured to recognize the faces of people other than a registered person in images to be encoded, and when such faces appear in an image, may apply a mosaic filter, for example, to the face of the person. Alternatively, as pre- or post-processing for encoding, the user may specify, for copyright reasons, a region of an image including a person or a region of the background to be processed. The server may process the specified region by, for example, replacing the region with a different image, or blurring the region. If the region includes a person, the person may be tracked in the moving picture, and the person's head region may be replaced with another image as the person moves.

Since there is a demand for real-time viewing of content produced by individuals, which tends to be small in data size, the decoder first receives the base layer as the highest priority, and performs decoding and reproduction, although this may differ depending on bandwidth. When the content is reproduced two or more times, such as when the decoder receives the enhancement layer during decoding and reproduction of the base layer, and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

(Other Implementation and Application Examples)

The encoding and decoding may be performed by LSI (large scale integration circuitry) ex500 (see FIG. 54), which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content, or whether it is capable of executing a specific service. When the terminal is not compatible with the encoding scheme of the content, or when the terminal is not capable of executing a specific service, the terminal first downloads a codec or application software and then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast, whereas unicast is easier with content providing system ex100.

(Hardware Configuration)

Figure 59:
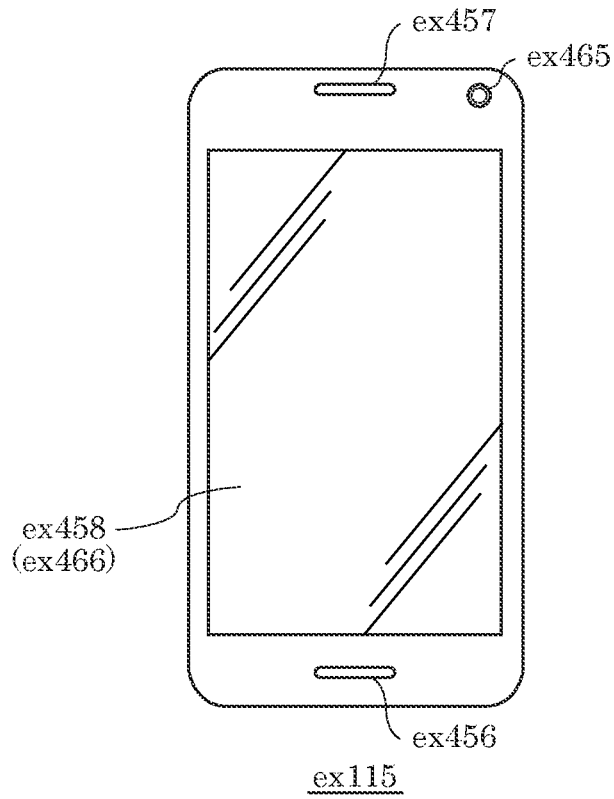
FIG. 59 illustrates one example of a smartphone.
Figure 60:
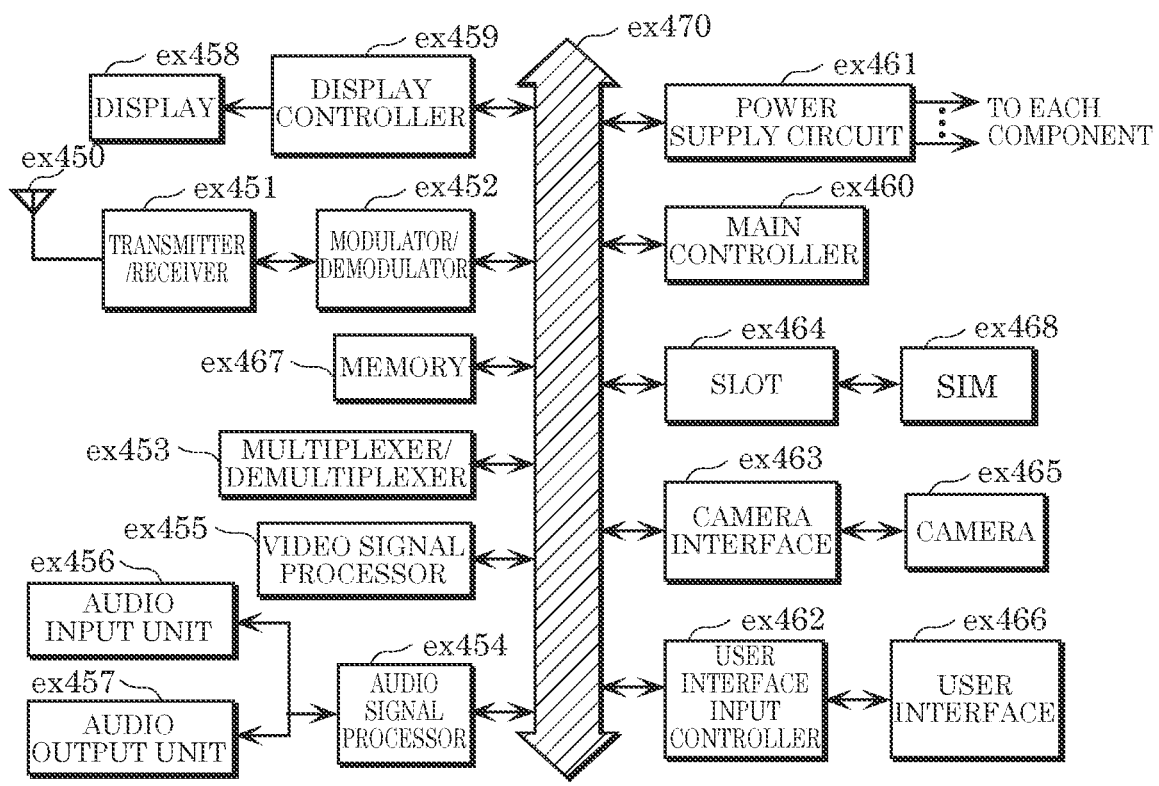
FIG. 60 is a block diagram illustrating a configuration example of a smartphone.

FIG. 59 illustrates further details of smartphone ex115 shown in FIG. 54. FIG. 60 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Main controller ex460, which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns on the power button of power supply circuit ex461, smartphone ex115 is powered on into an operable state, and each component is supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, to which spread spectrum processing is applied by modulator/demodulator ex452 and digital-analog conversion, and frequency conversion processing is applied by transmitter/receiver ex451, and the resulting signal is transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 based on operation of user interface ex466 of the main body, for example. Similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Audio signal processor ex454 encodes an audio signal recorded by audio input unit ex456 while camera ex465 is capturing a video or still image, and transmits the encoded audio data to multiplexer/demultiplexer ex453. Multiplexer/demultiplexer ex453 multiplexes the encoded video data and encoded audio data using a determined scheme, modulates and converts the data using modulator/demodulator (modulator/demodulator circuit) ex452 and transmitter/receiver ex451, and transmits the result via antenna ex450. The determined scheme may be predetermined.

When video appended in an email or a chat, or a video linked from a web page, is received, for example, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Audio signal processor ex454 decodes the audio signal and outputs audio from audio output unit ex457. Since real-time streaming is becoming increasingly popular, there may be instances in which reproduction of the audio may be socially inappropriate, depending on the user's environment. Accordingly, as an initial value, a configuration in which only video data is reproduced, i.e., the audio signal is not reproduced, is preferable; audio may be synchronized and reproduced only when an input, such as when the user clicks video data, is received.

Although smartphone ex115 was used in the above example, three other implementations are conceivable: a transceiver terminal including both an encoder and a decoder; a transmitter terminal including only an encoder; and a receiver terminal including only a decoder. In the description of the digital broadcasting system, an example is given in which multiplexed data obtained as a result of video data being multiplexed with audio data is received or transmitted. The multiplexed data, however, may be video data multiplexed with data other than audio data, such as text data related to the video. Further, the video data itself rather than multiplexed data may be received or transmitted.

Although main controller ex460 including a CPU is described as controlling the encoding or decoding processes, various terminals often include GPUs. Accordingly, a configuration is acceptable in which a large area is processed at once by making use of the performance ability of the GPU via memory shared by the CPU and GPU, or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of pictures, for example, all at once.

The invention claimed is:

1. A non-transitory computer readable medium storing a bitstream,
the bitstream including syntax information according to which a computer performs a decoding process including:
in response to a determined number of sub blocks of a block being set to four, splits the block into four sub blocks, wherein,
in response to a size of the block satisfying a block-size condition, splits the block into four sub blocks along a single direction, wherein the splitting includes,
splitting the block along a vertical direction into four 8×8 sub blocks in response to the width of the block being larger than the height of the block and the size of the block being 32×8; and
splitting the block along a horizontal direction into four 8×8 sub blocks in response to the height of the block being larger than the width of the block and the size of the block being 8×32; and
in response to the size of the block not satisfying the block-size condition, splits the block into four sub blocks along the vertical and horizontal directions, wherein the splitting includes splitting the block along the vertical and horizontal directions into four 16×16 sub blocks in response to the width of the block being equal to the height of the block and the size of the block being 32×32; and
decoding the sub blocks of the block.

* * * * *